Sept. 2, 1958 G. E. HAGEN ET AL 2,850,232
MACHINE FOR DIGITAL DIFFERENTIAL ANALYSIS
Filed Dec. 26, 1951 60 Sheets-Sheet 1

INVENTORS:
GLENN E. HAGEN
CHARLES R. WILLIAMS
EVERETT D. PHILBRICK, JR.
ROBERT M. BECK
CECIL R. RUSSELL

By Herbert E. Metcalf
THEIR PATENT ATTORNEY

Sept. 2, 1958        G. E. HAGEN ET AL        2,850,232

MACHINE FOR DIGITAL DIFFERENTIAL ANALYSIS

Filed Dec. 26, 1951        60 Sheets-Sheet 2

INVENTORS:
GLENN E. HAGEN
CHARLES R. WILLIAMS
EVERETT D. PHILBRICK, JR
ROBERT M. BECK
CECIL R. RUSSELL

By Herbert E. Metcalf

THEIR PATENT ATTORNEY

INVENTORS:
GLENN E. HAGEN
CHARLES R. WILLIAMS
EVERETT D. PHILBRICK, JR.
ROBERT M. BECK
CECIL R. RUSSELL

THEIR PATENT ATTORNEY

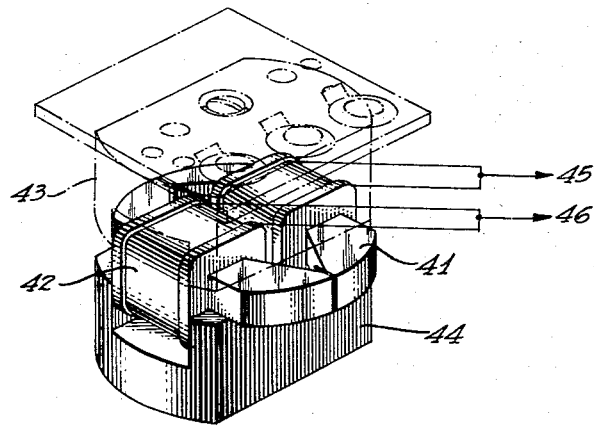
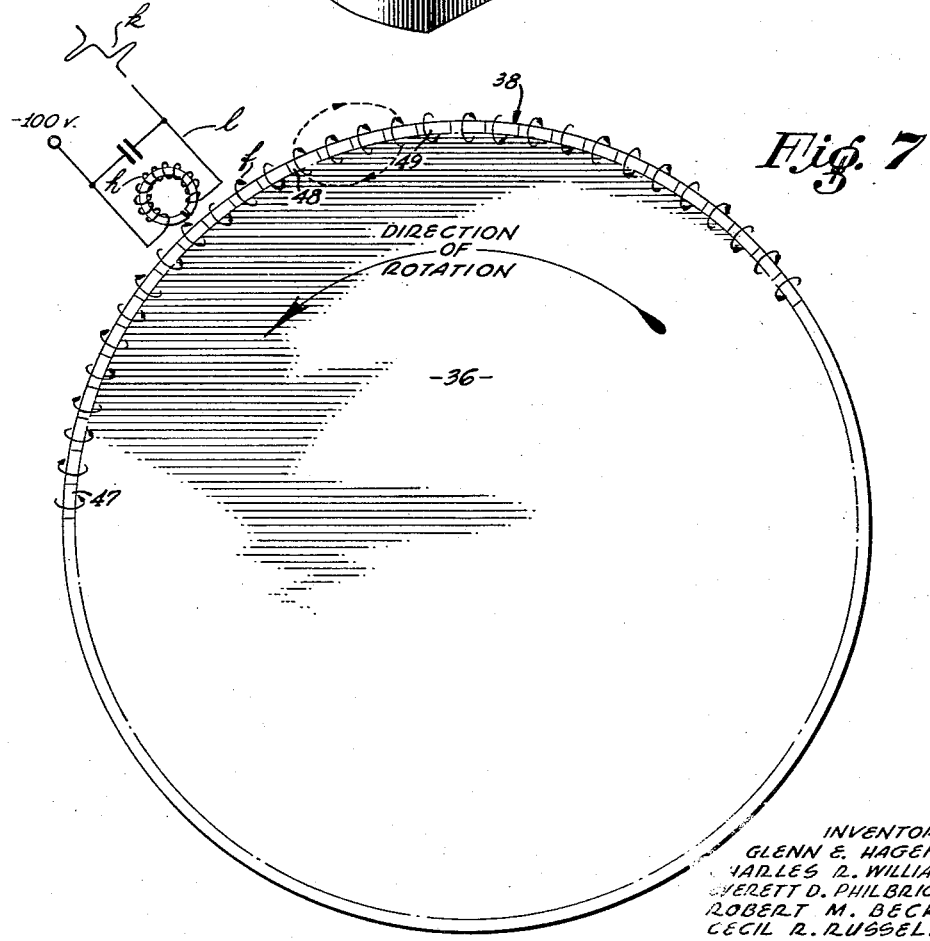

Sept. 2, 1958  G. E. HAGEN ET AL  2,850,232
MACHINE FOR DIGITAL DIFFERENTIAL ANALYSIS
Filed Dec. 26, 1951  60 Sheets-Sheet 5
*Fig. 8*
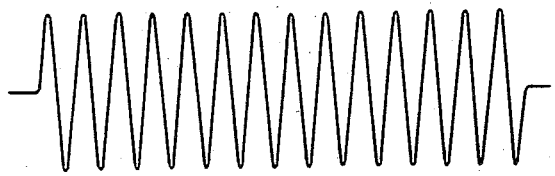
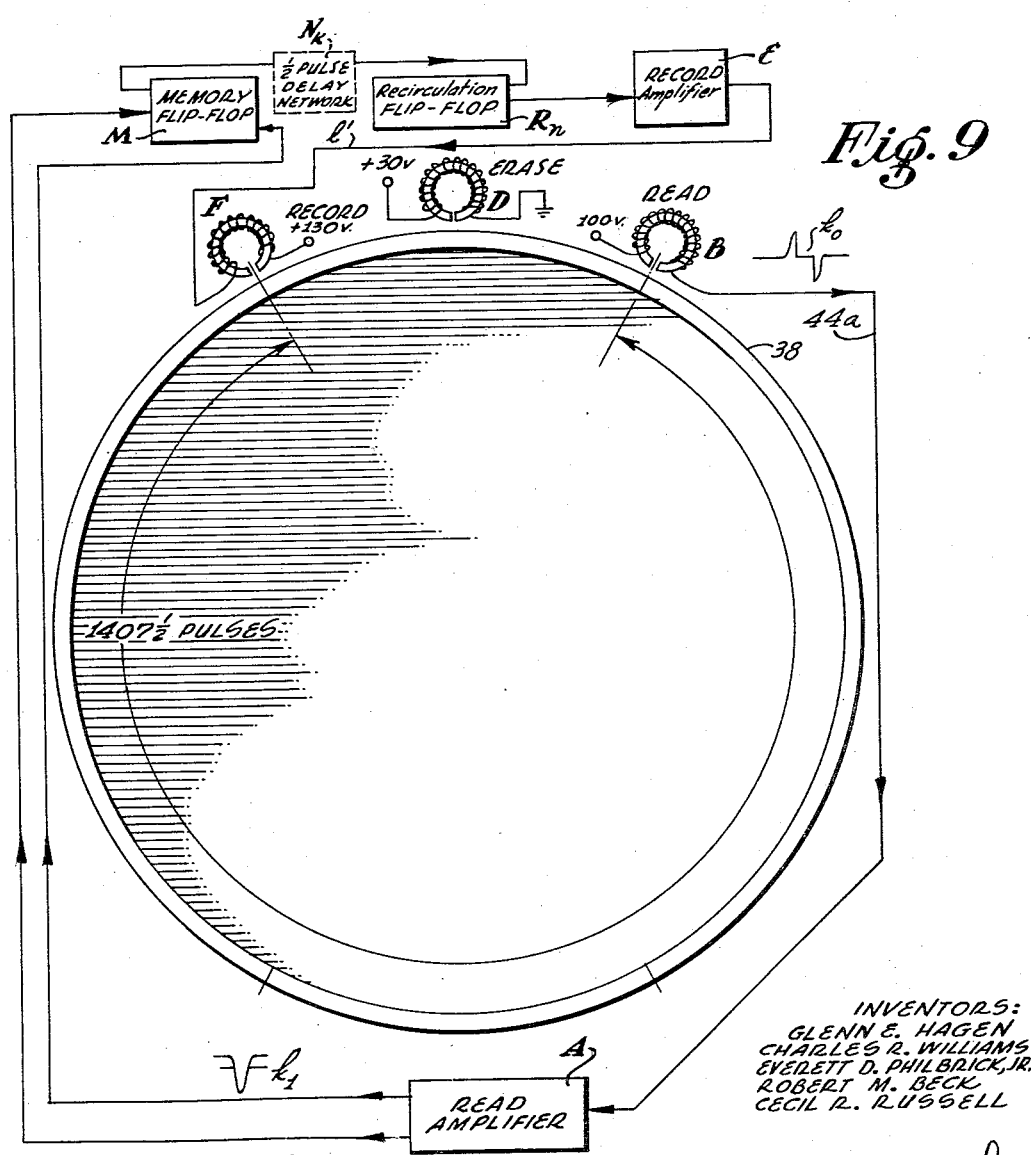
*Fig. 9*
INVENTORS:
GLENN E. HAGEN
CHARLES R. WILLIAMS
EVERETT D. PHILBRICK, JR.
ROBERT M. BECK
CECIL R. RUSSELL
BY Herbert E. Metcalf
THEIR PATENT ATTORNEY Sept. 2, 1958     G. E. HAGEN ET AL     2,850,232
MACHINE FOR DIGITAL DIFFERENTIAL ANALYSIS
Filed Dec. 26, 1951     60 Sheets-Sheet 6

INVENTORS:
GLENN E. HAGEN
CHARLES R. WILLIAMS
EVERETT O. PHILBRICK, JR.
ROBERT M. BECK
CECIL R. RUSSELL

BY Hubert E. Metcalf
THEIR PATENT ATTORNEY

Fig. 11

| WORD STRUCTURE |||| 
| R CHANNEL || Y CHANNEL ||
| PULSE POSITION | INFORMATION | PULSE POSITION | INFORMATION |
|---|---|---|---|
| $P_1$ | BLANK | $P_1$ | FIRST POSSIBLE POSITION OF START SCALE PULSE |
| $P_2$ TO $P_{31}$ | R NUMBER POSSIBLE | $P_2$ TO $P_{30}$ | Y MAGNITUDE POSSIBLE |
| $P_{32}$ | Reverse $dz$ output sign | $P_{31}$ | Y SIGN |
| | | $P_{32}$ | BLANK |

Fig. 12

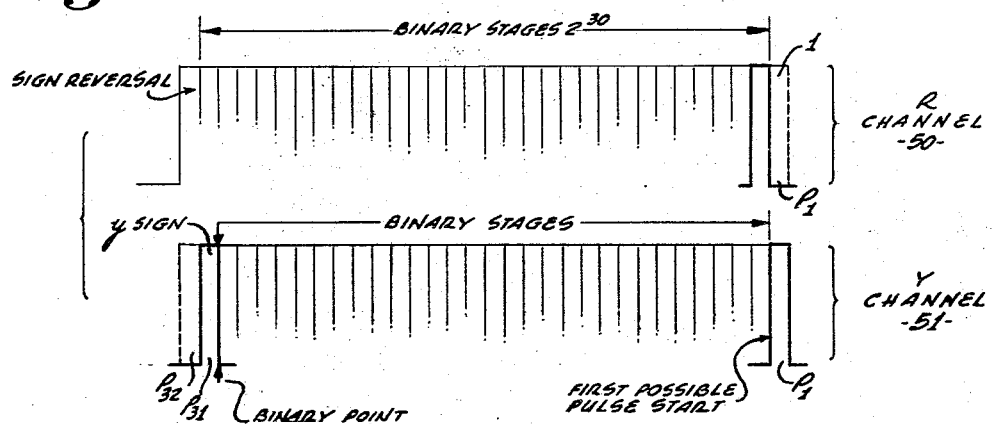

Fig. 13

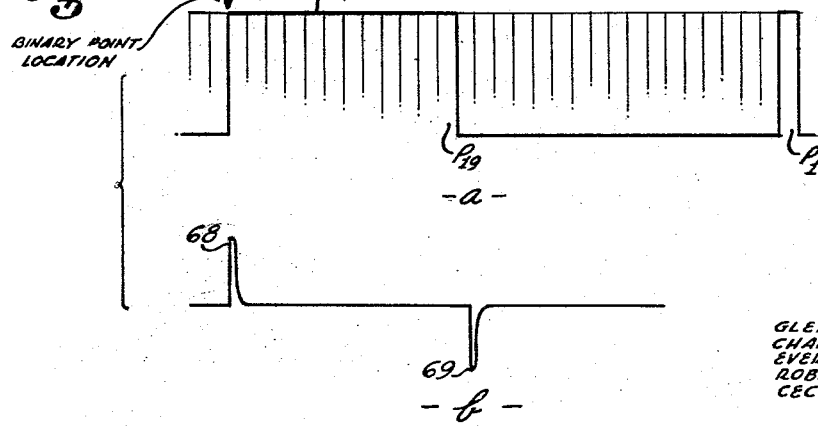

INVENTORS:
GLENN E. HAGEN
CHARLES R. WILLIAMS
EVERETT O. PHILBRICK, JR.
ROBERT M. BECK
CECIL R. RUSSELL

THEIR PATENT ATTORNEY

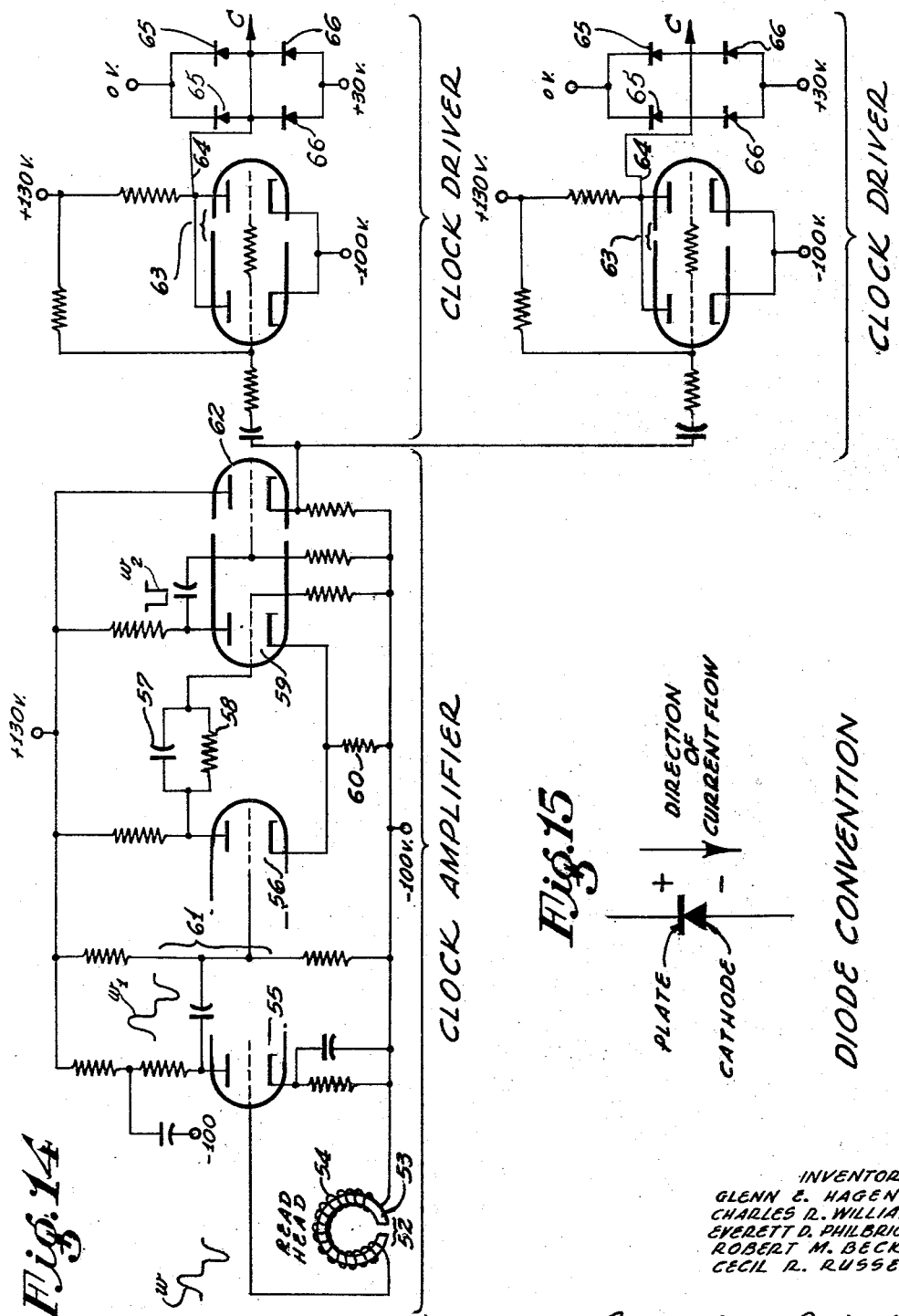

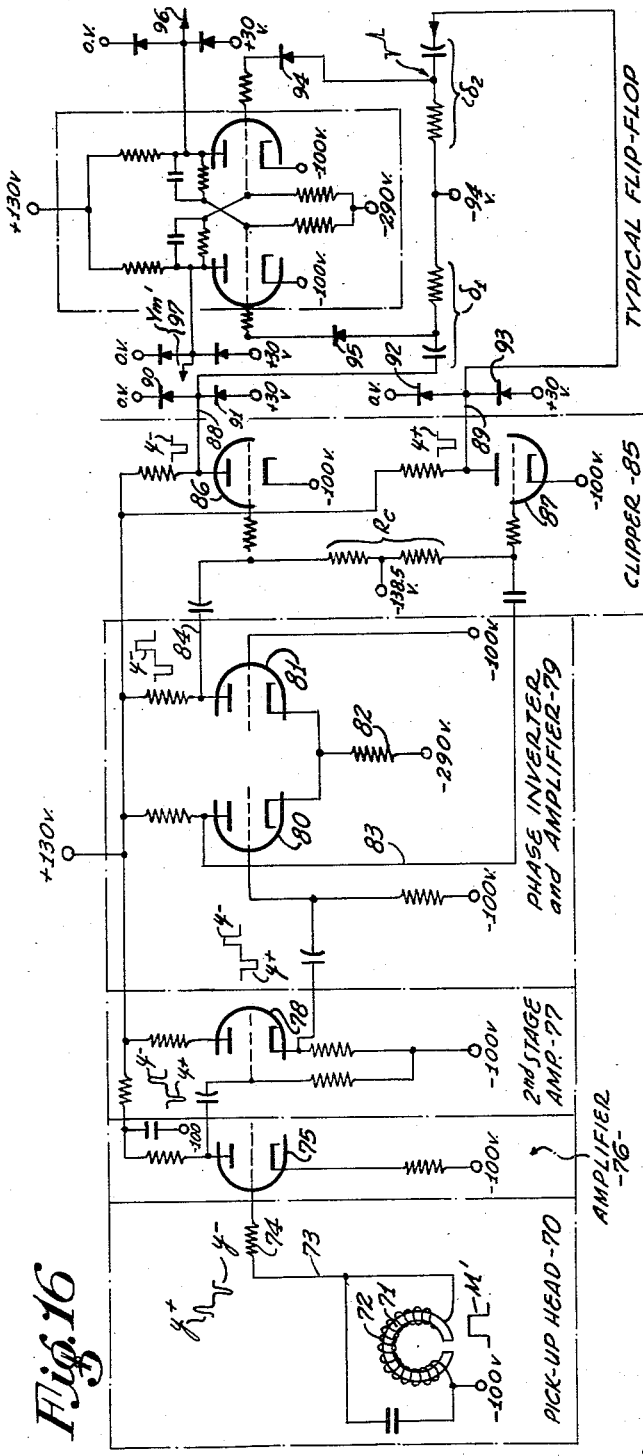

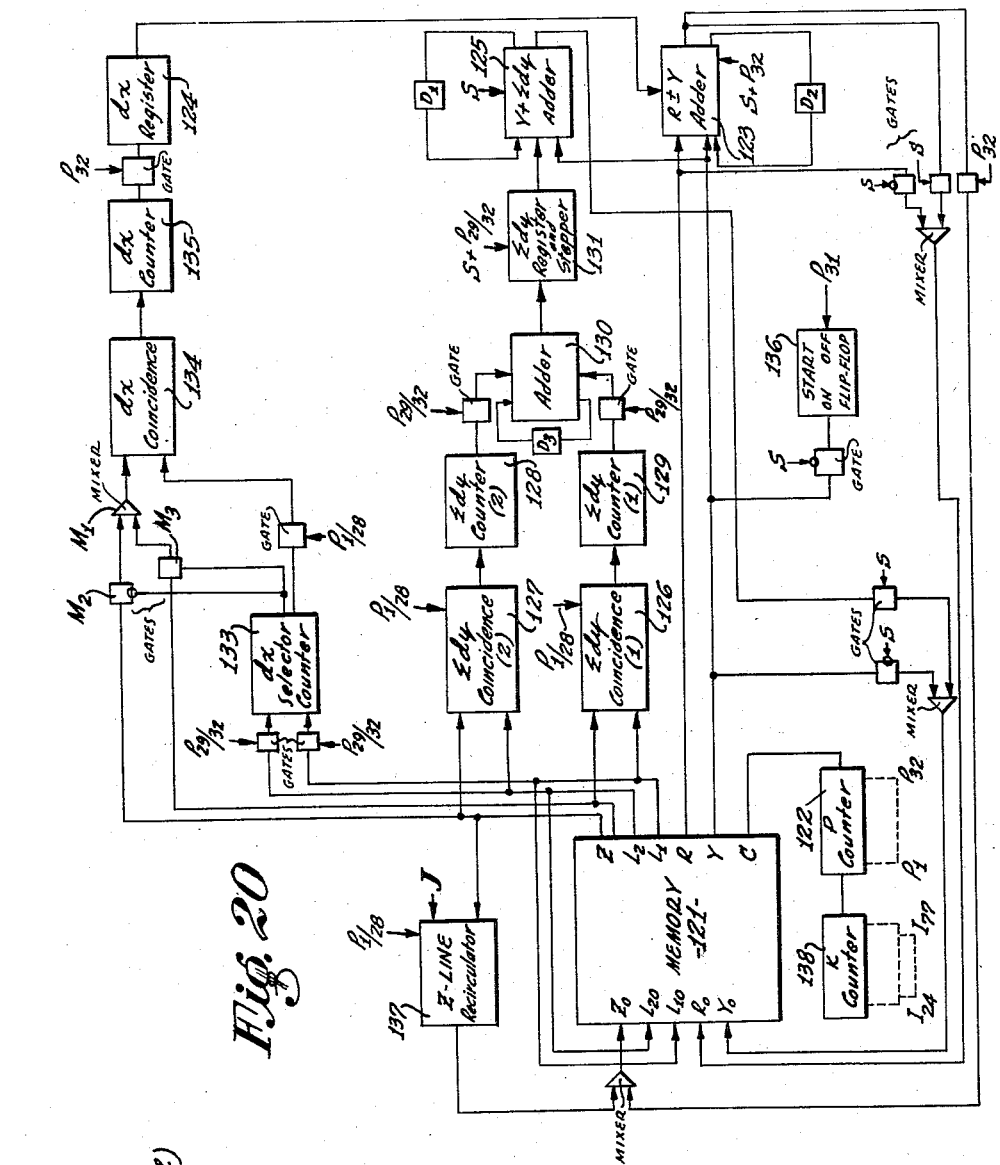

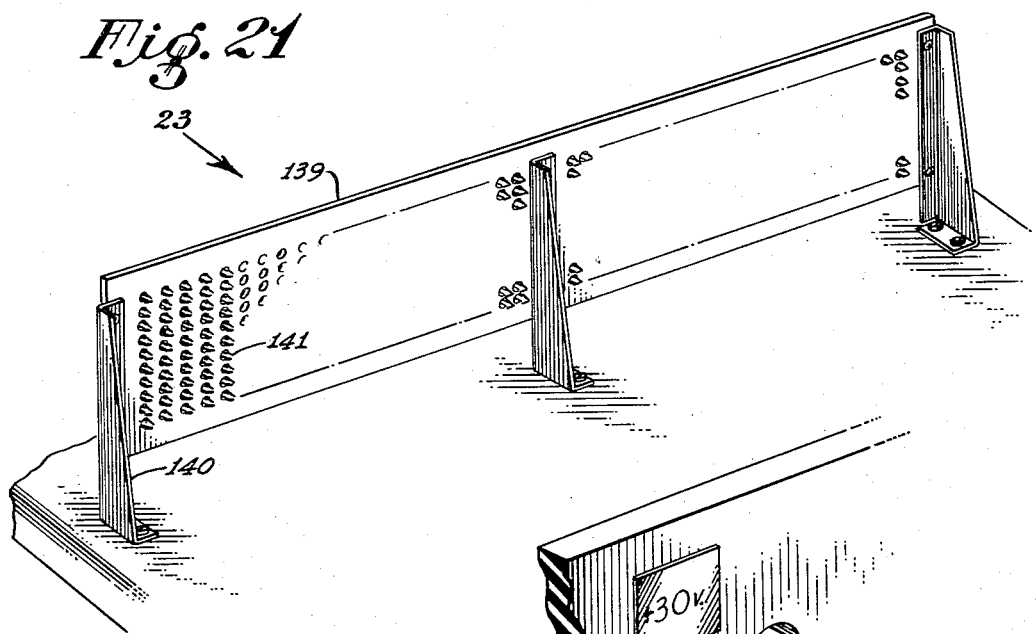
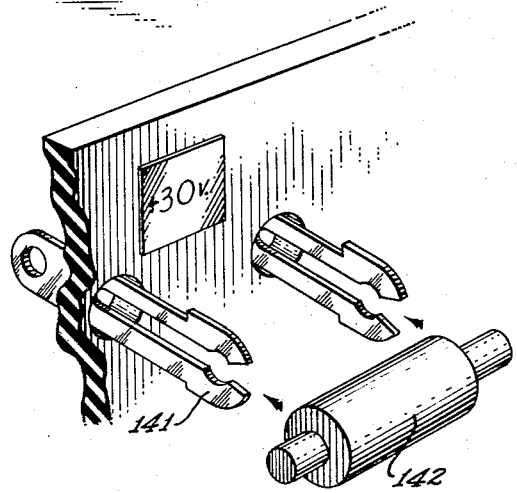
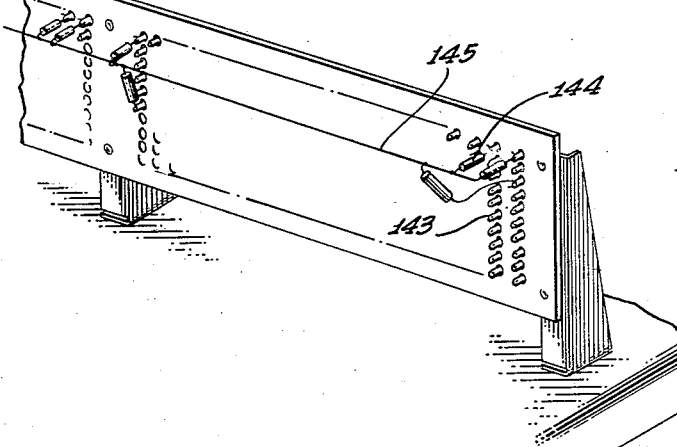

Sept. 2, 1958        G. E. HAGEN ET AL        2,850,232
MACHINE FOR DIGITAL DIFFERENTIAL ANALYSIS
Filed Dec. 26, 1951        60 Sheets-Sheet 12

INVENTORS:
GLENN E. HAGEN
CHARLES R. WILLIAMS
EVERETT D. PHILBRICK, JR.
ROBERT M. BECK
CECIL R. RUSSELL

By Herbert E. Metcalf
THEIR PATENT ATTORNEY

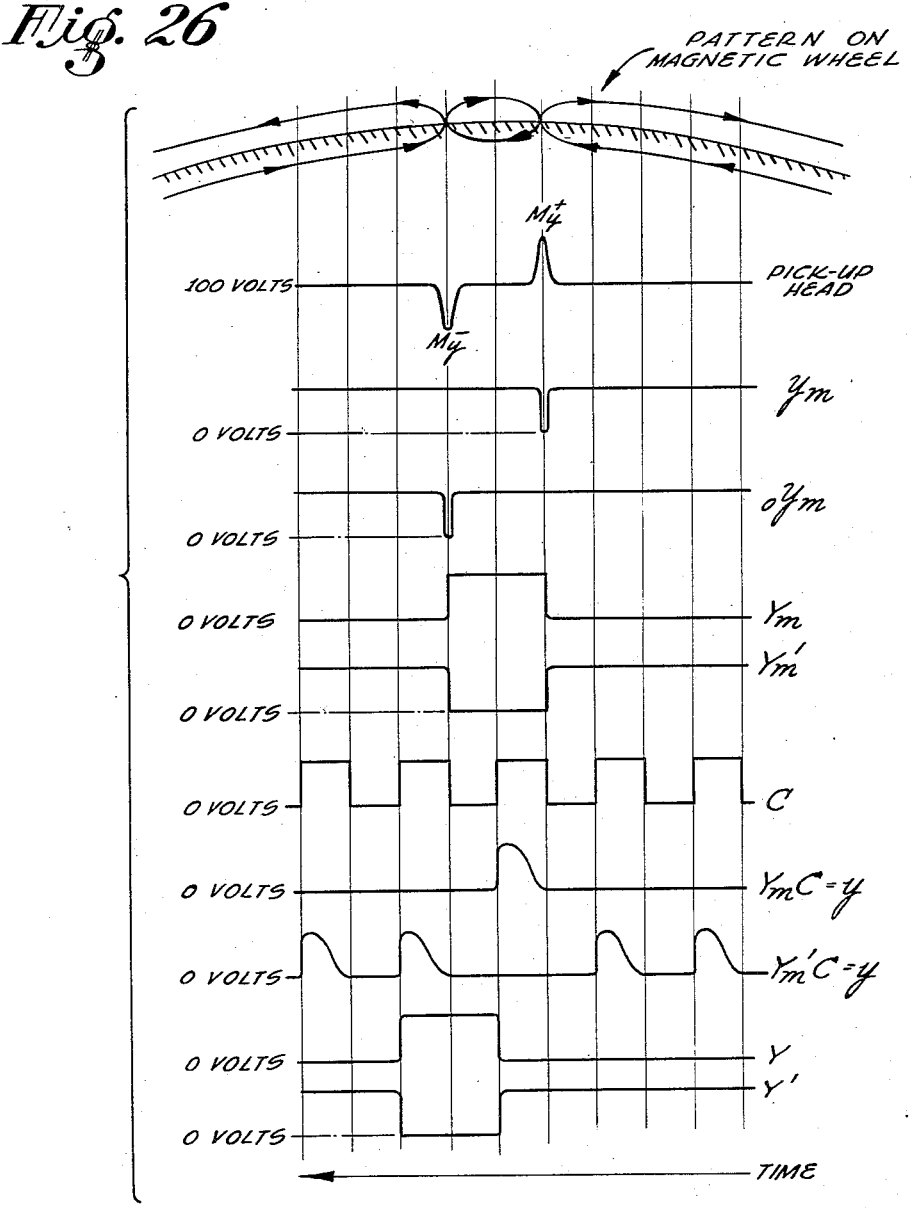

Sept. 2, 1958  G. E. HAGEN ET AL  2,850,232
MACHINE FOR DIGITAL DIFFERENTIAL ANALYSIS
Filed Dec. 26, 1951  60 Sheets-Sheet 15

*Fig. 30*

I  MAGNETIC PATTERN ON WHEEL (Z Channel)
II  PICK-UP HEAD (Z Channel)
III  PICK-UP HEAD (Clock Channel)
IV  $Z_m$ FLIP-FLOP
V  TRIGGER INPUT TO Z
VI  Z FLIP-FLOP
VII  $Z_a$ FLIP-FLOP
VIII  $Z_f$ FLIP-FLOP

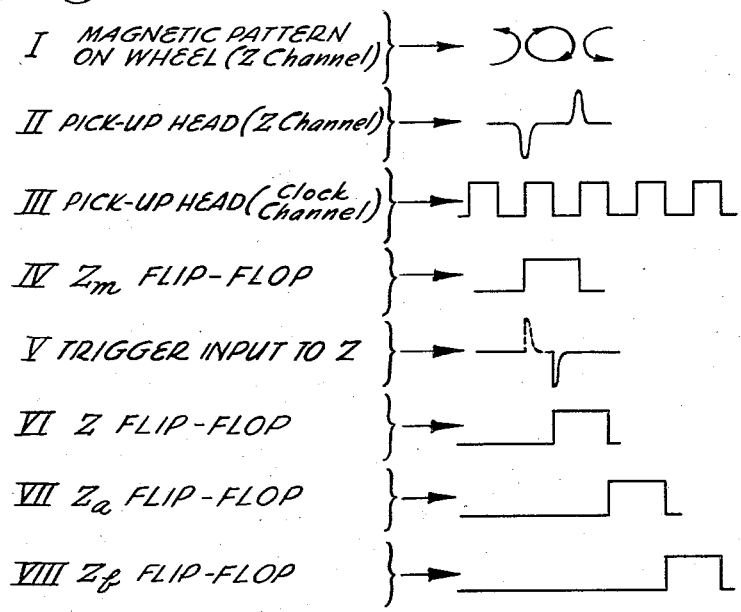

*Fig. 33*

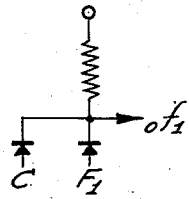

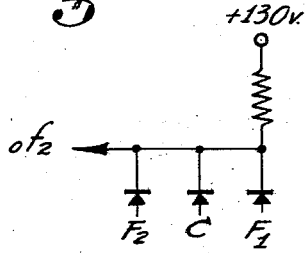

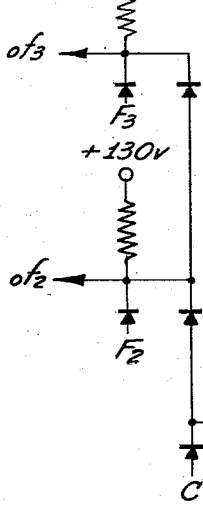

INVENTORS:
GLENN E. HAGEN
CHARLES R. WILLIAMS
EVERETT D. PHILBRICK, JR.
ROBERT M. BECK
CECIL R. RUSSELL

By Herbert E. Metcalf
THEIR PATENT ATTORNEY

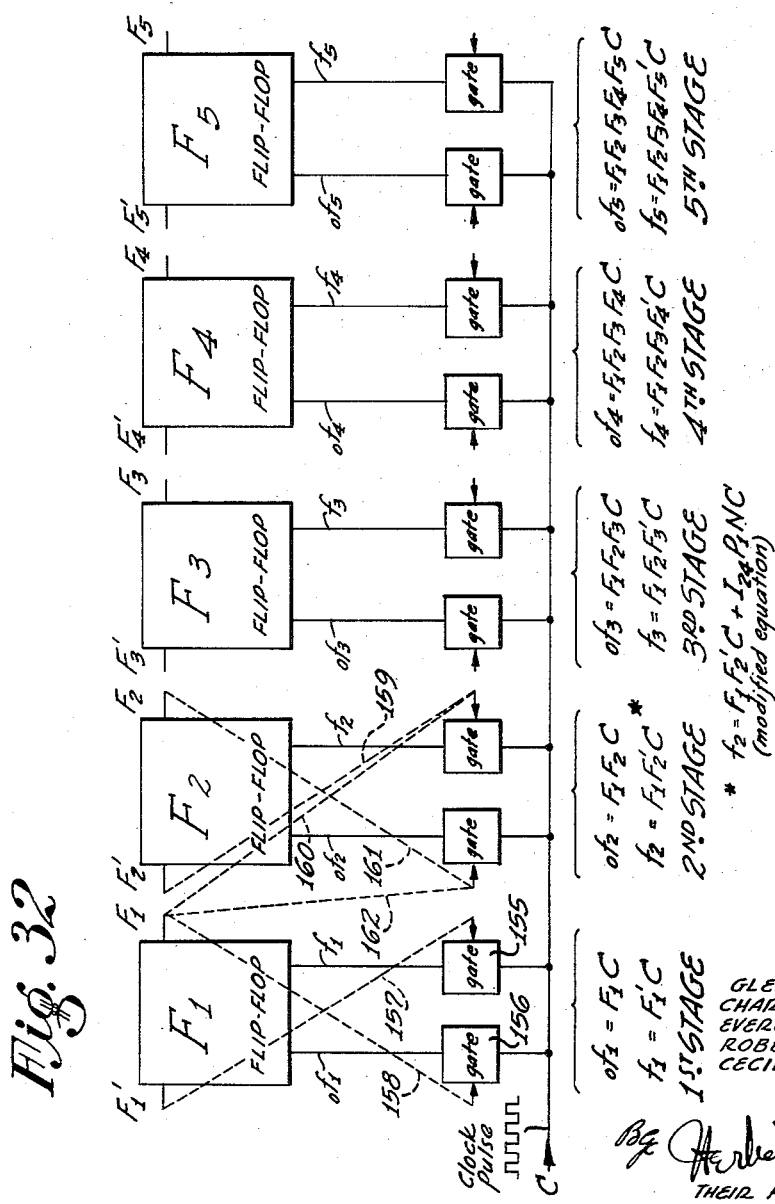

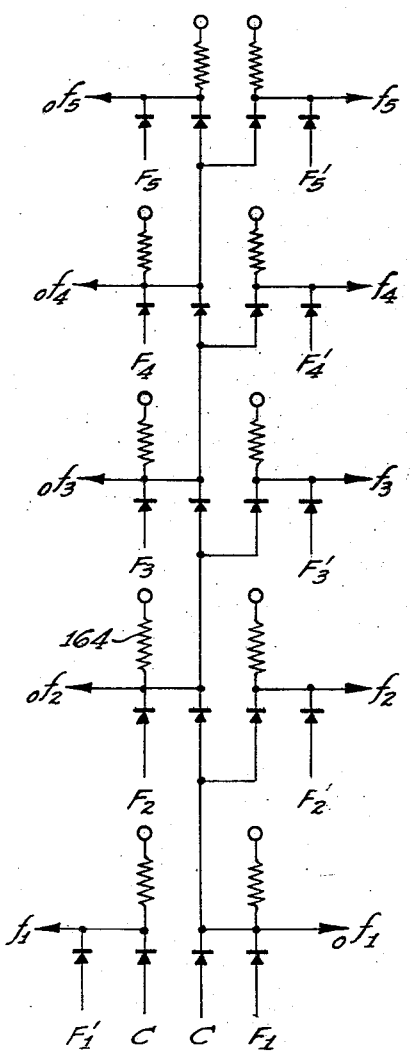

Sept. 2, 1958    G. E. HAGEN ET AL    2,850,232
MACHINE FOR DIGITAL DIFFERENTIAL ANALYSIS
Filed Dec. 26, 1951    60 Sheets-Sheet 18

| STAGES | | | | | | |
|---|---|---|---|---|---|---|
| $K_6$ | $K_5$ | $K_4$ | $K_3$ | $K_2$ | $K_1$ | INT. |
| 0 | 1 | 0 | 1 | 0 | 0 | 24 |
| 0 | 1 | 0 | 1 | 0 | 1 | 25 |
| 0 | 1 | 0 | 1 | 1 | 0 | 26 |
| 0 | 1 | 0 | 1 | 1 | 1 | 27 |
| 0 | 1 | 1 | 0 | 0 | 0 | 30 |
| 0 | 1 | 1 | 0 | 0 | 1 | 31 |
| 0 | 1 | 1 | 0 | 1 | 0 | 32 |
| 0 | 1 | 1 | 0 | 1 | 1 | 33 |
| 0 | 1 | 1 | 1 | 0 | 0 | 34 |
| 0 | 1 | 1 | 1 | 0 | 1 | 35 |
| 0 | 1 | 1 | 1 | 1 | 0 | 36 |
| 0 | 1 | 1 | 1 | 1 | 1 | 37 |
| 1 | 0 | 0 | 0 | 0 | 0 | 40 |
| 1 | 0 | 0 | 0 | 0 | 1 | 41 |
| 1 | 0 | 0 | 0 | 1 | 0 | 42 |
| 1 | 0 | 0 | 0 | 1 | 1 | 43 |
| 1 | 0 | 0 | 1 | 0 | 0 | 44 |
| 1 | 0 | 0 | 1 | 0 | 1 | 45 |
| 1 | 0 | 0 | 1 | 1 | 0 | 46 |
| 1 | 0 | 0 | 1 | 1 | 1 | 47 |
| 1 | 0 | 1 | 0 | 0 | 0 | 50 |
| 1 | 0 | 1 | 0 | 0 | 1 | 51 |
| 1 | 0 | 1 | 0 | 1 | 0 | 52 |
| 1 | 0 | 1 | 0 | 1 | 1 | 53 |
| 1 | 0 | 1 | 1 | 0 | 0 | 54 |
| 1 | 0 | 1 | 1 | 0 | 1 | 55 |
| 1 | 0 | 1 | 1 | 1 | 0 | 56 |
| 1 | 0 | 1 | 1 | 1 | 1 | 57 |
| 1 | 1 | 0 | 0 | 0 | 0 | 60 |
| 1 | 1 | 0 | 0 | 0 | 1 | 61 |
| 1 | 1 | 0 | 0 | 1 | 0 | 62 |
| 1 | 1 | 0 | 0 | 1 | 1 | 63 |
| 1 | 1 | 0 | 1 | 0 | 0 | 64 |
| 1 | 1 | 0 | 1 | 0 | 1 | 65 |
| 1 | 1 | 0 | 1 | 1 | 0 | 66 |
| 1 | 1 | 0 | 1 | 1 | 1 | 67 |
| 1 | 1 | 1 | 0 | 0 | 0 | 70 |
| 1 | 1 | 1 | 0 | 0 | 1 | 71 |
| 1 | 1 | 1 | 0 | 1 | 0 | 72 |
| 1 | 1 | 1 | 0 | 1 | 1 | 73 |
| 1 | 1 | 1 | 1 | 0 | 0 | 74 |
| 1 | 1 | 1 | 1 | 0 | 1 | 75 |
| 1 | 1 | 1 | 1 | 1 | 0 | 76 |
| 1 | 1 | 1 | 1 | 1 | 1 | 77 |

INVENTORS:
GLENN E. HAGEN
CHARLES R. WILLIAMS
EVERETT D. PHILBRICK, JR.
ROBERT M. BECK
CECIL R. RUSSELL

BY Herbert E. Metcalf
THEIR PATENT ATTORNEY

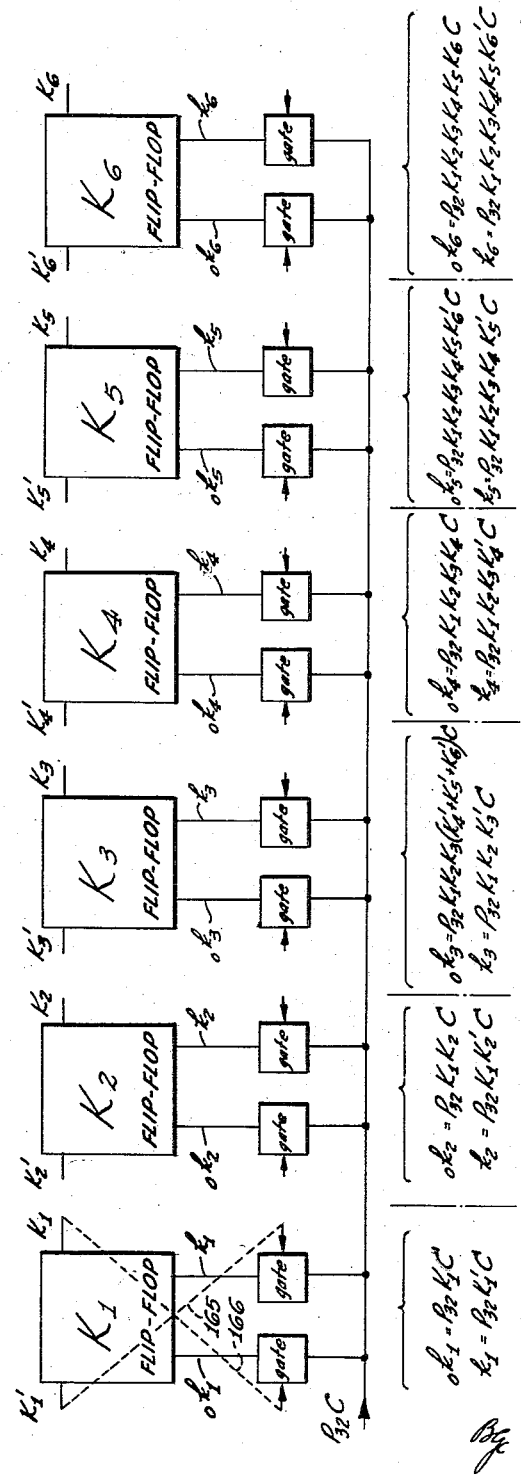

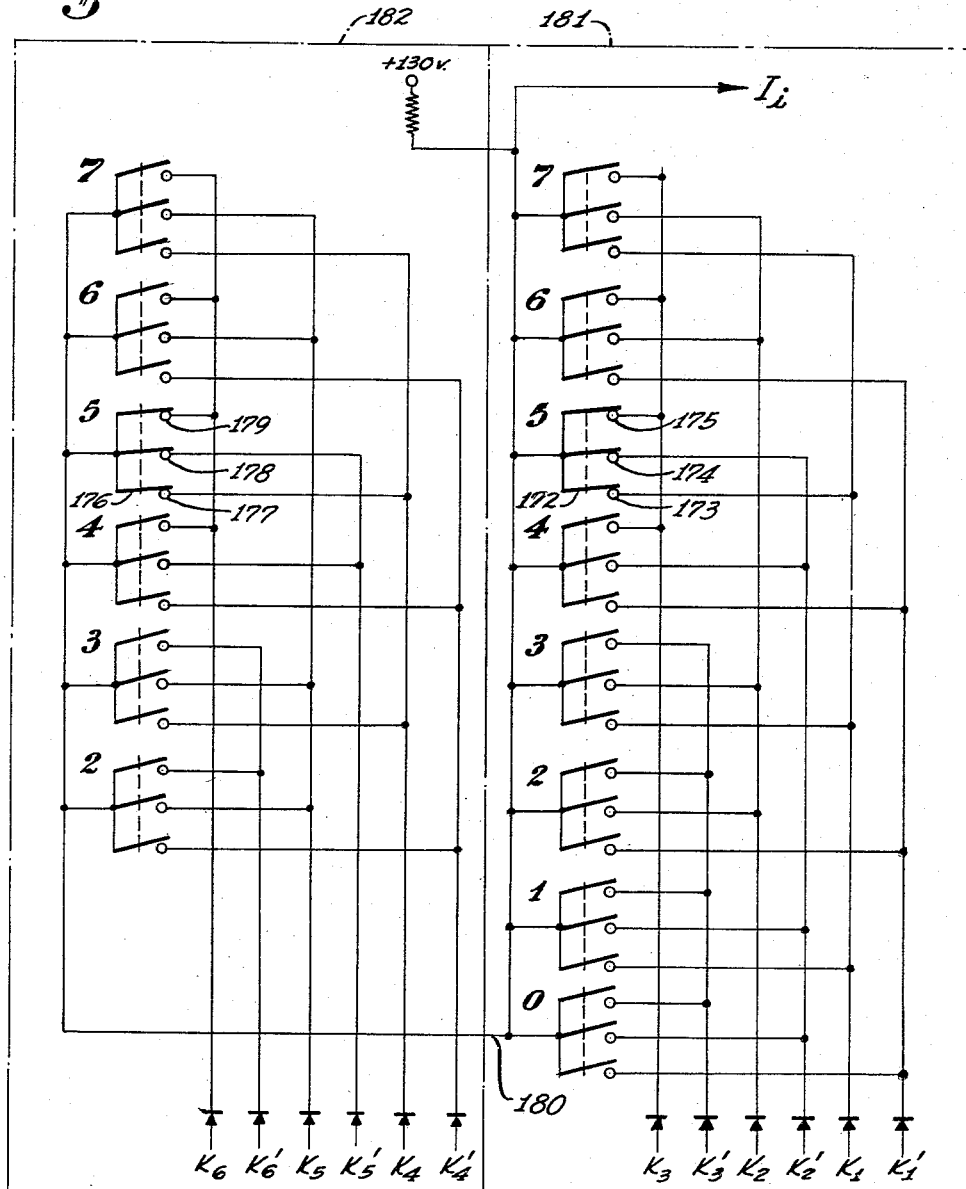

Sept. 2, 1958 G. E. HAGEN ET AL 2,850,232
MACHINE FOR DIGITAL DIFFERENTIAL ANALYSIS
Filed Dec. 26, 1951 60 Sheets-Sheet 21

INVENTORS:
GLENN E. HAGEN
CHARLES R. WILLIAMS
EVERETT D PHILBRICK, Jr.
ROBERT M. BECK
CECIL R. RUSSELL

BY Herbert E. Metcalf
THEIR PATENT ATTORNEY

Sept. 2, 1958  G. E. HAGEN ET AL  2,850,232
MACHINE FOR DIGITAL DIFFERENTIAL ANALYSIS
Filed Dec. 26, 1951  60 Sheets-Sheet 23

INVENTORS:
GLENN E. HAGEN
CHARLES R. WILLIAMS
EVERETT D. PHILBRICK, JR.
ROBERT M. BECK
CECIL R. RUSSELL

BY Herbert E. Metcalf
THEIR PATENT ATTORNEY

NOTE: NORMALLY UP MOMENTARILY DOWN PUSH BUTTON $_oh = G'C$
$h = F_1 F_2 F_3' F_4 F_5 I_{24}(Q+M+H_m)GC$

INVENTORS:
GLENN E. HAGEN
CHARLES R. WILLIAMS
EVERETT D. PHILBRICK, JR.
ROBERT M. BECK
CECIL R. RUSSELL

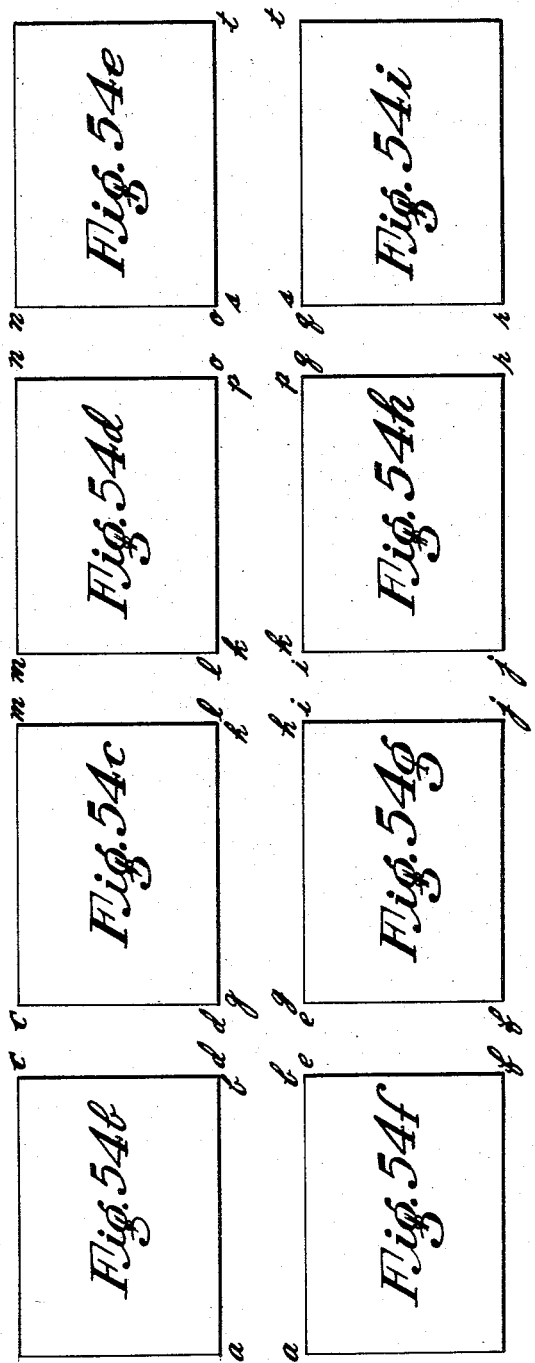

Sept. 2, 1958        G. E. HAGEN ET AL        2,850,232

MACHINE FOR DIGITAL DIFFERENTIAL ANALYSIS

Filed Dec. 26, 1951                                    60 Sheets-Sheet 26

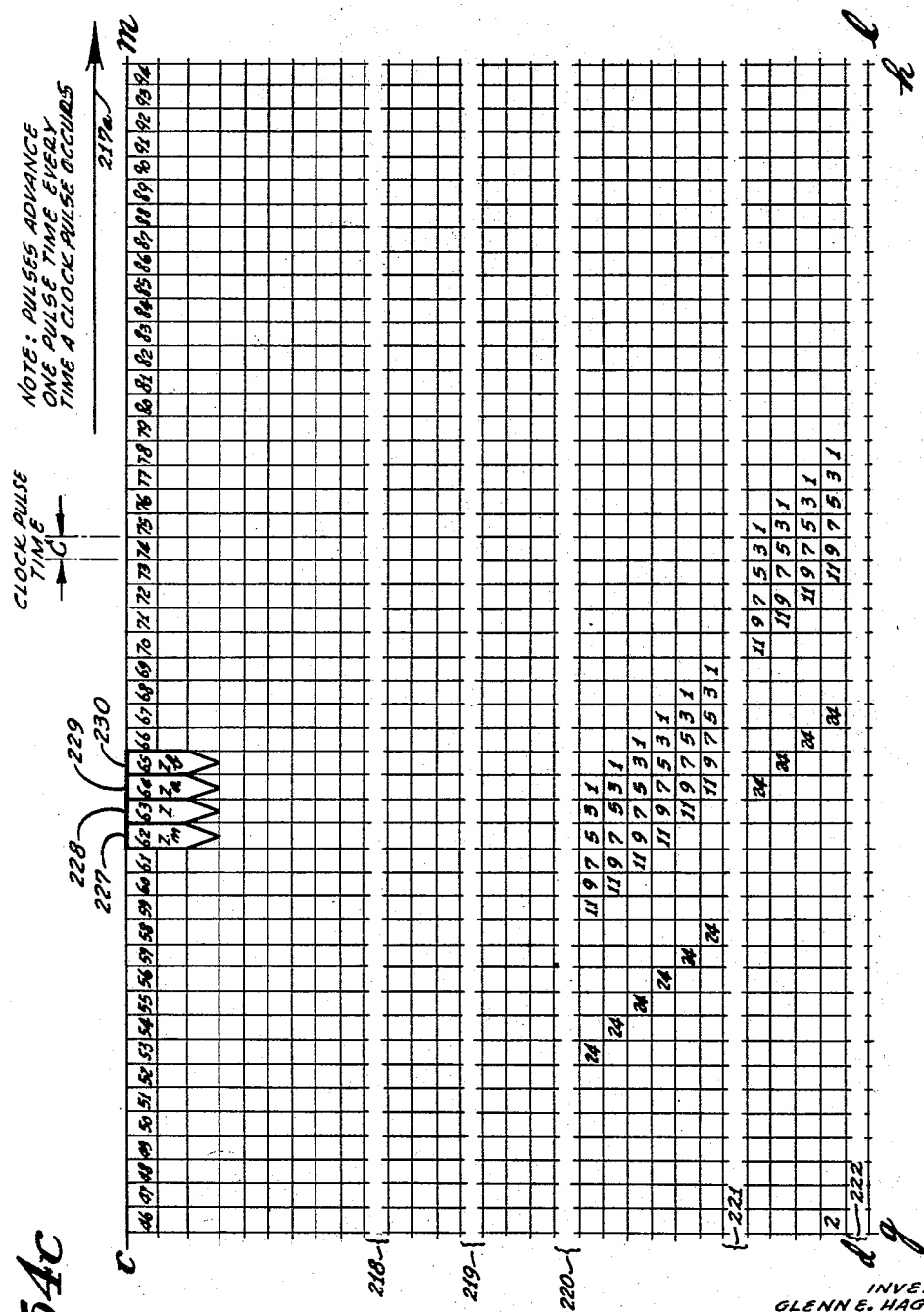

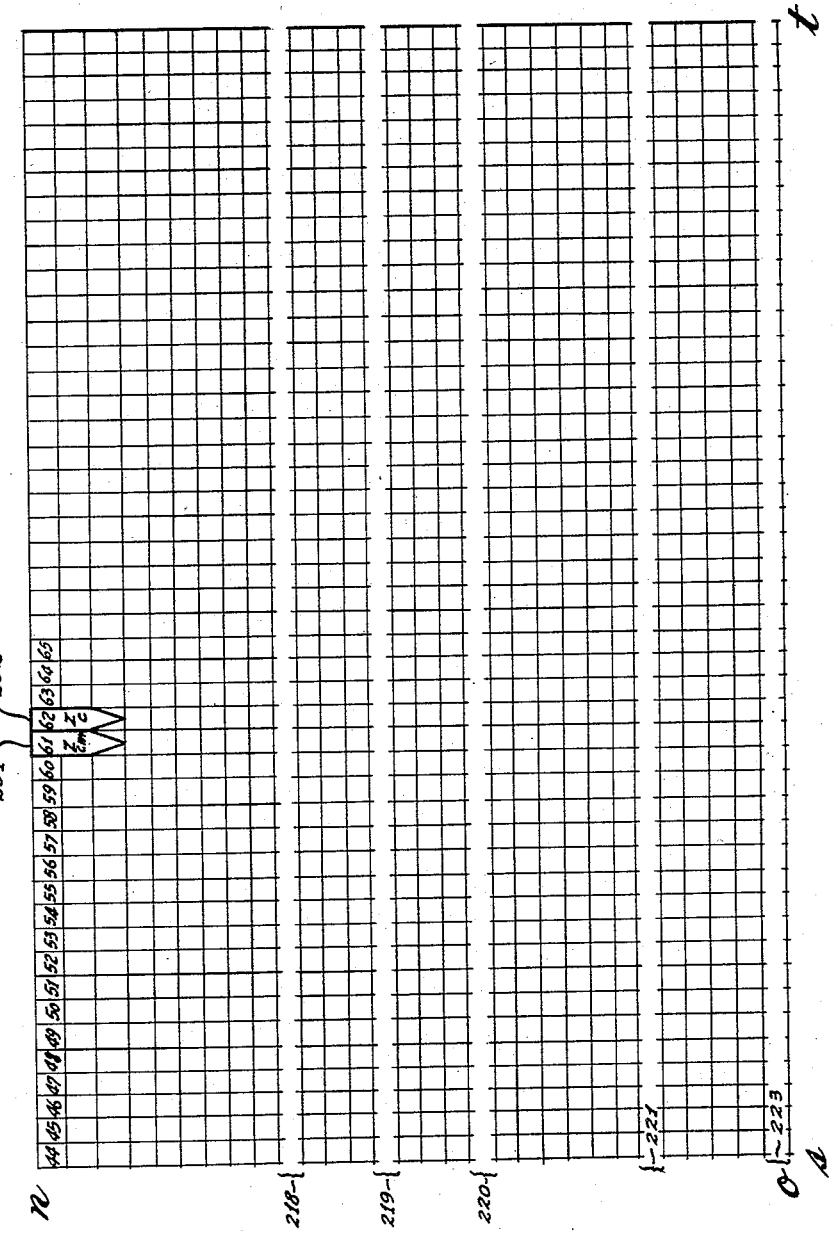

Fig. 54f

Sept. 2, 1958  G. E. HAGEN ET AL  2,850,232
MACHINE FOR DIGITAL DIFFERENTIAL ANALYSIS
Filed Dec. 26, 1951  60 Sheets-Sheet 31

Fig. 546

INVENTORS:
GLENN E. HAGEN
CHARLES R. WILLIAMS
EVERETT D. PHILBRICK, JR.
ROBERT M. BECK
CECIL R. RUSSELL

BY Herbert E. Metcalf
THEIR PATENT ATTORNEY

Sept. 2, 1958 G. E. HAGEN ET AL 2,850,232

MACHINE FOR DIGITAL DIFFERENTIAL ANALYSIS

Filed Dec. 26, 1951 60 Sheets-Sheet 32

Fig. 54k

INVENTORS:
GLENN E. HAGEN
CHARLES R. WILLIAMS
EVERETT D. PHILBRICK, JR.
ROBERT M. BECK
CECIL R. RUSSELL

By Herbert E. Metcalf
THEIR PATENT ATTORNEY

Fig. 54.i

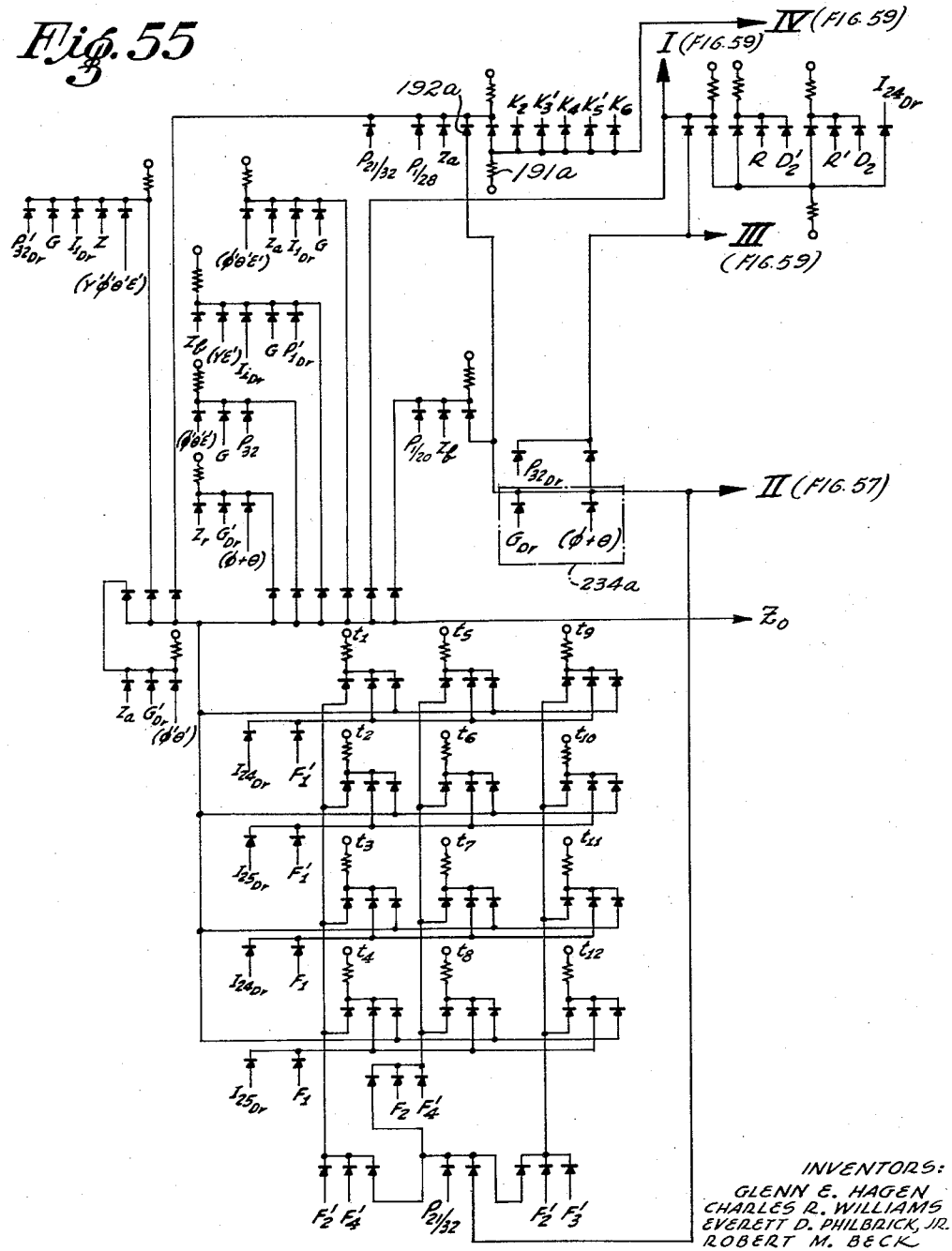

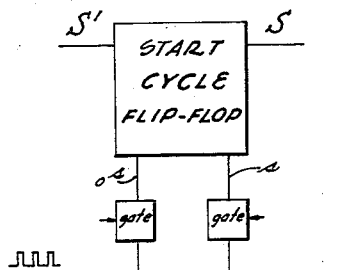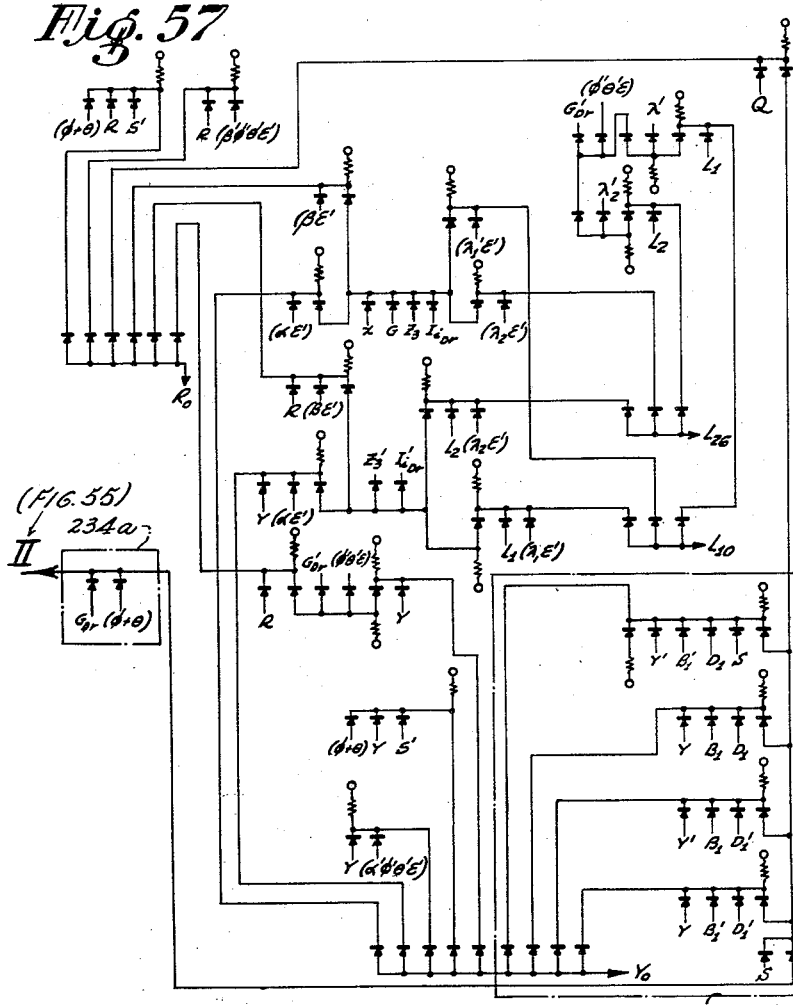

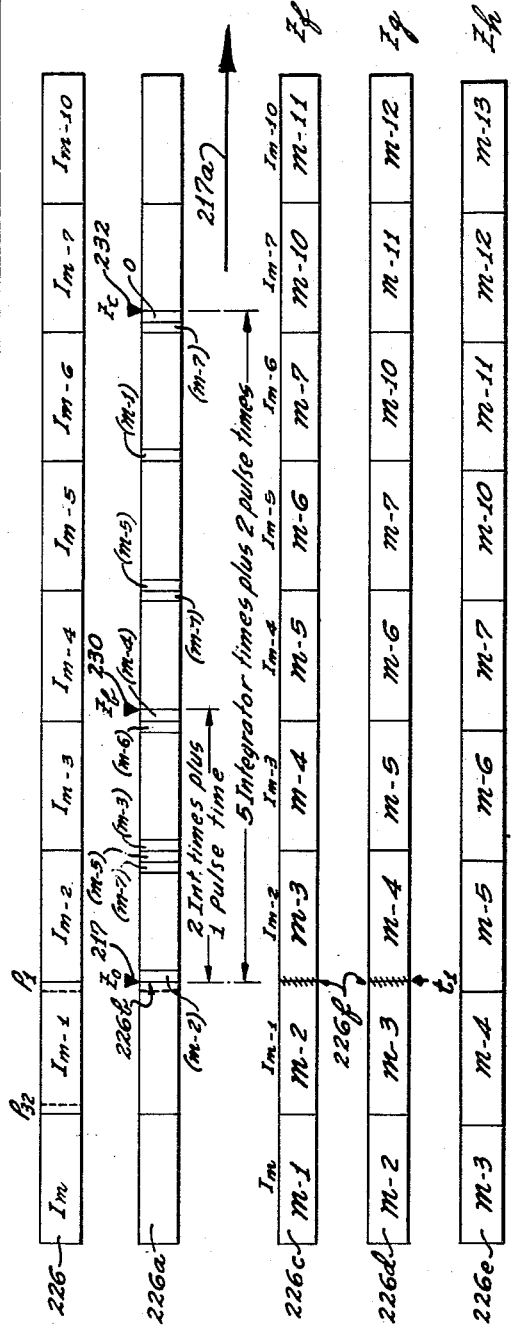

Sept. 2, 1958     G. E. HAGEN ET AL     2,850,232
MACHINE FOR DIGITAL DIFFERENTIAL ANALYSIS
Filed Dec. 26, 1951     60 Sheets-Sheet 37

*Fig. 59*

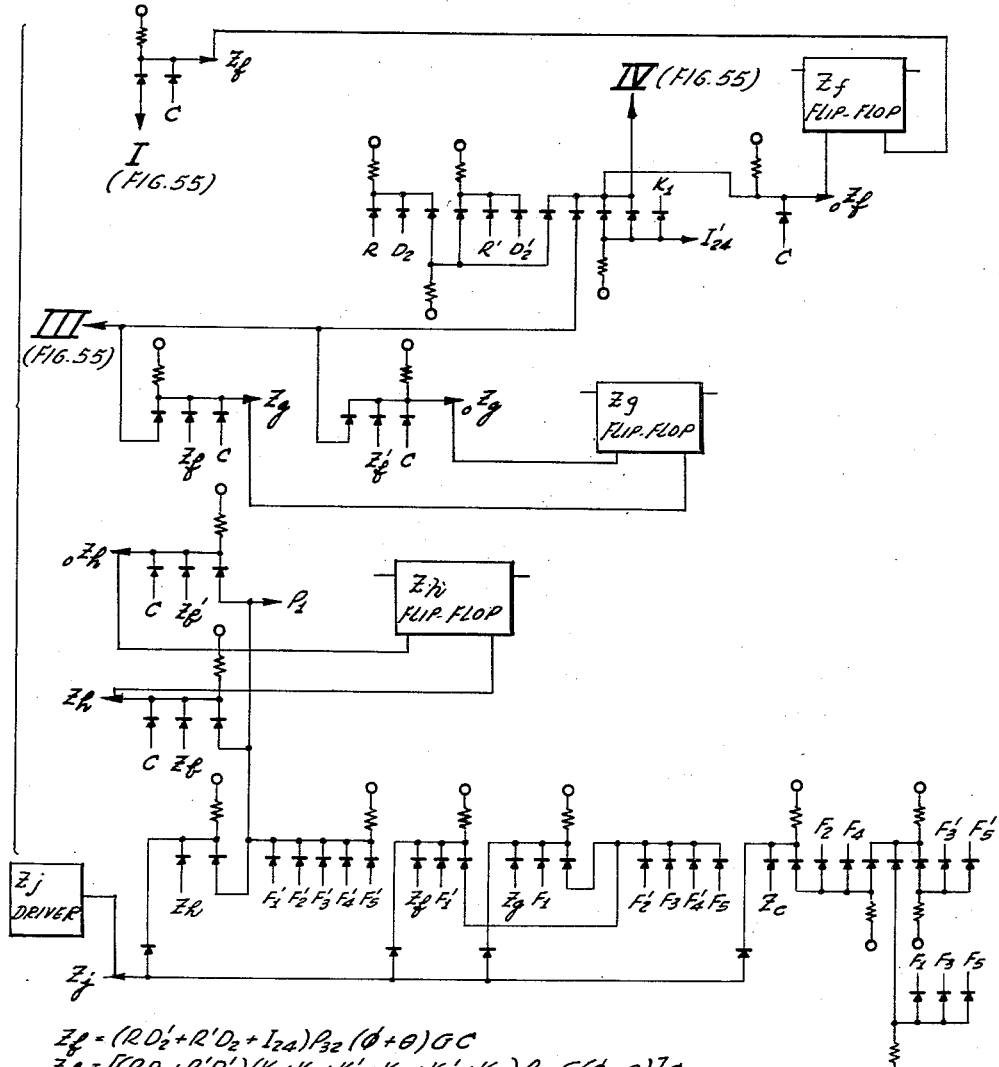

$Z_f = (RD_2' + R'D_2 + I_{24})P_{32}(\phi + \theta)GC$ $_oZ_f = [(RD_2 + R'D_2')(K_1 + K_2 + K_3' + K_4 + K_5' + K_6)P_{32}G(\phi + \theta)]C$ $Z_g = P_{32}G(\phi + \theta)Z_f C$ $_oZ_g = [P_{32}G(\phi + \theta)Z_f']C$ $_oZ_h = F_1'F_2'F_3'F_4'F_5' Z_f' C$ $Z_h = F_1'F_2'F_3'F_4'F_5' Z_f C$ $Z_j = F_1'F_2'F_3'F_4'F_5' Z_h + F_1'F_2'F_3'F_4'F_5 Z_f + F_1'F_2'F_3 F_4'F_5 Z_g$
$\quad + (F_2 + F_4 + [F_3' + F_5'][F_1 + F_3 + F_5])Z_c$ INVENTORS:
GLENN E. HAGEN
CHARLES R. WILLIAMS
EVERETT D. PHILBRICK, JR
ROBERT M. BECK
CECIL R. RUSSELL By Herbert E. Metcalf
THEIR PATENT ATTORNEY Sept. 2, 1958  G. E. HAGEN ET AL  2,850,232
MACHINE FOR DIGITAL DIFFERENTIAL ANALYSIS
Filed Dec. 26, 1951  60 Sheets—Sheet 38

| | | Σdy Counter | | |
|---|---|---|---|---|
| SIGN | $A_4$ | $A_3$ | $A_2$ | $A_1$ |
| +7 | 0 | 1 | 1 | 1 |
| +6 | 0 | 1 | 1 | 0 |
| +5 | 0 | 1 | 0 | 1 |
| +4 | 0 | 1 | 0 | 0 |
| +3 | 0 | 0 | 1 | 1 |
| +2 | 0 | 0 | 1 | 0 |
| +1 | 0 | 0 | 0 | 1 |
| +0 | 0 | 0 | 0 | 0 |
| −1 | 1 | 1 | 1 | 1 |
| −2 | 1 | 1 | 1 | 0 |
| −3 | 1 | 1 | 0 | 1 |
| −4 | 1 | 1 | 0 | 0 |
| −5 | 1 | 0 | 1 | 1 |
| −6 | 1 | 0 | 1 | 0 |
| −7 | 1 | 0 | 0 | 1 |
| −8 | 1 | 0 | 0 | 0 |

DECIMAL EQUIVALENT

INVENTORS:
GLENN E. HAGEN
CHARLES R. WILLIAMS
EVERETT D. PHILBRICK, JR.
ROBERT M. BECK
CECIL R. RUSSELL

BY Herbert E. Metcalf
THEIR PATENT ATTORNEY

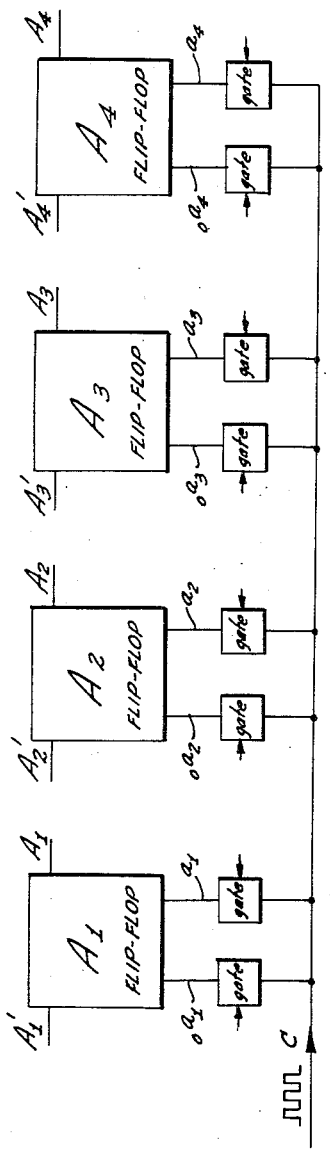

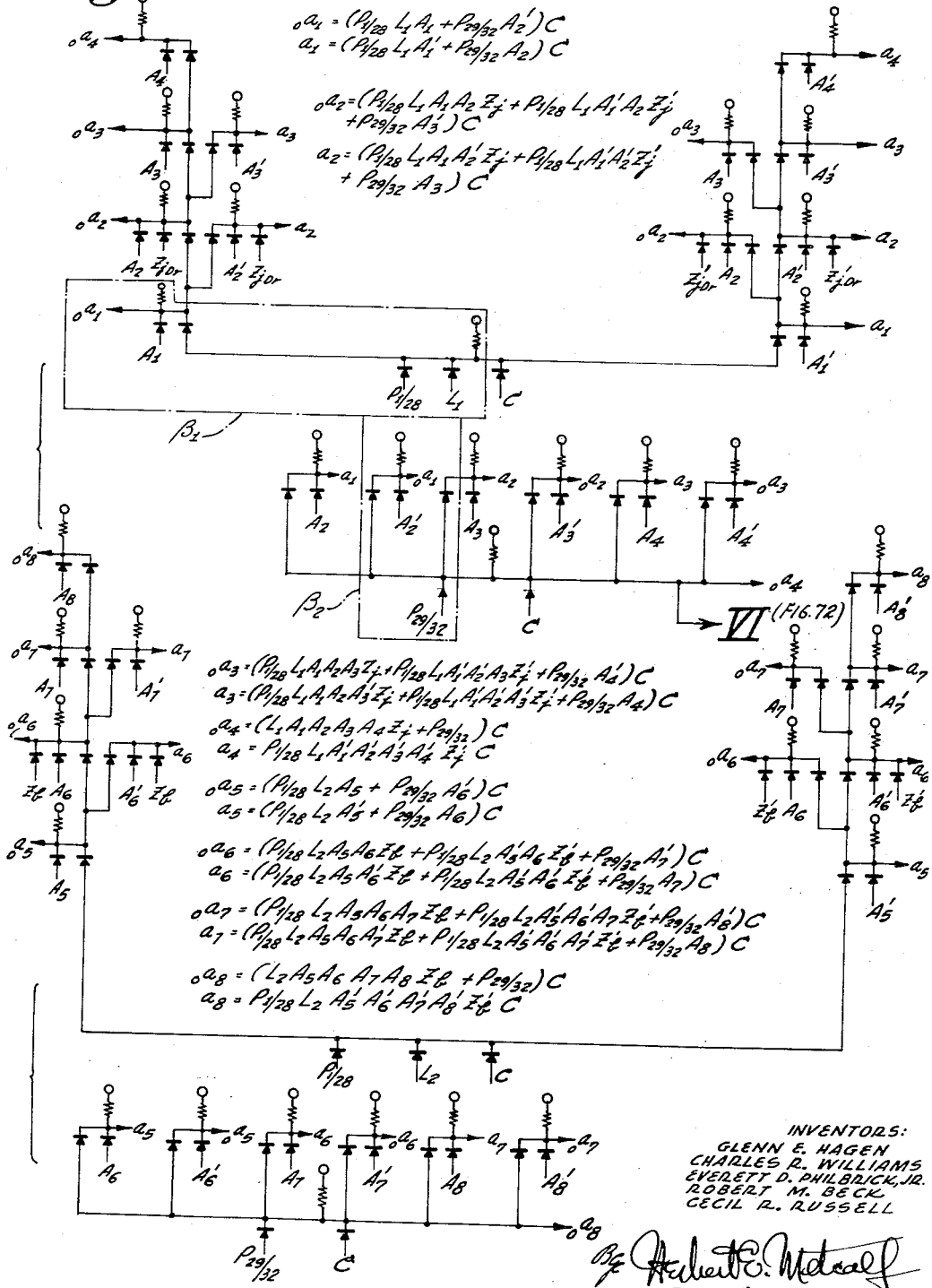

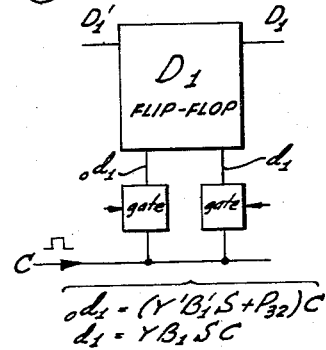
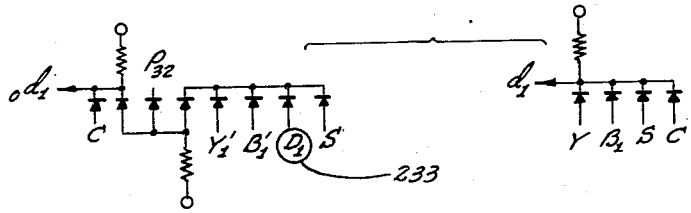

Sept. 2, 1958 G. E. HAGEN ET AL 2,850,232
MACHINE FOR DIGITAL DIFFERENTIAL ANALYSIS
Filed Dec. 26, 1951 60 Sheets-Sheet 42

INVENTORS:
GLENN E. HAGEN
CHARLES R. WILLIAMS
EVERETT O. PHILBRICK JR
ROBERT M. BECK
CECIL R. RUSSELL

BY Herbert E. Metcalf
THEIR PATENT ATTORNEY

Sept. 2, 1958  G. E. HAGEN ET AL  2,850,232
MACHINE FOR DIGITAL DIFFERENTIAL ANALYSIS
Filed Dec. 26, 1951                         60 Sheets-Sheet 43

*Fig. 69*

| Y | $B_1$ | $D_1$ | SUM | NEW CARRY |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

236  237

$y + \Sigma dy$ ADDER
FLIP-FLOP UNITS

238—
```
Y  0 0 1 1
B₁ 0 1 0 1
D₁ 0 0 0 1
    ₀d₁  d₁
```

239
```
D₁ Trigged:  ON  OFF  ON
              1   0   1
              1   0   1
             10   1   0
```

$$SUM := Y'B'D_1 + Y'B_1 D_1' + Y B_1' D_1' + Y B_1 D_1.$$

*Fig. 70*

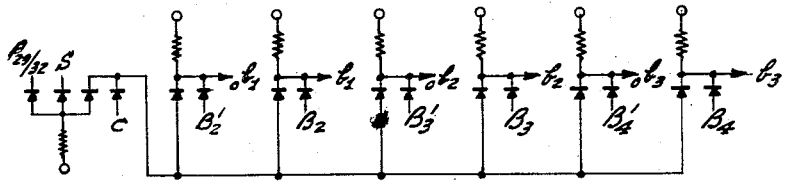

$$_0t_1 = (P_{29/32} + S) B_2' C$$
$$t_1 = (P_{29/32} + S) B_2 C$$
$$_0t_2 = (P_{29/32} + S) B_3' C$$
$$t_2 = (P_{29/32} + S) B_3 C$$
$$_0t_3 = (P_{29/32} + S) B_4' C$$
$$t_3 = (P_{29/32} + S) B_4 C$$

INVENTORS:
GLENN E. HAGEN
CHARLES R. WILLIAMS
EVERETT O. PHILBRICK, JR.
ROBERT M. BECK
CECIL R. RUSSELL

By Herbert E. Metcalf
THEIR PATENT ATTORNEY

Sept. 2, 1958    G. E. HAGEN ET AL    2,850,232
MACHINE FOR DIGITAL DIFFERENTIAL ANALYSIS
Filed Dec. 26, 1951    60 Sheets-Sheet 44

INVENTORS:
GLENN E. HAGEN
CHARLES R. WILLIAMS
EVERETT D. PHILBRICK, JR.
ROBERT M. BECK
CECIL R. RUSSELL

By Herbert E. Metcalf
THEIR PATENT ATTORNEY

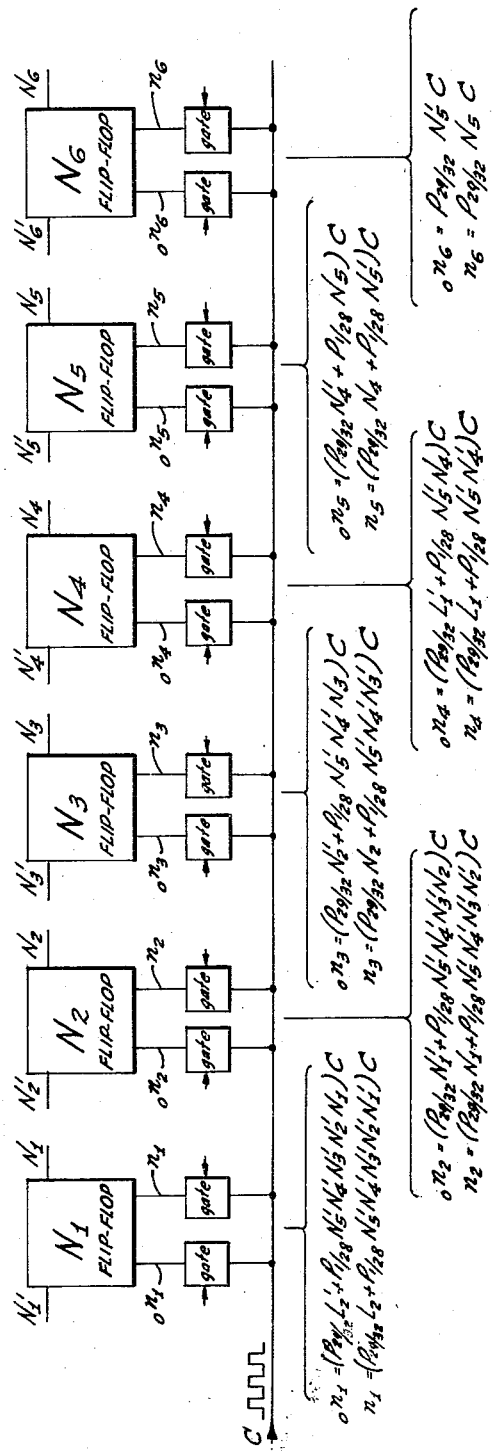

Sept. 2, 1958  G. E. HAGEN ET AL  2,850,232
MACHINE FOR DIGITAL DIFFERENTIAL ANALYSIS
Filed Dec. 26, 1951  60 Sheets-Sheet 46

Fig. 74

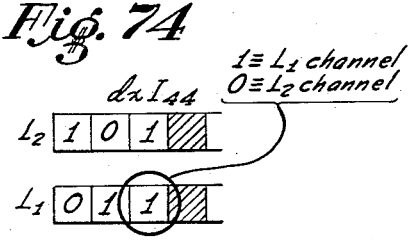
$d_x I_{44}$    $1 \equiv L_1$ channel
              $0 \equiv L_2$ channel

Fig. 76

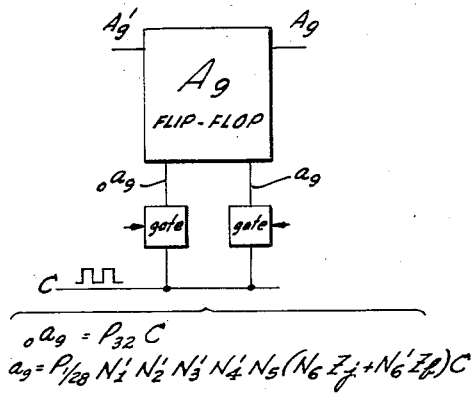

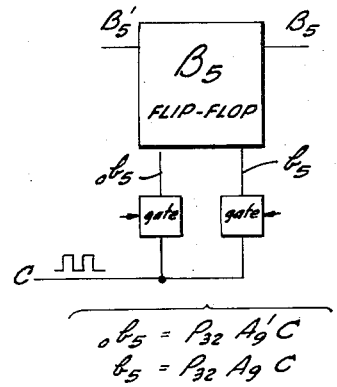

| Pulse Time | $N_6$ | $N_5$ | $N_4$ | $N_3$ | $N_2$ | $N_1$ |
|---|---|---|---|---|---|---|
| 29 | | | | | | |
| 30 | | | | | | |
| 31 | | | 1 | | | 1 |
| 32 | | 1 | 1 | | 1 | 0 |
| 1 | 1 | 1 | 0 | 1 | 0 | 1 |
| 2 | 1 | 0 | 0 | 1 | 0 | 1 |
| 3 | 1 | 1 | 1 | 0 | 0 | 1 |
| 4 | 1 | 0 | 1 | 0 | 0 | 1 |
| 5 | 1 | 1 | 0 | 0 | 0 | 1 |
| 6 | 1 | 0 | 0 | 0 | 0 | 1 |
| 7 | 1 | 1 | 1 | 1 | 1 | 0 |
| 8 | 1 | 0 | 1 | 1 | 1 | 0 |
| 9 | 1 | 1 | 0 | 1 | 1 | 0 |
| 10 | 1 | 0 | 0 | 1 | 1 | 0 |
| 11 | 1 | 1 | 1 | 0 | 1 | 0 |
| 12 | 1 | 0 | 1 | 0 | 1 | 0 |
| 13 | 1 | 1 | 0 | 0 | 1 | 0 |
| 14 | 1 | 0 | 0 | 0 | 1 | 0 |
| 15 | 1 | 1 | 1 | 1 | 0 | 0 |
| 16 | 1 | 0 | 1 | 1 | 0 | 0 |
| 17 | 1 | 1 | 0 | 1 | 0 | 0 |
| 18 | 1 | 0 | 0 | 1 | 0 | 0 |
| 19 | 1 | 1 | 1 | 0 | 0 | 0 |
| 20 | 1 | 0 | 1 | 0 | 0 | 0 |
| 21 | 1 | 1 | 0 | 0 | 0 | 0 |
| 22 | 1 | 0 | 0 | 0 | 0 | 0 |
| 23 | 1 | 1 | 1 | 1 | 1 | 0 |
| 24 | 1 | 0 | 1 | 1 | 1 | 0 |
| 25 | 1 | 1 | 0 | 1 | 1 | 0 |
| 26 | 1 | 0 | 0 | 1 | 1 | 0 |
| 27 | 1 | 1 | 1 | 0 | 1 | 0 |
| 28 | 1 | 0 | 1 | 0 | 1 | 0 |

OUTPUT ← (row 21)

Rows 29–32 grouped as $I_{42}$; rows 1–22 grouped as $I_{43}$.

INVENTORS:
GLENN E. HAGEN
CHARLES R. WILLIAMS
EVERETT D. PHILBRICK, JR.
ROBERT M. BECK
CECIL R. RUSSELL

BY Herbert E. Metcalf
THEIR PATENT ATTORNEY

Sept. 2, 1958  G. E. HAGEN ET AL  2,850,232
MACHINE FOR DIGITAL DIFFERENTIAL ANALYSIS
Filed Dec. 26, 1951  60 Sheets-Sheet 47

Fig. 78

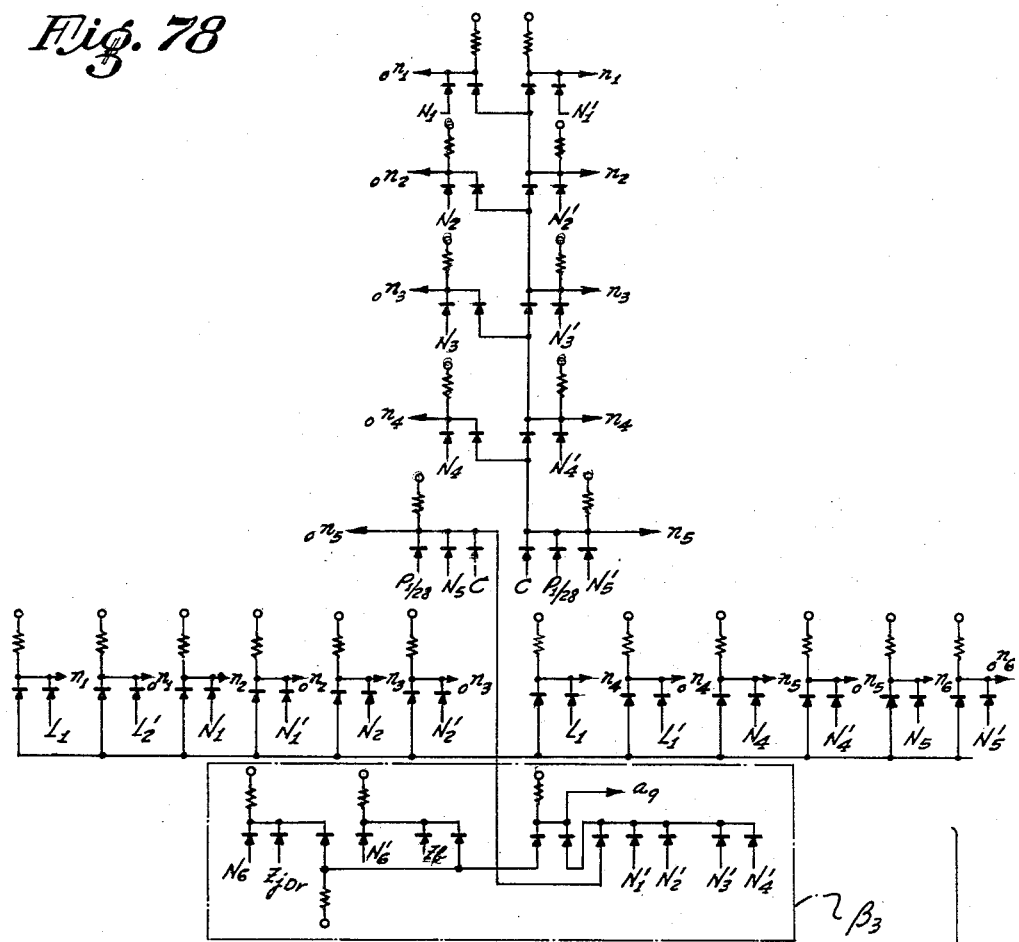

$n_1 = (P_{29/32} L_2 + P_{1/28} N_5' N_4' N_3' N_2' N_1')C$
$on_1 = (P_{29/32} L_2' + P_{1/28} N_5' N_4' N_3' N_2' N_1)C$
$n_2 = (P_{29/32} N_1 + P_{1/28} N_5' N_4' N_3' N_2')C$
$on_2 = (P_{29/32} N_1' + P_{1/28} N_5' N_4' N_3' N_2)C$
$n_3 = (P_{29/32} N_2 + P_{1/28} N_5' N_4' N_3')C$
$on_3 = (P_{29/32} N_2' + P_{1/28} N_5' N_4' N_3)C$
$n_4 = (P_{29/32} L_1 + P_{1/28} N_5' N_4')C$
$on_4 = (P_{29/32} L_1' + P_{1/28} N_5' N_4)C$
$n_5 = (P_{29/32} N_4 + P_{1/28} N_5')C$
$on_5 = (P_{29/32} N_4' + P_{1/28} N_5)C$
$n_6 = P_{29/32} N_5 C$
$on_6 = P_{29/32} N_5' C$
$a_q = P_{1/28} N_1' N_2' N_3' N_4' N_5 (N_6 Z_f + N_6' Z_g)C$
$oa_q = P_{32} C$
$b_5 = P_{32} A_q C$
$ob_5 = P_{32} A_q' C$

INVENTORS:
GLENN E. HAGEN
CHARLES R. WILLIAMS
EVERETT D. PHILBRICK, JR.
ROBERT M. BECK
CECIL R. RUSSELL

By Herbert E. Metcalf
THEIR PATENT ATTORNEY

Sept. 2, 1958    G. E. HAGEN ET AL    2,850,232
MACHINE FOR DIGITAL DIFFERENTIAL ANALYSIS
Filed Dec. 26, 1951    60 Sheets-Sheet 48

*Fig. 79*

| | | | | 242 | 240 | 241 | 243 |
|---|---|---|---|---|---|---|---|
| $B_5$ | $R$ | $Y$ | $D_2$ | NEW CARRY | $(R+Y)$ $Q$ | $Q'$ | LOGICAL TERM |
| 1 | 0 | 0 | 0 | 0 | 0 | 1 | $R'Y'D_2'B_5$ |
| 1 | 0 | 1 | 0 | 0 | 1 | 0 | 0 |
| 1 | 1 | 0 | 0 | 0 | 1 | 0 | 0 |
| 1 | 1 | 1 | 0 | 1 | 0 | 1 | $RYD_2'B_5$ |
| 1 | 0 | 0 | 1 | 0 | 1 | 0 | 0 |
| 1 | 0 | 1 | 1 | 1 | 0 | 1 | $R'YD_2B_5$ |
| 1 | 1 | 0 | 1 | 1 | 0 | 1 | $RY'D_2B_5$ |
| 1 | 1 | 1 | 1 | 1 | 1 | 0 | 0 |
| 0 | 0 | 0 | 1 | 0 | $R \ominus Y$ | 1 | $R'Y'D_2B_5'$ |
| 0 | 0 | 1 | 1 | 0 | 1 | 0 | 0 |
| 0 | 1 | 0 | 1 | 0 | 1 | 0 | 0 |
| 0 | 1 | 1 | 1 | 1 | 0 | 1 | $RYD_2B_5'$ |
| 0 | 0 | 0 | 0 | 0 | 1 | 0 | 0 |
| 0 | 0 | 1 | 0 | 0 | 0 | 1 | $R'YD_2'B_5'$ |
| 0 | 1 | 0 | 0 | 1 | 0 | 1 | $RY'D_2'B_5'$ |
| 0 | 1 | 1 | 0 | 0 | 1 | 0 | 0 |

$Q' = R'Y'D_2'B_5 + RYD_2'B_5 + R'YD_2B_5 + RY'D_2B_5 + R'Y'D_2B_5' + RYD_2B_5' + R'YD_2'B_5' + RY'D_2'B_5'$ $Q' = (YB_5' + Y'B_5)(RD_2 + R'D_2') + (YB_5 + Y'B_5')(R'D_2 + RD_2')$

*Fig. 80*

$Q' = (YB_5' + Y'B_5)(RD_2 + R'D_2')$
$\quad + (YB_5 + Y'B_5')(R'D_2 + RD_2')$

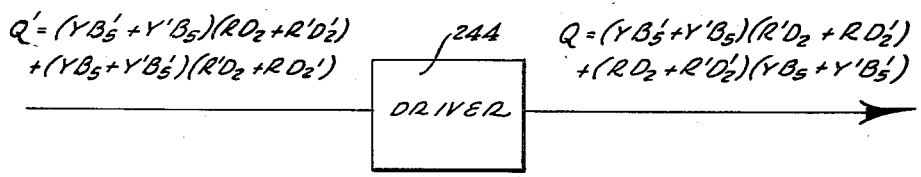

$Q = (YB_5' + Y'B_5)(R'D_2 + RD_2')$
$\quad + (RD_2 + R'D_2')(YB_5 + Y'B_5')$

INVENTORS:
GLENN E. HAGEN
CHARLES R. WILLIAMS
EVERETT D. PHILBRICK, JR.
ROBERT M. BECK
CECIL R. RUSSELL

BY Herbert E. Metcalf
THEIR PATENT ATTORNEY

Sept. 2, 1958     G. E. HAGEN ET AL     2,850,232
MACHINE FOR DIGITAL DIFFERENTIAL ANALYSIS
Filed Dec. 26, 1951     60 Sheets-Sheet 49
Fig. 81
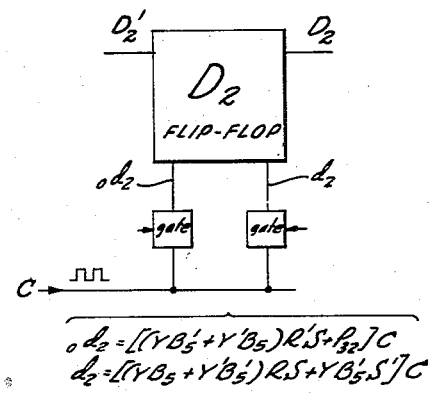
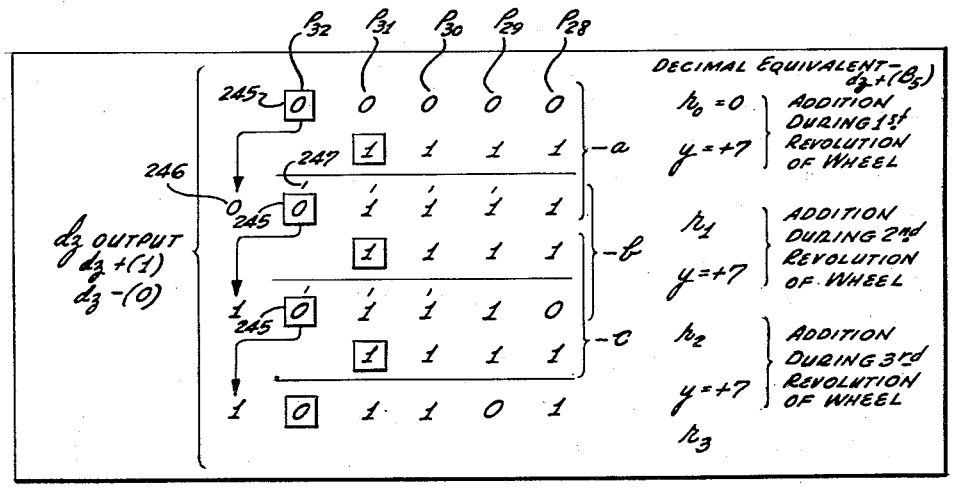
Fig. 82

Sept. 2, 1958   G. E. HAGEN ET AL   2,850,232
MACHINE FOR DIGITAL DIFFERENTIAL ANALYSIS
Filed Dec. 26, 1951   60 Sheets-Sheet 50

INVENTORS:
GLENN E. HAGEN
CHARLES R. WILLIAMS
EVERETT D. PHILBRICK, JR.
ROBERT M. BECK
CECIL R. RUSSELL

By Herbert E. Metcalf
THEIR PATENT ATTORNEY

Sept. 2, 1958 G. E. HAGEN ET AL 2,850,232
MACHINE FOR DIGITAL DIFFERENTIAL ANALYSIS
Filed Dec. 26, 1951 60 Sheets-Sheet 52

$$\frac{d^2y}{dx^2} = -\frac{dy}{dx} + y^2 + \sin y + A \qquad A = -\frac{1}{4} \quad x_0 = 0 \quad y_0 = 0$$

$$\left(\frac{dy}{dx}\right)_0 = \frac{1}{8} \qquad \left(\frac{d^2y}{dx^2}\right)_0 = -\frac{3}{8}$$

INVENTORS:
GLENN E. HAGEN
CHARLES R. WILLIAMS
EVERETT D. PHILBRICK, JR.
ROBERT M. BECK
CECIL R. RUSSELL

By Herbert E. Medcalf
THEIR PATENT ATTORNEY

Fig. 87

| I | $S_{d_x}$ | $S_{d_y}$ | $S_{d_z}$ | M | $S_y$ | $S_P$ | $Y_r$ (dec.) | $Y_m = Y_r 2^{s_y(dec)}$ | $o/m$ octal | $o/m$ $o_m$ octal entry |
|---|---|---|---|---|---|---|---|---|---|---|
| 25 | $S_{34}$ 15 | $(S_{31})$ 14 | $S_{27}$ 14 | 1 | -1 | 15 | +.0 | +.0 | +.0 | (1).0 |
| 26 | $S_{34}$ 15 | $S_{27}$ 14 | $S_{26}$ 14 | 1 | -1 | 15 | +.0 | +.0 | +.0 | (1).0 |
| 27 | $S_x$ 15 | $S_{27}$ 14 | $S_{27}$ 14 | 1 | -1 | 15 | -.375 | -.1875 | -.14 | (0).64 |
| 30 | $S_{34}$ 15 | $S_{26}$ 14 | $S_{27}$ 14 | 1 | -1 | 15 | +.1 | +.5 | +.4 | (1).4 |
| 31 | $S_x$ 15 | $S_{27}$ 14 | $S_{31}$ 15 | 0 | -0 | 16 | -.125 | -.125 | -.1 | (0).7 |

INVENTORS:
GLENN E. HAGEN
CHARLES R. WILLIAMS
EVERETT D. PHILBRICK, JR.
ROBERT M. BECK
CECIL R. RUSSELL

BY Herbert E. Metcalf
THEIR PATENT ATTORNEY

Sept. 2, 1958 G. E. HAGEN ET AL 2,850,232
MACHINE FOR DIGITAL DIFFERENTIAL ANALYSIS
Filed Dec. 26, 1951 60 Sheets-Sheet 54

| Fig. 88a | Fig. 88b |

INVENTORS:
GLENN E. HAGEN
CHARLES R. WILLIAMS
EVERETT D. PHILBRICK, JR.
ROBERT M. BECK
CECIL R. RUSSELL

By Herbert E. Metcalf
THEIR PATENT ATTORNEY

Fig. 88t $$\frac{d^2y}{dx^2} = -\frac{dy}{dx} + y^2 + \sin y + A \begin{cases} x_0 = 0 & \left(\frac{dy}{dx}\right)_0 = \frac{1}{8} & \left(\frac{d^2y}{dx^2}\right)_0 = -\frac{3}{8} \\ y_0 = 0 \end{cases}$$

INVENTORS:
GLENN E. HAGEN
CHARLES R. WILLIAMS
EVERETT D. PHILBRICK, JR.
ROBERT M. BECK
CECIL R. RUSSELL

By Herbert E. Metcalf
THEIR PATENT ATTORNEY

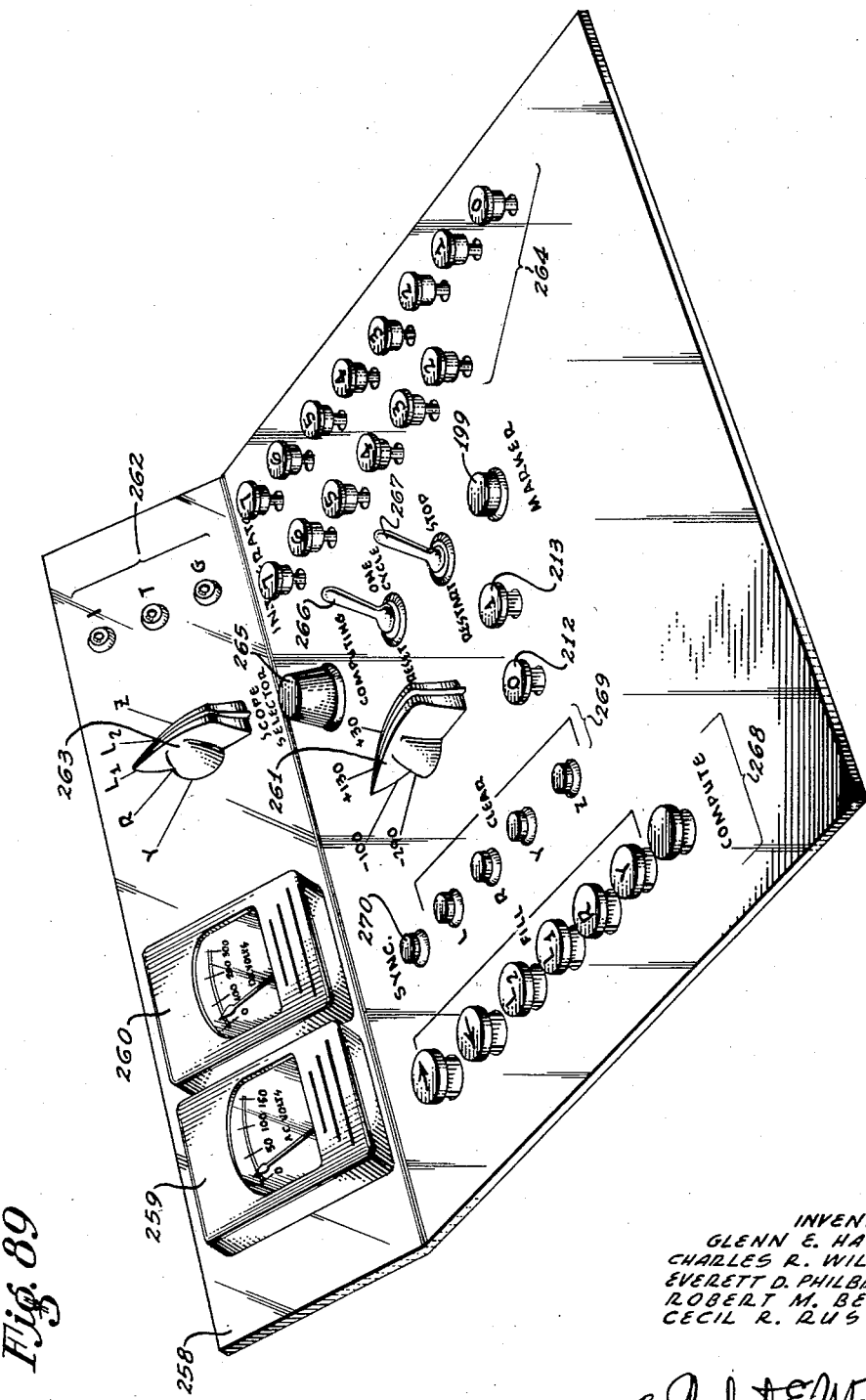

Sept. 2, 1958    G. E. HAGEN ET AL    2,850,232
MACHINE FOR DIGITAL DIFFERENTIAL ANALYSIS
Filed Dec. 26, 1951    60 Sheets-Sheet 57

INVENTORS:
GLENN E. HAGEN
CHARLES R. WILLIAMS
EVERETT D. PHILBRICK, JR.
ROBERT M. BECK
CECIL R. RUSSELL

By Herbert E. Metcalf
THEIR PATENT ATTORNEY

Sept. 2, 1958 G. E. HAGEN ET AL 2,850,232
MACHINE FOR DIGITAL DIFFERENTIAL ANALYSIS
Filed Dec. 26, 1951 60 Sheets-Sheet 58

INVENTORS:
GLENN E. HAGEN
CHARLES R. WILLIAMS
EVERETT D. PHILBRICK, JR.
ROBERT M. BECK
CECIL R. RUSSELL

BY Harbert E. Metcalf
THEIR PATENT ATTORNEY

Sept. 2, 1958 G. E. HAGEN ET AL 2,850,232
MACHINE FOR DIGITAL DIFFERENTIAL ANALYSIS
Filed Dec. 26, 1951 60 Sheets-Sheet 59

INVENTORS:
GLENN E. HAGEN
CHARLES R. WILLIAMS
EVERETT D. PHILBRICK, JR
ROBERT M. BECK
CECIL R. RUSSELL

By Herbert E. Metcalf
THEIR PATENT ATTORNEY

Sept. 2, 1958　　　G. E. HAGEN ET AL　　　2,850,232
MACHINE FOR DIGITAL DIFFERENTIAL ANALYSIS
Filed Dec. 26, 1951　　　　　　　　　　　　　60 Sheets-Sheet 60

INVENTORS:
GLENN E. HAGEN
CHARLES R. WILLIAMS
EVERETT D. PHILBRICK, JR.
ROBERT M. BECK
CECIL R. RUSSELL

BY Herbert E. Metcalf
THEIR PATENT ATTORNEY

United States Patent Office 2,850,232
Patented Sept. 2, 1958

2,850,232

MACHINE FOR DIGITAL DIFFERENTIAL ANALYSIS

Glenn E. Hagen, Lawndale, Charles R. Williams, Palos Verdes, Everett D. Philbrick, Jr., Beverly Hills, Robert M. Beck, Long Beach, and Cecil R. Russell, Sierra Madre, Calif., assignors to Northrop Aircraft, Inc., Hawthorne, Calif., a corporation of California Application December 26, 1951, Serial No. 263,152

23 Claims. (Cl. 235—61)

| TOPIC | Column |
|---|---|
| General discussion | 1 |
| Description of drawings | 8 |
| Introductory discussion of differential analyzers | 11 |
| Description of the preferred embodiment | 17 |
| Typical playback amplifier | 22 |
| Record circuits | 23 |
| Logical design of digital computers | 24 |
| Basic logical circuits | 26 |
| Circuit conventions | 26 |
| Block diagram of the preferred embodiment | 27 |
| Typical diode board | 31 |
| Logical circuits | 31 |
| Z channel proposition flip-flops | 34 |
| Pulse position—or "P"—counter | 35 |
| Integrator—or "I"—counter | 38 |
| Integrator selector switch | 39 |
| Operation switches | 40 |
| G, $G_1$ and H flip-flops | 41 |
| Precessing Z line | 43 |
| Logical nets of Z line | 49 |
| $L_1$ and $L_2$ address channels | 50 |
| Start flip-flop | 51 |
| Y channel | 52 |
| R channel | 52 |
| Z channel delay flip-flops | 53 |
| $\Sigma dy$ counter | 55 |
| $\Sigma dy$ counter logical network | 57 |
| $\Sigma dy$ register | 58 |
| $Y+\Sigma dy$ adder | 59 |
| $\Sigma dy$ register net | 61 |
| $dx$ Selector counter | 61 |
| $R \pm Y$ adder | 62 |
| Preparation of problems for the computer | 64 |
| Operating the computer | 68 |
| Interconnecting equipment | 71 |
| Output synchronization panel | 72 |
| Miscellaneous output panel | 72 |
| Input synchronization panel | 72 |
| Synchronization button | 72 |
| Interconnector | 73 |
| Clear circuits | 73 |
| Oscilloscope selector switch | 74 |
| Power supply and voltage selector switch | 74 |
| Computing indicating light | 75 |
| Oscilloscope read-out | 75 |

*General discussion*

This invention relates to computers and more particularly to a novel means and method for performing the process of differential analysis.

The generalized methods and means of this invention are novel developments from, and improvements on, methods and means illustrated, described and claimed in companion applications, Serial No. 147,862, filed March 6, 1950, and Serial No. 217,478, filed March 26, 1951.

As discussed in the referenced companion application, differential analysis devices are concerned with the generation of solutions to differential equations, i. e., equations whose variables are related and expressed in the form of derivatives or differentials.

In general, two generic classes of computers for such analysis have heretofore been known. One of these is the analogue differential analyzer, sometimes referred to as the continuous variable type computer, which is best known and demonstrated in its mechanical embodiment as the Kelvin wheel-and-disc integrator. The other of these classes is the digital differential analyzer which utilizes the well known principle of numerical integration consisting mainly of iterative steps of an arithmetical nature such as addition and subtraction. This latter class is further characterized by the fact that it employs signals-electrical pulses, for example, for representing incremental changes in magnitude of a variable; thus it is said to be a discrete variable type computer.

The present invention is primarily concerned with a novel means and method of performing the process of differential analysis; this process may be considered broadly as a hybrid of these two previously mentioned types of computational methods.

On examining these devices for performing integration it becomes readily apparent that the character of approach of the analogue computer, the wheel-and-disc type integrator, for example, is more direct and much simpler than that of the digital computer. This is because the wheel-and-disc integrator operates directly upon a differential equation as it is ordinarily written. It operates by methods of the calculus.

Digital computers, on the other hand, require that a differential equation be transformed into numerical form before it can be solved. An elaborate memory system is needed for storing subroutine numbers and orders. The preparation for setting up the equation in a digital computer is generally quite difficult and lengthy.

Thus it is seen that of the two classes of differential analyzers, it is the logic of the analogue computer that is most clearly a part to that body of mathematics, calculus, which it seeks to augment.

Digital computers, however, have many advantageous features. After once getting a problem coded for a digital computer, the problem can be solved on this computer in a very short time, much shorter than on analogue computers. This is due to the fact that digital computers embody the advantages of extremely fast acting electronic operations. Furthermore, digital computers are inherently more accurate than analogue computers. By representing magnitudes of variables by pulses, rather than proportional voltages, rotations of shafts, etc., digital computers have the abstract property of working with numbers and thus computations carried out by digital computers can proceed with practically all the rigorous accuracy associated with numbers.

Thus it is made evident that it would be highly desirable to have an integrating device which could embody the simplified, direct logical approach to a differential equation employed in the analogue differential analyzer while also gaining the advantage of speed and accuracy associated with digital computers.

In order for a differential analyzer to have these desirable features, it has been determined that a single fundamental integrating unit must satisfy certain requirements which, although they are all inherent in a mechanical manner in the wheel-and-disc type, must also be incorporated in an electronic digital manner in the proposed device. These requirements for an integrating device are as follows:

(a) It must receive two independent inputs of varying magnitude and produce from them one output of varying magnitude.

(b) If the time rates of change of the input magnitudes are called $$\frac{dx}{dt} \text{ and } \frac{dy}{dt}$$

the time rate of change of the output magnitude must be $$\frac{dz}{dt}$$

where the relation of the variables is such that $$\frac{dz}{dt} = Ky\frac{dx}{dt}$$

K being a constant which may be associated with the integrator.

(c) Both of the inputs, and the single output must all be of like nature. Just as the wheel-and-disc type represents magnitudes by shaft rotation, the present integrator must represent magnitudes by sums of electronic pulses.

(d) In order to perform mathematical processes, on the digital differential analyzer, the quantities involved must be capable of assuming values defined as positive or negative in sign.

It is well known that complex differential equations can be solved with the use of a plurality of mechanical integrators, by properly interconnecting the outputs of integrators into the inputs of other integrators or as their own input so as to form either an open loop or a closed loop computational system. In the mechanical analogue means for solving such complex problems, the integrating devices, composed of discs and wheels, are comparatively bulky. Likewise, interconnections are composed of shafts, gears, differentials, etc., which are cumbersome and take time to change from one setting to another.

In the process of operating this plurality of mechanical integrators to solve a problem, one of the shafts is usually designated as the independent variable "time." This time shaft is generally driven by a motor. Thus, the entire system, i. e., all the integrator devices, are simultaneously advanced in time in accordance with their shaft interconnections. In order to understand the analogy of the digital integration method of the present invention, the following concept is helpful. Assume that the independent variable "time" shaft of the mechanical integrator system, previously described, is rotated intermittently such that each operation time or step is defined by a fixed incremental rotation of this shaft. As a result of each one of these steps all of the individual integrator devices are re-adjusted, i. e., their input and output shafts are rotated various discrete amounts in accordance with their interconnection. It is further helpful to note that everytime the independent variable shaft is stopped, after an incremental rotational step, the integrator shafts can be thought of as storing information, in the form of angular shaft positions, this information is pertinent to the instantaneous "operation time" of the independent variable shaft. The shafts can thus be considered to be memory elements storing numbers which represent the integrator characteristic of each operation time.

Thus it is seen that, fundamentally, a useful differential analyzer consists of a number of interconnected integrating mechanisms, arranged normally in a closed loop system, which are driven by a single independent variable shaft. In other words, a mechanical differential analyzer consists generally, of a device which carries on several simultaneous integration processes.

The present invention is highly advantageous in that it overcomes this need for a plurality of integrating mechanisms. What is provided, instead, is a single highly flexible computer unit which is approximately a digital counterpart of one mechanical integrator. This single computer unit is used, successively, to advance by one step each of the individual integration processes, normally carried out simultaneously by many integrators in a mechanical differential analyzer in one step or operation time. To accomplish this, in accordance with the present invention, a memory is provided in place of each of the mechanical integrators of the above described system. Information, pertinent to a digital counterpart of a mechanical integrator condition or set-up, is then placed in each of these memories. To perform differential analysis, the information in each of these memories is serially fed into the single integrating computer unit which operates on this information to establish the proper relationship of the variables normally assumed by a digital type integrator at any given operation time. This new information is then recorded back onto the memory, thus freeing the computer unit to operate on the successive memory information. By this serial use of a single integrating computer unit over and over again, the same results are ultimately achieved as would be obtained by simultaneously carrying on a plurality of integration processes, without, however, the need for a large number of integrating computing units.

Thus, it is an object of this invention to provide an integrating device which embodies the simplified, direct, logical approach to a differential equation employed in the analogue differential analyzer while also gaining the advantage of speed and accuracy associated with digital computers.

It is another object of this invention to provide a single, versatile digital integrator computer unit which can be used in a serial manner to advance a plurality of digital integration set-ups, one step at a time, so as to perform differential analysis.

It is another object of this invention to provide a novel memory arrangement for the information required to perform serial digital integration.

It is another object of this invention to provide a novel, simple, compact electronic means and method for performing digital integration.

A novel method of designing digital computers is also set forth within this specification. This method involves a unique use of symbolic logic and logical algebra as applied to electronic digital computer circuit design. Symbolic logic is defined as the science concerned with the validity of systems of thought. A "system of thought" is defined as a set of rules, instructions or limitations of a procedure, for manipulating a given set of logical information. By expressing these rules, instructions, etc., in logical algebra, a new and useful manner of presenting the "system of thought" is provided. Since a given computer has a defined system of thought, a novel application of symbolic logic is employed in the design of the present invention.

Another object of this invention is thus to eliminate trial and error methods of design generally associated with digital computers and replace them by more simple, direct and logical methods.

Another object of this invention is to provide a compact computer that is portable, reliable, and serviceable.

Another object of this invention is to provide, in an electronic computational system, read-out connections which enable supplementary read-out equipment to be used.

Another object of this invention is to provide an electronic computational system in which new information (e. g. integrator outputs) is sensed while computation is simultaneously proceeding, said computation resulting from information previously sensed.

Another object of this invention is to provide means for the interconnection of a desired number of digital differential analyzers thus providing the number of integrators a particular problem may demand.

Another object of this invention is to provide an electronic computational system in which computation of several digital differential analyzers is controlled by flip-flops and circuitry within a master unit.

A still further object of this invention is to provide a digital differential analyzer which is smaller in size than an analogue computer of similar capacity.

Among additional objects of this invention are:

To provide means for identification and selection of information recorded on a memory device, said means consisting of a switching device which, by virtue of its particular setting (effective configuration), provides a lead which attains a desired voltage level during a particular count of an N stage counter of desired radix.

To provide means for identification and selection of information recorded on a magnetic drum memory, said means consisting of an integrator selector switch which by virtue of its particular setting (pushbutton configuration), provides a lead which attains a certain voltage level during a particular count of the $2n$ counts of an N stage binary counter, said integrator selector switch using only $2n$ diodes in its embodiment.

To provide in an electronic memory device, means for a portion of said memory (e. g. a channel on said memory) which discriminates between the outputs of odd and even numbered computational components (integrators) and also between odd and even numbered external inputs to computing circuitry.

To provide in a digital differential analyzer, means providing general storage for pulses which represent the output of each of the integration processes and also for storage of a number of available external inputs, said means including a method of making available, to each and every integrator, the outputs of the other integrators and also making available, to each and every integrator, a number of external inputs, a method of discriminating between outputs of integrators, grouping them into two distinct groups on the magnetic surface of a memory, a method by utilization of a flip-flop of effecting an "idling" during filling of information into the memory, a method of effecting "stepping right" or "stepping left" of information within a memory by utilization of prearranged, specific flip-flops, a method providing simultaneous availability of both integrator information groups, a method of idling between computational cycles (recirculation).

To provide means of supplying a flip-flop circuit with additive input circuits, said additive input circuits serving to accomplish the logical function of an inclusive "or" type gate circuit.

To provide in a digital differential analyzer, a $dx$ address system in which a $dx$ selector counter serves to sense a binary number address contained in either one of two address channels of an integrator, said sensing process occurring during predetermined pulse times following which occurs the pulse time of the next integrator time during which time said $dx$ selector counter counts *downward* from the binary number address $dx$ until binary one is reached, at which time the condition of an associated flip-flop is gated through a $dx$ coincidence circuit into a $dx$ counter, resulting information being gated into a $dx$ register at a certain clock pulse time, and said $dx$ counter is cleared in order to sense the next $dx$ information.

To provide in a digital differential analyzer, a means of effecting synchronization between the integrators of two or more interconnected computers, said means comprising a switch for rendering a logical proposition N true at a certain pulse time of a designated integrator, effectively setting up a pulse position counter configuration in which several pulse positions have been omitted in the count, and the integrator consequently shortened by several pulse positions, all other integrators therefore being advanced by several pulse positions, this process continuing until synchronization is effected with integrators of a reference memory.

To provide in a digital differential analyzer, external input logical circuits which govern placing any number (up to twelve) of binary input rates, said binary input rates undergoing no precession.

To provide in a digital differential analyzer, a magnetic drum memory including six essential information channels, one of said channels being a clock channel used for computer timing and synchronization, said clock channel working in conjunction with a pulse position counter and with an integrator counter, a $dx$ device comprising a $dx$ selector counter, $dx$ coincidence circuit, a $dx$ counter, $dx$ register, a $dy$ device including a pair of $\Sigma dy$ coincidence circuits, a pair of $\Sigma dy$ counters, a $\Sigma dy$ register and stepper, and a $Y+\Sigma dy$ adder, the output of the latter as well as the output of said $dx$ register being conveyed into an $R+Y$ adder from which re-recording of information is effected onto R and Y information channels and also onto a Z line which contains output information from all integrators, said output information being available to all integrators, said Z line possessing properties of precession and of recirculation, the entire computation process being controlled in accordance with the configuration of a start flip-flop.

To provide in a digital differential analyzer, a means of stopping computation comprising an integrator which has no $dy$ input. Overflow from this integrator triggers a halt flip-flop. A predetermined numerical value is filled into the Y channel of this integrator, said numerical value adding, during computation, into a remainder accumulator for each increment in the independent variable until the remainder accumulator overflows, stopping computation automatically.

To provide in a compact cabinet for a differential analyzer, a framework to which is affixed suitable, removable side panels and in which is housed a plurality of individual diode boards onto which logical circuit components (diodes, resistors, and condensers, for example) are wired, a plurality of flip-flops, driver circuits and amplifiers, a magnetic drum memory, a power supply and a blower designed to cool circuit components contained within said cabinet (the entire cabinet being mounted on rollers for mobility and convenience of operation).

To provide in a digital differential analyzer, a means of scaling the output of the computer so that answers can be tabulated and/or printed out in the decimal system.

To provide in a digital differential analyzer, a means of triggering an oscilloscope fitted with a suitable, graduated transparent, shield so that visual read-out in the binary system can be effected.

Briefly, one particular embodiment of the present invention includes a magnetic wheel functioning as a dynamic storage. Numerical and instructional data required for each digital integrator are initially stored on this wheel. A single integrating computer circuit is provided for cooperating with this dynamic storage. This computer circuit provides means for performing integration by a digital process which may be called the serial additive transfer method. In general, the computer circuit is composed of a plurality of flip-flops representing logical propositions needed to accomplish counting, simple arithmetical operations, and commands. These flip-flops have their inputs and outputs interconnected by diode nets which represent means for physically obtaining logical "and" and "inclusive or" connections or combinations of these. Since several actions can occur simultaneously while others only for certain intervals of time, a clock pulse is continuously generated by a recording placed on a magnetic wheel. A change of clock state from relatively high voltage to relatively lower voltage is needed at the input of the computer proposition flip-flops to enable them to change their state. Furthermore, counting circuits are provided to enable indexing of the intervals of time to be supplied, as will be more fully described later.

More specifically, the data on each arc of the dynamic storage is fed out at the proper time to the integrating computer circuit which operates on this data to advance the particular integrator set-up a given step. The resulting altered integrator set-up is then re-recorded in the memory, and data from the next integrator set-up is picked up and fed through the computer unit. By this means several integrator set-ups can be processed in a serial fashion through the computer units. Each of the integrator outputs resulting from a particular integrator computation is fed into an auxiliary memory loop which acts as a processing line and which serves as a central information file. These integrator outputs can be extracted into either of the inputs of any integrator or integrators (up to seven) in a pre-arranged manner in accordance with instructions initially set-up and associated with each of the integrator memories.

In order to introduce instructions and initial numerical conditions into each integrator set-up, a read-in circuit is provided comprised primarily of a control panel which enables information to be placed into predetermined positions of the memory provided for each of the integrators. A read-out device is also provided. This read-out device can take the form of a counter or an oscilloscope, for example, for visually reading a Y number appearing in one of the integrator set-ups, this Y number representing some value of the desired solution. However, the output can also be provided in the form of a series of pulses or indications which can be used to actuate and control a mechanism in accordance with the solution of a differential equation being solved.

More specifically, in the magnetic drum memory of the digital differential analyzer, herein to be described, stationary magnetic heads operate on magnetic information contained on the periphery of a rotating wheel; such operations are performed, digit-by-digit, from the least significant digit to the most significant digit. Thus the computer is essentially a serial-type machine in which a stationary magnetic head scans, one-by-one, the status of magnetic patterns parading by. Of course, this scanning operation is taking place at a very rapid rate—approximately 100,000 digits per second; this rate corresponds to a frequency of approximately 100 kilocycles. Since the computer contains 44 integrators of 32 pulse positions each, the total recirculation cycle is completed about 70 times per second.

Information units on a given channel of the memory wheel periphery appear as a magnetization status of the special paint thereon. Such magnetization information states effect either a pulse or no pulse in pick up circuitry. Thus required information and control instructions are communicated between components within the computer by the presence or absence of pulses.

It is to be noted that the invention does not employ counters as accumulators. The R and Y quantities are recorded in two channels on the memory and are available for transfer operations serially. Thus only one compact computing section is necessary; consequently only a small number of vacuum tubes are required by the computer since the computing section is comprised mainly of crystal diodes.

The Y, R and Z channels are used for temporary storage; thus while computation is in progress, information units on these channels are constantly changing. These three channels are recorded, erased and recorded again each revolution of the wheel. The address channels, $L_1$ and $L_2$, contain constant address information. The permanently recorded clock channel contains 1560 equally spaced magnetization states and is used for computer sychronization.

As the memory wheel revolves (counter-clockwise direction), each magnetic information unit, which corresponds to a binary digit, is examined and modified accordingly For example, the magnetic configuration in the Y cannel is modified by information from a stepping circuit which contains the algebraically combined contents of the results of scanning the Z line, this scanning being governed by the L channels where magnetic directions are contained for sensing the correct integrator outputs on the Z line at the proper pulse times. Since the Z line completely recycles during the time that any integrator is passing through the recirculation circuit, it makes available the outputs of all the integrators to the integrator which is passing through. During a typical scanning instant, if the Z line contained a one the $\Sigma dy$ counter will add one to its contents and if the Z line contained a zero, the $\Sigma dy$ counter will subtract one from its contents. Similarly, the Y number is added to or subtracted from the number in the R channel in accordance with the $dx$ address which is identified by a $dx$ counter which counts off pulse times and causes a $dx$ register to observe the Z line at the proper instant in order to sense the proper $dx$ input for the integrator.

The presence of a "pulse" in $dy$ counter adds one unit to the number in the Y counter, and the absence of a pulse in $dy$ counter subtracts one unit from the number in the counter. Similarly, the presence of a pulse in $dx$ counter adds Y to R, and the absence of a pulse in $dx$ counter subtracts Y from R. The $dz$ output, which occurs when the R register overflows, represents: (1) zero, if it is alternately pulse and no pulse, (2) a positive quantity if it contains a greater number of present pulses than absent pulses, and (3) a negative number if it contains a greater number of absent pulses than present pulses.

Initial magnetic state instructions, which have been placed on the memory wheel periphery by means of external controls, supervise the process of solving a particular problem. While computation is in progress, magnetization patterns of Y, R, and Z channels are undergoing continual modification. When computation stops as, for example, when the first integrator has a pulse output, consequently triggering a half flip-flop, information existing on the memory wheel is recirculated and can be observed as a waveform upon an oscilloscope screen. This waveform can be interpreted as a binary number, capable of being converted to an octal number and ultimately to a decimal number.

Description of drawings

Other objects and various advantageous features of a preferred embodiment of the invention will be more apparents from the following description which is to be read in connection with the accompanying drawings in which:

Figure 6 is a perspective drawing of a typical magnetic head.

Figure 7 is an exaggerated plan view of a magnetic drum surface and the magnetized coating showing, in particular, how information is sensed from the magnetized surface.

Figure 8 depicts the approximate waveform or oscilloscope pattern obtained from the clock channel recording on the drum wheel.

Figure 9 is a combination schematic-block diagram for illustrating how information is read and recorded onto the sensitive surface of the drum wheel.

Figure 11 is a chart showing the word structure of the R channel and the Y channel.

Figure 12 is a graphical presentation of pulse time positions in the R channel and in the Y channel.

Figure 13 is a graphical representation of a 12 stage binary stream, consisting of all ones (Figure 13a) and of the associated trigger pulses (Figure 13b).

Figure 14 is a schematic diagram of clock amplifier and clock driver circuits.

Figure 15 is a schematic diagram showing the diode symbol convention used throughout the specification.

Figure 16 is a schematic diagram of Y channel circuitry.

Figure 17 is a schematic diagram of a typical recording circut as employed in the invention.

Figure 18 is a schematic diagram of a basic circuit used for producing symbolic addition.

Figure 19 is a schematic diagram of a basic circuit used for producing symbolic multiplication.

Figure 20 is a block diagram of a preferred form of the invention.

Figure 21 is a perspective sketch of a typical diode board.

Figure 22 is a perspective sketch of a typical diode and its associated clips.

Figure 23 is a perspective sketch of the opposite face of a typical diode board shown in Figure 21.

Figure 26 is a graph showing various wave forms associated with the Y flip-flop, and the $Y_m$ flip-flop.

Figure 30 is a graph illustrating wave forms at various locations in the Z channel.

Figure 31 is a table illustrating the counting operation of the pulse position or "P" counter.

Figure 32 is a schematic-block diagram of the pulse position counter, including logical equations of its associated stages.

Figure 33 is a schematic diagram of diode circuitry comprising a false-triggering input gate to flip-flop $F_1$.

Figure 34 is a schematic diagram of diode circuitry comprising a false-triggering input to flip-flop $F_2$.

Figure 35 is a schematic diagram of diode circuitry comprising a false-triggering input to flip-flop $F_3$.

Figure 36 is a schematic diagram of the circuits shown in Figures 33, 34, and 35 combined into one "family-tree" type of diode network.

Figure 37 is a schematic diagram of the entire diode network comprising the pulse position counter.

Figure 38 is a schematic diagram of the diode net for the $P_1'$ driver circuit.

Figure 39 is a schematic diagram of the diode net associated with the $P_{32}'$ driver.

Figure 40 is a schematic diagram of the diode gate circuits used for triggering the $P_{1/28}\,P_{29/32}$ flip-flop.

Figure 41 is a schematic diagram of the diode gate circuits used for triggering the $P_{1/20}\,P_{21/32}$ flip-flop.

Figure 43 is a schematic-block diagram of the integrator counter, including logical equations of its associated stages.

Figure 45 is a schematic diagram of the integrator selector switch.

Figure 54a is a block diagram illustrating how Figures 54b through 54i are assembled, so as to comprise a chart exemplifying the operation of the precessing Z line.

Figure 55 is a schematic diagram of logical diode networks associated with the Z line, including its logical equation.

Figure 56 is a schematic-block diagram of the start flip-flop, including its logical input equations.

Figure 57 is a schematic diagram of the "family tree" type of diode network comprising circuitry for the Y, R, $L_1$, and $L_2$ channels, including logical equations.

Figure 58 is a chart exemplifying the purpose of the Z channel delay flip-flops.

Figure 59 is a schematic diagram of the logical diode networks associated with Z channel delay flip-flops.

Figure 61 is a schematic-block diagram of flip-flops $A_1$ through $A_4$, including logical input equations for respective stages.

Figure 63 is a schematic diagram of logical diode networks associated with $\Sigma dy$ counters.

Figure 64 is a table illustrating how information within $\Sigma dy$ counters is added, and then stepped into $Y+\Sigma dy$ adder.

Figure 66 is a schematic-block diagram of the $D_1$ flip-flop, including logical input equations.

Figure 67 is a schematic diagram of diode gate circuits associated with the $D_1$ flip-flop.

Figure 68 is a table illustrating the process undertaken by $Y=-6$ added to $\Sigma dy=+2$ yielding $Y_0=-4$ in $Y+\Sigma dy$ adder.

Figure 69 is a table illustrating the logic expressing combinations of three inputs which render true the sum proposition of the $Y+\Sigma dy$ adder.

Figure 70 is a schematic diagram of a family tree type diode gate circuit associated with the $\Sigma dy$ register, including logical input equations.

Figure 73 is a schematic-block diagram of the $dx$ selector counter, including logical input equations of its associated stages.

Figure 74 is a portion of a typical coding sheet, illustrating how a $dx$ address is filled in.

Figure 75 is a table illustrating the logical counting followed by the $dx$ selector counter.

Figure 76 is a schematic-block diagram of the $A_9$ flip-flop, including logical input equations.

Figure 77 is a schematic-block diagram of the $B_5$ flip-flop, including logical input equations.

Figure 78 is a schematic diagram of logical diode networks associated with the $dx$ selector counter and with the $A_9$ and $B_5$ flip-flops, including logical input equations.

Figure 79 is a table illustrating logic from which expressions for Q and Q' were derived.

Figure 80 is a block diagram showing the use of a driver circuit to obtain Q proposition.

Figure 81 is a schematic-block diagram of the $D_2$ carry flip-flop, including its logical input equations.

Figure 82 is a chart illustrating the addition process which takes place in the $R+Y$ adder.

Figure 87 is a table containing tabulated results of scaling for the invention a certain differential equation.

Figure 88 illustrates the proper arrangement of Figure 88$a$ and Figure 88$b$ so as to comprise a prepared coding sheet for the invention.

Figure 89 is a perspective sketch of the control panel which is used for operating the computer.

*Introductory discussion of differential analyzers*

Figure 1:
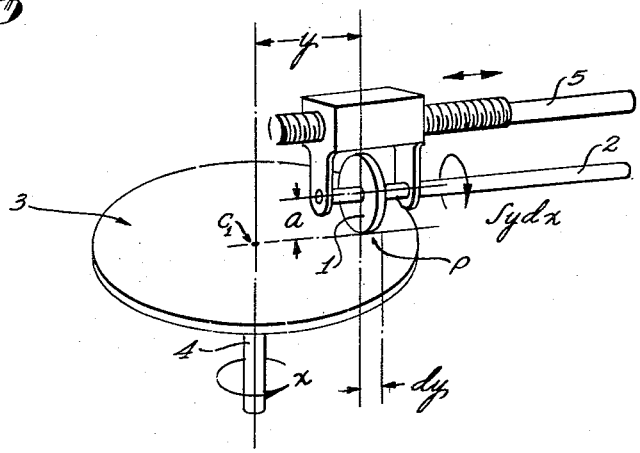
Figure 1 is an illustration for depicting the theory of operation of a wheel-and-disc type integrator.

As a means of understanding the theory of operation of the invention undergoing specification, refer first to Figure 1 in which the mechanical wheel-and-disc type analogue integrator is illustrated. Basically, a vertical wheel 1, mounted on shaft 2, is driven by a horizontal disc 3 mounted on shaft 4. This wheel-and-disc are mounted in a manner such that the distance $y$ between the center of rotation $C_1$ of disc 3 and the point of contact P of wheel 1 with disc 3 can be varied. Consequently this distance $y$, which is usually called the "displacement" of the integrator, is proportional to the gear ratio between the rotations of disc 3 and wheel 1; therefore, this gear ratio must be made proportional to the integrand of the integral to be evaluated. The variable of integration is represented by the rotation of disc 3; this rotation is usually called "rotation" of the integrator.

Consider the point of contact P of wheel 1 and disc 3 to be at a given instant, a distance $y$ from the center $C_1$ of disc 3. If disc 3 rotates through a small fraction of a turn, say $dx$, due to a rotation of vertical shaft 4, wheel 1 will rotate through $$\frac{ydx}{a} \text{ turns}$$

where $a$ is the radius of wheel 1. By virtue of this rotation of wheel 1, horizontal shaft 2 is rotated through an equivalent small fraction of a turn, say $dz$.

If the distance $y$ is varied by a small fraction of a turn, say $dy$, on lead screw 5 while disc 3 is rotating, the total rotation of wheel 1, and consequently of horizontal shaft 2, is the sum of each of the contributions $$\frac{ydx}{a}, \text{ that is, } \int \frac{ydx}{a} \text{ turns}$$

The quantity $1/a$ is a constant and can be designated generally as K and be taken outside of the integral sign.

This completes the description of the analogue integrator which enables one to produce solutions to differential equations mechanically and which has been presented herein to introduce the basis of the logic of the digital integrator of the present invention.

Analogue devices all have in common a proportionality characteristic; this exists in the wheel-and-disc integrator between shaft rotations and the variables of the differential equation. Each variable in the equation is represented somewhere in the machine by a rotating shaft. The total angle of rotation of a shaft from some reference position is proportional to the magnitude of the variable, and again, the direction the shaft is rotating determines the sign of the derivative. The independent variable shaft for one integrator, which in this case is vertical shaft 4, corresponds to the variable $x$ and is generally driven by a motor; the ratio of the speed of rotation of any other shaft, say lead screw 5 (which corresponds to the variable $y$) to vertical shaft 1 is always proportional to $dy/dx$.

Consideration of derivatives and integrals separately will serve as a further explanation of this integration operation. For example, if the speed of rotation of the independent variable shaft 4 is defined as $dx/dt$ and it rotates for $t$ seconds through the range $x_1$ to $x_2$, its total rotation would be $$(x_2-x_1)=\int_{x_1}^{x_2}dx$$

In other words, the speed of rotation of the shaft is proportional to the time derivative $dx/dt$ of the variable $x$; and the total rotation $(x_2-x_1)$ of the shaft is proportional to the integral of $dx$.

In the mechanical integrator, lead screw 5 is connected in such a manner as to vary, at a $dy/dt$ rate, the position of the contact point P of wheel 1 with respect to the center $C_1$ of disc 3. Disc 3 is rotated by the independent variable shaft 4 at a speed $dx/dt$. From this standpoint, the integrator is a multiplier. Since $$\frac{dz}{dt}=\frac{ydx}{adt} \text{ where } \frac{dz}{dt}$$

is the output speed, the total output rotation $z$ is given by $$z=\frac{1}{a}\int_{x_2}^{x_1}ydx$$

Because of these facts, the speeds of each of the shafts may be rightly defined as being proportional to the time derivative, or rate of change, of the variable it represents. It is also proper and proves to be advantageous in understanding the present invention to treat the speeds of the shafts as being proportional to the differentials of the variables, since the time term, though always implicit, cancels out.

Figure 2:
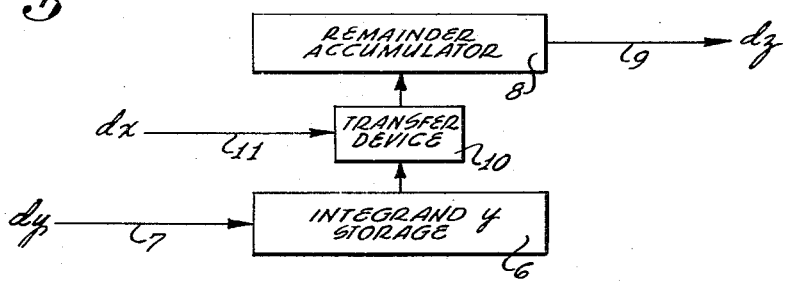
Figure 2 is a block diagram for depicting the theory of operation of the digital counter-part of the integrator in Figure 1.

The basic analogous digital integrating circuit of the present invention is schematically illustrated in Figure 2. In general, three elements comprise this circuit: a first counter 6 functioning as an integrand storage and having an input lead 7, a second counter 8 functioning as a remainder accumulator and having an output lead 9; and, a transfer device 10 which has a second input lead 11.

Each electrical pulse, designated $dy$, received on input lead 7 to integrand storage 6, represents a small unit increase of the integrand $y$ and causes integrand storage 6 content to increase by one. The nature of the transfer device 10 is such that as each input pulse, representing the variable of integration $dx$, is received on input lead 11, the number $y$ existing in integrand storage 6 is transferred in an additive manner to the number in remainder accumulator 8 while still being retained in storage 6.

Continual addition of the existing $y$ number into remainder accumulator 8, as dictated by the $dx$ inputs, results eventually in accumulator 8 reaching its capacity which in this case is the same as that of integrand storage 6. When this capacity is reached, output lead 9 emits an output pulse $dz$, and accumulator 8 starts to count from zero again. Thus, it is apparent that accumulator 8 periodically overflows at a rate $dz/dt$. Furthermore, it can be seen that the relation between $dz/dt$ and $dx/dt$ is dependent on the magnitude of $y$ and on a constant which represents the length of the registers.

It is to be noted that integrand storage 6 does not provide for an overflow output; its capacity limits the maximum value of $y$ which can be transferred into remainder accumulator 8.

The transfer of the $y$ number out of integrand storage 6 via transfer device 10 can be accomplished in any one of several possible forms, such as series or parallel additive transfer, for example. In the preferred embodiment of the present invention, which is to be described in detain in the ensuing discussion, a serial additive transfer is utilized.

An analogy of the digital integrator circuit of the present invention to the previously described wheel-and-disc integrator can now be drawn.

The basic idea of the present invention, in accordance with the foregoing, is in the representation of a variable by a train of electronic pulses instead of a shaft rotation.

The rate at which these electrical pulses are generated corresponds to the speed of rotation of a shaft on the wheel-and-disc integrator, i. e., is proportional to the derivative of the variable. The total number of pulses in any interval is proportional to the magnitude of the variable.

Furthermore, in the mechanical integrator, the relative position of the wheel 1 on disc 3, which corresponds to the variable $y$, can be thought of as a memory device, i. e., it stores a signal number $y$ which is being changed in magnitude in accordance with the $dy/dt$ rate of rotation of the dependent variable lead screw 5. Integrand storage 6 of the digital integrator plays the same role, i. e., it sums the pulses received on the input lead 7 and stores the number $y$ thus obtained.

Similarly, radius $a$ of wheel 1 which appears as a constant $1/a$ in the output expression from the mechanical integrator may be thought of as a fixed rate changer, i. e., its magnitude reduces, or gears down, the speed of rotation of output shaft 2. In the digital integrator, remander accumulator 8 functions in the same manner; its capacity expressed in binary notation as $2^n$, appears as a constant $1/2^n$ in the output expression and, as will be seen, reduces the rate of the $dz$ pulses fed out on output lead 9.

Figure 3:
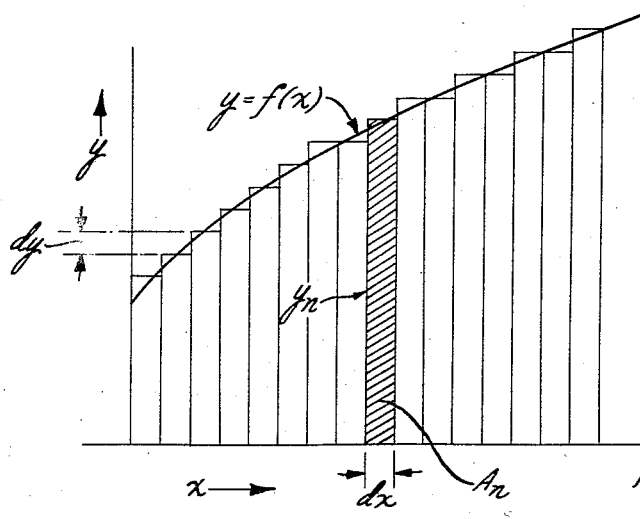
Figure 3 is a graph illustrating generally how the present invention performs the process of integration.

As an aid in explaining how the digital integrating circuit operates, digital integration will be described as a limiting process of finding the area under a curve $y=f(x)$ which is identified only as a set of numerical values of the ordinate corresponding to a set of successive values of the abscissa. As shown in Figure 3, this is accomplished by subdividing a given area into a succession of adjacent incremental rectangular sub-areas such as the cross-hatched area $A_n$. The height of each rectangular sub-area $A_n$ can vary in steps equivalent to fixed increments $dy$ which closely approximate the curve; the width of all the sub-areas is equal and is determined by the value fixed for the increment $dx$. The total area, which is the sum of the sub-areas, corresponds to the approximated integral. Thus a method of defining integration is presented which can be approximated to any degree of accuracy desired. This accuracy is obtained by decreasing the value of the increment assigned to each $dx$ and, of course, $dy$ which is of the same order.

Fast acting electronic equipment employed in the present invention renders possible the assigning of very small values to $dx$, or the increment for any other variable.

Notwithstanding the fact that the rate of change of a variable is a discrete step in the logic of a digital integrator, accuracy is not sacrificed because such discrete steps are made as small as needed in order to obtain the required accuracy; this is done by maintaining the continuously variable rate of change of the variable. Consequently the essential feature of the calculus is preserved.

Referring back to Figure 2, digital integration of the area under the curve $y=f(x)$ is performed by the circuit there presented, by summing the incremental variable rectangular sub-area $A_n$ so determined in Figure 3. Since the increment $dx$, in determining each incremental sub-area, defined as $ydx$, is fixed throughout an integration, $dx$ can be assumed to be dropped out of the notation by being assigned to value "one." This in no way effects the proportionality of an ordinate $y$ to its corresponding sub-area.

Each time a $dx$ pulse is received on second input lead 11 to the integrator circuit, a digit "one" may be considered to be received.

Referring to Figure 3, it is noted that the change in height of a sub-area $A_n$, i. e., the change in magnitude of the successive ordinates $y$, is to be made in very small fixed steps denoted as $dy$.

Since each $dy$ pulse received on the input lead 7 of the digital integrator increases the number in the integrand storage 6 by one unit, it is, similar to the $dx$ input pulse, considered as a digit "one" input to the integrator circuit.

Consequently the digital integrator of Figure 2 can be considered to have two "one" inputs, one of which, $dy$, is proportional to the incremental change in height of the sub-area $A_n$, and the other of which, $dx$, is the instruction to accumulate.

Successive cumulation of the sub-areas corresponding to the $y$ ordinates in the remainder accumulator 8 of Figure 2 results in the emission of a carry out pulse $dz$; each time the capacity of the accumulator 8 is reached, a carry out pulse $dz$ is emitted on the output lead 9.

Likewise to be considered as a digit "one" in the logic of the digital integrator is the carry out pulse $dz$ which results from a pulse accumulation corresponding to a number N where N is one greater than the largest number which either the accumulator 8 or the storage 6 will hold. In other words, $N=2n$, where $2n-1$ is the number in a binary accumulator, say, when all of the stages contain the digit one. The number of digits N can be arbitrarily chosen between 1 and 29. When a carry out pulse $dz$ is emitted as a "one" digit on output lead 9, a remainder term of $r/N$, which is always less than "one," is left in the accumulator 8. The next transfer of a $y$ number from the storage 6 thus adds to the remainder $r/N$ in the accumulator 8 and may or may not, depending on the combined value, cause a single carry out pulse $dz$ on output lead 9. Thus the summing of rectangular incremental sub-areas is the function performed by the basic integrator circuit.

Consider the case in which the $y$ number in the integrand storage 6 is fixed, i. e., no input pulses or "ones" appear on input lead 7. In general, if a number $x$ represents the total number of "ones," i. e., pulses, entering on second input lead 11 for a given time interval, the total number of carry out "ones," identified as $z$ will be:

$$z = \frac{yx}{N} - \frac{r}{N}$$

where N, as noted previously, is one greater than the largest number which either the accumulator 8 or storage 6 will hold, and $r/N$ is the remainder term always less than "one" which is herein defined as the roundoff of the increment $dz$.

As a further explanation, still assuming that $y$ is held constant, consider the concept of the rate at which "ones" are entering on $dx$ input lead 11 and leaving on $dz$ output lead 9. Note that within the accuracy of the accumulator 8, which contains the proportional part of a "one" not appearing on output lead 9, the rate of "ones" output is fixed with respect to the rate of the "ones" input. This is because the input $x$, as seen in the foregoing formula, is multiplied in this case by a constant $y/N$ to obtain the output $z$.

An analogy of the present circuit is embodied in the wheel-and-disc integrator which is, in reality, but a variable gear. For example, if the position of the wheel 1 were to be fixed on the disc 3, the mechanical integrator would function as a fixed gear and the change in speed of the independent variable shaft 4 to the output shaft 5 would be a constant.

But consider the input rate of "ones" into the storage 6 as $dy/dt$. Such a consideration can be made because a counter can be considered as a device which integrates the rate admitted to it with respect to time, i. e., $$y = \int \frac{dy}{dt} dt = \int dy$$

Since $y$ now varies in magnitude, the previous equation no longer holds. Instead, the integral or the output rate of "ones" must be expressed as:

$$z = \int \frac{y dx}{N} - \frac{r}{N} \text{ or } \frac{dz}{dt} = \frac{y dx}{N dt} - \frac{1}{N} \frac{dr}{dt}$$

where the differentials $dz$ and $dx$ are not true differentials but the small discrete changes in the variable as previously described.

In the foregoing equation, it is essentially stated that the rate at which the accumulator 8 produces "ones" is proportional to the product of the variable $y$ and the input rate of "ones" into the transfer device 10. The last term $$\frac{N}{1}\frac{dr}{dt}$$

corresponds to the rate of change of the round-off of the increment $dz$.

In such a manner, the output rate $dz/dt$ of "ones" on the $dz$ output lead 9 is now variable with respect to the input rate $dx/dt$ of "ones" on the $dx$ input lead 11. This variableness in the rates of "ones" into and out of the integrator is directly proportional to the variable number $y$, within the accuracy of the remainder term $$\frac{1}{N}\frac{dr}{dt}$$

The concept of the rate at which "ones"

$$\left(\frac{dx}{dt} \text{ and } \frac{dz}{dt}\right)$$

are entering and leaving the integrator circuit, for the case of an input rate $dy/dt$ of "ones" also, will now be considered further. Since neither of these operations $$\left(\frac{dx}{dt} \text{ and } \frac{dx}{dt}\right)$$

need repeat at constant intervals of times, it is necessary to define some continuity which establishes an equivalent rate of change. Assume that both $x$ and $z$ are plotted against real time as a succession of points, each point being located at that instant in which its value was just changed from the previous value by the admission or emission of "one" in the integrator circuit. If a smooth curve, as a polynomial of higher order, is passed through these points and the time derivative $$\left(\frac{dx}{dt} \text{ and } \frac{dz}{dt}\right)$$

taken, then the instantaneous time rates at which "ones" enter the transfer device 10 of the integrator can be defined as equal to $dx/dt$ and the instantaneous time rates at which "ones" carry out of the integrator from the accumulator 8 can be defined as equal to $dz/dt$. A concept of such rates is both useful and correct inasmuch as integration is a process of summation.

Owing to the fact that the time term, though always implicit, cancels out, no substantial error is made in the digital integrator in considering the rate of change of a variable as being proportional to its differential instead of its derivative.

Consequently, to preserve the similarity of the digital integrator to the mechanical one and to take advantage of the simple logic of the mechanical differential analyzer, inputs 7 and 11, and output 9 of the digital integrating circuit diagrammed in Figure 2 are referred to as the $dy$ and $dx$ inputs and the $dz$ output, respectively. This nomenclature persists throughout the remainder of this discussion and is adhered to both in developing the logic of the fundamental digital integrator circuit and in interconnecting several such integrator circuits to solve complex differential equations.

Thus the numerical device just described satisfies broadly the first three requirements as set forth for the integrator in that it combines two input rates into the specified output rate and produces the output in kind. For example, the $dz$ output of the device can be coupled back to form its own $dy$ input to produce an exponential function. Note that a "one" can serve either as an incremental unit or as an instruction.

Digital integrators may be generally regarded as a set of devices which communicate between themselves in the monary or unitary number system and which operate upon the intercommunications by means of internally stored numbers, expressed in any suitable numbering system. Numbers may be looked upon here as the means of establishing and accurately controlling "streams of ones." These "ones" are, in turn, counted to form other numbers.

The stored numbers act upon a received rate of "ones" by deleting units from it, and therefore serve as variable or fixed rate dividers.

An integrator can effect the transmission of an efficient unitary rate $dz$ which is equal to or less than the $dx$ input rate but is never greater than the $dx$ input rate. If the value of a dependent variable, $z$, is to be found by counting the $dz$ or output rate, then for example, between $10^4$ and $10^5$ units or pulses must be counted in order to express $z$ as a five place decimal number. If the rate reduction of the integrator is nominal, this may, ordinarily, be accomplished by the admission of no more than $10^5$ $dx$ inputs. Excessive rate reduction within the integrator will increase the number of $dx$ inputs required to achieve the same accuracy of expression for $z$. Since the time required to perform an addition cycle in the integrator will usually be fixed, the accuracy achieveable in a limited time and with a limited amount of equipment will, therefore, depend, among other things, upon the extent of rate reduction in the integrators.

Returning to Figure 2 and to the equation $$\frac{dz}{dt} = \frac{y}{N}\frac{dx}{dt} - \frac{1}{N}\frac{dr}{dt}$$

it is evident that the rate reduction $dz/dx$ is essentially established by the ratio of the variable $y$ to the constant $N$. Therefore $y$ must be kept as large as possible consistent with the size of the storage 6. The maximum value $y$ takes during computation will fill the storage 6; that is, will have a digit represented in the highest stage. The capacity of storage 6 cannot be exceeded at any time. In the binary system, if the average numerical value which $y$ takes in the storage 6 during computation is half its capacity, then the average rate out is one-half of the average $dx$ rate in. If this rate is allowed to cumulate in the storage 6 of another integrator, then that storage will receive enough units to fill half of its capacity. Since it will have an initial setting, however, which will fill half of its capacity, the storage will be filled.

Consequently, the rate reduction through a series of integrations need not exceed that of a single integrator providing the scale has been correctly chosen for each integrator. This principle will be demonstrated later in an example in which the preferred embodiment of the invention can be used for generating the numerical solution to the differential equation:

$$\frac{d^2y}{dx^2} = -\frac{dy}{dx} + y^2 + \sin y + A$$

*Description of the preferred embodiment*

Figure 4:
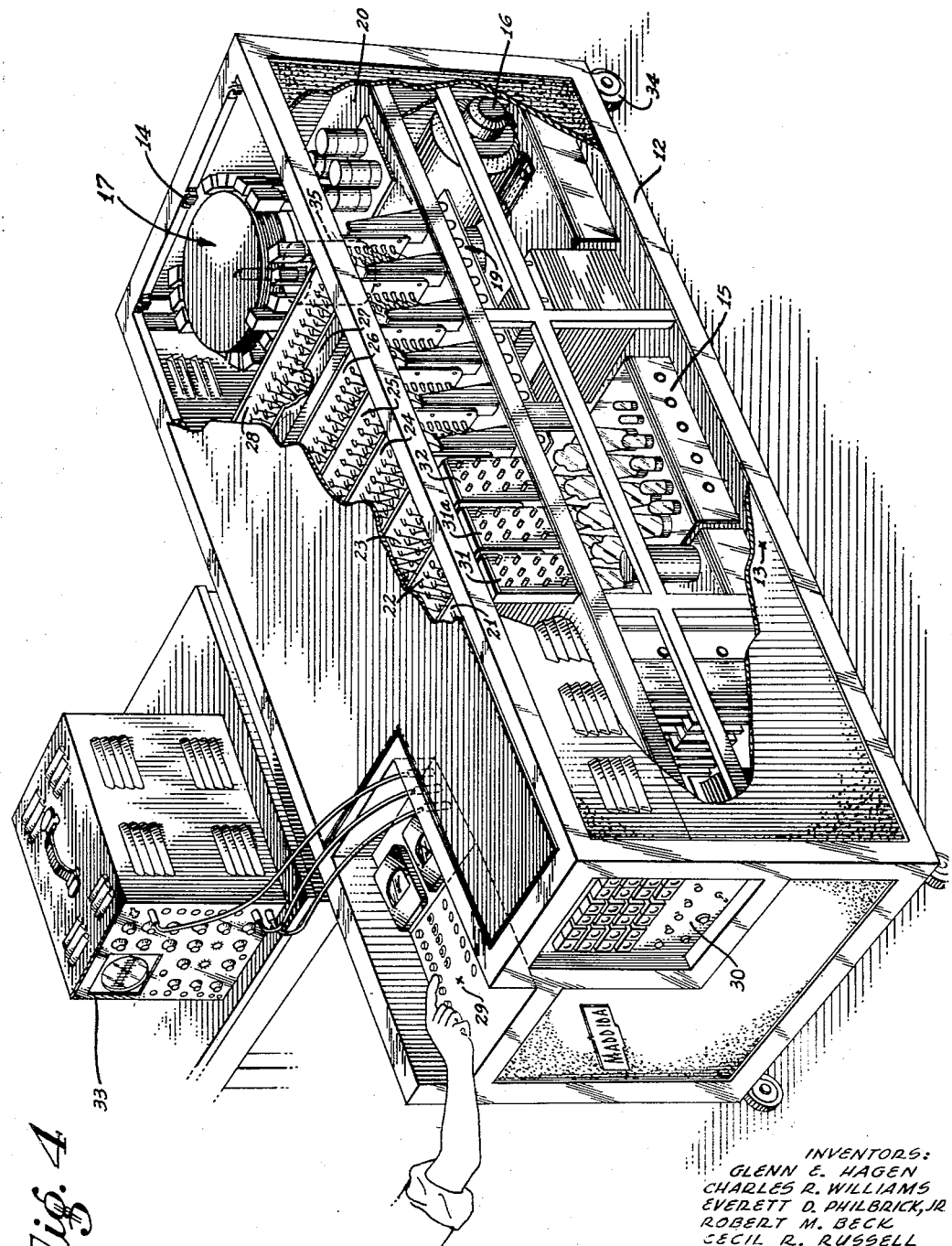
Figure 4 is a cutaway-perspective drawing of a preferred embodiment of the invention.

In Figure 4 is presented a perspective view of a preferred form of the invention undergoing specification. The computer chassis consists of a metal frame 12, covered by sheet metal sides 13 which are removable, being held in position by means of adequate fasteners 14. The power supply is situated in position 15; a cooling blower is located in position 16. The magnetic drum memory 17 is mounted in the rear of machine and driven by suitable motor 35 (hysteresis-induction type in this embodiment). The computing unit 19, consists of associated tubes and flip-flops mounted up-side-down (sandwich style) on base 20 and of eight diode boards (21, 22, 23, 24, 25, 26, 27, 28) upon which are wired essential logical circuits of the computer. Information and commands are filled into the computer by means of control panel 29. The output selection plug board 30 serves to coordinate the output (i. e. a "one" or "zero") of any number of integrators (up to 12) so that it is available on the output sync panel 31 and output panel 31a; plugs can be inserted into panel 31a in order to convey a desired output to suitable scalers and/or read out devices. The input synchronizing panel 32 provides plugs into which as many as 12 outside empirical inputs (digital information) can be inserted and made available to the computer. Various spare and checking terminals are also provided. A suitable read out device, oscilloscope 33, for example, is used to interpret the computer answer or for other uses—for example, the indication of numerical instructions and digital information contained within a particular integrator. As a means of furthering the utility of this highly compact machine, the entire unit is conveniently mounted on rollers 34.

Thus has been described the entire assembly comprising a preferred form of the invention—a digital differential analyzer which has 44 integrators numbered octally from 24 through 77 for logical reasons to be discussed later. The specification will next elaborate upon and explain the operation of each of the essential components of the computer.

Figure 5:
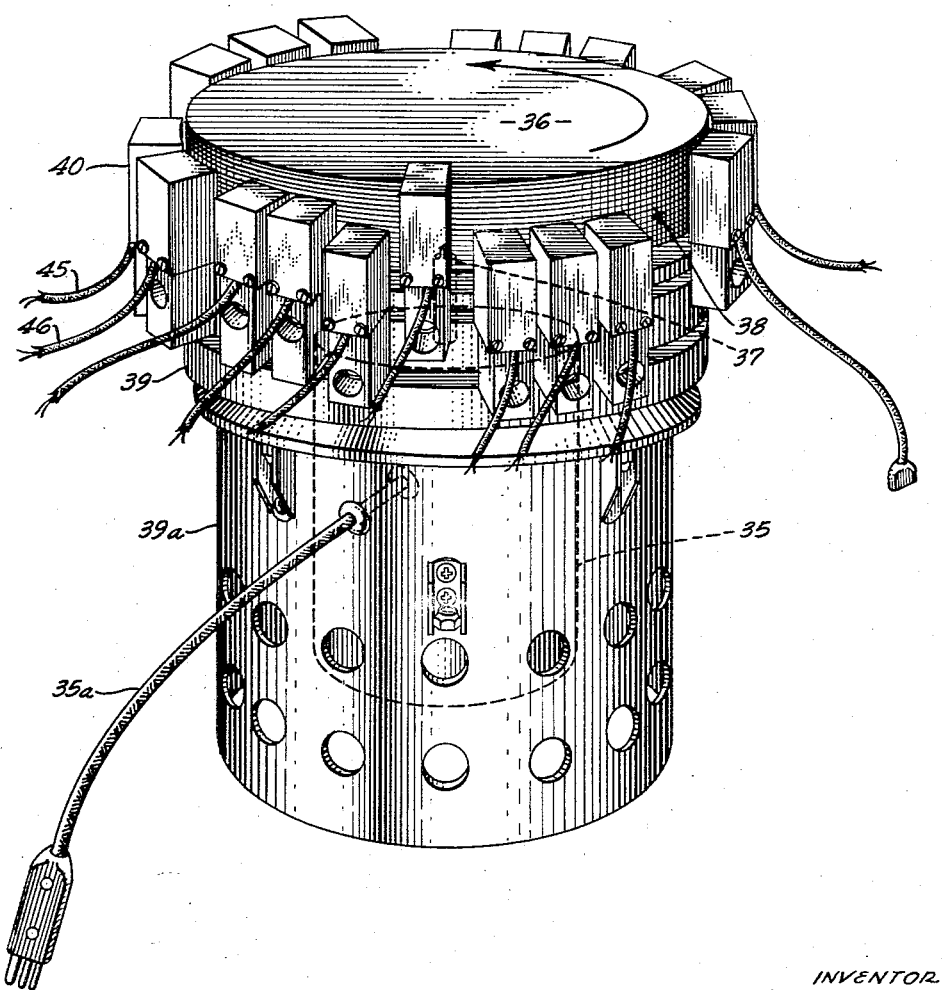
Figure 5 is a perspective drawing of a magnetic drum memory used in the invention.

Figure 5 represents a perspective-schematic diagram of the magnetic wheel which functions as a dynamic memory. In the present embodiment of the invention, the wheel 36 is a self-contained unit, including a 3600 R. P. M. synchronous motor 35. The said synchronous motor 35 effects rotation of drum wheel 36 through a drive shaft 37, at substantially, although not necessarily, a constant speed. The wheel 36 has a coating of suspension 38 painted around its outer periphery; such a suspension may consist of iron oxide powder in a shellac vehicle.

On the wall of housing 39, magnetic heads 40 are rigidly mounted. Owing to variations among magnetic heads 40, the ideal spacing between a magnetic head 40 and suspension 38 varies from .0005 inch to .001 inch. As shown in Figure 6, a typical magnetic head consists of a head core 41, a head coil 42, a single head core support 43, and a single lower block 44 and leads 45 and 46; magnetic heads can serve to read, erase, or record information.

Figure 10:
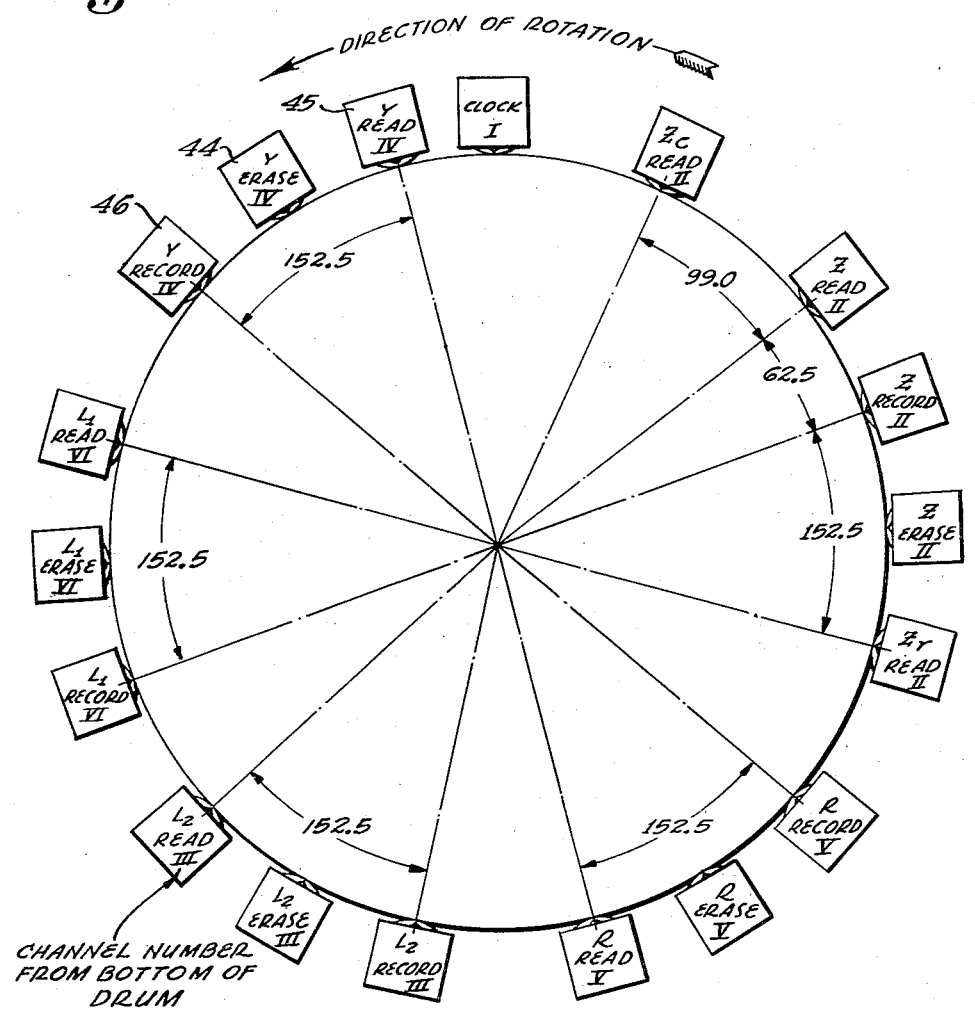
Figure 10 is a plan view of the magnetic drum, illustrating magnetic head spacing in terms of number of clock pulses.

Although the coating 38 is sprayed uniformly over the annular surface of the wheel 36, the coating may be considered as being divided into 6 channels. These channels are somewhat schematically shown in Figure 20 and are designated as the C, Y, R, $L_1$, $L_2$ and Z channels. Each channel is sufficiently separated axially from the adjacent channels so as to be substantially magnetically independent of the other channels. In this way, the magnetic signals provided in one channel cannot directly affect the magnetic signals provided in the other channels. A plurality of magnetic heads are associated with the different channels. The relative annular disposition of these heads on the periphery of the wheel 36 is illustrated in Figure 10. The function performed by each head is also designated in Figure 10.

Leads 35a shown protruding from drum housing 39a supply necessary energy to motor 35 which rotates wheel 36 in a counter-clockwise direction as viewed from the top surface. Leads 45 and 46 from the pick-up heads serve to convey information to various circuit components, comprising a computer unit. For example, a read head interprets information on the magnetic drum and conveys interpreted information to a memory flip-flop which is triggered through an amplifier.

Visualize coating 38 on the wheel 36 as being comprised of adjacent magnetic fields which are recorded onto said coating 38. Figure 7 represents an exaggerated plan view of drum surface 36 and magnetized coating 38 in which adjacent magnetic fields, are represented by current loop lines "*f*." As the wheel rotates in the direction indicated, magnetic head "*h*" cuts lines of magnetic flux and consequently voltage pulses "*k*" are induced, said voltage pulses being conveyed to suitable amplifiers via leads "*l*."

The operation of the erase head which deletes obsolete magnetic information from the drum is such as to subject the periphery of coating 38 to a strong, constant magnetic field which consequently aligns the surface into one direction of magnetization. (See Figure 7 between points 48 and 49).

On the other hand, information to be recorded is conveyed to the record head F (Figure 9) according to orders from a decision network which serves to control the plate current of an electron tube amplifier so as to produce either a net effect of no magnetization or a magnetic field of polarity opposite to that of the erase head D and consequently place information on the drum.

Since binary addition or subtraction can be performed one column at a time, it is therefore not necessary to have entire registers present in the electronic circuit of the computer at any one time. In fact, registers of integrators are nothing more than spaces on the magnetic drum. Numbers from these registers are read off one column at a time into appropriate adding and filling circuits and the altered numbers are recorded on the drum without delay. The integrators are serviced serially in this manner, all 44 integrators being serviced in each revolution of the drum. Actually, however, they are serviced at a somewhat higher rate than the rate at which the drum turns because they are not replaced on the drum in the same spot from which they are removed.

As previously stated, there are six channels used on the memory drum. One of these is a permanently recorded clock channel which keeps the machine in synchronization. Consequently variations in line frequency do not cause the computer to slip out of synchronization. Two channels hold the Y and R information; these two channels correspond to the two registers discussed in Figure 2. Two more channels which we refer to as $L_1$ and $L_2$ contain hook-up information and specify what problem is being solved. A sixth channel referred to as the Z line is used for intercommunication between integrators and transmits information in accordance with data contained in the L channels.

Initially, all information is placed in the memory by means of a binary typewriter on the computer's control panel. Suitable circuitry allows the information to be typed in as slow or fast as the operator wishes and his filling can be viewed on an oscilloscope as it enters the memory.

It is to be emphasized that, although each of the 44 integrators occupy a certain memory arc upon the wheel 36, this location of the integrator memory arcs is of a dynamic nature. For example, the information on each point of the integrator arc, as it comes up to pick up heads B is transferred to a new point on the wheel ahead of its previous position by a certain distance (a given number of clock pulses) equal to the non-working arc.

The circumferential channel occupying the first position (counting from the bottom toward the top) on the drum is denoted the clock channel. Upon this channel, a magnetic pattern of alternate adjacent polarities is impressed as shown in Figure 7 (between points 47 and 48) which, when viewed on an oscilloscope screen yields what is essentially a sine wave as shown in Figure 8. The sine wave is substantially uniform representing differentiated pulses from magnetic information on the drum, and, for the present embodiment of the wheel, has 1560 cycles magnetically impressed around the wheel circumference in a closed loop. The clock pick-up head 40 has clock pulses continuously generated therein, at about 100 kc., all the while wheel 36 is running. These clock pulses are fed on leads as 45 and 46 (Figure 6) to the computer unit to synchronize the operations performed therein. It should be noted that clock pick-up head 40 can be located anywhere along the circumferential clock channel, and that the clock channel is permanently recorded on magnetic coating 38 and is never erased.

However, the positioning of the remainder of the pick-up heads is dependent upon the logic of the machine. Note that a spacing of 152.5 pulses is maintained between the read and record heads in the Y, R, Z, $L_1$, and $L_2$ channels, as shown in Figure 10. The reason for this spacing is that each integrator in the computer is 32 pulse positions long. Since there are 44 integrators, the total number of pulse positions is 1408. But subtracting the total spacing (152.5 pulses) of the read and record heads for each channel from the total number of pulses on the drum (1560) yields 1407.5 pulses. This half pulse difference is accounted for by reference to Figure 9 in which information from coating 38 is detected by differentiated pulses $k_0$ from read head B, sent through lead 44a to read amplifier A, and thence the amplified pulses $k_1$ actuate memory flip-flop M which after half pulse delay triggers a recirculation flip-flop $R_n$, the half pulse delay network $N_k$ acting as a precaution to insure triggering of said recirculation flip-flop $R_n$ by the memory flip-flop M. After triggering, recirculation flip-flop $R_n$ sends electrical pulses to a record amplifier E which conveys the voltages to be recorded to the magnetic record head F via leads $l'$. Meanwhile, the erase head is continually erasing old information on coating 38.

Figure 10 is an approximate plan view of wheel 36, showing how the magnetic heads are arranged. The spacing of the Z record, Z read, and $Z_c$ read heads differs from the other head spacings owing to the precession of the Z line and will be discussed in the section of this specification dealing with the Z line.

A more detailed description of the R and Y channels, 50 and 51 respectively, located on the memory track on the periphery of wheel 36 can now be best described by referring to Figures 11 and 12. Figure 11 is a table defining the word structure appearing in the Y and R channels; Figure 12 shows the layout of a single integrator memory set up, so far as the Y and R channels are concerned.

Of the 32 pulses positions occupied by an integrator, each clock pulse time represents a spot on the wheel periphery on which a unit of information may be placed. This unit of information is binary in nature being either a pulse or no pulse (one or zero). With reference to Figure 11, it can be seen that the word structure of the R channel is divided in the main into a "zero" or blank pulse in $P_1$ owing to the fact that there is no number to overflow into this pulse position from the Y channel, and an R number section including pulse time intervals $P_2$ through $P_{31}$, and sign reversal information at $P_{32}$. In the Y channel, $P_1$ is the first possible position of the "start pulse." This start pulse is used for triggering a start flip-flop "S" (shown in Figure 56) representing a proposition in the computer which controls, in essence, the scale factor of the integrator. It should be noted that the start pulse can be positioned in any of the later pulse positions ($P_2$, $P_3$, etc. up to $P_{30}$) in which case, all the lower pulse positions are necessarily blank down to and including $P_1$. Thus the Y number magnitude fills in between $P_2$ and $P_{30}$. The Y number sign is located at $P_{31}$. $P_{32}$ is always blank or "zero" owing to the logic of the machine (i. e., a one in this pulse time position would interfere with proper carry action).

Returning to the term "start" pulse again, it is important to note that this said pulse serves to define the location of the least significant digit of the Y number, this digit being situated in the next higher numbered pulse position from that of the start pulse.

It should also be pointed out that the maximum capacity of an integrator is 29 binary stages, $P_{30}$ corresponding to $2^{-1}$ stage and $P_2$ to $2^{-29}$ stage. Furthermore, note that although there are but 29 digit positions in the Y channel, the R channel has 30 digit positions; the reason for this difference is, of course, that no one of the stages in the R channel is reserved for sign as is the case in the Y channel.

In Figure 12 is presented a graphical representation of the pulse-time positions in the Y and R channels. Pulse time $P_{31}$ in the Y channel serves to indicate whether Y is positive or negative. If Y is positive, a one will appear in this space. Y then appears as a binary number starting in the second space from the left and extending as many digits as desired. The termination of Y is marked with an additional "one" or "start" pulse which is annexed to the right of the Y number. Thus a register is permitted to operate to any desired number of significant digits up to its capacity of 29 binary digits.

For example, first assume Y is zero. The only thing present in the Y register will then be a "one" in the sign position. The first time Y is added into R this "one" will appear in the $P_{31}$ pulse time position of the R channel register. The second transfer that is made will clear R and cause it to overflow. Thus with Y equal to zero, the integrator will put out alternate ones and zeros as one would expect in this system.

As Y increases positively, the R register will occasionally overflow twice in a row; when Y gets to a maximum, the R register will overflow every time. When Y goes negative a zero appears in the sign position and the value of Y appears as a binary complement. As Y approaches a maximum in the negative direction, the Y register approaches a condition of all zeros, the result being that the R register never overflows, and the integrator puts out steady zeros.

The $dx$ input causes Y to add into R according to the foregoing process, if the input signal is one; however, if the input signal is zero (no pulse), the effect of the $dx$ signal is such as to subtract Y from R.

The sign reversal pulse at pulse time $P_{32}$ in the R channel is provided for sign reversal of an integrator's output. When this space is filled, the output of an integrator is complemented.

The scheme employed is the present invention for recording information on wheel 36 is based upon the principle that a constantly flowing recording current only changes its direction in the case of a change in the stream of binary digits to be recorded.

Referring to Figure 13a, here a 12 stage binary stream, consisting of all ones is shown. Since $P_{31}$ is zero, the Y sign is negative. The recording current is positive and continuous for the entire 10 stage duration. Consequently the magnetic material 38 on the wheel 36 is uniformly magnetized, yielding a pattern similar to that bounded by heavy line 67.

A pick-up head scanning the rotating wheel 36 would effect trigger pulses such as 68 and 69 (Figure 13b) as a means of operating associated circuitry.

A description of the other 3 channels, namely, the $L_1$ and $L_2$ address channels and the precessing Z line will be given later in the specification.

In general, however, the $dy$ inputs for an integrator are picked up by two counters known as the $\Sigma\ dy$ counters. These counters watch the two address channels $L_1$ and $L_2$. The $dy$ address of a given integrator consists of the information as to what must be picked up and added to form the $dy$ input for that integrator. This $dy$ address is placed in the form of zero to seven pulses in the L channel and this entire address is offset one integrator space so that it comes through the recirculation circuits just ahead of the integrator to which it applies.

The complexity of the Z line of the computer arises from the fact that there are 44 integrators and any number up to 12 external inputs to be recorded on it. Briefly, the Z precession line can be thought of as a memory through which all the $dz$ pulses are serially advanced one pulse length each time a clock pulse occurs.

The circuitry associated with the clock pick-up head will now be discussed with reference to Figure 14. Consider first the pick-up head 52 having a split core 53 wound by coil 54. As mentioned previously, the permanent magnetic recording on the clock channel is substantially a sine wave, as $w$. It is this wave $w$ which is applied to the grid of an amplifying electron tube 55. As is apparent in the diagram, the plate output of electron tube 55 is coupled to the grid of another electron tube 56 which, in turn, has its plate coupled through parallel capacitor 57 and resistor 58 to the grid of still another electron tube 59, thus comprising a Schmidt triggering circuit. The cathodes of both of these latter tubes are connected to a −100 volt supply through a common resistor 60. The grid of electron tube 56 is held at a relatively high positive potential by voltage divider 61 so that tube 56 is normally conducting. Consequently the low plate voltage of electron tube 56, impressed on the grid of electron tube 59, prevents this latter tube from normally conducting. Application of the output waveform $w_1$ from amplifier 55 onto the grid of electron tube 56 results in the positive portion of said wave $w_1$ having no appreciable effect on the Schmidt circuit; however, the negative portion of this applied wave tends to cut off electron tube 56. As a result of this action, the plate voltage of tube 56 is increased and this increased plate voltage is next applied to the grid of electron tube 59. Decreased current flow through common resistor 60 lessens the cathode potential of said tube 59. Consequently, as a result of these two effects, tube 59 is suddenly started conducting, said conduction causing a rapid decrease in the plate output voltage of tube 59. In a similar manner, conduction of electron tube 59 is suddenly cut off when the input waveform to the grid of electron tube 56 becomes positive. Thus is obtained a periodic square wave $w_2$ which is conveyed to the grid of a normally conductive tube 62 in a cathode follower stage. The introduction of the negative pulse to the grid of the tube 62 causes the tube to become non-conductive and a negative pulse to be produced on the cathode of the tube. This negative pulse is introduced to the grids of a pair of normally conductive tubes 63 in each of a pair of driver stages. Upon the introduction of the negative pulse to their grids, the tubes 63 become cut off and produce positive pulses on their plates. Two parallel driver stages each having two tubes in parallel are employed because of the large amount of power required from the driver stages to control the operation of a considerable number of circuits, all of which will be described in detail hereinafter.

The positive pulse of voltage on the plates of the tubes 63 is introduced to the cathodes of parallel diodes 65 which have their plates maintained at potential of 0 volts. The positive pulse of voltage on the plates of the tubes 64 is also introduced to the plates of parallel diodes 66 having their cathodes maintained at a potential of 30 volts. The diodes 65 prevent the voltage pulse from the tubes 63 from ever falling below a potential of 0 volts by causing current to flow through the diodes when the potential on the cathodes of the diodes falls below 0 volts. When the potential of the voltage from the tubes 63 rises above 30 volts, current flows through the diodes 66 to maintain the plates of the diodes at substantially 30 volts. In this way, the voltage pulses from the plates of the tubes 63 are clamped between 0 and 30 volts.

Figure 15 illustrates the schematic convention used for representing germanium diodes throughout the entire specification. In accordance with this representation convention, the clock output line 64 is clamped between 0 volts and +30 volts by upper parallel clamping diodes 65 and lower parallel clamping diodes 66, respectively. The parallel units of this circuit enable a large current source to be provided for driving the clock propositions required in the logical nets.

*Typical playback amplifier*

Since the pick-up head and playback amplifier circuitry for the Y channel, the R channel, and the Z channel are identical, only the Y channel circuitry will be described in detail, with reference to the schematic diagram comprising Figure 16. The components shown in Figure 16 perform functions similar to those performed by the read head B and the amplifier A shown in Figure 9.

The Y pick-up head 70 is in the form of a split core 71 wound with a coil 72. As the head 70 passes the substantially square magnetized pattern M' on the Y channel 51 (Figure 12), said pattern is differentiated so that positive pulses $y+$ are generated on the leading edges of magnetic pattern M', and negative pulses $y-$ are generated on the trailing edges of the magnetic pattern M'. These positive and negative pulses are conveyed on pick-up line 73, through limiting resistor 74 and thence to the grid of tube 75 which comprises amplifier 76. The amplified reversed polarity pulses are then coupled into 2nd stage amplifier 77 composed of tube 78 which feeds low impedance pulses of corresponding polarity from its cathode to a phase inverter and amplifier circuit 79. Circuit 79 is composed of triodes 80 and 81, respectively, having their cathodes joined and returned to a −290 volt potential via a bias resistor 82. Triodes 80 and 81 are normally both conducting a small amount.

The effect of a positive pulse on the grid of triode 80 is conduction. As a result of the conduction of tube 80 the momentary potential drop on the plate of the said triode causes a negative polarity pulse to be emitted on the first plate output line 83. Simultaneously, the potential drop through resistor 82 is increased. Consequently, the potential of the cathode of triode 81 is momentarily raised, and the current flow therethrough decreased; thus a positive pulse is emitted on the second plate output line 84.

A negative input pulse to the phase inverter and amplifier circuit 79 produces an opposite effect on the output lines. Specifically, a negative pulse is generated on second plate output line 84 and a positive pulse on the first plate output line 83. It should be noted that it is the positive pulses on the plate output lines which correspond to the desired signals.

The pulses on these latter two output lines 83 and 84 are fed into a clipper circuit 85 made up of upper and lower triodes 86 and 87, respectively. The grids of these triodes are biased by resistor $R_c$ returned to −138.5 volt source, such that the negative pulses fed thereon are clipped but the positive pulses effectively cause the triodes to conduct. As a result signals appear as narrow negative square pulses on upper output line 88 and lower output line 89, respectively. These latter output lines are clamped by separate diodes, such as diodes 90 and 91 for upper output line 88, and diodes 92 and 93 for lower output line 89, to a 0 volt and a 30 volt source, respectively. Hence the swing of the voltage of these output lines are maintained between these limits. Upper output line 88 is coupled through a first differentiating circuit $\delta_1$ to the left grid of the $Y_m$ flop-flop. The lower output line 89 is coupled through a second differentiating circuit $\delta_2$ to the right grid of the $Y_m$ flip-flop.

Flip-flop $Y_m$ is a standard bistable circuit having the opposite grids and plates of the two triodes comprising it, intercoupled by a resistor and a capacitor in parallel. The circuit is further characterized by its ability to be triggered by negative pulses applied at either of its grids. Diodes 94 and 95 conveying energy to the right and left grids of flip-flop $Y_m$, respectively, essentially attenuate the positive portion of the differentiated input wave fed therein and permit only the negative portion to trigger the $Y_m$ flip-flop circuit.

The output lines 96 and 97 from the $Y_m$ flip-flop are taken from the right and left plates, respectively. In order to maintain the swing of the plate voltage between 0 and +30 volts, clamping diodes, as previously described, connect the right and left output lines 96 and 97, respectively, to the 0 volt and +30 volt source.

Record circuits

Having described the Y channel pick-up circuit which transfers the magnetic pattern M' on the magnetic wheel into a true or false proposition indicated by a state of the $Y_m$ flip-flop, it should be noted that the potentials on the $Y_m$ flip-flop follow exactly the magnetic pattern impressed on the wheel memory track. Similarly, the R and Z channel circuits transfer the magnetic pattern on the respective channels of the wheel into a true or false proposition indicated by the state of the $R_m$ and $Z_m$ flip-flops.

The record circuitry for recording the $Y_0$, $R_0$, $Z_0$, $L_{10}$ and $L_{20}$ information (pulses) from the logical nets back onto the wheel 36 will next be described with reference to Figure 17. Since these five record paths denoted $Y_0$, $R_0$, $Z_0$, $L_{10}$ and $L_{20}$ (Figure 20), respectively are all identical only the $Z_0$ path will be described in detail. The circuit for the $Z_0$ path is shown schematically in Figure 17. The circuit shown in Figure 17 performs functions similar to those performed by record head F and the recording amplifier E shown in Figure 9.

Any time a $Z_0$ unit pulse is received, it is applied through a voltage divider 98 onto the control grid 99 of a record pentode 100. The said control grid 99 is normally held at cutoff (−16 volts) by a grid resistor 101 connected to −290 volts. The $Z_0$ unit pulse is of about +30 volt amplitude and consequently effects the raising of the control grid potential to about −2 volts, and never more than zero volts owing to clamping diode 102 which limits the control grid potential. When at this limiting potential, the pentode 100 conducts. The resulting current passes through limiting resistor 103 and energizes the coil 104 of record head 105 so as to produce the magnetizing pattern M' on the desired pulse position of the memory wheel 36. Thus the plate output of pentode 100 is used to energize the record head coil 104 each time a $Z_0$ pulse is routed through voltage divider 98. Condenser 106 serves as a peaking device, increasing the rise time of the $Z_0$ voltage pulses which ordinarily would have considerable lag owing to shunting capacities within $Z_0$ line 107; thus said condenser 106 improves circuit response for recording on the rotating magnetic wheel 36. Grid limiting resistor 108 further serves to restrict the maximum voltage applied to control grid 99.

Logical design of digital computers

Terminology and conventions used will be discussed before continuing with a description of a preferred form of the invention.

Design of this machine was accomplished by application of the principles of symbolic logic. In brief, symbolic logic is a concise organized means for determining the best decision to make. The operations of symbolic logic can only show that, given certain premises, certain conclusions are valid and others are invalid.

The algebra of symbolic logic, often referred to as Boolean algebra, includes two basic operations—addition and multiplication. The two basic operations of Boolean algebra differ from the two corresponding operations of ordinary algebra. The rules followed by the two basic operations of Boolean algebra on a proposition $a$ are:

(1) for addition:

| | |
|---|---|
| $a+a=a$ | idempotent |
| $a+b=b+a$ | commutative |
| $a+(b+c)=(a+b)+c$ | associative |
| $a+bc=(a+b)(a+c)$ | distributive |

(2) for multiplication:

| | |
|---|---|
| $aa=a$ | idempotent |
| $ab=ba$ | commutative |
| $a(bc)=(ab)c$ | associative |
| $a(b+c)=ab+ac$ | distributive |

A proposition $a$ is bounded by universal bounds or elements 0 or 1, in this case, which correspond to "false" or "true," respectively. These elements have the following properties:

| | |
|---|---|
| $0 \cdot a=0$ | intersection |
| $0+a=a$ | union |
| $1 \cdot a=a$ | intersection |
| $1+a=1$ | union |

Negation is indicated by a prime sign. For example, negated $a$ is read "not $a$." In other words, a negation prime reverses the quantity under it.

| | |
|---|---|
| $aa'=0 \quad a+a'=1$ | complementation |
| $(ab)'=a'+b'$ | dualization |
| $(a+b)'=a'b'$ | |
| $(a')'=a$ | involution |

The general logical method of circuit design utilized in the present invention is based upon the correspondence between propositions and methods of symbolic logic, and the two valued nature of electrical quantities in impulse work.

Logical representation of a proposition may be made using the symbol 1 for a true proposition or a relatively high electrical voltage and 0 for a false proposition or a relatively low voltage. For example, addition may be defined logically by the following table:

| | | |
|---|---|---|
| $1+1=1$ | or in terms | $H+H=H$ |
| $1+0=1$ | of high and | $H+L=H$ |
| $0+1=1$ | low voltages | $L+H=H$ |
| $0+0=0$ | | $L+L=L$ |

A proof of the second distributive law by complete induction, will serve to illustrate the use of a "truth table" which is merely an organized list of the elements which satisfy a logical equation.

Suppose it is desired to prove the second distributive law $a+bc=(a+b)(a+c)$ by complete induction

| a | b | c | substitution into equation |
|---|---|---|---|
| 0 | 0 | 0 | 0=0 |
| 0 | 0 | 1 | 0+0=0·1 or 0=0 |
| 0 | 1 | 0 | 0+0=1·0 or 0=0 |
| 0 | 1 | 1 | 0+1=1·1 or 1=1 |
| 1 | 0 | 0 | 1+0=1·1 or 1=1 |
| 1 | 0 | 1 | 1+0=1·1 or 1=1 |
| 1 | 1 | 0 | 1+0=1·1 or 1=1 |
| 1 | 1 | 1 | 1+1=1·1 or 1=1 |

Since the equation is valid for all possible values of $a$, $b$, $c$, the identity is therefore established.

The application of the foregoing symbolic logic principles toward the design of an electronic computer circuit resulted in the logical equations of the invention. The evolution of logical equations may be better understood with reference to the following electronic computer design outline:

(1) Draw a "black box" with necessary inputs and outputs noted.

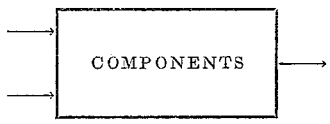

(2) Prepare a truth table based upon the desired input—output relations.

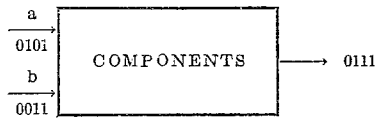

The block diagram above defines what output 0111 is desired for various combinations of inputs 0101 and 0011.

(3) Translate into logical equations, cancel out and condense terms.

(a) Make up a truth table

| a | b | x |
|---|---|---|
| 0 | 0 | 0 |
| 1 | 0 | 1 |
| 0 | 1 | 1 |
| 1 | 1 | 1 |

(b) Note that $x$ is one when $a$ is one and $b$ is zero or when $a$ is zero and $b$ is one or when $a$ is one and $b$ is one.

(c) This statement can be condensed into symbolic logic notation to read $$x=ab'+a'b+ab$$

the multiplication standing for "and" and the addition standing for "or."

Thus $x=ab'+a'b+ab$ is the equation of an electronic circuit which will effect the desired values of $x$.

(d) Simplifying:

$x=ab'+a'b+ab$
$=a(b'+b)+a'b$
$=a+a'b$
$=(a+a')(a+b)$
$=a+b$

Since $x=a+b$ involves fewer circuit elements, namely germanium diodes, it is considered the most desirable circuit.

(4) Draw the circuit diagram directly from the simplified equation.

The task of fulfilling the latter requirement involves the ingenious use of one or a combination of two basic circuits (to be discussed later) in such a manner as to accomplish the desired logical operation.

*Basic logical circuits*

Referring first to the circuit in Figure 18, a means for obtaining the symbolic sum $(a+b)$ is shown. Positive polarities corresponding to these terms are conveyed into crystal diodes 112 and 113, respectively. The cathodes of these diodes are joined to common line 115. Line 115 is then connected to ground through resistor 116. The extension of common line 115 represents the output and the voltage thereon is relatively low, i. e., substantially at ground only when both inputs $a$ and $b$ are both relatively low in potential. When either or both of the inputs $a$ and $b$ are relatively high in potential, output line 115 is relatively high owing to the diode current flowing through resistor 116. It is this relatively high potential on output line 115 which represents the symbolic sum. In the present invention the high and low potentials applied on inputs $a$ and $b$ are the 30 volt and 0 volt output level of the flip-flops. Thus a method has been provided for symbolically adding two terms; additional terms can be added by feeding the voltage representing each of these other terms to the common line 115 through separate diodes. This circuit is called an "inclusive or" type gate.

In the circuit shown in Figure 19, the symbolic product $(c \cdot d)$ is formed by multiplication of the terms $c$ and $d$ conveyed on separate lines through crystal diodes 117 and 118. The plate leads of diodes 117 and 118 are connected to lead 119. Lead 119 is connected through a load resistor 120 to a high potential source B+. Lead 119 is at a relatively high potential only when both inputs $c$ and $d$ are of relatively high potential. If either one of the inputs is of relatively low potential, lead 119 is relatively low in potential as a result of diode current flowing through load resistor 120. This output voltage corresponds to a logical product of the two inputs $c$ and $d$ as previously defined. This circuit can be extended to multiply any number of terms by conveying all the voltages representing these terms through individual diodes to lead 119. In order for lead 119 to have a relatively high potential thereon, all these inputs must be relatively high in potential. This circuit is called an "and" type gate.

Thus circuitry has been provided for producing symbolic addition and symbolic multiplication.

*Circuit conventions*

Propositions are represented in the present invention by flip-flops. When a given proposition is "true," the flip-flop is in one of its states, when "false" the flip-flop is in the other state.

In accordance with the present invention, it is desired to have both the "true" and the "false" states of the proposition flip-flop sensed as a relatively high voltage. Hence output lines are connected to each of the two respective plates of each of the flip-flops. Likewise, it is desirable to be able to trigger a proposition flip-flop to either its true state or to its false state by separate input lines; hence an input line is connected to each of its grids.

The flip-flops used in the present invention are all of a basic design as described in detail for the $Y_m$ flip-flop (Figure 16) and they include two outputs and two inputs.

A standard convention is employed throughout this specification for designating the proposition flip-flops and their outputs and inputs.

Combinations of capital letters and number subscripts or lower case letter subscripts are used for designating the proposition flip-flops themselves. The outputs of the flip-flops are characterized by corresponding capital letters with an appropriate subscript. Since one of the outputs corresponds to the proposition being true and the other corresponds to the proposition being false, the latter is distinguished from the former by an affixed "prime," just as "primes" were used in the discussion of symbolic logic as a representation for negated terms. It is important to note that a true state of a flip-flop $A_1$, for example, is denoted by the symbol $A_1$, the designation of the flip-flop; furthermore a false state of a flip-flop of a flip-flop $A_1$, for example, is denoted by the symbol $A_1'$.

On the other hand, the inputs to a flip-flop are designated by corresponding lower case letters with an appropriate subscript, the input for rendering a flip-flop false being further characterized by a subscript zero preceding the lower case letter.

Thus it can be seen that conventional notation and circuit means have been provided whereby propositions can be represented and information stored as to whether a proposition be true or false. Furthermore, circuit means have been provided for enabling the propositions to be changed from one state to the other in accordance with which input line a negative potential is fed into the flip-flop.

Each of the input leads to a proposition flip-flop can be represented by a logical algebra equation. This equation is made up of flip-flop propositions (either true or false) which logically govern this input. The equation for the inputs to the proposition flip-flops are thus a key to how the outputs of the flip-flops are interconnected to the inputs.

Equations are physically solved by the use of logical nets, derived from the basic circuits of Figures 18 and 19. Since the various terms, which represent true or false states of the governing proposition, are related either by logical multiplication or logical addition operations, the solution is represented by a relatively high voltage level on a single wire. Thus by connecting this wire to the right input of a flip-flop, the validity of the proposition is automatically determined by the state of this flip-flop.

It it to be noted that choice of optimum design of a logical circuit combining the basic "or" circuit and basic "and" circuit as illustrated in Figures 18 and 19, respectively, is governed by various economic and electronic factors of feasibility. For example, for economic reasons, the circuit containing the least number of diodes required to effect the desired results is preferred. Unfortunately, however, such a circuit is not always electronically feasible. Careful consideration must be given to choice of resistor values 116 and 117 in order to insure that the circuit will operate properly.

Furthermore, "or" gate circuits are sometimes built up from two separate "and" gate circuits as the example contained later (Figure 37) indicates. A number of "and" gate circuits can be used to comprise an "or" proposition input to a flip-flop.

*Block diagram of the preferred embodiment*

In order to gain some understanding of the operation of the invention shown in Figure 4, it is useful to organize the machine into its basic components, and, furthermore, to consider how these basic components operate in relation to one another in accomplishing a desired result—numerical integration.

A convenient method of organizing a complex device into its basic components is by use of a block diagram; consequently a magnetic drum digital differential analyzer is presented in block diagram form in Figure 20.

Just as our own memory is of utmost importance to us, so is the memory of a digital differential analyzer of great importance to the device. In Figure 20, memory block 121 represents a magnetic drum memory upon which six information channels are recorded. These six information channels represent the very "heart" of computer operation; all other components in the computer merely serve to maintain numerical operations taking place in the form of magnetization alterations on the magnetic surface of the drum wheel. Thus six information channels, designated Z, $L_2$, $L_1$, R, Y and C are cooperating in order to achieve the fundamental computer task, i. e., a $dx$ rate and a $dy$ rate effecting a corresponding $dz$ rate.

It is by means of these channels that new digital information is recorded in order to replace old digital information which is erased. This digital information is either a number or an order. For example, the Z channel contains respective numbers (ones or zeroes) which represent the outputs of the R registers of the respective integrators. Each binary digit appearing as a magnetization state on the Z channel represents the most significant digit in the R register of a particular integrator. By means of the Z channel, the outputs of all the integrators as well as external inputs J are recorded and recirculated. Thus the Z channel contains *number* information.

Proper sensing or "pick-up" of number information contained on the Z channel is controlled by address channels $L_1$ and $L_2$. Thus these two channels contain *"order"* or *"command"* information.

The R and Y numbers undergo computational alteration in the R channel and in the Y channel, respectively. Thus these two channels contain number information.

The designation $Z_0$, $L_{20}$, $L_{10}$, $R_0$, and $Y_0$ on memory block 121 represent information that is re-recorded on the drum from the Z, $L_2$, $L_1$, R and Y channels, respectively.

Clock channel C contains synchronization information—1560 equally-spaced magnetization states. Associated with clock channel C is a P or "pulse-position" counter 122 which is triggered by clock pulses into any one of 32 possible consecutive configurations. The carry from P counter 122 triggers K or integrator counter 138 which can attain any one of 44 possible consecutive configurations. Thus every complete cycle of P counter 122 defines a new integrator interval $I_i$. So means is provided for locating unit memory positions on the drum wheel.

Consider first the method by means of which the Y number undergoes computational alteration from its initial value. Essentially, an integrator length of the Y channel is acting as a register, accumulating a variable Y. This variable Y is the instantaneous sum of pulses received at a rate $dy/dt$. As previously illustrated in Figure 3, the $y$ ordinate of the function has an opportunity to change its value as each $dx$ increment is traversed. Consequently during the integration process, the entire number Y is being repeatedly added into the R register of an integrator at a rate $dx/dt$. Because neither the Y register nor the R register is cleared or reset in the process, the R register periodically overflows (output from $R \pm Y$ adder 123) at a rate $dz/dt$. Thus a digital reproduction of the integral is reproduced by the computer.

A number appears in the Y channel of a particular integrator as a train of magnetization states corresponding to a binary number, starting in the second pulse position from the left and extending as many digits as desired (up to twenty-nine). The purpose of the first pulse position on the left in a Y register is to indicate whether Y is positive or negative. If Y is positive, a one will appear in this first pulse position; if Y is negative, a zero will appear in this first pulse position.

In the case of a negative Y, the Y number appears as a complement, that is to say with ones replacing zeroes etc. The termination of Y is marked with an additional one or start pulse which is annexed to the right of the Y number and which serves to trigger on start flip-flop 136. Thus means is provided for a register to operate on any desired number of significant digits (up to twenty-nine).

Pulse position $P_{32}$ in the R channel of an integrator is used for indicating sign reversal of an integrator's output. When this pulse position contains a one, the output from the integrator is complemented.

Figure 20 is an attempt to explain the particular "system of thought" by which the computer unit of the present invention performs integration.

The operation of the machine is actually carried on in a parallel manner in that during each operation time (clock interval time) the following occurs:

(a) Information from a given pulse position of the R, Y, and Z channels is fed into the computer unit from drum wheel 36 which corresponds to memory block 121.

(b) This input information along with the existing states of the computer flip-flops determines the information to be recorded in corresponding pulse positions of the R, Y and Z channels of the wheel.

(c) The flip-flops, interconnected by logical nets, are caused to change their states in accordance with the inputs and the previous states of the flip-flops. This process begins as a clock pulse C changes from a one state to a zero state, an action which also brings new information out of the memory.

Memory 121 is the "hub" of the computer, so to speak, from which information is sent out and eventually returned again. The construction of memory means 121 is fully disclosed above and shown in Figures 5 to 10, inclusive. A similar memory means is also fully shown and disclosed in co-pending application Ser. No. 217,478, filed March 26, 1951, by Glenn E. Hagen et al. Y channel information is conveyed through four different routes. One of these routes leads to start flip-flop 136 which is switched on after the start pulse occurs in the Y channel of an integrator and goes off again after $P_{31}$ pulse time as counted by "P" counter 122. In order to recopy the start pulse, Y channel information is recorded directly back into memory 121 while start flip-flop 136 is off.

Another route takes Y after the start pulse into the $R \pm Y$ adder 123 where it is added to or subtracted from R depending upon the condition of $dx$ register 124. After the start pulse, Y also goes into the $Y + \Sigma dy$ adder 125 where Y information is increased or decreased in accordance with the total number (any binary number, between decimal $-8$ and decimal $-7$) of $dy$ inputs conveyed from $dy$ register and stepper 131. Carry flip-flop $D_1$ insures that a correct new Y number is obtained as a result of adding $dy$ inputs to the existing Y number in memory 121. This new Y number is then recorded back onto Y channel (represented by $Y_0$ on memory 121).

R channel information is routed into the $R \pm Y$ adder 123 where it is added to or subtracted from R depending upon the condition of $dx$ register 124, (i. e. when $dx$ register 124 is true, Y is added into R, when $dx$ register 124 is false, Y complement is added into R). The resulting number from this addition process is recorded back into the R channel.

The output from $R \pm Y$ adder 123 at pulse time $P_{32}$ as counted by P counter 122 is the output of an integrator and is recorded directly into the Z channel where the latest outputs of all the integrators as well as the empirical inputs (J) are maintained by Z line recirculator 137. R is also recorded while start flip-flop 136 is off in order to recopy the output sign reversal pulse, if any, at $P_{32}$ in the R channel.

Intercommunication of information between integrators is handled by the Z channel working in conjunction the the two address channels $L_1$ and $L_2$.

Essentially, the Z channel arranges and circulates integrator information into two groups; consequently two Z read out lines are shown in Figure 20. The two read-out lines shown in Figure 20 receive signals picked up by the Z (Read II) and $Z_c$ (Read II) heads shown in Figure 10. The Z (Read II) and $Z_c$ (Read II) heads are respectively spaced substantially 63 and 162 pulse positions from the Z (Record II) head shown in Figure 10. Associated with the Z channel are two address channels, $L_1$ and $L_2$ in which are contained the $dx$ and $dy$ addresses for the integrators used. Information from channel $L_1$ is conveyed into $\Sigma dy$ coincidence circuit 126. Also conveyed into $\Sigma dy$ coincidence circuit 126 is information from the Z channel. An identical $\Sigma dy$ coincidence circuit 127 receives information from channel $L_2$ and also from the Z channel.

As previously stated, there are two information arrays in the Z channel; consequently two $\Sigma dy$ counters (128 and 129) are used to work in cooperation with two read heads and various delay flip-flops, sensing Z channel information. $\Sigma dy$ counter 128 scans the $L_2$ channel for pulse information while sensing a Z channel read head for coincident information; $\Sigma dy$ counter 129 simultaneously scans the $L_1$ channel for pulse information while sensing a Z channel read head for coincident information. Now when either one or possibly both of these $\Sigma dy$ counters 128 and 129 senses an address pulse on its associated L channel, it simultaneously senses whatever information is being read by a corresponding Z head at that particular instant. Of course, the sensed information will be either a one or a zero that has come from an external input or from another integrator. If, at this pulse time position, the Z channel contains a one, the associated $\Sigma dy$ counter will add one to its contents, however, if the Z channel contained a zero at this time, the associated $\Sigma dy$ counter will subtract one from its contents. Both $L_1$ and $L_2$ channels are scanned simultaneously and, in the next instant, the algebraically combined contents of the $\Sigma dy$ counters 128 and 129 are transferred to stepping circuit 131. Thus the $\Sigma dy$ counters are prepared to sense address pulses for the next integrator. Simultaneously, stepping circuit 131 is triggered by the start pulse of the particular integrator so as to add its contents into the Y channel of that integrator. No time is wasted for two necessary operations are occurring simultaneously in the $dy$ address operations namely, providing one integrater with its proper $dy$ input while simultaneously sensing and summing the $dy$ input for the following integrator.

Whenever an address pulse is sensed in the $L_1$ or in the $L_2$ channel, the current condition of a corresponding Z line head is transmitted into one of two $\Sigma dy$ counters (128 or 129). This process occurs from pulse times $P_1$ through $P_{28}$; during the next four pulse times $P_{29}$ through $P_{32}$, the contents of these two counters are conveyed into adder 130. Proper carry action is effected in adder 130 by means of carry flip-flop $D_3$. By virtue of this process, $\Sigma dy$ counters 128 and 129 are cleared to sense the $\Sigma dy$ input for the next address. The total $\Sigma dy$ increment is next conveyed to $\Sigma dy$ register and stepper 131 where this number is held until the start pulse of the next integrator appears at which time this number steps serially into $Y + \Sigma dy$ adder 125. A carry flip-flop $D_1$ is used to obtain proper result. Thus $dy$ increments which are to be added to Y are provided.

The $dx$ address differs from the $dy$ address inasmuch as the $dx$ address for a particular integrator is coded into the second preceding integrator and consists of the binary notation of where the particular input information is found in the $dy$ address section (either $L_1$ channel or $L_2$ channel) of the particular integrator. The reason why $dx$ address information is placed two integrators ahead of the integrator it pertains to is to allow time for it to step into $dx$ counter 135 which counts pulse times so that $dx$ register 124 will sense information from an associated Z channel read head at the proper instant to pick up the $dx$ input for the integrator. (This $dx$ input represents an incremental progression in the integration process and states whether $dy$ is positive or negative.)

During pulse times $P_{29}$ through $P_{32}$, information from the L channels is conveyed into $dx$ selector counter 133; the function of this counter is to sense the binary number address $dx$ listed in the L channels from pulse times $P_{29}$ through $P_{32}$. The $dx$ selector counter 133 during pulse times $P_1$ through $P_{28}$ of the succeeding integrator time $I_1$ then counts downward from the address number it sensed until it reaches binary number one; then the condition of the proper Z head is gated through coincidence circuit 134.

Into $dx$ coincidence circuit 134 is also conveyed an input from a mixer circuit $M_1$ which discriminates from which information grouping on the Z line the proper integrator output is to be found. Selection is dictated by "and" gates $M_2$ and $M_3$ each fed by one of the output lines from $dx$ selector counter 133. Gate $M_3$ passes information when a one is placed into the last digit of the $dx$ address; gate $M_2$ passes information when a zero is placed into the last digit of $dx$ address. Information from $dx$ coincidence 134 is then conveyed to $dx$ counter 135. Resulting information is conveyed into $dx$ register 124, thus clearing $dx$ counter 135 to sense the next $dx$ and simultaneously signaling $R+Y$ adder whether addition or subtraction is to be performed. Thus the computational loop is completed.

Recirculation of address information during computation is maintained for address channels $L_1$ and $L_2$ as the lines to $L_{20}$ and $L_{10}$ indicate.

Thus has been presented an overall presentation of the operation of the computer. The various components of the invention will now be discussed in detail.

Typical diode board

Logical circuits of this invention have been conveniently mounted onto diode boards of the type 21, 22, 23, 24, 25, 26, 27, 28, as shown in Figure 4.

Figure 21 is a perspective sketch of a typical diode board, consisting of phenolic laminate strip 139 mounted on metal supports 140 and having a series of holes drilled into said strip 139 into which are placed clips 141, designed to hold germanium diode 142 as shown in Figure 22.

Figure 23 is a perspective sketch of the opposite face of the strip 139 as shown in Figure 21. By utilization of clip terminals 143, various resistors 144 and accompanying leads 145 forming the circuitry associated with diodes 142 are wired into place.

In order to simplify servicing of the computer, diodes have been identified by means of an ingenious numbering system. The numbers are four-digit, the first digit represents the diode board number (counted from the control panel back toward the magnetic drum); the second digit is the tube or flip-flop number (numbered horizontally across top of diode board from zero to nine); the third digit tells whether diode is left (zero) or right (one) in the two vertical columns associated with the flip-flop. Finally, the fourth digit is the location of the diode measured from top to bottom (0 to 9) in the particular vertical column where the diode is situated. For example, diode number 1010 on a schematic drawing could be found on diode board number one, flip-flop number zero, right vertical column, first or 0 diode on top of this column; diode number 5309 would be found on diode board number five, left vertical column (0) associated with flip-flop number 3 and would be the last or number 9 diode at the bottom of that vertical column.

Thus the logical circuits of the computer, by virtue of their mounting upon these diode boards, have been arranged in an organized and accessible manner.

Logical circuits

Having discussed a typical diode board, the specification now commences a detailed explanation of logical circuits contained on each of these diode boards.

Starting with diode board 28, as shown in Figure 4, note that this board contains the memory flip-flops and the memory input flip-flops. The logical equation of the Y channel memory flip-flop is $$Y_m \quad y_m = M_y^+$$
$$Y_m' \quad _0y_m = M_y^-$$

The equation for $Y_m$ is merely a concise means of saying that a positive pulse input ($M_y^+$ or "one") triggers the $Y_m$ flip-flop to the true state $Y_m$; similarly, the equation for $Y_m'$ means that a negative pulse input ($M_y^-$ or zero) triggers the $Y_m$ flip-flop to the false state ($Y_m'$).

This standard convention is employed throughout the present specification for designating the proposition flip-flops and their outputs and inputs.

Combinations of capital letters and numbers or lower case letters are used for designating the proposition flip-flops themselves. The outputs of the flip-flops are characterized by corresponding capital letters with an appropriate subscript. Since one of the outputs corresponds to the proposition being true and the other corresponds to the proposition being false, the latter is distinguished from the former by an affixed "prime."

On the other hand, inputs to a flip-flop are designated by corresponding lower case letters with an appropriate subscript. The input for rendering a flip-flop false is further characterized by a zero subscript preceding the lower case letter.

Thus it can be seen that conventional notation and circuit means have been provided whereby propositions can be represented and information stored as to whether a proposition be true or false. Furthermore, circuit means have been provided for enabling propositions to be changed from one state to the other in accordance with which input line a negative potential is fed into the flip-flop.

The significance of the logical equation of the Y channel memory flip-flop may be better understood by the following considerations: As the memory wheel 36 rotates, it passes under stationary pick-up heads (Figure 6) associated with the $L_1$, R, Y, $L_2$, Z and C channels, respectively, reading from top to bottom of the drum. These pulses read off memory wheel 36 are not necessarily coincident with the 100 kc. clock pulses which continuously feed into the computer unit and are used for synchronizing the operation of the machine.

Figure 24:
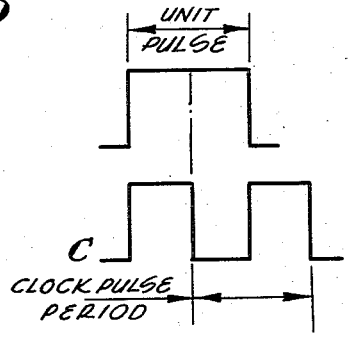
Figure 24 is a diagram illustrating waveforms of a unit pulse (binary one) and also of a clock pulse.

As a means to synchronize or align each of the memory "units of information" with a clock pulse, the outputs of each of the memory flip-flops $Y_m$, $R_m$ and $Z_m$ are fed through gating devices (logical product networks) to associated flip-flops designated Y, R and Z respectively. These gating devices are then triggered by clock pulses in such a manner that the output therefrom is necessarily coincident in time with the clock pulses C, as Figure 24 illustrates.

Figure 25:
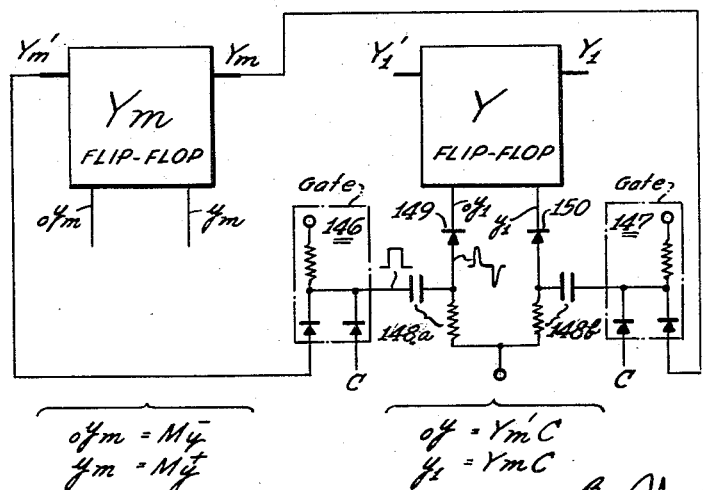
Figure 25 is a schematic-block drawing of the $Y_m$ flip-flop and of the Y flip-flop, including logical input equations.

Figure 25 comprises a schematic illustration of the $Y_m$ flip-flop and of the Y flip-flop. The $Y_m$ flip-flop is so devised as to exactly follow the magnetic pattern on the memory as shown in Figure 26. Each time a magnetic pattern reverses its flux direction from that associated with a "one" indication, a negative triggering pulse designated $M_y^-$ is impressed on the $_0y_m$ input of the $Y_m$ flip-flop. As previously noted, energization of this input line renders the $Y_m$ flip-flop false, i. e., a relatively high potential is effected upon the output lead $Y_m'$. On the other hand, magnetic flux direction associated with "one" indication generates a positive pulse designated $M_y^+$ which is conveyed into the input $y_m$ to make $Y_m$ true, i. e., the output $Y_m$ is made to have a relatively high potential.

It is the purpose of the Y flip-flop to effect synchronization between the magnetic pulse pattern taken from wheel 36 and the clock pulse C. The Y flip-flop is partially schematically illustrated in Figure 25 inasmuch as a detailed circuit diagram is shown only of the input circuitry to the flip-flop. Gating circuits 146 and 147 are used for feeding differentiating circuits 148a and 148b connected to the $_0y_1$ and $y_1$ input grids respectively, of the Y flip-flop through attenuating diodes 149 and 150, respectively.

The $Y_m'$ output potential of flip-flop $Y_m$ is connected to one input of gating circuit 146, the $Y_m$ output potential of flip-flop $Y_m$ on the other hand, is connected to one of the inputs of the gating circuit 147. Clock pulse C is conveyed into the second inputs of each of the gating circuits 146 and 147.

These gating circuits 146 and 147 are logical product circuits, as shown in Figure 19, and will not be described in detail here. When both input leads to a gate, as shown, are relatively high in potential, the output of the gate is made relatively high. As evidenced by waveforms on the $Y_m$ and C lines feeding into gating circuit 146, the rise in potential $Y_m$, is not necessarily coincident with the rise in potential of the clock pulse C (Figure 24). These two terms are high for a portion of the clock period. Proper relation is maintained between these two signals as long as the trailing edge of a clock pulse determines the trailing edge of the output pulse from the gating circuit. The resulting gate output pulse is differentiated by circuit 147, effecting a positive leading pulse which is attenuated in the back resistance of diode 149 and a negative trailing pulse which passes through diode 149 to trigger the Y flip-flop to a false state.

Thus, by having the trailing edge of a clock pulse positioned approximately in the middle of a magnetic unit pulse, the latter pulse can be brought into coincidence with the clock pulse period, this coincidence being sensed by the state of the Y flip-flop.

Referring now to the equations of the inputs to the Y flip-flop, the input equation required to make the Y flip-flop "false" is defined by the symbolic product $_0y = Y_m'C$. This equation, as previously described, is interpreted as meaning when both $Y_m'$ and C are simultaneously of a high potential, the Y flip-flop is made "false." The input equation required to make the Y flip-flop "true" is defined as $y = Y_mC$ and its explanation follows from the foregoing. These potential outputs taken from the plates of the proposition flip-flops are used for driving diode logical nets employed for solving logical equations which define the inputs to the proposition flip-flops.

Figure 26 is a graph showing the various waveforms associated with the explanation of the foregoing equations. Note that in not one of these waveforms does the voltage level drop below 0 volts. The horizontal axis represents time, the vertical axis wave amplitude.

Figure 27:
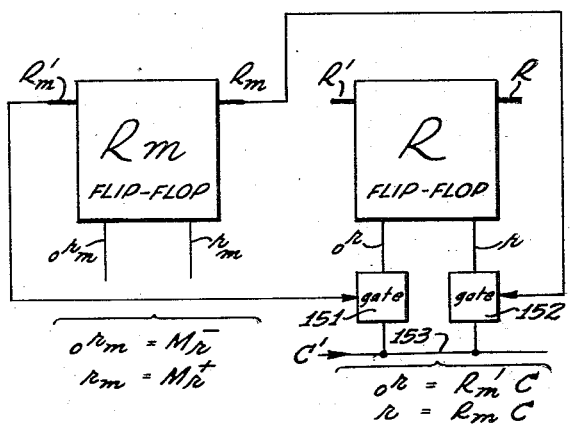
Figure 27 is a schematic-block drawing of the $R_m$ flip-flop and of the R flip-flop, including logical input equations.

Figure 27 schematically shows the $R_m$ flip-flop and the R flip-flop which is similarly employed for bringing the R channel magnetic pattern in coincidence with the clock pulse time. It should be noted that the gating devices to the inputs $_0r$ and $r$ of the R flip-flop are represented by blocks 151 and 152, respectively. Furthermore, the differentiating circuit and the attenuating diodes in the input circuits are omitted. This simplified gating device, together with ac lock pulse C conveyed through lead 153, with parallel connections to the gates, will be used throughout the remaining drawings for simplification of presentation.

Below each of the $R_m$ and R flip-flops, the logical equations, representing the logical nets to their inputs are presented. The understanding of these equations follow from the explanation associated with Figure 25 and will not be further discussed.

On the basis of the foregoing discussion, interpretation can be made of the logical equations for the $L_1$ address channel; in which the operation of the $L_1$ channel memory flip-flop is summarized in the logic.

$$L_{1m} \quad l_{1m} = M_{e_1}{}^+$$
$$L'_{1m} \quad _0l_{1m} = M_{e_1}{}^-$$

Similarly, the logic of the $L_2$ channel memory flip-flop is expressed:

$$L_{2m} \quad l_{2m} = M_{e_2}{}^+$$
$$L'_{2m} \quad _0l_{2m} = M_{e_2}{}^-$$

And the $L_1$ channel input flip-flop is expressed:

$$L_1 \quad l_1 = L_{1m}C$$
$$L_1' \quad _0l_1 = L'_{1m}C$$

The $L_2$ channel input flip-flop being summarized:

$$L_2 \quad l_2 = L_{2m}C$$
$$L_2' \quad _0l_2 = L'_{2m}C$$

The schematic circuit diagrams associated with this logic can be easily drawn by using the analogy to Figure 19. Consequently they have not been set forth in this specification.

Z channel proposition flip-flops

Figure 28:
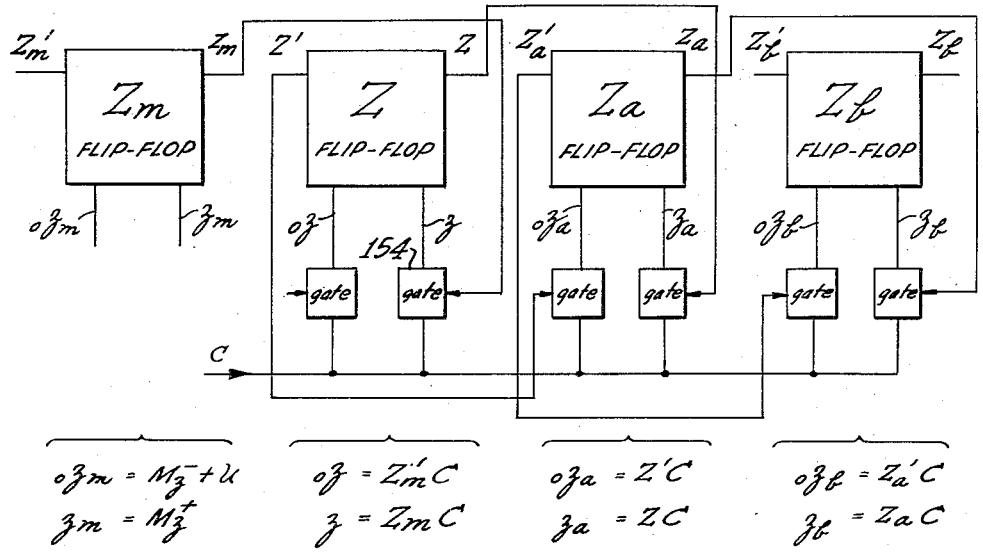
Figure 28 is a schematic-block diagram of four Z channel proposition flip-flops; $Z_m$, Z, $Z_a$, and $Z_b$, including logical input equations.
Figure 29:
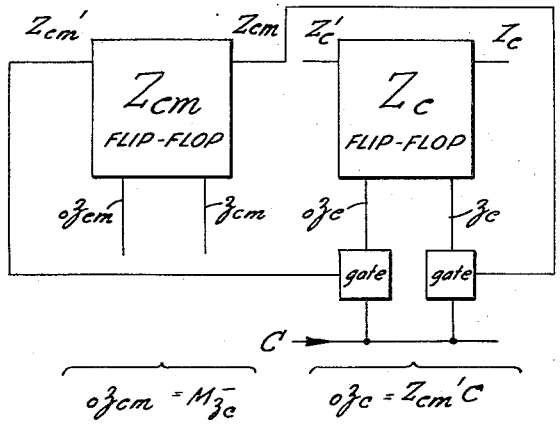
Figure 29 is a schematic-block diagram of the $Z_{cm}$ and $Z_c$ flip-flops.

Directly concerned with the Z channel are the proposition flip-flops shown in Figures 28 and 29. Referring to Figure 28, the $Z_m$ flip-flop serves to follow the magnetic pattern on wheel 36. The Z flip-flop is used in bringing this pattern into coincidence with the clock pulses; $Z_a$ and $Z_b$ flip-flops represent additional delays.

The time-wise relationship of the Z channel flip-flops can best be explained by Figure 30 which shows the waveforms at various locations in the Z channel. Line I shows the magnetic pattern appearing in the $P_{31}$ position of the Z channel. Line II is a pattern of the signals generated in the Z pick-up head. It should be noted that the Z pick-up head differentiates the leading and trailing edges of the magnetic pattern to form $Z^+$ and $Z^-$ pulses. The III line shows the timewise location of the clock pulses generated by the clock pick-up head. It is well to note that a clock operation time interval $P_{31}$, for example, is not coincident with the $P_{31}$ position of the magnetic pattern, being shifted slightly later in time. The $Z_m$ flip-flop as shown by line IV, is triggered so as to follow the magnetic pattern $M'$. A comparison of lines III and IV will reveal that the trailing edge of the $P_{30}$ clock pulse (i. e. the beginning of the $P_{31}$ time interval) occurs at approximately the middle of the square wave representing the $P_{31}$ position of the $Z_m$ flip-flop proposition. The common high potential of the $Z_m$ flip-flop and the clock channel determines the width of the pulse which is fed, for example, through gate 154 (Figure 28) into the Z flip-flop. This pulse is then differentiated and the positive portion thereof attenuated by the input circuitry, such as diode 150 shown in Figure 25. These latter differentiated waveforms are shown by line V of Figure 30. It is thus seen that it is always the trailing edge of a clock pulse which triggers a flip-flop. Thus the $P_{31}$ position of the Z flip-flop is shown now by line VI to be in coincidence with the $P_{31}$ clock pulse time. The $Z_a$ and $Z_b$ flip-flops are shown by respective lines VII and VIII to be triggered into a true state, in coincidence with the trailing edges of the $P_{31}$ and $P_{32}$ clock pulse times, respectively.

The connections of the inputs to the Z channel flip-flops to cause them to be triggered in order, as previously described, are represented by the logical equations appearing in Figure 28 below their respective flip-flops. Interpretation associated with these equations follows from the description of the flip-flop circuits in Figures 25 and 27 and will not be further discussed.

It should be noted that the Z, $Z_a$ and $Z_b$ flip-flops supply delayed outputs from the Z precession line. These latter flip-flops in effect give the Z line a variable length. When outputs are taken from Z flip-flop, the Z line is 63 clock pulses long. Since an integrator length occupies 32 pulse positions, positive precession of $dz$ pulses is effected. This output is used during the filling operation of the computer. When outputs are taken from the $Z_a$ flip-flop, the Z line is re-recorded after 64 clock pulses delay and no precession is evident in the Z line, i. e., corresponding pulse positions remain the same in the Z line. Thus, the output from the $Z_a$ flip-flop is used when the machine idles, during filling. When the outputs are taken from the $Z_b$ flip-flop, $dz$ pulses precess in a negative manner for each recording. It is this latter condition, negative precession, which is active during $P_1$ through $P_{20}$ pulse times, while the computer is computing.

Figure 29 is a schematic-block diagram of the $Z_{cm}$ and $Z_c$ flip-flops which serve to read and synchronize information that is essential to proper computational instructions and that would otherwise be lost. The purpose of these flip-flops will become more apparent in the ensuing discussion of the Z line.

Pulse position—or "P"—counter

As a means of tracing the development and operation of logical gate circuits comprising the invention, the specification now commences a detailed explanation of the counter which discriminates between the 32 pulse positions of each of the 44 integrators. This device is known as the "P" counter; it consists of five stages and is wired upon diode board 23.

The P counter is comprised of flip-flops $F_1$ to $F_5$, inclusive, the various combinations of bistable states of these flip-flops being used for the definition of 32 different consecutive pulse times, thus enabling the counting of clock pulses (intervals) from pulse times $P_1$ through $P_{32}$ to repeatedly take place. The 32 different configurations that the flips-flops assume are indicated in Figure 31 which is actually a table showing a cycle of binary numbers counting from the equivalent decimal number 0 through 31.

Figure 32 is a schematic-block diagram illustrating the manner of interconnecting the flip-flops $F_1$ through $F_5$ in order to obtain the desired result of discriminating between the 32 pulse positions. The convention used in Figure 32, in accordance with Figure 31, is that when the right plate is of relatively high potential, the flip-flop indicates a "1" or "true" state, and when the left plate is of relatively high potential, the flip-flop indicates "0" or "false" state.

All of the flip-flops $F_1$ through $F_5$ have clock pulses $C$ simultaneously fed into all of their inputs through right and left gating devices, such as 155 and 156 respectively, shown for flip-flop $F_1$. These gating devices, as described, are such that they pass a pulse to an input of a flip-flop when and only when all lines feeding into the gating device are of a relatively high potential. As consecutive clock pulses $C$ are conveyed into the P counter, the flip-flops change their states, in order, in accordance with the table in Figure 31. Such a result is generally achieved by interconnecting the outputs of the flip-flops to the inputs according to a scheme best recognized by Figure 32. It is to be noted that the first flip-flop $F_1$ changes from one of its states to the other state every time a clock pulse $C$ appears; hence the right gating device 155, which feeds into the $f_1$ input of the flip-flop $F_1$, is connected so as to be impressed by the potential of the left output $F_1'$ and the left gating device 156, which feeds into the $_0f_1$ input, is connected so as to be impressed by the potential of the right output $F_1$. Dashed diagonal lines 157 and 158, respectively, represent these connections for flip-flop $F_1$ in Figure 32.

Thus each clock pulse $C$ can only pass into that input of the flip-flop $F_1$ which will change its state.

Figure 31 indicates that in order to have each successive clock pulse $C$ trigger the flip-flops to indicate the desired count, all of the flip-flops, after the first, change to a "1" state when and only when all the previous flip-flops are in a "1" state. Consequently the condition required for enabling a flip-flop to change to a "1" state on the next clock pulse $C$ is for all the previous flip-flops to be indicating a "1."

Likewise the condition required for enabling a flip-flop to change to a "0" state on the next clock pulse $C$ is for all the previous flip-flops, plus the flip-flop in question, to be in a "1" state. Using these two conditions, it is possible to set up symbolic logic equations for each of the flip-flops which define the conditions needed to change a particular flip-flop to its opposite state.

For flip-flop $F_1$, whose connections have already been described, the input equation for enabling flip-flop $F_1$ to indicate a "1" i. e., to be made true on the next clock pulse $C$ is defined by $f_1 = F_1'C$. The input equation for enabling the flip-flop $F_1$ to indicate a "0," i. e., be made false on the next clock pulse $C$, is defined by $_0f_1 = F_1C$.

The flip-flop $F_2$ has an input equation $f_2 = F_1F_2'C$ i. e., the $f_2$ input senses both its own flip-flop state and the state of flip-flop $F_1$. This expression is schematically illustrated in Figure 32 by dashed diagonal lines 159 and 160 connecting the $F_2'$ output and the $F_1$ output, respectively, to the right input gating device of flip-flop $F_2$. Thus when flip-flop $F_2$ in in a false state and flip-flop $F_1$ is in a true state, the next clock pulse $C$ is passed to make flip-flop $F_2$ true. Similarly, the other input equation is $_0f_2 = F_1F_2C$. This is illustrated in Figure 32 by dashed diagonal lines 161 and 162, connecting output $F_2$ and output $F_1$, respectively, to the left input gating device of flip-flop $F_2$.

By extending the foregoing theory, one can obtain the input equations $_0f_3$, $f_3$, $_0f_4$, $f_4$, $_0f_5$, $f_5$ for all the other flip-flops.

The explanation now concerns itself with the logical diode net for the P counter which was designed in accordance with the input equations previously described.

In Figure 33, the input equation $_0f_1 = F_1C$ is physically set up by a diode network having terms $F_1$ and $C$ fed therein on separate diode input lines. $F_1$ is obtained from the right output of flip-flop $F_1$, and $C$ is obtained from the clock channel on wheel 36. This circuit corresponds to a logical product net as described in connection with Figure 19. The high potential output on $_0f_1$ corresponds to a logical product of the two input voltages as previously defined.

In Figure 34, the input $_0f_2$ of flip-flop $F_2$ is shown to be similarly formed by terms $F_1$, $F_2$ and $C$ feeding in on separate lines to a three diode input logical product net.

Similarly $_0f_3$ is shown in Figure 35 to be formed by a gating circuit having four separate crystal diode inputs, $F_1$, $C$, $F_2$, $F_3$.

Figure 36 comprises a schematic diagram showing these three circuits combined into a family tree type of diode network which, in effect, performs the multiplication of terms in equations $_0f_1$, $_0f_2$, $_0f_3$ in a simplified manner.

The simplified circuit of Figure 36 has the $C$ term fed in on but one lead instead of being fed into each gating circuit on a separate line. Consequently the result of each logical multiplication, which represents the solution to one of the simple equations, is made available to be combined with other terms so as to comprise the more complex equation. Thus the high output of first junction 163 in Figure 36 is equal to $_0f_1$. This latter output, when combined with a single new input $F_2$ is then fed into another two input multiplier to form the new output $_0f_2$. Similarly this latter output $_0f_2$ and new term $F_3$ combine to produce $_0f_3$.

Figure 37 comprises a schematic diagram of the entire diode network required to interconnect the flip-flops $F_1$ through $F_5$ in order to count the pulses $P_1$ through $P_{32}$. This "family tree" is constructed in accordance with the principles embodied in Figures 31 through 36. Because the input $f_1$ is composed of terms $C$ and $F_1'$ and the term $F_1'$ does not appear in any of the other equations, it is located at the bottom of the tree and set up as a separate network.

It is apparent that in this family tree each of the solution lines, such as $_0f_1$, $f_1$, $_0f_2$ etc., has a resistor, such as resistor 164 (Figure 37), associated therewith. Any time all of the terms which make up the input equation to one of the flip-flops or drivers are of the same high potential simultaneously, the current flow through the associated resistor, such as resistor 164 (Figure 37), serves to adjust the potential on the solution line to this same high potential. It is this high potential, which is always only of a short duration owing to the nature of clock pulse $C$, that represents the solution of the equation.

In addition to indexing the consecutive pulse positions $P_1$ through $P_{32}$ of each integrator, the P counter is used for generating "time propositions" that are needed within the computer. For example, the interval $P_1$ is defined by $P_1 = F_1'F_2'F_3'F_4'F_5'$ indicating a zero configuration in all of the flip-flops comprising the five states. Therefore the diode net for the $P_1'$ driver would be as illustrated in Figure 38, thus making $P_1'$ available for use in the extension of the logical circuitry.

The diode net associated with the $P_{32}$ driver is shown schematically in Figure 39. The method of conveying the $P_{32}$ output first into a $P_{32}'$ driver and then into a $P_{32}$ driver is also shown in block diagram form in Figure 39. A typical driver is shown and explained later (see Figure 47).

Figures 40 and 41 also show pluralities of diodes arranged in networks to perform special functions. In Figure 40, the plates of diodes 155a, 156a and 157a are connected through a suitable resistance 158a to a terminal for providing positive voltage and are also connected to the grid of the left tube in a flip-flop multivibrator 159a. The cathode of the diode 155a receives voltage from an "and" network connected in a manner similar to that shown for the networks in Figures 38 and 39 so as to indicate $F_1F_2F_3'C$. The cathodes of the diodes 156a and 157a, respectively, have voltages applied to them from the plates of the right tubes in the $F_4$ and $F_5$ flip-flops shown in Figure 32.

In like manner, the plates of diodes 160a and 161a are connected through a suitable resistance 162a to the terminal for producing positive voltage and to the grid of the right tube in the flip-flop 159a. The cathode of the diode 160a is connected to the output terminal of the network shown in Figure 39 so as to produce a relatively high voltage at pulse position 32 of each integrator. The cathode of the diode 162a is connected to the read head in the clock channel C.

In operation, the voltages on the cathodes of the diodes 160a and 161a become simultaneously high at pulse position 32 of each integrator during the positive half of the clock pulse. When the clock pulse starts through the negative half of its cycle in the following pulse position, as illustrated in Figure 24, current flows from the positive terminal through the resistance 162a and the diode 161a and causes a voltage drop to be produced across the resistance. Because of this voltage drop, a relatively low voltage is introduced to the grid of the right tube in the flip-flop 159a, as shown in Figure 40, so as to cut off the tube. When the right tube in the flip-flop 159a becomes cut off, a relatively high voltage is produced on its plate and is used for purposes which will be disclosed in detail hereinafter.

The right tube in the flip-flop 159a remains cut off between pulse positions 1 and 28 of each integrator. When the wheel 36 has rotated so that pulse position 28 of an integrator is presented for utilization, the voltages on the cathodes of the diodes 155a, 156a and 157a become simultaneously high. This prevents a current from flowing through the resistance 158a. Since current cannot flow through the resistance 158a, the voltage on the plate of the diode rises to substantially that provided by the voltage terminal to which the resistance 158a is connected.

Since the cathode of the diode 155a receives voltage from a network which includes the clock pulse C, the voltage on the cathode of the diode becomes relatively low during the negative half of the clock pulse cycle in pulse position 29. Current then flows from the positive terminal through the resistance 158a and the diode 155a and causes a voltage drop to be produced across the resistance. Because of this voltage drop, the voltage on the plates of the diodes 155a, 156a and 157a becomes relatively low. This voltage is introduced to the grid of the left tube in the flip-flop 159a to cut off the tube.

The left tube in the flip-flop 159a remains cut off until the occurrence of pulse position 32 of the integrator is presented for utilization. The network formed by the diodes 160a and 161a then operates in a manner similar to that disclosed above to cut off the right tube in the flip-flop 159a. In this way, a differentiation is provided by the flip-flop 159a between the first 28 pulse positions of each integrator and the last 4 positions of the integrator.

The networks shown in Figure 41 operate in a similar manner to distinguish between pulse positions 1 to 20 of each integrator and pulse positions 21 to 32 of each integrator. This distinction is obtained by the introduction of the voltage from the plates of the diodes in one of the two networks shown in Figure 41 to the grid of the left tube in a flip-flop 163a and by the introduction of the voltage on the plates of the diodes in the other network to the grid of the right tube in the flip-flop 163a.

Similarly, Figure 41 is a schematic illustration of the manner in which the $P_{1/20}$ $P_{21/32}$ flip-flop is triggered. Here again the $P_{21/32}$ output is a "family tree" circuit based upon the $f_3$ output of Figure 37.

Integrator—or "I"—counter

The integrator or "I" counter has a capacity of 44 configurations since there are 44 integrators, in series, on the memory track. This counter is wired upon diode board 21 and is comprised of six flip-flop stages, designated $K_1$, $K_2$, $K_3$, $K_4$, $K_5$ and $K_6$ as shown in Figure 43. In order to facilitate counter resetting and to simplify the integrator selector switch, the present counter has an initial number, in this case a binary indication of the octal number 24, set therein. This initial number is assigned to the time interval $I_{24}$. The I counter flip-flops then flip in a normal binary manner to count incoming pulses through $I_{77}$ (a total of 44 integrators) at which time it resets again to the initial binary number.

The I counter is supplied by overflow pulses, $P_{32}$, from the P counter. Hence the P counter counts through 44 cycles in order to supply the I counter with enough pulses to count through its cycle. It should be noted that the I counter remains at a particular count for a time interval corresponding to the length of an integrator.

Figures 42, 44:
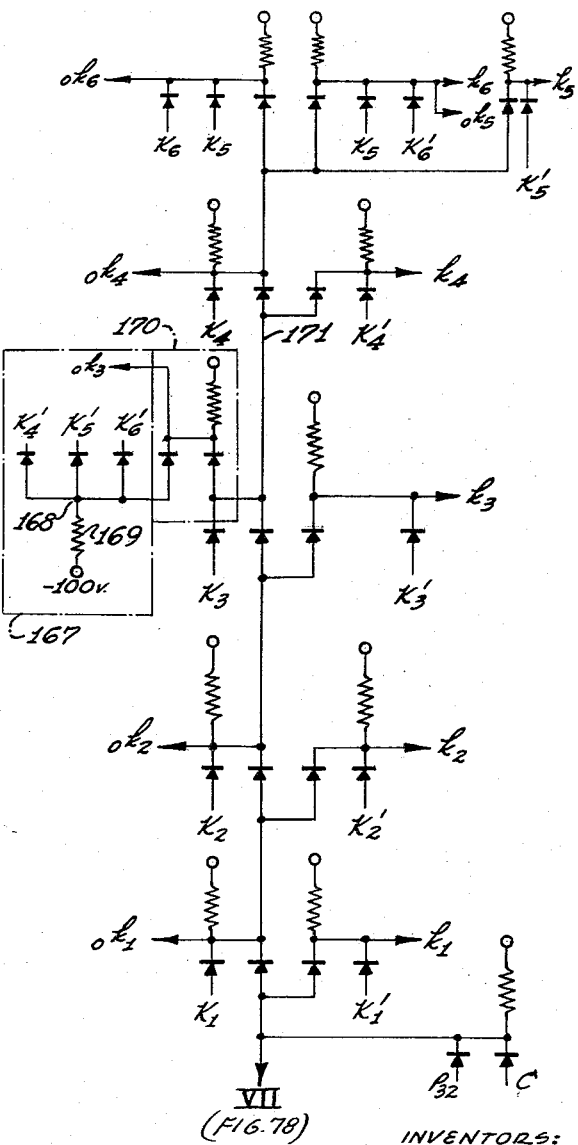
Figure 42 is a table showing the counting operation of the integrator counter.
Figure 44 is a schematic diagram of the logical gate circuit used for interconnecting the flip-flops of the integrator counter.

In a manner similar to that shown for the P counter, the scheme used for determining the equations of the inputs to the flip-flops $K_1$ through $K_6$ is revealed by the table of the binary indications of the flip-flops as shown in Figure 42. Again the $K_1$ flip-flop reverses its state each time a $P_{32}C$ term is received from the P counter. This reversal of flip-flop state is accomplished by impressing the right and left gating devices of the flip-flop $K_1$ by potentials from the opposite plates as indicated, for example, by diagonal lines 165 and 166, respectively. Thus the equation $k_1 = P_{32}K_1'C$ is obtained for the right input which effects a "1" or a true state in flip-flop $K_1$; and the equation $_0k_1 = P_{32}K_1C$ is obtained for the left input which effects a "0" or a false state ($K_1'$) in the $K_1$ flip-flop.

The input equations of flip-flop $K_2$ (i. e., $_0k_2 = P_{32}K_1K_2C$ and $k_2 = P_{32}K_1K_2'C$) indicate that the $k_2$ input senses both its own flip-flop state and the state of flip-flop $K_1$.

However, in the case of rendering flip-flop $K_3$ false, as shown in Figure 43, a discontinuity arises when the counter changes from $I_{77}$ to $I_{24}$. At this instant, although $K_1$, $K_2$ and $K_3$ are true, $K_3$ must remain true in order for the K counter to reset to $I_{24}$. Consequently additional terms must be supplied to the input $_0k_3$. Thus $_0k_3$ can be expressed in the logical equation.

$$_0k_3 = K_1K_2K_3K_4'P_{32}C + K_1K_2K_3K_5'P_{32}C + K_1K_2K_3K_6'P_{32}C$$
$$_0k_3 = P_{32}K_1K_2K_3(K_4' + K_5' + K_6')C$$

The plus (+) symbol in symbolic logic signifies an "inclusive or" operation; hence, if any one of the three flip-flops $K_4$, $K_5$ or $K_6$ is false at the same time that $K_1$, $K_2$ and $K_3$ are true, the $K_3$ flip-flop can be made false.

The same problem of suppressing the change of the flip-flop in order to return to the initial number in the counter is met by equation $_0k_5$, wherein the false state of flip-flop $K_5$ is introduced to permit flip-flop $K_5$ to be made false when going from $I_{37}$ to $I_{40}$, but preventing flip-flop $K_5$ from going false when going from $I_{77}$ to $I_{24}$.

Figure 44 is a schematic diagram of the diode network used for interconnecting the flip-flops of the integrator I counter. The family tree type of network is shown with seven levels of diodes for physically setting up the symbolic equations of the inputs to the K flip-flop shown at the bottom of Figure 43. As is characteristic of the family tree network, the equations have some of their terms supplied as the solutions of previous lower order equations.

The $_0k_3$ equation, as seen in Figure 43, is made up by symbolically adding three terms representing symbolic products. Referring back to Figure 18, the basic diode net used for performing symbolic addition is shown. Similarly, the portion of the logical net employed in Figure 44 for adding the terms of the $_0k_3$ equation is shown in the block 167. The terms $K_4'$, $K_5'$, $K_6'$ are fed through individual diodes to a common junction 168 returned to $-100$ volt through a resistor 169. Any time at least one of the input terms is of a relatively high potential, the voltage of junction 168 rises owing to diode current flowing through resistor 169. This high voltage is then fed into one of the inputs of a logical product net defined by second block 170. The other input to the net 170 connects to lead 171 which carries the voltage corresponding to the logical product of the common terms $K_1$, $K_2$, $K_3$, $P_{32}$ and C, appearing in each of the three terms of the $_0k_3$ equation. The rest of the logical net for the I counter is essentially a family tree made up of logical product nets and will not be further described.

It should be appreciated that the term "integrators" as generally used herein refers to the memory means 121 (Figure 20) and the subdivision of the memory means into a plurality of individual portions each having a particular number of pulse positions, such as 32 positions. The subdivision of the memory means 121 into the individual portions is accomplished by such stages as the counters 122 and 138 in Figure 20.

Integrator selector switch

Reference is now made to Figure 45 which is a schematic diagram showing how the outputs of integrator flip-flops $K_1$ through $K_6$ can be interconnected such that a signal can be obtained during any integrator interval time $I_{24}$ through $I_{77}$. Referring to the table in Figure 42, the pattern of the states of the flip-flop stages for each integrator interval is used for setting up the circuitry in Figure 45. For example, in Figure 45, the selector push buttons 55 are shown depressed. Thus octal numbered integrator 55 has been selected. A study of Figure 42 should reveal that, integrator 55 interval is identified by a true state of flip-flop $K_1$, a false state of flip-flop $K_2$, a true state of flip-flop $K_3$, a true state of flip-flop $K_4$, a false state of flip-flop $K_5$, and a true state of flip-flop $K_6$. Referring again to Figure 45, it is seen that depressing push button 172 so as to make contact with terminals 173, 174 and 175 completes the "and" circuit to $K_1$, $K_2'$ and $K_3$, respectively. Furthermore, the depression of push button 176 so as to make contact with terminals 177, 178, and 179, effectively completes the "and" circuit to $K_4$, $K_5'$ and $K_6$, this "and" circuit being coupled to the first mentioned terms by means of connecting lead 180 so as to effect the total "and" circuit $K_1K_2'K_3K_4K_5'K_6$ which identifies integrator 55 interval. It should be noted that the least significant digit of the octal integrator number is pushed on corresponding push button shown enclosed within dotted lines 181, the first digit of the said integrator number being filled in by means of corresponding push button enclosed by dotted lines 182. Thus means is provided for sensing all the interval times $I_{26}$, $I_{27}$, etc., as a high potential on output $I_1$. The duration of this high potential defining a particular integrator time is 32 clock pulses long.

Figure 46:
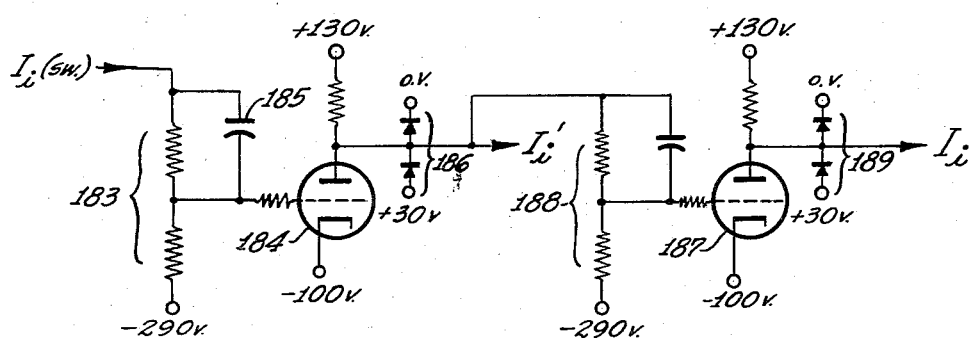
Figure 46 is a schematic diagram of $I_1$ driver circuit.

The schematic diagram of Figure 46 comprises the circuit to which the $I_1$ output of Figure 45 is conveyed. The high output representing an $I_1$ integrator interval, is impressed through a voltage divider circuit 183 to the grid of triode 184. The capacitor 185, connected from the input of the voltage divider 183 to the grid of triode 184, serves to maintain the said waveform's shape. The plate output of triode 184 is clamped between 0 volts and $-30$ volts by a pair of clamping diodes 186. The plate output of triode 184 represents the proposition $I_1'$ that is, the inverse of $I_1$. This $I_1'$ voltage is impressed upon the grid of a second triode 187 through a second voltage divider circuit 188 so as to obtain the square waveform representing the time interval $I_1$. As before, a pair of diodes 189 connect the plate output of triode 187 to potential sources 0 volts and $+30$ volts, respectively.

Figure 47:
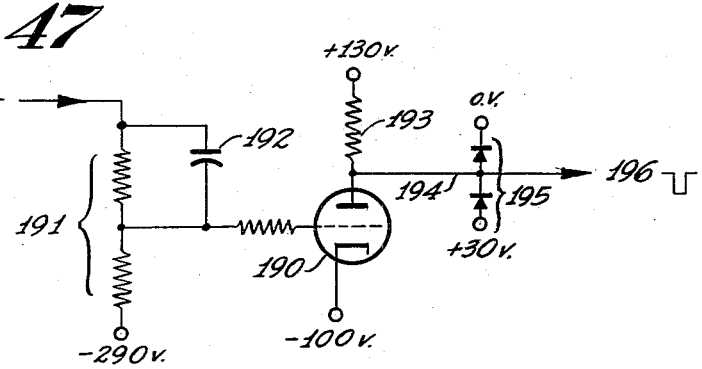
Figure 47 is a schematic diagram of a typical driver circuit.

Figure 47 is a schematic diagram of a typical driver such as is used for $P_{32}$, $P_1'$, $I_{24}$, $I_{25}$, etc. The circuit comprises a triode 190 having the inverted term conveyed to its grid through voltage divider 191 and a condenser 192 which serves as a peaking device by increasing the rise time of the pulses and which also serves to combat lag. The plate of triode 190 is connected to a $+130$ volt source through a load resistor 193. The output line 194 from the plate of triode 190 is clamped between 0 volts and $+30$ volts by diodes 195, effecting the availability of a proposition term at 196.

The logical equation for the $I_{24}'$ proposition which is conveyed into the $I_{24}$ driver so as to yield the desired $I_{24}$ integrator time output is:

$$I_{24}'=K_1+K_2+K_3'+K_4+K_5'+K_6$$

Similarly, the logical equation for the $I_{25}'$ proposition from which the $I_{25}$ integrator time output is obtained is:

$$I_{25}'=K_1+K_2+K_3'+K_4+K_5'+K_6$$

Reference to the table in Figure 42 will substantiate the foregoing two logical equations.

Operation switches

Figure 48:
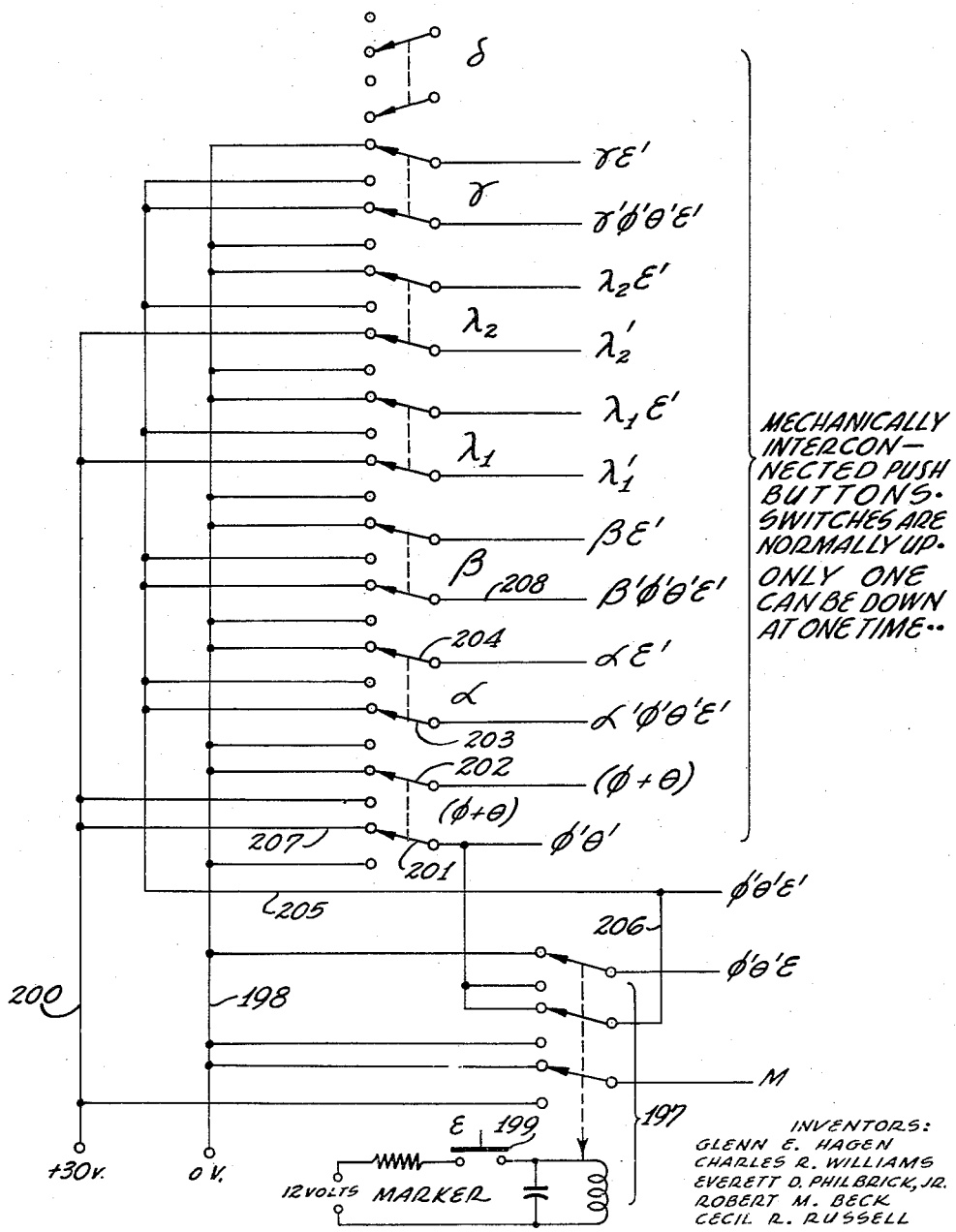
Figure 48 is a schematic diagram of some external switches which govern computer operations.

Figure 48 comprises a schematic diagram illustrating some of the external switches governing computer operations. Here seven mechanically interconnected pushbuttons designated $\delta$, $\gamma$, $\lambda_2$, $\lambda_1$, $\beta$, $\alpha$ and $(\phi+\theta)$ and a marker button 199 which actuates 3 pole double throw relay 197 are shown. These push-buttons control the following operations respectively; shift right, shift left, fill $L_2$ channel, fill $L_1$ channel, fill R channel, fill Y channel, compute; the push-button switches are of the type that are normally up. Furthermore, they are mechanically interconnected so that only one of them can stay down at a time. The marker button 199 is normally up and requires pressure to hold it to the down position.

It is to be noted that the $\delta$ push button is arranged in such a manner that when all the other push buttons are up, it is down; consequently pushing down the $\delta$ push button serves to return a "down" push button to the "up" position. Of course, pushing down any of the other push buttons will effect this same result. However, Figure 48 indicates the existing wiring configuration when the $\delta$ push button is down.

Consider the $(\phi+\theta)$ or "compute" push button which controls the two switch poles 201 and 202, representing the $\phi'\theta'$ and $(\phi+\theta)$ propositions, respectively. In the normally up position, pole 202 is connected directly to 0 volt source line 198 while in the down position, 202 is connected to $+30$ volt source line 200. The $(\phi+\theta)$ output from pole 202 is always connected to the opposite source from that to which the $\phi'\theta'$ output is connected. Thus the $(\phi+\theta)$ proposition and its inverse proposition $(\phi'\theta')$ can be sensed as voltage levels at all times.

The $\alpha$ or "fill Y channel" push button controls poles 203 and 204, representing the $\alpha'\phi'\theta'E'$ and $\alpha E'$ propositions, respectively. In the normally up position shown, pole 204 is connected to 0 volt line 198 and pole 203 is connected to a pole of relay 197 as shown. However, in this configuration, the depression of marker switch 199 (E proposition) will not complete the circuit to $+30$ volt bus 200. But when the $\alpha$ push button is in the down position and the marker button 199 is up, as required in the logic for $\alpha E'$, then the energization path to $+30$ volts via leads 205, 206, and 207 is complete.

Thus the condition for the energization of an output lead is contained in the logical proposition describing its output. Further examples are $\beta E'$ which means output lead 208 is energized by $+30$ volts when the $\beta$ push button is depressed and the "E" or marker switch 199 is not depressed. The remaining switch outputs can be determined in a similar manner and furthermore can be verified by tracing the energization paths from $+30$ volts and 0 volts.

The following definitions are herewith presented in order to gain a better understanding of symbols used in this specification:

| | |
|---|---|
| Clock proposition | C |
| Fill Y button | $\alpha$ |
| Fill R button | $\beta$ |
| Fill $L_1$ button | $\lambda_1$ |
| Fill $L_2$ button | $\lambda_2$ |
| Shift left | $\gamma$ |
| Shift right | $\delta$ |
| Compute one operation time | $\phi$ |
| Compute independent variable increments | $\theta$ |
| Fill $P_{32}$ Z channel | E |
| Fill "0" button output | ⓪ |
| Fill "1" button output | ① |
| Clear Z channel | $c_z$ |
| Clear Y channel | $c_y$ |
| Clear R channel | $c_r$ |
| Clear $L_1$ and $L_2$ channel | $c_l$ |
| Manual stop compute | M |

$G$, $G_1$ and $H$ flip-flops

When performing operations such as computing and filling, it is necessary to be able to commence these operations at a given point on the memory wheel, the location of this point being governed by a particular configuration of the K counter and of the P counter. Hence first and second "go" flip-flops designated as G and $G_1$, respectively, are employed to control such action. The second "go" flip-flop $G_1$ can be made true, at any time, by an external switch closed by the operator. The first "go" flip-flop G is interconnected so as to be automatically triggered to a "true" state at the beginning of the next $P_{29}I_{24}$ time. This pulse time defines the start of an effective computational revolution of drum wheel 36. Proposition flip-flops G and $G_1$ are interconnected, as shown by their input equations in Figure 49.

The $G_1$ flip-flop can be placed into a "true" state by receiving a negative pulse on its $g_1$ input. Although all details of the grid input circuitry are not shown in Figure 49, this input circuitry is similar to that of the other flip-flop circuits in that the negative drop of the $g_1$ input pulse (in this case the leading edge) is differentiated and used to trigger the $G_1$ flip-flop to a true state. The negative pulse fed into the $g_1$ input is generated by manually closing either a "0" or a "1" push button (see Figure 52). These input pulses are designated by symbols ⓪ or ① and are conveyed into $g_1$ input via a mixer circuit which is similar to a logical product circuit (Figure 19) but operates like a logical adding circuit (Figure 18). Normally the two inputs ⓪ and ① to mixer circuit 209 are relatively high in potential so that the output potential on lead $g_1$ is also high. Whenever either one of these inputs ⓪ or ① goes low, however, a negative drop is sensed on the $g_1$ input owing to additional current flow through resistor 210.

Figure 50:
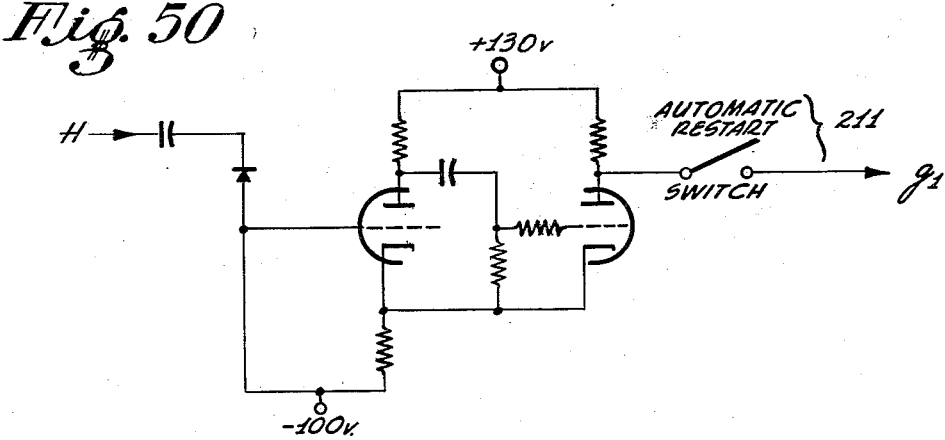
Figure 50 is a schematic diagram of a one-shot circuit and an automatic restart switch.

When several computers of the type herein described are interconnected the "G" flip-flop of a master unit (herewith designated $G_M$) can be used to trigger $G_1$ to the true state as the logical equation indicates. Furthermore, the one shot circuit, shown schematically in Figure 50, working in conjunction with automatic restart switch 211 can also be used to trigger $G_1$ to the true state.

Figure 49:
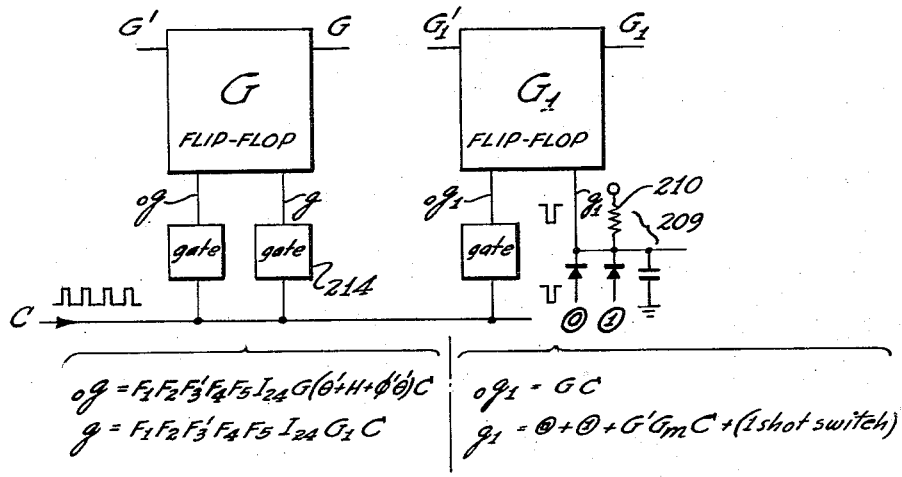
Figure 49 is a schematic-block diagram of G and of $G_1$ proposition flip-flop, including their logical input equations.

The one shot is triggered by a signal from the halt flip-flop H and its output is conveyed to the input $g_1$ of the $G_1$ flip-flop diagrammed in Figure 49. The operation of the familiar one shot type circuit will not be further discussed in this specification.

Figure 51:
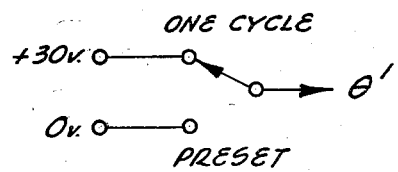
Figure 51 is a schematic diagram of the preset-one cycle switch.

Figure 51 is a schematic diagram of the preset-one cycle switch which can be simply interpreted as meaning when $\theta'$ is high and the computer is computing, computation stops after one effective revolution of the wheel 36 as indicated in the logical equations $$_0g = F_1 F_2 F_3' F_4 F_5 I_{24} G(\theta' + H + \phi'\theta')C$$

When $\theta'$ is low, computation will continue until automatically stopped by the preset instructions in integrator 24 which will be discussed later.

Figure 52:
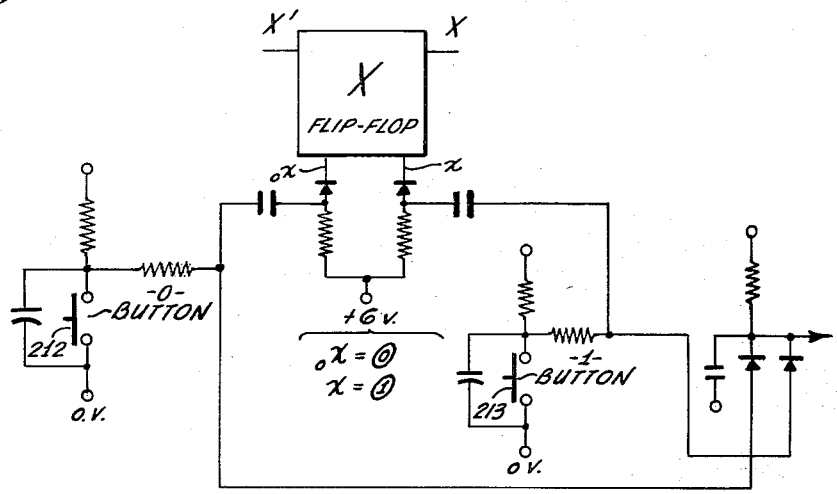
Figure 52 is a schematic-block diagram of the "0" and "1" push buttons and of the X or "fill digit" flip-flop.

In Figure 52, the "0" and "1" push buttons which initiate the negative inputs ⓪ and ①, respectively are shown. In addition to controlling the $G_1$ flip-flop, the "0" and "1" buttons are used to control an X flip-flop whose function will be described later.

At the instant the $G_1$ flip-flop is made true, its $G_1$ high output potential is conveyed to gate 214 (Figure 49) feeding the g input of the G flip-flop. This potential, along with the $P_{28}I_{24}$ proposition in a true state opens gate 214 (Figure 49), thus permitting the next coincident clock pulse C to pass therethrough. The trailing edge of this latter clock pulse triggers the G flip-flop to a true state.

After the G flip-flop is rendered to the true configuration, as indicated by the $_0g_1$ input equation to the $G_1$ flip-flop, the coincidence of the high output potential G with a clock pulse C renders the $G_1$ flip-flop false.

Furthermore, the high level output G is impressed on the $_0g$ input of its own flip-flop. This procedure is followed in order to insure triggering of the G flip-flop to the false or "off" state at the proper time. As is indicated in the logical equation:

$$_0g = P_{28}I_{24}G(\theta' + \phi'\theta' + H)C$$

the G flip-flop will go off at the end of $P_{28}I_{24}$ time when the one cycle preset switch (Figure 51) is set to one cycle ($\theta'$ condition high) or when the $\phi'\theta'$ proposition is high, as it is during filling, or when the H flip-flop is on.

It is to be noted that the $(\phi+\theta)$ term is an entity of the invention and is high during computation and that the $\phi'\theta'$ term is high during filling (see Figure 48). When $\theta'$ is low during the computing operation $(\phi+\theta)$ of the invention, the computer is computing a predetermined independent variable increment. Normally, such computation requires a number of revolutions of the wheel. When $\theta'$ is true, computation ceases after a single effective revolution of the memory wheel. This fact was pointed out in the discussion of Figure 51.

Hence, when the term $\theta'$ is of a high potential in the foregoing equation, G flip-flop is turned off (made false) after a single effective revolution of the wheel. On the other hand, if $\theta'$ is not high, the turning off of the G flip-flop during computation depends on H being high.

Figure 53:
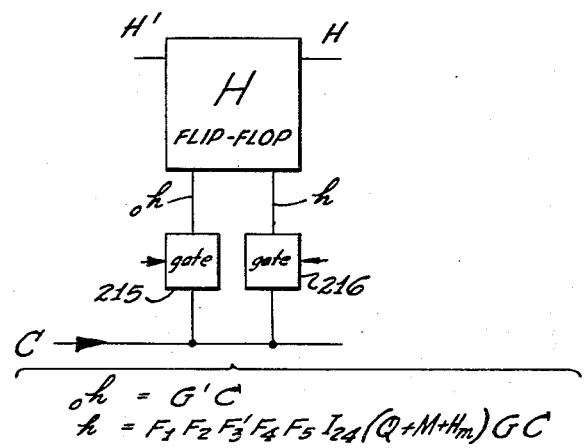
Figure 53 is a schematic-block diagram of the halt flip-flop, including logical input equations.

"H" refers to the halt flip-flop shown schematically in Figure 53. This proposition is made true by an output from $I_{24}$ integrator at $P_{28}$ time. In order for an output to occur from $P_{28}I_{24}$, the $R+Y$ adder proposition Q, at this time must be true. Furthermore if the manual stop compute line M (see Figure 48) is high or if the H flip-flop of a master unit $H_M$ (several of these computers interconnected) is high and the G flip-flop is on, the H proposition is effected to a true state.

H goes high or to a true state when gate 216 is opened, thus permitting the next clock pulse C to make the flip-flop true. H goes low or to a false state when gate 215 is opened, thus permitting the next clock pulse C to make the flip-flop false.

The foregoing description of H is summarized in the logical equations presented in Figure 53.

According to the logic, halt flip-flop H is effected to a true configuration at the beginning of $P_{29}I_{24}$ time of the next to last effective computational rotation of wheel 36. The computation process is then stopped, as indicated by the $_0g$ input to the G flip-flop. On the other hand, the halt flip-flop H is triggered to false (off) state when the first "go" flip-flop is in the G' configuration the clock pulse C occurs.

Precessing Z line

Although previous mention has been made of the precessing Z line, its operation has not yet been explained. The processing Z line is a general storage for $dz$ pulses which represent the output of each of the integration precesses. These pulses are generated at the $P_{32}$ pulse time associated with each of the integrators. The Z line is also a storage for any number (up to 12) of available external inputs.

Figure 54D:
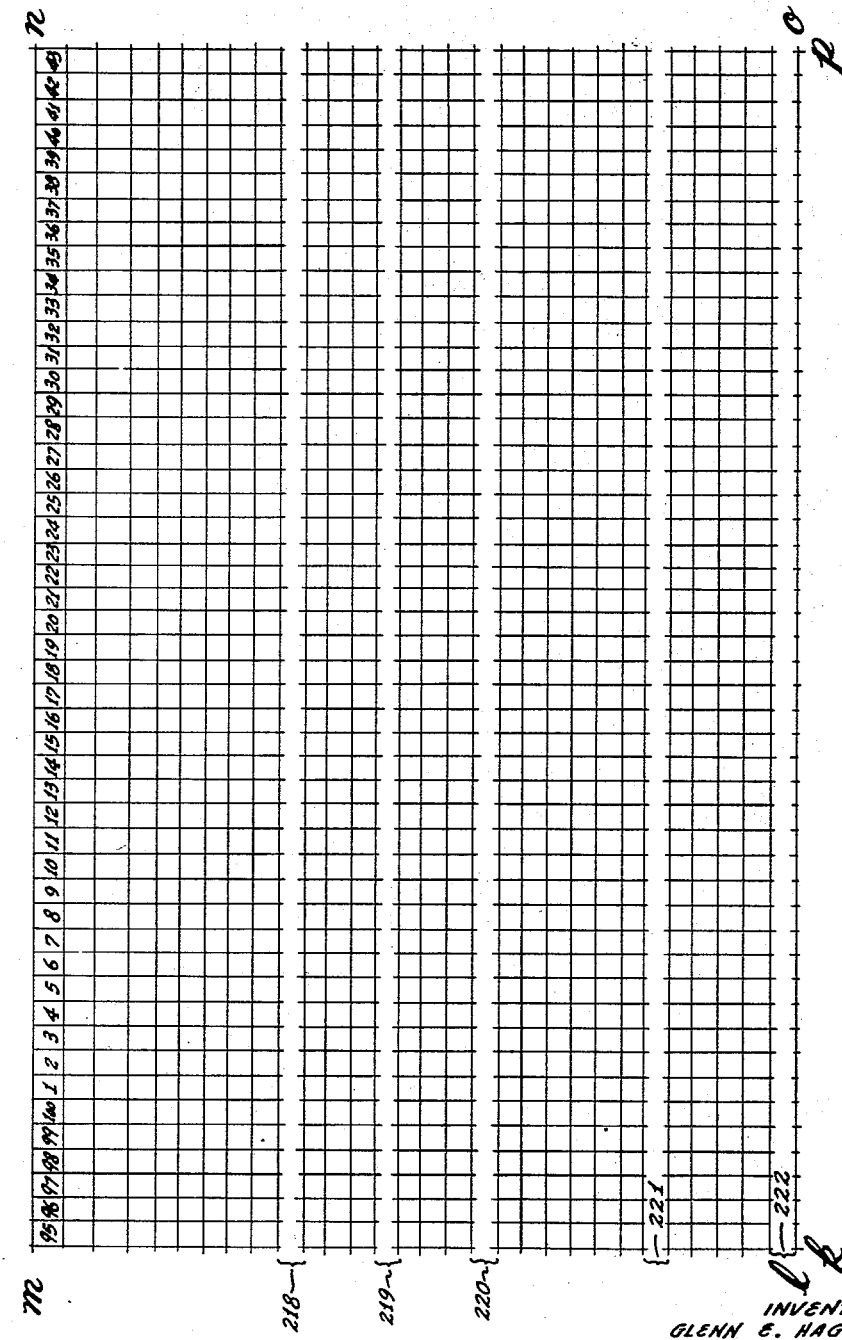
Figure 54F:
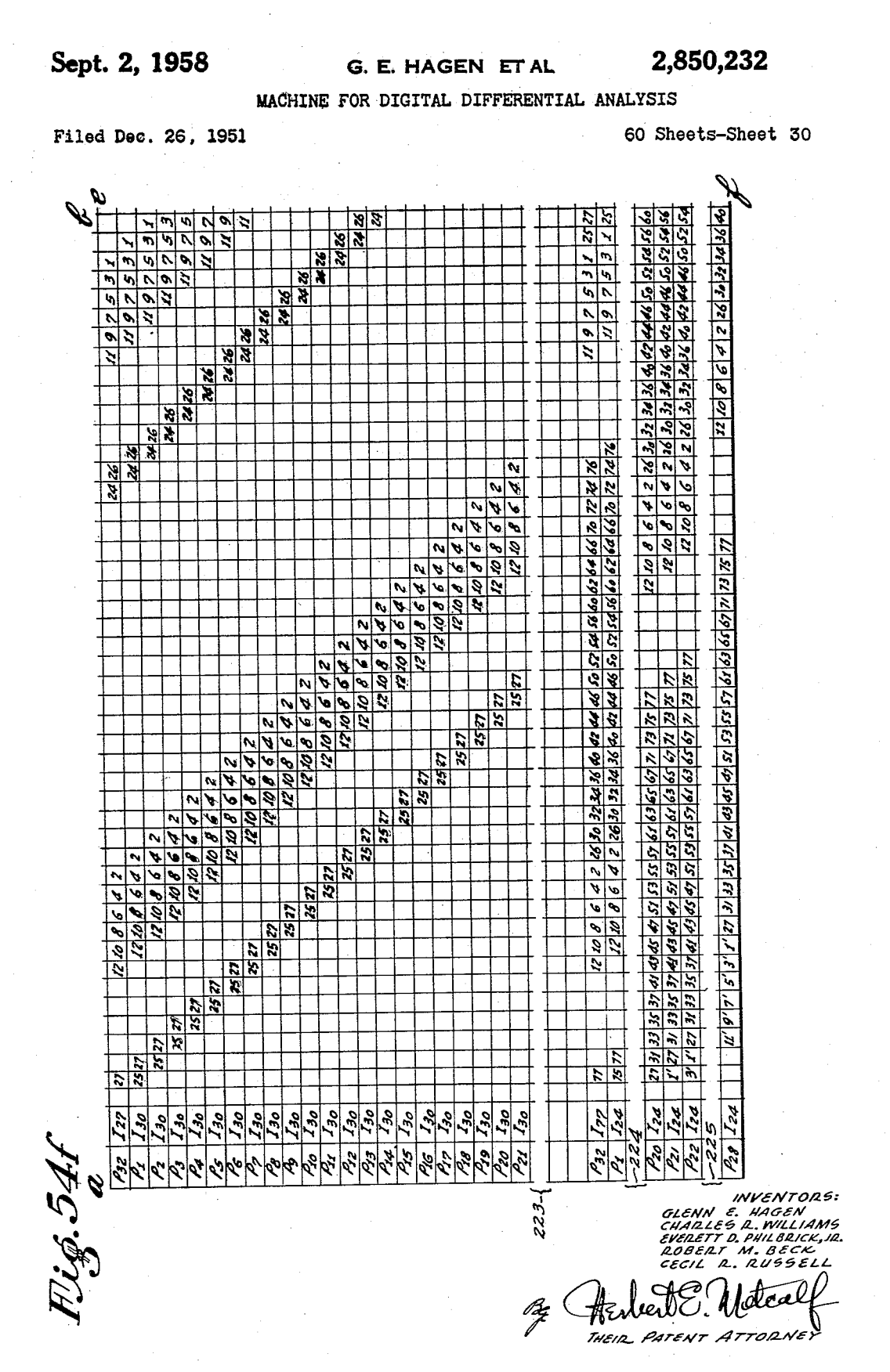
Figure 54:
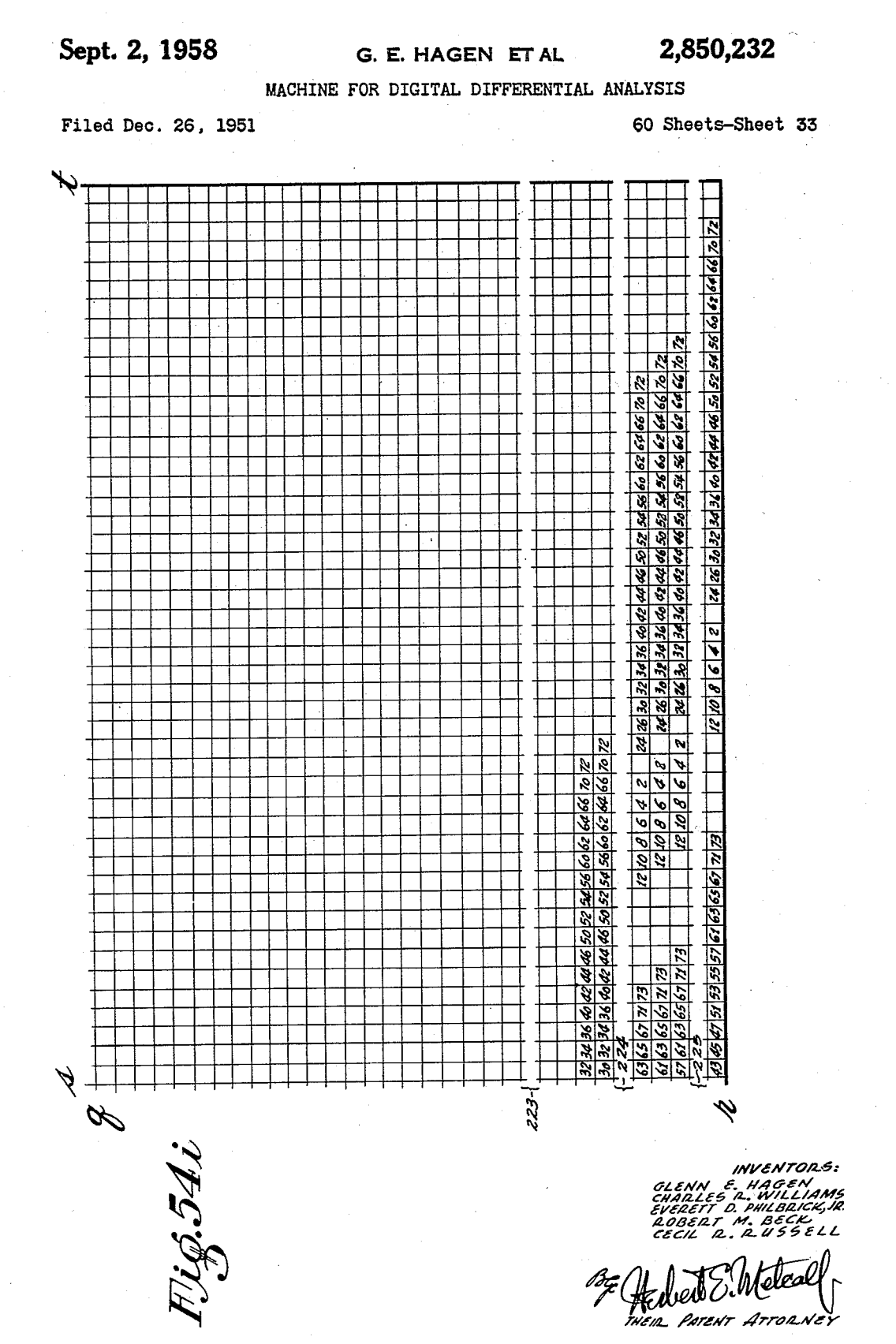

Figure 54a is a block diagram illustrating how Figures 54b through 54i (which are not, of themselves, complete diagrams), are joined together at points a—b, c—d, e—f, g—h, i—j, l—m, k—p, o—n, q—r, and s—t, so as to form a diagrammatic representation of the operation of the Z line. Of course, the entire process has not been shown on the diagram since available space on the paper does not permit.

Under the heading "pulse time," reading down the column, the pulse time as $P_{29}$, for example, is given and the integrator time as $I_{24}$, for example, is also given. The horizontal row associated with each vertical column, identifying a particular pulse-time for a particular integrator, shows the arrangement of information on the Z line at that particular time. Thus the top horizontal row represents pulse-time positions on the periphery of drum wheel 36 whose direction of rotation is indicated by arrow 217a. The width of each vertical column is one clock pulse time C. $Z_m$ flip-flop 227 is shown spaced 62 pulse times from Z record head 217. Associated with $Z_m$ flip-flop 227 are Z flip-flop 228, $Z_a$ flip-flop 229 and $Z_b$ flip-flop 230 spaced 63, 64 and 65 pulse positions, respectively, from Z record head 217. $Z_{cm}$ flip-flop 231 is shown spaced 161 pulse times from Z record head 217 and $Z_c$ flip-flop 232 is shown spaced 162 pulse times from Z record head 217. The $Z_r$ read-head and flip-flop, spaced 1408 pulse times from Z record head 217, is not shown. It is to be noted that the magnetic heads associated with the Z line are $Z_c$ read, Z read, Z record, Z erase and $Z_r$ read (see Figure 10). The Z erase head, spaced midway between Z record head and $Z_r$ read head is not shown in Figure 54b through 54i. As previously shown in Figure 28, flip-flops $Z_m$, Z, $Z_a$ and $Z_b$ are triggered by information sensed by Z read head. As previously shown in Figure 29, flip-flops $Z_{cm}$ and $Z_c$ are triggered by information sensed by $Z_c$ read head. The electronic means by which information was read and recorded was described in Figures 16 and 17.

The primary purposes of the Z line are:

(1) The Z line makes available to each and every integrator, the outputs of the other integrators except the one preceding integrator and also all of the external inputs.

(2) The Z line discriminates between the outputs of odd and even numbered integrators, grouping them into two distinct groups on the magnetic surface of drum wheel 36.

(3) The Z line can effect an "idling" during filling of information on drum wheel 36 by utilization of $Z_a$ flip-flop 229 which is spaced 64 pulse times away from Z record head 217.

(4) The Z line can effect a "stepping right" of information on wheel 36 by utilization of Z flip-flop 228 which is spaced 63 pulse times from Z record head 217.

(5) The Z line can effect a "stepping left" of information on wheel 36 by utilization of $Z_b$ flip-flop 230 which is effectively spaced 65 pulse times from Z record head 217.

(6) $Z_c$ flip-flop 232 effectively spaced 162 pulse times from Z record head 217 reads one of the two information groups while the other is being read by $Z_b$ flip-flop 230, thus the simultaneous availability of both of the integrator information groups is insured.

(7) The $Z_r$ flip-flop (not shown on diagram) spaced 1408 pulse times from Z record head 217 is used for "idling between computational cycles" (recirculation).

The manner in which the Z line achieves the foregoing can be explained by considering the sequence of events occurring during one complete cycle (1408 pulse times) of wheel 36 during computation. The scheme employed in Figures 54b through 54i for representing $dz$ outputs is to use the octal number, corresponding to integrators $I_{24}$ through $I_{77}$, in the position the integrator's $dz$ output occupies in the delay line at any given clock pulse time. Furthermore the decimal number corresponding to external inputs 1 through 12 is placed in the pulse position the external input occupies in the delay line at any given clock pulse time.

A complete diagram of Z line operation would require 44 integrators of 32 pulse positions each. The diagram formed by Figures 54b through 54i is not a complete diagram of Z line operation; certain pulse positions have been omitted as gaps 218, 219, 220, 221, 222, 223, 224 and 225 indicate.

The operation of the Z line is expressed in the logical equation:

$$Z_0 = (RD_2' + R'D_2 + I_{24})P_{32}G(\phi+\theta) + P_{1/20}Z_bG(\phi+\theta)$$
$$+ P_{21/32}P_{1/28}(K_2 + K_3' + K_4 + K_5' + K_6)Z_aG(\phi+\theta)$$
$$+ \{[P_{21/32}G(\phi+\theta)I_{24}F_1'F_2'F_4']t_1 +$$
$$[P_{21/32}G(\phi+\theta)I_{25}F_1'F_2'F_4']t_2$$
$$+ [P_{21/32}G(\phi+\theta)I_{24}F_1F_2'F_4']t_3 +$$
$$[P_{21/32}G(\phi+\theta)I_{25}F_1F_2'F_4']t_4$$
$$+ [P_{21/32}G(\phi+\theta)I_{24}F_1'F_2F_4']t_5 +$$
$$[P_{21/32}G(\phi+\theta)I_{25}F_1'F_2F_4']t_6$$
$$+ [P_{21/32}G(\phi+\theta)I_{24}F_1F_2F_4']t_7 +$$
$$[P_{21/32}G(\phi+\theta)I_{25}F_1F_2F_4']t_8$$
$$+ [P_{21/32}G(\phi+\theta)I_{24}F_1'F_2'F_3']t_9 +$$
$$[P_{21/32}G(\phi+\theta)I_{25}F_1'F_2'F_3']t_{10}$$
$$+ [P_{21/32}G(\phi+\theta)I_{24}F_1F_2'F_3']t_{11} +$$
$$[P_{21/32}G(\phi+\theta)I_{25}F_1F_2'F_3']t_{12}\}$$
$$+ Z_rG'(\phi+\theta) + GI_i'Z_a\phi'\theta'E' + GI_i\gamma E'Z_bP_1'$$
$$+ GI_iZ\gamma'\phi'\theta'E'P_{32}' + P_{32}\phi'\theta'EG + Z_aG'\phi'\theta'$$

The left side of this equation ($Z_0=$) means "a pulse will be recorded on the Z line when." The first term $(RD_2' + R'D_2 + I_{24})P_{32}G(\phi+\theta)$ is true when it is $P_{32}$ pulse time and the G flip-flop (Figure 49) is on and the "compute" button ($\phi+\theta$) is down (term $\phi+\theta$ is high) and there is a sign reversal pulse on the R channel and no carry pulse or no sign reversal pulse on the R channel and a carry pulse or it is $I_{24}$ integrator time.

Referring to Figures 54b through 54i, the introduction of information into the Z line during the period of actual computation is schematically illustrated. During the periods in which the digital differential analyzer is actually computing to obtain the solution of a problem, the output of integrator 24 is recorded on the Z line at $P_{32}I_{24}$ time in accordance with first term in the $Z_0$ equation. Thus octal number 24 has been entered into the space underneath Z record head 217 (at the row headed by $P_{32}$, $I_{24}$). The first effective computational cycle of wheel 36 commences at $P_{29}I_{24}$ time for this example as Figure 54b indicates. For simplicity, it has been assumed that there is no previous information on the Z line except the available external inputs, represented by numerals 11, 9, 7, 5, 3, 1 as shown. These external inputs were recorded onto the Z line during pulse times $P_{21}$ through $P_{26}$ of integrator $I_{24}$ in accordance with terms 4, 6, 8, 10, 12, and 14 of the logical equation for $Z_0$ and will be explained later. On the ensuing pulse times ($P_1I_{25}$, $P_2I_{25}$, etc.) the output of integrator 24 advances as a result of the rotation of wheel 36. A gap in the table is indicated by gap 218 and then $P_{21}I_{25}$ is shown. Thus pulse times $P_3I_{25}$ through $P_{20}I_{25}$ have been omitted between gap 218. At pulse time $P_{21}I_{25}$ a new output is recorded onto the Z line. This new recording occurs in accordance with the fifth term in the equation for $Z_0$ and comprises an external input which is conveyed into the computer from an outside source as a tape, for example. Terms four through fifteen enclosed in the { } brackets are the external inputs; these terms may be examined as follows: Let $$W = J_1 t_1 + J_2 t_2 + J_3 t_3 + J_4 t_4 + J_5 t_5 + J_6 t_6 + J_7 t_7 + J_8 t_8 + J_9 t_9 + J_{10} t_{10} + J_{11} t_{11} + J_{12} t_{12}$$

Where:

$$J_1 = P_{21/32} G(\phi+\theta) I_{24} F_1' F_2' F_4' \quad \text{(a)}$$
$$J_2 = P_{21/32} G(\phi+\theta) I_{25} F_1' F_2' F_4' \quad \text{(b)}$$
$$J_3 = P_{21/32} G(\phi+\theta) I_{24} F_1 F_2' F_4' \quad \text{(c)}$$
$$J_4 = P_{21/32} G(\phi+\theta) I_{25} F_1 F_2' F_4' \quad \text{(d)}$$
$$J_5 = P_{21/32} G(\phi+\theta) I_{24} F_1' F_2 F_4' \quad \text{(e)}$$
$$J_6 = P_{21/32} G(\phi+\theta) I_{25} F_1' F_2 F_4' \quad \text{(f)}$$
$$J_7 = P_{21/32} G(\phi+\theta) I_{24} F_1 F_2 F_4' \quad \text{(g)}$$
$$J_8 = P_{21/32} G(\phi+\theta) I_{25} F_1 F_2 F_4' \quad \text{(h)}$$
$$J_9 = P_{21/32} G(\phi+\theta) I_{24} F_1' F_2' F_3' \quad \text{(i)}$$
$$J_{10} = P_{21/32} G(\phi+\theta) I_{25} F_1' F_2' F_3' \quad \text{(j)}$$
$$J_{11} = P_{21/32} G(\phi+\theta) I_{24} F_1 F_2' F_3' \quad \text{(k)}$$
$$J_{12} = P_{21/32} G(\phi+\theta) I_{25} F_1 F_2' F_3' \quad \text{(l)}$$

The external input voltages ($t$'s) are recorded at pulse times $P_{21}$ through $P_{26}$ in integrators $I_{24}$ and $I_{25}$ according to the foregoing logical equations. Between gaps 218 and 219, external inputs are entering integrator $I_{25}$ as governed by equations, (b), (d), (f).

After gap 219, the table has been resumed at $P_{32}I_{25}$ during which time the output of integrator $I_{25}$ is recorded onto the Z line. The next two pulse times ($P_1I_{26}$, $P_2I_{26}$) are shown and then gap 220.

At $P_{21}I_{26}$ time, the first external input is recorded onto the Z line because the originally recorded first external input is, at this time, in $Z_a$ flip-flop 229. The introduction of the first external input to the $Z_a$ flip-flop at $P_{21}I_{26}$ time may be seen from Figure 54c. This process follows from the third term in the logical equation for $Z_0$ i. e.

$$P_{21/32} P_{1/28} (K_2 + K_3' + K_4 + K_5' + K_6) Z_a G(\phi+\theta)$$

which states, essentially, that if it is pulse time interval $P_{21/32}$ and $P_{1/28}$ (i. e. $P_{21}$ through $P_{28}$ time) and it is not integrator 24 or 25 time $(K_2 + K_3' + K_4 + K_5' + K_6)$ and G is on and $(\phi+\theta)$ true (i. e. "compute" button down), then the digit triggering $Z_a$ flip-flop 229 will be recorded on the Z channel. And so this re-recording process continues re-recording each digit as it passes through $Z_a$ flip-flop 229 as the diagram indicates, between gaps 220 and 221.

Between gaps 221 and 222, the re-recording of a previously recorded integrator output is illustrated. For example, at $P_{32}I_{26}$ time, integrator 26 records its output onto the Z line. However, at $P_1I_{27}$ time, the previously recorded output of integrator 24 is re-recorded next to the output of integrator 26. This process is in accordance with the second term of the logical equation for $Z_0$ $(P_{1/20} Z_b G)(\phi+\theta)$ which states that during pulse times 1 through 20, when $(\phi+\theta)$ is true and the G flip-flop is on, the digit passing through $Z_b$ will be re-recorded onto the Z line. An illustration of how the process continues as governed by the foregoing logic is shown between gaps 222 and 223.

The arrangement of information on the Z line at $P_{32}I_{77}$ is especially noteworthy; at this time, even and odd numbered external inputs and integrator outputs have been recorded in two distinct groups. It is also noteworthy that not all octal integrator numbers (24 through 77) appear in a recorded group, the two groups being so arranged that the even numbers are together with one number missing and the odd numbers are together with one number missing.

The "1'" recorded onto the Z line at pulse time $P_{21}I_{24}$ is indicative of the fact that this is a new digit of the first external input and not merely a re-recorded digit from $Z_a$ flip-flop 229. Careful consideration of the third logical term of the $Z_0$ equation reveals that this term inhibits the re-recording of a digit from $Z_a$ when it is integrator 24 or integrator 25 time. The *new* digit (indicated by prime sign as 1', 2', etc.) of the external input is recorded in accordance with the previously mentioned supplementary equation $$J_1 = P_{21/32} G(\phi+\theta) I_{24} F_1' F_2' F_4'$$

which has already been explained.

No recordation of information from $Z_a$ occurs between $P_{21}I_{24}$ and $P_{26}I_{24}$ and between $P_{21}I_{25}$ and $P_{26}I_{25}$ because of the third logical expression in the logical equations shown in column 44. This expression is rewritten as $$P_{21/32} P_{1/28} (K_2 + K_3' + K_4 + K_5' + K_6) Z_a G(\phi+\theta)$$

Because of the operation of the flip-flops 159a and 163a shown in Figures 40 and 41, respectively, high voltages are simultaneously obtained from the plate of the right tubes in the flip-flop 159a and the plate of the left tube in the flip-flop 163a only during pulse positions 21 to 26 of each integrator. This is indicated by the expression $P_{21/32} P_{1/28}$.

As will be seen in Figure 42, integrator 24 differs from integrator 25 only in the configuration of flip-flop $K_1$. For both integrators, flip-flops $K_2$, $K_3$, $K_4$, $K_5$ and $K_6$ are in the same state of operation such that the right tubes of flip-flops $K_3$ and $K_5$ are cut off and the right tubes of flip-flops $K_2$, $K_4$ and $K_6$ are conducting. Thus, the operation of integrators 24 and 25 ($I_{24}$ and $I_{25}$) as distinguished from all other integrators can be expressed as an "and" expression $K_2' K_3 K_4' K_5 K_6'$. If any of the flip-flops is in a different state of operation than that given in the expression, $K_2' K_3 K_4' K_5 K_6'$, then neither integrator 24 ($I_{24}$) nor integrator 25 ($I_{25}$) is being presented for utilization. As a result, the "and" expression $K_2' K_3 K_4' K_5 K_6'$ can be converted into the "or" expression $(K_2 + K_3' + K_4 + K_5' + K_6)$ to distinguish integrators 24 and 25 ($I_{24}$ and $I_{25}$) from all other integrators.

By including the $Z_a$ term in the above logical expression, the marker pulses are recirculated without any change in position. This results from the fact that the $Z_a$ flip-flop receives information recorded in the Z channel after a delay of substantially 64 pulse positions, which corresponds to a delay of substantially 2 integrators. The $I_1'$ term in the above expression causes the marker pulse for each integrator, except the integrator being coded, to be inserted without any shift in position. The particular integrator designated as $I_1$ at any instant is determined by the closure of the switches shown in Figure 45. The marker pulse for the $I_1$ integrator is not included in the above expression since it is shifted in position every time that the G flip-flop is triggered into a true state during the coding operation.

During the coding of information into the Y, R, $L_1$ and $L_2$ channels, new information can be inserted into each channel only in a pulse position corresponding to the disposition of the marker pulse in the Z channel for the $I_1$ integrator. After the information has been inserted into a particular channel in the position corresponding to the marker pulse for the $I_1$ integrator, the marker pulse is shifted by one pulse position so that new coded information can be inserted into the channel. During the shift in the position of the marker pulse in the Z channel, the information previously inserted into the other channels is recirculated, as will be disclosed in detail hereafter.

The shift in the marker pulse may either be to the "right" or to the "left." When a shift is made to the "right," the marker pulse is moved from one pulse position in the Z channel to an earlier position. For example, if the marker pulse is initially in pulse position 16 of an integrator, a shift to the "right" would cause the marker pulse to be inserted in pulse position 15 of the integrator. In the above example, a shift to the "left" would cause the marker pulse to advance from pulse position 16 of the integrator being coded to pulse position 17 of the integrator.

The logical expression $GI_iZ\gamma'\phi'\theta'E'P_{32}'$ controls the shifting of the marker pulse to the right in the Z channel. The $\phi'\theta'$ term is included in the above expression to indicate that the shift in the marker pulse occurs during the time that the Y, R, $L_1$ and $L_2$ channels are being coded in accordance with a problem to be solved. The E' term is included to indicate that the marker pulses have already been inserted into the Z channel and that the coding operation is being performed. Because of the inclusion of the $\gamma'$ term, the shift in the marker pulse can occur only when the $\gamma$ switch shown in Figure 48 has not been operated to provide a relatively high voltage on the terminals of the switch. As previously disclosed, the operation of the $\gamma$ switch to make $\gamma$ true initiates a shift of the marker pulse one pulse position to the left. The $I_i$ term is included in the above expression to indicate that the shift of the marker pulse one pulse position to the right occurs only for the $I_i$ integrator—that is, for the integrator being coded.

Since the G term is included in the expression for shifting the marker pulse to the right in the Z channel, the marker pulse can be shifted only during the time that the G flip-flop becomes true. The G flip-flop becomes true after either the (0) button or the (1) button shown in Figure 52 has been depressed to insert the proper information in one of the channels in the pulse position corresponding to the position of the marker pulse in the Z channel for the $I_i$ integrator. The G flip-flop remains true for one cycle of operation after the depression of either the (0) button or the (1) button. Since the G flip-flop remains true for only one cycle of operation every time that the (0) button or the (1) button is depressed, the shift of the marker pulse in the Z channel for the $I_i$ integrator is limited to one pulse position at a time.

In order for the marker pulse to be shifted one pulse position to the right, either the $\alpha$ switch, the $\beta$ switch, the $\lambda_1$ switch or the $\lambda_2$ switch must be operated to provide a relatively high voltage on the terminals of the switch. These switches appear in Figure 48 and respectively control the coding of the Y, R, $L_1$ and $L_2$ channels. Since the operation of any one of these four switches is a prerequisite to the shift to the right of the marker pulse in the Z channel, no term relating to these switches need be included in the logical expression for the shift to the right of the marker pulse.

Because of the configuration $P_{32}'$ in the foregoing logical expression, the logical pulse cannot be shifted from pulse position 1 of an integrator to pulse position 32 of the immediately preceding integrator. For example, the marker pulse cannot be shifted from pulse position 1 of integrator 31 to pulse position 32 of integrator 30. The marker pulse does not have to be shifted from one integrator to another because a different marker pulse has been initially inserted into the Z channel for each integrator.

The actual shift of the marker pulse in the Z channel one pulse position to the right is accomplished by the Z flip-flop shown in Figure 28. Since the marker pulse initially recorded in the Z channel by the Z record head is delayed substantially 63 pulse positions before it is introduced to the Z flip-flop, it reaches the Z flip-flop substantially one pulse position before the wheel 36 has rotated through two integrators. This difference of one pulse period between the introduction of the marker pulse to the Z flip-flop and the rotation of the wheel 36 through two revolutions causes the marker pulse to be shifted to an earlier position than its previous position.

The shift of the marker pulse one position to the left in the Z channel is controlled by the expression $GI_i\gamma E'Z_bP_1'$. The functions performed by the G, $I_i$ and E' terms in the expression $GI_i\gamma E'Z_bP_1'$ are similar to those performed by the terms in the expression controlling the shift of the marker pulse to the right. The $\gamma$ term in the expression controlling the shift of the marker pulse to the left indicates that the marker pulse can be so shifted only when the $\gamma$ switch shown in Figure 48 is closed.

Because of the $P_1'$ term, the marker pulse cannot be shifted from pulse position 32 of one integrator to pulse position 1 of the integrator immediately following the first integrator. For example, the marker pulse cannot be shifted in the Z channel from pulse position 32 of integrator 31 to pulse position 1 of integrator 32. This shift is prevented because a marker pulse is already present in the second integrator, such as integrator 32 in the above example.

Since the marker pulse initially inserted by the Z record head in the Z channel is delayed by substantially 65 pulse positions before it reaches the $Z_b$ flip-flop shown in Figure 28, the inclusion of the term $Z_b$ in the above expression causes the marker pulse to be shifted one pulse position to the "left"—for example, from pulse position 16 of an integrator to pulse position 17 of the integrator. The marker pulse is shifted one pulse position to the "left" because a delay of 65 pulse positions in the introduction of the marker pulse to the $Z_b$ flip-flop constitutes a period one pulse position greater than the rotation of the wheel 36 through two integrators.

As will be seen from the logical equations in column 44 and from the above disclosure, recordation of information as the information passes by the $Z_r$ heads occurs only when the expression $Z_rG'(\phi+\theta)$ is true. This expression is true during the time that the analyzer is idling between computational cycles. The term $(\phi+\theta)$ in the above expression indicates that the analyzer has been placed in condition for computation and the term G' in the expression indicates that the analyzer is in a condition of idling. During idling, all of the information on the magnesium drum is recirculated without any change because the $Z_r$ read head is separated by substantially 1408 pulse positions from the record head in the Z channel. A delay of 1408 pulse positions corresponds to a rotation of the wheel 36 through each of the 32 integrators in the analyzer.

The "or" expression $(K_2+K_3'+K_4+K_5'+K_6)$ is shown as a diode network at the top of Figure 55. When any of the flip-flops is in the state of operation designated in the "or" expression, current flows through the diode connected to this flip-flop and through a resistance 191a in series with the diodes. This current causes a voltage to be produced across the resistance 191a. Because of the voltage produced across the resistance 191a, a relatively high voltage is applied to the cathode of a diode 192a to place the "and" network including the diode in a condition for operation. In this way, a relatively high voltage is applied to the cathode of the diode 192a during the presentation for utilization of all of the integrators except integrators 24 and 25 ($I_{24}$ and $I_{25}$).

The logical expression $GI_i'Z_a\phi'\theta'E'$ indicates that the marker pulses inserted into the Z channel at every 32 pulse positions will be recirculated without any shift in position at certain times. Because of the diode network represented by this expression, the marker pulse is recirculated in the Z channel without any change in position during the time that coded information is being inserted into the analyzer, as indicated by the $\phi'\theta$ term. Since the E proposition is not true, the recirculation of the marker pulse without a change in position occurs after the marker pulses have been initially inserted into the Z channel at 32 pulse intervals.

Furthermore, since the G proposition is true, the recirculation of the marker pulse without a shift in position occurs during the time that information is being inserted into one of the other channels for the pulse position corresponding to the marker pulse. As previously disclosed, the G flip-flop becomes true for one complete cycle of operation when either the (0) button or the (1) button shown in Figure 52 is depressed to insert information in one of the channels at a position in the channel corresponding to the position of the marker pulse.

As will also be seen from the above expression, no recordation of information is ever obtained from the $Z_c$ or $Z_{cm}$ flip-flops shown in Figure 29 as the information passes through these flip-flops. Except for the recordation of information from the $Z_r$ read head as indicated by the expression $Z_rG'(\phi+\theta)$, all of the recordation occurs as the information in the Z channel passes through the Z, $Z_a$ and $Z_b$ flip-flops shown in Figure 28. As previously disclosed, the expression $Z_rG'(\phi+\theta)$ controls the recirculation of information while the analyzer is idling between periods of computation.

After the proper information has been coded in all of the channels in accordance with the problem to be solved, the analyzer is ready to start a computation to obtain the solution of the mathematical problem represented by the coded information. Before the computation is initiated, the marker pulses in the Z channel are deleted by closing the "Clear Z" switch 269 shown in Figure 89. This switch is represented by the term "U" shown in Figure 28. Upon the depression of the "Clear Z" switch, the left tube in the $Z_m$ flip-flop is triggered into a state of non-conductivity so that $Z_m$ becomes false.

One pulse position after $Z_m$ becomes false, the Z flip-flop is triggered into its false state. At subsequent pulse positions, $Z_a$ and $Z_b$ become false. Since the Z, $Z_a$ and $Z_b$ flip-flops control the recordation of information in the Z channel during the periods that the analyzer is not computing or is not idling between periods of computation, the marker pulses are cleared from the Z channel. The "Clear Z" switch is then released as a preliminary step to preparing the analyzer for actual computation.

Consideration is now to be given to the remaining term in the logical equation for $Z_0$.

The term $P_{32}\phi'\theta'EG$ is a filling term by which pulses can be put into the $P_{32}$ pulse positions of each of the 44 integrators. This is done when $(\phi\theta')$ is true as it is during filling and when E is true as it is when the marker button 199 (Figure 48) is pressed down and when go flip-flop G is true. Furthermore when the condition $\phi'\theta'EG$ is true, the terms $(\phi+\theta)$, E' and G' are false; therefore all the other terms in the $Z_0$ expression will be false thus preventing any other pulses, excepting those at $P_{32}$ pulse positions, from being recorded.

Consider next the term $Z_a$, $G'\phi'\theta'$. This is essentially the "recopy" term for the marker pulses previously filled in by virtue of the preceding term discussed. As in the case of the foregoing term, it can be deduced that when $Z_aG'\phi'\theta'$ is true, all the other terms in the $Z_0$ logic are necessarily false because $(\phi'\theta')$ is true and the G' is true. $Z_aG'\phi'\theta'$ effects idling to maintain the markers which have been deleted by action of the erase head (not shown in Figures 54b through 54i); $Z_a$ flip-flop 229 re-records the erased markers back into position again.

*Logical nets of Z line*

Having completed the detailed discussion of the logical equation governing operation of the Z line, consider now the translation of this equation into a logical diode net. Figure 55 comprises a schematic representation of the associated circuitry. This is a "family tree" type of network as first discussed in conjunction with Figure 36, and will not be further described here. As will be seen in Figure 55, the various diodes are arranged in logical "and" and "or" networks in accordance with the logical equations expressed for $Z_0$ in column 44. The output lead to the Z record head is indicated by a lead extending towards the right in the middle of Figure 55.

*$L_1$ and $L_2$ address channels*

The logical expression for recording information in the $L_1$ channel is $$L_{10}=L_1(G'+\phi'\theta'E+\lambda_1')+X\lambda_1E'GZ_aI_i+L_1\lambda_1E'(Z_a'+I_i')$$

In the above expression, the term $L_{10}$ indicates that a relatively high level of magnetization is recorded in the $L_1$ channel. The term $L_1$ indicates that a signal of relatively high magnitude is picked up from the $L_1$ channel by the read head associated with the $L_1$ channel.

In order to initiate the coding of information into the $L_1$ channel, the switch 199 shown in Figure 48 is closed. When the switch 199 is closed, the term E in the above logical expression becomes true. Since the term $\phi'\theta'$ is true during the time that the filling operation is being performed, the expression $L_1\phi'\theta'E$ becomes true when a relatively high signal is inducted in the $L_1$ read head shown in Figure 10. In this way, information previously coded into the $L_1$ channel is recirculated without any change in position during the time that marker pulses are being inserted into the Z channel.

After a marker pulse has been inserted in pulse position 32 of an integrator, coding of the integrator in the $L_1$ channel is initiated. The coding is initiated by opening the switch 199 shown in Figure 48 to make E false and by operating the $\lambda_1$ switch shown in Figure 48 to make $\lambda_1$ true. The coding of information in each pulse position is controlled by the operation of the (0) button and (1) button shown in Figure 52. When the (1) button is depressed, the right tube in the X flip-flop shown in Figure 52 is triggered into a state of non-conductivity so that X becomes true. Upon the closure of the (1) button shown in Figure 52, the $G_1$ flip-flop shown in Figure 49 also becomes true. Since the operation of the G flip-flop shown in Figure 49 is dependent upon the operation of the $G_1$ flip-flop, the G flip-flop becomes true at pulse position 28 ($P_{28}$) of integrator 24 ($I_{24}$) in the cycle following that in which the flip-flop $G_1$ became true. The G flip-flop remains true during the rotation of the wheel 36 through each of the 32 integrators in the analyzer.

As previously disclosed, the term $I_i$ designates the integrator being coded, as determined by the closure of a particular combination of the switches shown in Figure 45. Since $\lambda_1$ has been initially made true, all of the terms in the expression $X\lambda_1E'GZ_aI_i$ became simultaneously true at the instant that $Z_a$ becomes true. As previously disclosed, $Z_a$ becomes true at the pulse position that the marker pulse appears in the Z channel. At this pulse position, a relatively high level of magnetization is induced in the $L_1$ channel to indicate that the (1) button has been depressed.

When the (0) button is depressed, the X flip-flop does not become true. This prevents a relatively high level of magnetization from being induced in the $L_1$ channel at the position corresponding to that in which the marker pulse appears in the Z channel. The relatively low level of magnetization inserted into the $L_1$ channel at this pulse position indicates that the (0) button has been closed for the position.

During the time that the switch controlling E is open and the $\lambda_1$ switch has been operated to make $\lambda_1$ true, the information previously inserted into the $L_1$ channel is recirculated without change in position in accordance with the expression $L_1\lambda_1E'(Z_a'+I_i')$. Because of the inclusion of the term $Z_a'$ in the expression, the information in the $L_1$ channel is recirculated for every pulse position except those in which marker pulses appear in the Z channel. Since the marker pulse appears in one pulse position in the Z channel for each integrator, the information in the pulse position coinciding with the marker pulse for all of the integrators except that being coded would be eliminated without the inclusion of the $I_i'$ term. Because of the inclusion of the $I_i'$ term, the information in the $L_1$ channel for each integrator except the integrator being coded is recirculated for the pulse position corresponding to the appearance of the marker pulse in the Z channel for the particular integrator. In this way, recirculation is obtained for every pulse position except that controlled by the expression $X\lambda_1E'GZ_aI_i$.

As previously disclosed, a short period may result between the closure of either the (0) button or the (1) button and the triggering of the G flip-flop into a true state. This short delay results from the fact that the G flip-flop can become true only upon the presentation of pulse position 28 of integrator 24 for utilization after either the (0) button or the (1) button has been depressed. During the partial cycle in which the G flip-flop remains false after the depression of either the (1) button or the (0) button, the information in the $L_1$ channel is recirculated in accordance with the expression $L_1G'$. The expression $L_1G'$ also causes the information in the $L_1$ channel to be recirculated during such times as the analyzer is idling between periods of actual computation. The information is recirculated during such periods since G is false while the analyzer is idling.

At all times in which the $\lambda_1$ button is not closed, the information in the $L_1$ channel is recirculated in accordance with the expression $L_1\lambda_1'$. Because of the $L_1\lambda_1'$ expression, recirculation of the information in the $L_1$ channel takes place during the time that any of the other channels is being recorded. Thus, the information in the $L_1$ channel will be recirculated during the time that either the $L_2$, Y or R channels is being recorded. Recirculation of the information in the $L_1$ channel in accordance with the $L_1\lambda_1'$ expression also occurs during the time that the actual computation of a problem is proceeding.

The logical equation controlling the recording of information into the $L_2$ channel is similar to that disclosed above for the $L_1$ channel. The logical equation for the $L_2$ channel is as follows:

$$L_{20}=L_2(G'+\phi'\theta'E+\lambda_2')+X\lambda_2E'GZ_aI_i+L_2\lambda_2E'(Z_a'+I_i')$$

*Start flip-flop*

Before discussing the Y and R channels whose word structures were discussed in the explanations accompanying Figure 12, consideration must be given to the "S" or "start cycle flip-flop." The function of start flip-flop S is to define the length of a number appearing in the Y channel of an integrator.

Figure 56 is a block diagram of start cycle flip-flop S, together with its logical input equations.

The start pulse is the first effective pulse appearing in an integrator; this pulse serves to trigger the start flip-flop S to a true state as the logical equation: $s=YS'C$ states. In other words, when the start flip-flop is off and the first pulse appears in the Y channel of an integrator, the coincident clock pulse will trigger start flip-flop S on.

Since all operations on Y and R values during computation must occur only while start flip-flop S is on, S is, accordingly, not triggered off until the effective end of an integrator. The equation for triggering S to false state (i. e. $_0s=(F_3+I_{24})F_2F_4F_5C$) means that this triggering action occurs at pulse times $P_{31}$ and $P_{32}$ (as logical terms $F_2F_3F_4F_5$ states) for any integrator or at pulse times $P_{27}$, $P_{28}$, $P_{31}$, and $P_{32}$ for integrator $I_{24}$. Integrator $I_{24}$ has been shortened by four pulses for special purposes to be discussed later.

*Y channel*

Information is recorded in the Y channel in accordance with the following logical equation:

$$Y_0=(YB_1D_1+YB_1'D_1'+Y'B_1D_1'+Y'B_1'D_1)SG(\phi+\theta)+YS'(\phi+\theta)+Y(G'+\phi'\theta'E)+X\alpha E'GZ_aI_i+Y\alpha E'(Z_a'+I_i')+Y\alpha'\phi'\theta'E'$$

In the foregoing logical equation, the term $Y_0$ indicates that a magnetic pulse of relatively high amplitude is being recorded by the Y record head shown in Figure 10. The term Y indicates that a relatively high signal is being produced in the Y read head shown in Figure 10.

As will be seen, the term $Y\phi'\theta'E$ is similar to a term discussed above in connection with the $L_1$ channel. As such, the term controls the recirculation of information in the Y channel during the insertion of the marker pulse in the Z channel for the coding of information into the analyzer. The term $X\alpha E'GZ_aI_i$ corresponds to a similar term discussed above in connection with the $L_1$ channel and controls the insertion of new information into the Y channel during the coding operation. The $\alpha$ term is included in the expression since it indicates the switch shown in Figure 48 for controlling the coding of the Y channel.

In accordance with the term $Y\alpha E'(Z_a'+I_i')$, information previously inserted into the Y channel is recirculated during the coding operation. This expression corresponds to a similar expression in the logical equation for the $L_1$ channel. In like manner, the expression $YG'$ provides for the recirculation of information in the Y channel during the coding operation. Specifically the $YG'$ expression insures that the information in the Y channel will be recirculated after either the (0) button or the (1) button shown in Figure 52 is depressed, but before the G flip-flop becomes true. The expression $YG'$ also provides for the recirculation of the information in the Y channel during the time that the analyzer is idling between periods of actual computation.

The expression $Y\alpha'\phi'\theta'E'$ provides for the recirculation of information during the time that information is being coded into a different channel than the Y channel. The expression is somewhat similar to an expression included in the equation for coding the $L_1$ channel, except that the term $\phi'\theta'$ has been included as a part of the expression. The $\phi'\theta'$ term has been included so that information will be recirculated only during the coding operation and not during the actual computation of a problem. The information is not recirculated during the actual computation of a problem since the information in the Y channel for each integrator may change after the integrator is presented for computation.

The functions of the expressions $$(YB_1D_1+YB_1'D_1'+Y'B_1'D_1'+Y'B_1'D_1)SG(\phi+\theta)+YS'(\phi+\theta)$$

forming a part of the logical equation for $Y_0$ will be discussed in detail hereinafter.

*R channel*

The equation for recording pulses onto the R channel i. e.

$$R_0=QSG(\phi+\theta)+RS'(\phi+\theta)+R(G'+\phi'\theta'E)+X\beta E'GZ_aI_i+R\beta E'(Z_a'+I_i')+R\beta'\phi'\theta'E'$$

is analogous to the previously discussed equation for the Y channel except R appears in place of Y and $\beta$ or "fill R channel" appears in place of $\alpha$.

The first term $QSG(\phi+\theta)$ means that a pulse is recorded on the R channel during computation $(\phi+\theta)$ when the Q proposition (to be discussed later) is true, start flip-flop S is on and go flip-flop G is on.

This completes the discussion of logical equations defining outputs to the memory (i. e. $Z_0$, $L_{20}$, $L_{10}$, $Y_0$ and $R_0$). It is to be noted that the terms in these equations represent an instantaneous recording condition and not merely a flip-flop triggering action as distinguished from other logical equations discussed.

The "family tree" type of diode network for the R channel is illustrated schematically in Figure 57. Also included in this diagram is the circuitry for the $L_1$, $L_2$ and Y channels. It is to be noted that some diodes serve a multiple function entering into nets derived from at least two different equations; such diode networks provide a "time sharing" effect. The "and" network $G_{Dr}(\phi+\theta)$ shown enclosed in dotted box 234a is common to the logical network shown in Figure 55e as well as to the logical network shown in Figure 57. The subscript "Dr," $G_{Dr}$, for example, means the output from a driver circuit and, for logical purposes, is synonymous with G. Roman numeral II indicates connection of the network shown in Figure 57 with the network shown in Figure 55.

Z channel delay flip-flops

In the discussion of the precessing Z line (see Figure 54a through 54i), it was shown how a magnetic pattern, resulting from an integrator output, when passing under a read head initiated the triggering of an appropriate flip-flop such as $Z_b$ or $Z_c$ so as to effect re-recording of this magnetic information at a new location on the Z line. The description now concerns itself with integrator outputs which are not in position to trigger the $Z_b$ or $Z_c$ flip-flops during the integrator time of sensing.

For example, it may be desired for an integrator to obtain output information from integrators preceding it by two, three or five integrator times. In order to achieve this result in accordance with previously discussed methods, the desired output would necessarily have to be triggering the $Z_b$ or $Z_c$ flip-flops during the integrator time one preceding the integrator for which the output is coded. Study of the diagram consisting of Figures 54a through 54i will reveal the following:

(1) Flip-flop $Z_b$ reads what has been recorded two integrator times plus one pulse time previous.

(2) Flip-flop $Z_c$ reads what has been recorded five integrator times plus two pulse times previous.

Figure 58 is a block diagram for illustrating why the outputs of integrators $I_{m-2}$, $I_{m-3}$, and $I_{m-5}$, representing the second, third and fifth previous integrators, respectively, to an integrator $I_m$, have to be obtained from the $Z_f$, $Z_g$ and $Z_h$ delay flip-flops, respectively. The row 226 of rectangular blocks, labeled $I_m$ through $I_{m-10}$, indicates relative orientation of these integrators on the periphery of drum wheel 36. The reason why integrator $I_{m-10}$ follows integrator $I_{m-7}$ is, of course, that the integrators are assigned octal numbers. Direction of rotation of drum wheel 36 is indicated by arrow 217a.

Row 226a is a diagrammatic representation of the Z channel at time $t_1$ when Z record head 217 is recording information between pulse time $P_{32}$ of integrator $I_{m-2}$ and pulse time $P_1$ of integrator $I_{m-1}$. Relative positions of recorded integrator outputs, indicated by rectangles 226b are shown as well as Z record head 217, $Z_b$ flip-flop 230 and $Z_c$ flip-flop 232. During the integrator time following that for which Figure 58 is drawn, inputs for integrator $I_m$ will be sensed. Study of row 226a will reveal that an output ($m$–4) of integrator $I_{m-4}$ will be available to integrator $I_m$ at pulse time $P_1$ of integrator $I_{m-1}$ when an output of integrator $I_{m-4}$ will be read by $Z_b$ flip-flop 230. The output of integrator $I_{m-4}$ is available to integrator $I_m$ at pulse time $P_1$ of integrator $I_{m-1}$; the $dy$ address is offset one integrator space so that it comes through the recirculation circuits just ahead of the integrator to which it applies. It is to be noted that none of the integrator outputs $m$–1, $m$–2, $m$–3 or $m$–5 will be in position sufficient to trigger $Z_b$ flip-flop 230 or $Z_c$ flip-flop 232 during integrator $I_{m-1}$ time. In fact, an output of integrator $I_{m-1}$ is never made available to integrator $I_m$.

Rows 226c, 226d, and 226e consist of adjacent blocks indicating the state of the $Z_f$, $Z_g$, and $Z_h$ flip-flops, respectively, for the integrator times heading each vertical column. For example, during integrator $I_{m-1}$ time, flip-flop $Z_f$ if in a state ($m$–2) governed by an output of integrator $I_{m-2}$, flip-flop $Z_g$ is in a state ($m$–3) governed by an output of integrator $I_{m-3}$. Thus it is apparent that at the end of each integrator time (pulse time $P_{32}$), flip-flop $Z_f$ is tirggered according to the output of the integrator. Furthermore at the end of each integrator time (pulse time $P_{32}$), the integrator output formerly stored in flip-flop $Z_f$ is transferred to flip-flop $Z_g$. Therefore during integrator $I_{m-1}$ time, flip-flop $Z_f$ is in a configuration which corresponds to an output of integrator $I_{m-2}$ and flip-flop $Z_g$ is in a configuration which corresponds to an output of integrator $I_{m-3}$.

It is to be noted that the blocks representing states of flip-flop $Z_h$ are shifted one-pulse time with respect to the other blocks. The reason for this representation is that flip-flop $Z_h$ is triggered at end of pulse time $P_1$ in accordance with a configuration of flip-flop $Z_b$. At the particular time $t_1$ for which Figure 58 is drawn, flip-flops $Z_f$ and $Z_g$ are in a transition state between two configurations as shaded portions 226f indicate. The output $m$–4 of integrator $I_{m-4}$ has been made available to integrator $I_m$ as previously described; outputs $m$–2, $m$–3 and $m$–5 are available to integrator $I_m$ when the increments for $I_m$ are being determined during the time that $I_{m-1}$ has been made available for utilization. The configuration of $Z_h$ is available at pulse time $P_1$, after which time flip-flop $Z_h$ is in a configuration governed by the output of a preceding integrator until pulse time $P_1$. As will be disclosed subsequently, the outputs from each of the $Z_f$, $Z_g$ and $Z_h$ flip-flops pass through a $Z_j$ driver. The $Z_j$ driver makes these outputs available to the $\Sigma dy$ counter 129 at predetermined pulse positions in each integrator to determine whether increments in the dependent quantity $y$ for the integrator are positive or negative.

The output of integrator $I_{m-2}$ is made available to integrator $I_m$ by the Z channel output delay flip-flop $Z_f$ which is triggered in accordance with the following logic:

$$z_f = (RD'_2 + R'D_2 + I_{24})P_{32}(\phi+\theta)GC$$

$$_0z_f = (RD_2 + R'D'_2)(K_1 + K_2 + K_3' + K_4 + K_5' + K_6)P_{32}G(\phi+\theta)C$$

It should be noted that the expression for triggering $Z_f$ true is the same as the first term in the logical equation for $Z_0$ with the exception that it includes clock pulse "C." A clock pulse C is necessary when triggering a flip-flop.

The expression for triggering $Z_f$ false (i. e. $_0z_f$) accounts for all those cases not covered by the equation for $Z_f$ (i. e. combinations $RD_2$ or $R'D_2'$ when no output occurs and $K_1 + K_2 + K_3' + K_4 + K_5' + K_6$ which means $I_{24}'$ (not integrator 24 time) as a study of the table in Figure 42 will reveal.

The output of integrator $I_{m-3}$ is made available to integrator $I_m$ by Z line delay flip-flop $Z_g$ as governed by the logical equations;

$$z_g = P_{32}G(\phi+\theta)Z_fC$$

$$_0z_g = P_{32}G(\phi+\theta)Z_f'C$$

This equation is triggered "true" at pulse time $P_{32}$ when G flip-flop is true, "compute" proposition ($\phi+\theta$) is high and flip-flop $Z_f$ is high and, of course, a clock pulse C is coincident; it is triggered false when flip-flop $Z_f$ is false at $P_{32}$ pulse time, G flip-flop is true and a clock pulse C is coincident.

As previously stated, the output of integrator $I_{m-4}$ is available because of its triggering of the $Z_b$ flip-flop.

The output of $I_{m-5}$ is rendered available as a result of the logic controlling the $Z_h$ flip-flop:

$$z_h = F_1'F_2'F_3'F_4'F_5'Z_bC = P_1Z_bC$$

$$_0z_h = F_1'F_2'F_3'F_4'F_5'Z'_bC = P_1Z_b'C$$

Thus at pulse time $P_1$ when flip-flop $Z_b$ is true and a clock pulse C occurs, flip-flop $Z_h$ is triggered true; at pulse time $P_1$ when flip-flop $Z_b$ is false and a clock pulse C occurs, flip-flop $Z_h$ is triggered false.

The $Z_h$, $Z_f$, and $Z_g$ flip-flops along with $Z_c$ flip-flop are used in driving the logical proposition $Z_j'$, the equation governing this action being:

$$Z_j = F_1'F_2'F_3'F_4'F_5'Z_h + F_1'F_2'F_3F_4'F_5Z_f +$$
$$F_1F_2'F_3F_4'F_5Z_g + (F_2 + F_4 + [F_3' + F_5'][F_1 + F_3 + F_5])Z_c$$
$$= P_1Z_h + P_{21}Z_f + P_{22}Z_g + (P_1 + P_{21} + P_{22})'Z_c$$

Thus $Z_j$ proposition is true if $Z_h$ flip-flop is true at pulse time $P_1$ or if $Z_f$ flip-flop is true at pulse time $P_{21}$ or if $Z_g$ flip-flop is true at pulse time $P_{22}$ or if $Z_c$ flip-flop is true at any other pulse times. Proposition $Z_j'$ is obtained from a driver circuit (see Figure 47) driven by the logical expression for $Z_j$; $Z_j$ proposition is obtained by conveying $Z_j'$ proposition to the grid of another driver circuit i. e. the $Z_j$ driver.

The family tree type diode network comprising the logic of the Z channel delay flip-flops is presented in schematic form in Figure 59. Roman numerals I, III and IV are provided which correspond to similar numerals shown in Figure 55. These numerals indicate how output voltages from the network shown in Figure 55 are applied to input terminals of the network shown in Figure 59.

*Σdy counter*

The function of Σ$dy$ counters (128 and 129) as shown in the block diagram of Figure 20 will now be described. These two counters, identical except that 129 is associated with $L_1$ address channel and 128 is associated with $L_2$ address channel, serve to identify information in $Z_j$ and $Z_b$ flip-flops coming into coincidence with the $L_1$ and $L_2$ pulses, respectively, and count this information (represented by block 130) from whence the information is added into Σ$dy$ register and stepper 131.

Briefly, a Σ$dy$ counter is a logical, four-stage, add-subtract counter; during each integrator time, a Σ$dy$ counter receives information from all integrators whose outputs have been coded as consecutive inputs to a succeeding integrator, stores the algebraic count of these outputs (any number up through a positive maximum of $+7$ or down through a negative maximum of $-8$) and steps this information into the Σ$dl$ register 131 in preparation for changing the Y value of the succeeding integrator.

For example, when it is desired to code the outputs of one or more integrators as the inputs to a single integrator ($I_j$), code pulses are placed in the $L_1$ or $L_2$ channel of $I_{j-1}$, where, at pulse times determined by the precessing Z line the outputs of the desired integrators will be found. These outputs will appear either in the $Z_b$ flip-flop in the case of code pulses in $L_2$ channel, or in the $Z_j$ driver in the case of code pulses in $L_1$ channel.

The logical equation defining the $Z_j$ driver is, as mentioned previously in the discussion of the Z channel delay flip-flops (see Figure 59), $Z_j = P_1Z_h + P_{21}Z_f + P_{22}Z_g + (P_1 + P_{21} + P_{22})'Z_c$.

(The term $(P_1 + P_{21} + P_{22})'Z_c$ is synonymous with $(F_2 + F_4 + [F_3' + F_5'][F_1 + F_2 + F_5])Z_c$.)

Thus when the $L_1$ channel is used for an address, a Σ$dy$ counter ($A_1$ through $A_4$) will be required to scan the $Z_c$ flip-flop at all times during the pulse time interval $P_{1/28}$, except at pulse times $P_1$, $P_{21}$ and $P_{22}$ when the outputs of integrators $I_{j-5}$, $I_{j-2}$, and $I_{j-3}$ will be found in flip-flop $Z_h$, $Z_f$ and $Z_g$, respectively.

Figures 60, 62:
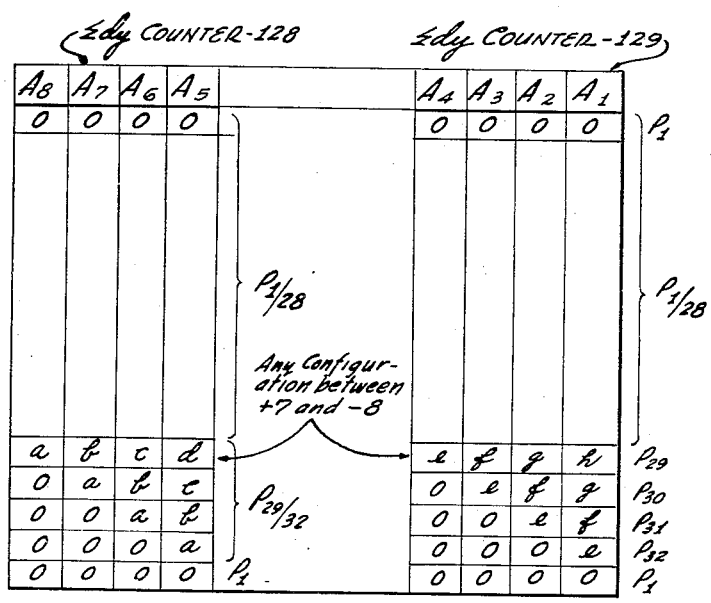
Figure 60 is a table illustrating the counting operation of a $\Sigma dy$ counter.
Figure 62 is a table illustrating the stepping operation of the binary number contained within the $\Sigma dy$ counter.

Since the operation of Σ$dy$ counters 128 and 129 are identical, only one of the two will be discussed in detail. Consider Σ$dy$ counter 129, associated with $L_1$ address channel. This counter includes four flip-flops, $A_1$, $A_2$, $A_3$, and $A_4$. However, only the first three flip-flops are effective counting stages. The $A_4$ flip-flop represents the sign of the number contained in the previous three flip-flops. As shown in Figure 60, a positive content of the Σ$dy$ counter is represented by a "0" in the $A_4$ flip-flop; and a negative content of a Σ$dy$ counter is represented by a "1" in the $A_4$ flip-flop. The zero content and the positive counting of a Σ$dy$ counter is represented in a conventional binary manner. Minus one is represented by "1" in all the flip-flops.

As shown by the truth table comprising Figure 60, Σ$dy$ counter 129 changes by a count of $+1$ or $-1$ whenever there is a pulse or no pulse, respectively, in the $L_1$ channel during pulse time interval $P_{1/28}$ which is indicated by a true state of the $L_1$ flip-flop in that interval. The change of the counter will be $+1$ if the output of the integrator designated by the position of the $L_1$ address pulse was $+1$ ($Z_j$ proposition true) and $-1$ if said output was $-1$ ($Z_j'$ proposition true). The counter can accumulate up to seven consecutive positive inputs from the zero configuration, and likewise up to eight consecutive negative inputs. If the counter should overflow in either a plus or a minus direction, the result will be meaningless.

Since the least significant digit as governed by the $A_1$ flip-flop must change state everytime an address pulse $L_1$ is received from magnetic wheel 36, the logical equations $$a_1 = P_{1/28}L_1A_1'C$$
$$_0a_1 = P_{1/28}L_1A_1C$$

are sufficient to govern the first stage.

The input equations for the remaining A flip-flops are derived, in general, according to the scheme outlined for the P counter 122, i. e., by referring to the table of the binary indications of the A flip-flops as shown in Figure 60, and noting what the states are of the previous flip-flops as well as the state of the flip-flop undergoing consideration. For example, when going in the positive direction ($Z_j$), $A_2$ must change to 1 when it is zero itself and $A_1$ is 1, and when going in the negative direction ($Z_j'$), $A_2$ must change to 1 when both $A_1$ and $A_2$ are zero. Upon receiving a plus count ($Z_j$), flip-flop $A_2$ must change to zero when $A_1$ and $A_2$ are both 1, and upon receiving a minus count ($Z_j'$), flip-flop $A_2$ must change to zero when $A_1$ is zero and $A_2$ itself is one. The equations describing this action are:

$$a_2 = P_{1/28}L_1(A_1A_2'Z_j + A_1'A_2'Z_j')C$$
$$_0a_2 = P_{1/28}L_1(A_1A_2Z_j + A_1'A_2Z_j')C$$

The foregoing are the equations necessary to describe the actions of flip-flop $A_2$ during pulse time interval $P_{1/28}$. The action during pulse time interval $P_{29/32}$ will be discussed later.

The equations for flip-flops $A_3$ and $A_4$ are similarly derived from the truth table comprising Figure 60.

$$a_3 = P_{1/28}L_1(A_1A_2A_3'Z_j + A_1'A_2'A_3'Z_j')C$$
$$_0a_3 = P_{1/28}(L_1(A_1A_2A_3Z_j + A_1'A_2'A_3Z_j')C$$
$$a_4 = P_{1/28}L_1A_1'A_2'A_3'A_4'Z_j'C$$
$$_0a_4 = (L_1A_1A_2A_3A_4Z_j)C$$

The block diagram comprising Figure 61 illustrates, according to the previously established convention, flip-flops $A_1$ through $A_4$ and their corresponding logical equations.

At the completion of pulse time $P_{28}$ of integrator $I_j-1$, Σ$dy$ counter 129 will have attained a configuration which is the algebraic binary sum of the plus and minus inputs for which address pulses have been placed in the $L_1$ channel. It is to be noted that if the algebraic sum is a negative number, it is indicated as the true "ones" complement of the equivalent positive binary number. Now, during the pulse time interval $P_{29/32}$, the algebraic sum configuration is stepped serially from Σ$dy$ counter 129, least significant digit first, combined with contents of Σ$dy$ counter 128 (flip-flops $A_5$ through $A_8$) and thence conveyed into Σ$dy$ register 131.

This stepping operation, as illustrated by Figure 62, causes the binary number contained in the Σ$dy$ counter flip-flops to "step" or shift bodily within the counter, stage by stage, in the direction of the least significant digit; this action occurs during pulse times $P_{29}$ through $P_{32}$.

As shown in Figure 62, during pulse times $P_{1/28}$, $dy$ counter 128, associated with $L_2$ address channel and $\Sigma dy$ counter 129, associated with $L_1$ address channel change from a "zero" configuration to configurations $a$, $b$, $c$, $d$, and $e$, $f$, $g$, $h$, respectively, representing the $dy$ inputs to be added into $\Sigma dy$ register 131. The equivalent decimal values of these configurations can be any number between $+7$ and $-8$, as Figure 60 indicates. Since the $dy$ counter contains three stages, it is shown that the counter must be stepped three times in order to place the digit of stage $A_4$ into stage $A_1$.

Consider a general configuration $efgh$ at pulse time $P_{29}$ in $\Sigma dy$ counter 129 as Figure 62 illustrates. In accordance with the equation $_0a_4 = P_{29/32}C$, flip-flop $A_4$ resets to zero in order to be ready for pulse time interval $P_{1/28}$ of the next integrator. Simultaneously, the information in $\Sigma dy$ counter 129 stops in the direction of $A_1$ according to the logical equation:

$$a_3 = P_{29/32}A_4C$$
$$_0a_3 = P_{29/32}A'_4C$$
$$a_2 = P_{29/32}A_3C$$
$$_0a_2 = P_{29/32}A'_3C$$
$$a_1 = P_{29/32}A_2C$$
$$_0a_1 = P_{29/32}A'_2C$$

which means that each flip-flop in $\Sigma dy$ counter 129 attains the configuration that the next higher numbered flip-flop in the series had at the preceding pulse time. Referring to Figure 62, it will be noted that the information which was present in the counter in parallel form at pulse time $P_{29}$, has been stepped serially through $A_1$ for each succeeding pulse time in pulse time interval $P_{29/32}$.

The operation of $\Sigma dy$ counter 128 is identical with that of $\Sigma dy$ counter 129 just discussed except the flip-flops involved are designated $A_5$, $A_6$, $A_7$, $A_8$ instead of $A_1$, $A_2$, $A_3$, $A_4$. $\Sigma dy$ counter 128 is governed by the following logic:

1st stage
$$(A_5a_5 = P_{1/28}L_2A'_5 + P_{29/32}A_6)C$$
$\Sigma dy$ counter
$$(A'_{5\,0}a_5 = P_{1/28}L_2A_5 + P_{29/32}A'_6)C$$
2nd stage
$$(A_6a_6 = (P_{1/28}L_2A_5A'_6Z'_b +$$
$$P_{1/28}L_2A'_5A_6Z'_b + P_{29/32}A_7)C$$
$\Sigma dy$ counter
$$(A'_{6\,0}a_6 = (P_{1/28}L_2A_5A_6Z_b +$$
$$P_{1/28}L_2A'_5A'_6Z'_b + P_{29/32}A'_7)C$$
3rd stage
$$(A_7a_7 = (P_{1/28}L_2A_5A_6A'_7Z'_b +$$
$$P_{1/28}L_2A'_5A'_6A_7Z'_b + P_{29/32}A_8)C$$
$\Sigma dy$ counter
$$(A_{7\,0}a_7 = (P_{1/28}L_2A_5A_6A_7Z_b +$$
$$P_{1/28}L_2A'_5A'_6A'_7Z'_b + P_{29/32}A'_8)C$$
4th stage
$$(A_8a_8 = P_{1/28}L_2A'_5A'_6A'_7A'_8Z'_bC$$
$\Sigma dy$ counter
$$(A'_{8\,0}a_8 = (L_2A_5A_6A_7A_8Z_b + P_{29/32})C$$

The foregoing describes the various operations which are performed on a $\Sigma dy$ counter. The positive or negative counting operations occur during $P_1$ through $P_{28}$ pulse times; the stepping operation occurs during $P_{29}$ through $P_{32}$ pulse times; and the resetting operation is completed at the end of $P_{32}$ pulse time.

Thus in addition to provision for the transfer of $\Sigma dy$ counters 128 and 129 into $\Sigma dy$ register 131, provision for resetting is also included by stepping a zero from flip-flop $A_4$ at pulse time $P_{30}$ all the way through to flip-flop $A_1$ at pulse time $P_1$ of the next integrator.

$\Sigma dy$ counter logical network

The logical networks comprising $\Sigma dy$ counters 128 and 129 are shown in schematic form in Figure 63. This is the "family tree" type of circuitry previously discussed, yielding the desired inputs to the $A_1$ through $A_8$ flip-flops. For example, the solution of the $_0a_1$ input to the $A_1$ flip-flop is made up of the combination of a single counting equation common to positive and negative counting, and a stepping equation. With reference to Figure 63, it is seen that each of these terms $P_{1/28}L_1A_1$, $P_{29/32}A'_2$ are solved independently, the solution $P_{1/28}L_1A_1$ being contained within the bounds of dotted box $\beta_1$, and the solution $P_{29/32}A'_2$ being contained within dotted bounds of box $B_2$. Essentially both of these circuits are of the logical product type (see Figure 19).

The remaining equations controlling the operation of $\Sigma dy$ counters 128 and 129 are physically solved in a similar manner by the logical net shown in Figure 63. Numeral VI indicates connection to $\Sigma dy$ register and stepper 131 shown in Figure 72.

$\Sigma dy$ register

As previously disclosed the $\Sigma dy$ counter 128 operates during pulse positions 1 to 28 for an integrator to determine the increments in the dependent quantity $y$ for the following integrator in accordance with the code provided in the $L_1$ channel and the digital indications in the Z channel. The $\Sigma dy$ counter 129 operates in a similar manner in accordance with the code provided in the $L_2$ channel and the digital indications in the Z channel. After the counters have operated during pulse positions 1 to 28, inclusive, the adder 130 shown in Figure 20 operates during pulse positions 29 to 32, inclusive, to combine the determinations made by the counters 128 and 129. For example, if the counter 128 determines that an increment for a particular integrator should be $+3$ and the counter 129 determines that an increment should be $+2$, the adder would obtain a resultant increment of $+5$ by arithmetically combining $+3$ and $+2$. Similarly, if the counters 128 and 129 made respective determinations of $+3$ and $-2$, the adder 130 would obtain a resultant increment of $+1$.

The determinations made by the adder 130 as to the total increment in the dependent quantity $y$ for a particular integrator are transferred to the register 131 so as to be available for utilization at pulse position 1 of the integrator. The register holds such determinations until the start pulse S for the integrator is presented for utilization. The total $\Sigma dy$ increment in the register 131 is then stepped into the $Y + \Sigma dy$ adder 125 shown in Figure 20 for combination with the indications of $Y$ for the integrator as these indications appear in the $y$ channel.

Figure 65:
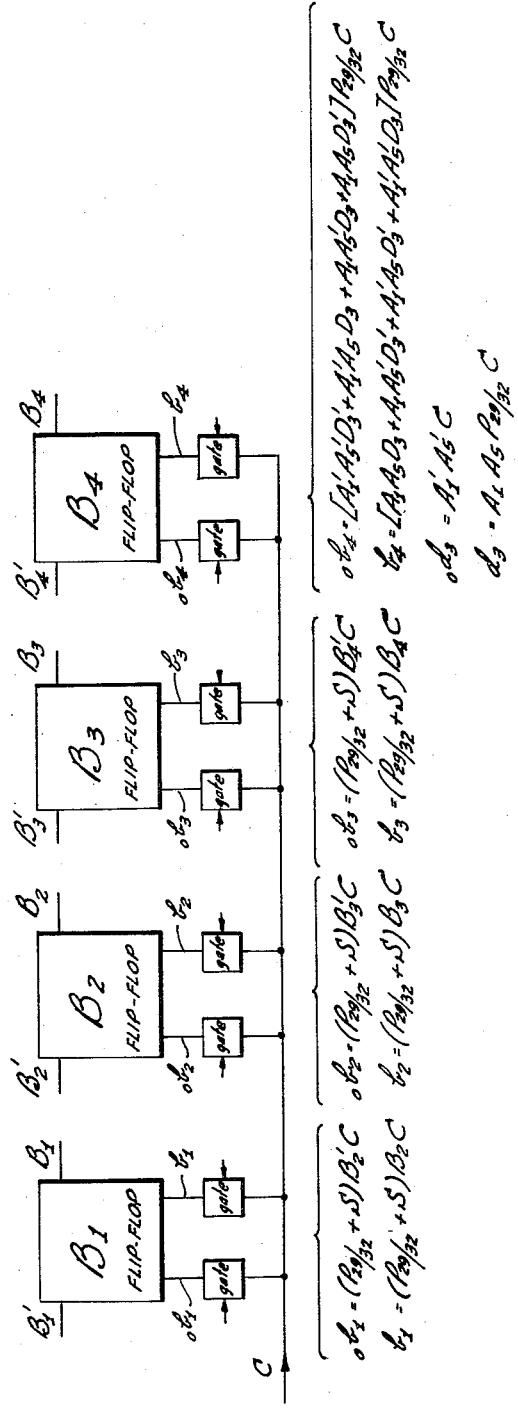
Figure 65 is a schematic-block diagram of the $\Sigma dy$ register, including logical input equations.

The table comprising Figure 64 shows how the information $a$, $b$, $c$, $d$, in $\Sigma dy$ counter 128 is added to the information $e$, $f$, $g$, $h$ in $\Sigma dy$ counter 129 during pulse times $P_{29}$ through $P_{32}$. Pulse times $P_{29}$ through $P_{32}$ shown in Figure 64 are simultaneous with pulse times $P_{29}$ through $P_{32}$ shown in Figure 62. The sum of the numbers in the $\Sigma dy$ counters is represented by $i$, $j$, $k$, $l$ of which $i$ represents the sign. At pulse time $P_{29}$, flip-flops $B_1$ through $B$ are in "$\eta$" configuration, "$\eta$" representing the sign of the sum of 2 numbers in the $\Sigma dy$ counters which were added together during the previous computational cycle. The adding and stepping process continues as the logical equations in Figure 65 indicate and as shown in the table of Figure 64. Figure 65 is a block diagram of the $\Sigma dy$ register, including logical equations of each stage and of carry flip-flops $P_3$ which will be discussed later.

Start pulse "S" can be positioned at any time between pulse times $P_1$ through $P_{29}$ so as to initiate stepping action into $Y + \Sigma dy$ adder 125. For example, in Figure 64, start pulse S is shown triggered true at the beginning of pulse time $P_{24}$. The digits then commence a stepping operation into $Y + \Sigma dy$ adder 125. At the conclusion of the effective stepping operation, at pulse time $P_{27}$, for example, the $\Sigma dy$ register is filled with the most significant digit $i$, representing the sign of the sum of the 2 numbers, the other digits having been stepped into $Y + \Sigma dy$ adder 125. Thus the $\Sigma dy$ register 131 has served to hold the total Σdy increment until a start pulse initiates stepping action into Y+Σdy adder.

Figure 72:
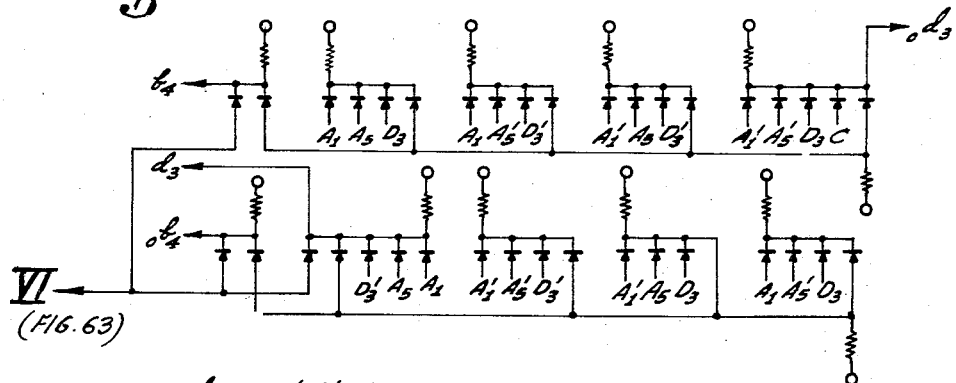
Figure 72 is a schematic diagram of logical diode networks which are associated with $D_3$ and $B_4$ flip-flops.

The "family tree" type of diode network derived from the foregoing logic is presented schematically in Figure 70. Triggering gates $_0b_4$ and $b_4$ for flip-flop $B_4$ are shown in Figure 72.

Y+Σdy adder

As study of Figure 20 will reveal, the next step after information has passed through Σdy register and stepper 131 is that the information is conveyed into Y+Σdy adder 125. Referring back to Figures 11, 12 and 13, the word structure of Y channel 51 is shown. The pulse positions of an integrator which are delegated to the y number are $P_2$ through $P_{31}$, except in the case of integrator 24 in which the range for the y number is $P_2$ through $P_{23}$. The sign position of the y number is always the $P_{31}$ pulse position. The $P_{32}$ pulse position is always blank.

It should be noted that the positive and negative binary numbers in Σdy register 131 are similar to that of the y number taken from wheel 36 except for the fact that a positive Σdy content is denoted by a zero, and a negative Σdy content is denoted by a one in the sign position flip-flop $B_4$.

Figure 66 is a block diagram of the $D_1$ flip-flop which is used for delaying the carry, so that it can be combined with the following stage addition. The logical equations defining inputs to the $D_1$ flip-flop are presented below this block diagram: A pulse on the Y channel, coincident with a true state of $B_1$ flip-flop, a true state of start flip-flop S and a clock pulse C triggers $D_1$ flip-flop true. When no pulse is on Y (i. e. Y') and $B_1$ flip-flop is false and start flip-flop S is true or it is pulse time $P_{32}$, a coincident clock pulse C triggers flip-flop $D_1$ false.

Figure 67 is a schematic diagram of the diode gate circuits derived from the logical equations of Figure 66. Although the appearance of $D_1$ term 233 is extraneous in the equation, the invention has been wired in this manner to save diodes through a "diode sharing" arrangement (i. e. the term $Y'B_1D_1S$ appears in the expression for $Y_0$ also). In other words, inserting $D_1$ input 233 has not changed the logic of the equation $_0d_1=(Y'B_1'S+P_{23})C$.

The summation process is carried out within a logical diode network 234 comprising the Y+Σdy adder (see Figure 57). The addition process will now be explained with reference to Figure 68 in which is presented an example of how y=+7 is added to dy=−1, obtaining a result $y_0$=+6. As noted previously, the $P_{31}$ pulse position of the Y number represents its sign. A pulse therein (1) signifies the Y number is positive. For the example of Figure 68, $P_{26}$ pulse position (not shown) carries the start pulse and pulse positions $P_{27}$ through $P_{30}$ contain the Y number digits. The Y number is binary+7. The Σdy count is −1, represented by 1's in all the stages including the sign stage $B_4$ of Σdy register and stepper 131. This is because the sign convention of Σdy register 131 is opposite the sign convention of the Y number, i. e. a pulse (1) in the $B_4$ flip-flop signifies the Σdy register content is negative and a lack of a pulse (0) therein signifies the Σdy register content is positive. Adding corresponding digits, the result binary +6 is obtained for $Y_0$. It is to be noted that the content 235 of the $B_4$ stage of Σdy register 131 is, in effect, carried along and added to all subsequent stages of the Y number. Thus the $P_{31}$ position of the new y number ($y_0$=+6) is still positive as desired.

As further clarification of the manner in which Y=Σdy adder 125 adds, Figure 68 shows how y=−6 when added to dy=+2 yields $y_0$=−4. In this case, the binary word, representing −6 follows the convention for negative Y numbers. A zero in the $P_{31}$ pulse position shows the Y number to be negative. The Σdy register content is positive as shown by a zero in its fourth stage $B_4$. On summing the binary number there shown, the binary number −4 is obtained. In this case, as before, $P_{31}$ pulse position is added as an ordinary digit yielding a zero sum, indicating the binary number is negative.

From the truth table comprising Figure 69, the logical equations of logical diode network 234 (Figure 57) which make up Y+Σdy adder 125 were derived.

This truth table shows all the possible combinations of the states of flip-flops Y, $B_1$, and $D_1$. This task is easily accomplished by setting up a table of all the binary numbers that can be represented by three stages. Each stage is designated by one of the three flip-flop propositions. The eight rows of binary digits thus obtained are each summed and the resulting digit is placed in a column 236 designated "sum." Any carry digit thus derived is placed in adjacent column 237, designated "new carry."

Block 238 indicates the conditions existing when the $D_1$ flip-flop (Figure 66) which is the carry flip-flop for Y+Σdy adder 125 changes its state. It can be seen that the significant terms required for completely defining the inputs to the $D_1$ flip-flop are $_0d_1=(Y'B_1'S+P_{32})C$ and $d_1=YB_1SC$ because, as block 239 indicates, these terms trigger $D_1$ flip-flop to the proper state so as to achieve the correct answer as when adding the numbers 5+5=10, for example.

At the end of each integrator computation, defined by pulse time $P_{32}$, it is always desired to reset the $D_1$ flip-flop to a "false" state thus clearing it for the next computation. Hence the $_0d_1$ input equation defines this reset operation by a second product $P_{32}C$.

The equations from which the logical diode network 234 of Figure 57 which, together with the networks of Figure 67 comprises the Y+Σdy adder, were derived, resulted from the combinations of the states of the three inputs which render the "sum" proposition true, as shown by column 236 in Figure 69. Four such combinations are present; these combinations are recognized to be:

$$YB_1D_1+YB_1'D_1'+Y'B_1D_1'+Y'B_1'D_1$$

This proposition is a part of the first term in the logical equation for $Y_0$ which was discussed previously. Consequently when any one of the above four terms are true and S, G, ($\phi+\theta$) are also true, a pulse, representing a digit 1, is deposited onto the Y number channel of drum wheel 36.

As previously disclosed, the term ($\phi+\theta$) is true during the time that the analyzer is actually computing a problem. The G flip-flop is triggered into its true state at the beginning of the computing operation and is maintained in its true state throughout the actual period of computation. As will be disclosed in detail subsequently, the S flip-flop shown in Figure 56 is triggered into its true state by the first pulse in the Y channel for each integrator and is maintained in its true state until pulse position 31 of the integrator.

The S flip-flop is triggered into its true state because of the logical expression YS'C. This expression indicates that S becomes true for an integrator when a pulse first appears in the Y channel for the integrator at the time that S is in its false state. The S flip-flop is maintained in its true state because of the equation $$_0s=(F_3+I_{24})F_2F_4F_5C$$

As a result of the operation of the gate circuit constructed in accordance with this equation, S is triggered into its false state at pulse position 31 of every integrator except integrator 24 and at pulse position ($P_{28}$) of integrator ($I_{24}$).

A diode gate built in accordance with the expression YS'($\phi+\theta$) is associated with the Y channel to recirculate the start pulse in the Y channel for each integrator. This expression indicates that during the periods of computation any information in the Y channel is recirculated during the time that the S flip-flop is false. Since the S flip-flop is false only until the introduction of the start pulse for each integrator in the Y channel, the start pulse will be recirculated in accordance with this expression.

$\Sigma dy$ register net

The family tree type diode gate circuit comprising a portion of $\Sigma dy$ register 131 previously discussed is presented in schematic form in Figure 70. The inputs $b_4$ and $_0b_4$ are not shown here. They are presented later in Figure 72.

A discussion has not been given concerning the $D_3$ carry flip-flop in the $\Sigma dy$ transfer process. This flip-flop serves to delay any carrys occurring as a result of the addition and transfer of information from $\Sigma dy$ counters 128 and 129 into $\Sigma dy$ register and stepper 131 during pulse times $P_{29}$ through $P_{32}$, as indicated previously in Figure 64.

Figure 71:
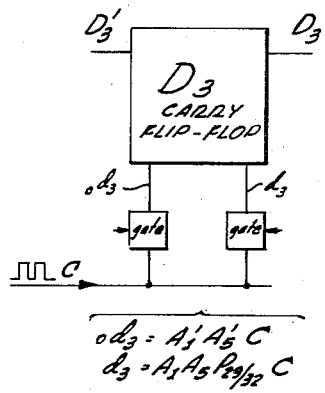
Figure 71 is a schematic-block diagram of the $D_3$ carry flip-flop.

Figure 71 is a block diagram of $D_3$ flip-flop, including corresponding input equations.

The translation of the logical equations from the $D_3$ and $B_4$ flip-flops into a family tree type of diode network is presented in schematic form in Figure 72. It is to be noted that Roman numeral VI connects to the logical circuit presented in Figure 63.

dx Selector counter

Having discussed the $dy$ address circuitry, the specification now turns to a discussion of the $dx$ address circuitry. As stated earlier in the specification, $dx$ counter 135 serves to sense or "pick-up" the binary number $dx$ contained in the $L_1$ or $L_2$ channel of an integrator; this pick up process occurs during pulse times $P_{29}$ through $P_{32}$. In the ensuing pulse times $P_1$ through $P_{28}$ of the next integrator time, the $dx$ counter counts downward from the binary number address it sensed, when binary one is reached, the condition of the proper Z flip-flop is gated through $dx$ coincidence circuit 134 into $dx$ counter 135. As Figure 20 indicates, the resulting information is gated into $dx$ register 124 at pulse time $P_{32}$ and $dx$ counter 135 is cleared in order to pick up the next $dx$ information.

Figure 73 is a block diagram drawn in the convention previously set forth in this specification and including the logical equations of $dx$ selector counter 133.

In order to gain an understanding of the preparation of the $dx$ selector counter 133, consider a specific example: in this particular problem, it is desired that integrator 44 use for its $dx$ address the output of integrator 42. In the $dy$ address section of integrator 44 (occurring in integrator 43), the integrator output position numbered 42 occurs in the $L_1$ channel at pulse time $P_{21}$. Therefore in the $dx$ address section of integrator 44 (occurring in the upper left-hand corner of block 42 on a coding chart) the binary number 21 is written (i. e. 10101) within the portion of a coding chart shown in Figure 74. The "one" shown encircled on the diagram indicates $L_1$ channel. A "zero" would have been used had the desired integrator output appeared in the $L_2$ channel.

Figure 75 is a table showing the logic which $dx$ selector counter 135 follows in counting down from binary 21 to binary 1, thus putting an output into $dx$ coincidence circuit 134 at pulse time $P_{21}$ of integrator $I_{43}$ as required. It is to be noted that the pulse time during which the counter reaches one is the binary $dx$ address with which an integrator is coded. As a further example, if integrator 57 were coded to pick up the $dx$ of integrator 74, $dx$ selector counter 133 would reach binary one at pulse time $P_{14}$.

During pulse times $P_1$ through $P_{28}$, when $dx$ selector counter 133 is in binary one configuration, namely $N_1'N_2'N_3'N_4'N_5$, the content of the $Z_j$ driver or the $Z_b$ flip-flop is gated into the $A_9$ flip-flop (shown in block diagram form in Figure 76), depending upon the configuration of the $N_6$ flip-flop at that time. Thus a coincidence is reached as indicated by block 134 in Figure 20 and as accomplished by circuit $\beta_3$ in Figure 78.

The $A_9$ flip-flop ($dx$ counter 135) is cleared at the end of each integrator time in accordance with the logical equation $_0a_9=P_{32}C$.

The $A_9$ flip-flop is used as a triggering device for the $B_5$ flip-flop, referred to as $dx$ register 124 in Figure 20 and illustrated in block diagram form, along with the logical input equations in Figure 77. When the $A_9$ flip-flop is cleared, the $B_5$ flip-flop receives information contained in the $A_9$ flip-flop at that time and $B_5$ contains this information for the following integrator time as governed by the logical equations;

$$b_5=P_{32}A_9C, \quad _0b_5=P_{32}A_9'C$$

Thus it has been shown that the $dx$ address consists of the binary notation of where the particular input information is found in the $dy$ address section for the same integrator. The $dx$ address is stepped into $dx$ counter 135 which counts off pulse times and causes $dx$ register 124 to observe the $dz$ outputs in flip-flops $Z_b$ and $Z_j$ at the proper instant to pick up the $dx$ input for the integrator undergoing consideration.

Figure 78 comprises a schematic diagram of logical gate circuits which serve to fulfill the logic just discussed; this is the previously discussed "family-tree" type of diode net. Line VII connects to K counter 138 as indicated in Figure 44.

$R \pm Y$ adder

As a study of Figure 20 will reveal, the next step in the information flow through the computer after having passed through $dx$ register 124 leads to $R \pm Y$ adder 123. As the name implies, the $R \pm Y$ adder serves to either add a Y number to an R number or to subtract a Y number from an R number. The $R \pm Y$ adder is based upon the following logical equation:

$$Q'=(YB'_5+Y'B_5)(RD_2+R'D'_2)+ \\ (YB_5+Y'B'_5)(R'D_2+RD_2')$$

The $Q'$ proposition is used as an input to a driver from which the proposition Q is obtained.

The $d_2$ and $_0d_2$ equations define logical inputs to the $D_2$ carry flip-flop of the $R \pm Y$ adder.

The Y number taken from drum wheel 36 is added stage by stage to the R number taken from same wheel 36. The Y number, the $dx$ input, and the $dy$ input can be either positive or negative in value.

In order to gain understanding of the meaning of the foregoing equations, a truth table will prove helpful. In such a table, it is necessary to include all possible values of R, Y, carry $D_2$ and also to indicate the state of the $B_5$ flip-flop (Figure 77) which governs whether or not $dx$ is positive or negative by virtue of its true state, or its false state, respectively.

Referring to Figure 79, possible combinations of R, Y and $D_2$ are shown by the binary numbers in the second, third, and fourth columns, respectively, of the table. The configuration of the $B_5$ flip-flop is indicated in the first column: when $B_5$ is true ($dx$ positive), addition takes place; when $B_5$ is false ($dx$ negative), subtraction takes place. The sum obtained from the binary digits $(R+Y)$ in each row is placed in column 240 designated Q. Similarly, the result of subtraction $(R-Y)$, obtained effectively by adding the complement of Y to R, is noted in column 240, this process occurring when $B_5$ flip-flop is in zero (false) configuration. The negation of Q is recorded in the next column 241 designated Q'. The new carry resulting from the addition or subtraction process is listed in column 242. Column 243 lists the logical terms governing the pulse or "one" configuration of Q'. By applying principles of symbolic logic previously discussed, the equation for Q' is derived as indicated below the table. The logical equation can then be factored into a more concise statement as shown by the final expression:

$$Q'=(YB_5'+Y'B_5)(RD_2-R'D_2')+ \\ (YB_5+Y'B_5')(R'D_2+RD_2')$$

The reason a logical equation is obtained for the term Q' instead of Q is because a driver circuit 244 is needed for driving the Q term. This driver circuit inverts its input. Hence when the term Q' is fed therein, the desired term Q is fed out, as shown in the block diagram comprising Figure 80.

Figure 85:
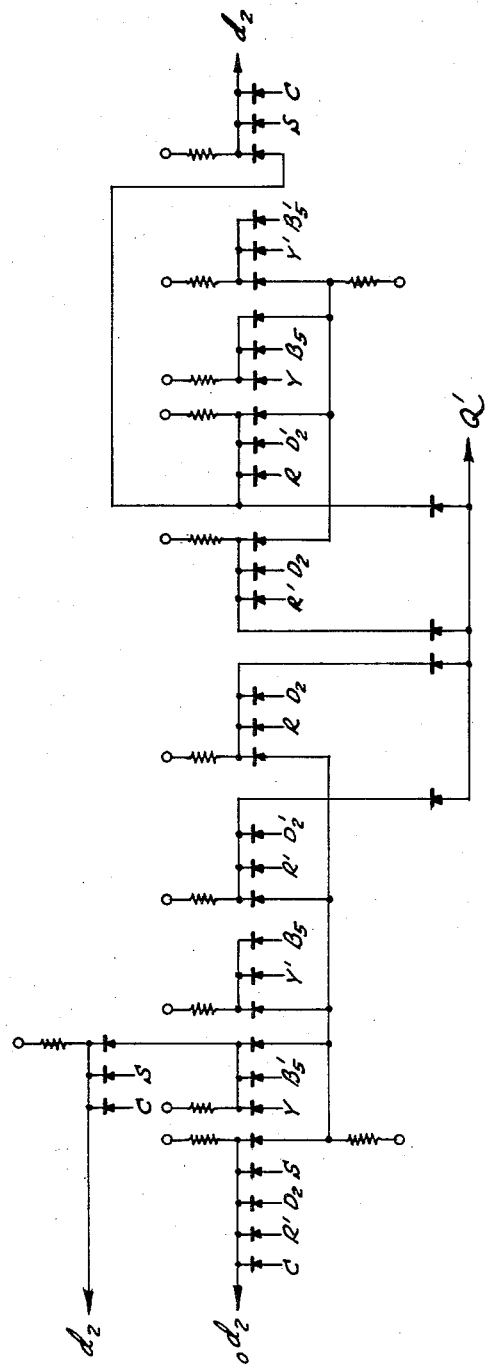
Figure 85 is a schematic diagram of the logical diode network associated with the $R+Y$ adder and the $D_2$ flip-flop, including logical equations.

Figure 81 is a block diagram of the $D_2$ flip-flop used for controlling the carry input into the $R \pm Y$ adder circuitry shown in Figure 85. The equations defining the conditions which control the inputs to this $D_2$ flip-flop are presented below the diagram of Figure 81. In order to trigger $D_2$ flip-flop "true," i. e. go from 0 to 1, terms $YB_5RS$ or $Y'B'_5RS$ or $YB_5S'$ and, of course, clock pulse C are needed. The term $YB_5RS$ means when both Y and R are one and addition is being performed ($B_5$ true) and start flip-flop S is on, a carry will occur. During the complementation process used in subtraction ($B_5'$ true), it is necessary to add a one to the number being complemented; the term $YB_5'S'C$ achieves this result since it triggers carry flip-flop $D_2$ on when a pulse appears on Y with $B_5'$ and $S'$ true and a coincident clock pulse C occurs, thus insuring that one is added to the last digit of the Y number which follows the word start condition $YS'$.

Carry flip-flop $D_2$ is triggered false by any one of three terms. Term $YB_5'R'S$ states that flip-flop $D_2$ is triggered off for the $R-Y$ process ($B_5'$ true), when R is zero, Y is one, start flip-flop S is on and clock pulse C is coincident. Term $Y'B_5R'S$ means that flip-flop $D_2$ is triggered off when both Y and R are zero when start flip-flop S is on and a clock pulse C occurs during the addition process ($B_5$ flip-flop true). Since the result of both terms is zero (no pulse), the carry flip-flop $D_2$ must be triggered off. The last term $P_{32}C$ merely insures that $D_2$ flip-flop is triggered off at the end of pulse time $P_{21}$ of an integrator.

The method of adding or subtracting (effectively using the complement) in the $R-Y$ adder can be better understood by referring to Figure 82. Here the R number is assumed to be zero initially. The Y number taken from drum wheel 36 is $+7$ and $dx$ is plus "one." Thus $B_5$ flip-flop is true and the Y number is combined with the R number as dictated by each $dx$ input. One addition takes place per effective revolution of drum wheel 36, the $dz$ outputs occur as previously shown in the discussion of the first term in the z line equation.

For the first addition in Figure 82, no carry is obtained from the pulse time $P_{31}$ addition and hence the $dz$ output is a zero (246) since the pulse time $P_{32}$ content 245 of the R number has no output reversal so as to reverse the sign of the output. After each computation, this same pulse time $P_{32}$ content is re-recorded with the new R number.

When adding $y=+7$ to the R number during the next revolution of wheel 36, a carry 247 is obtained during pulse position $P_{32}$. This carry 247 effects a $dz$ output of $+1$ since there is no sign reversal pulse in pulse position $P_{32}$ of the R channel. When adding $y=+7$ a third time to the R number, again a carry from $P_{31}$ time summation results in a $+1$ output.

Figure 83:
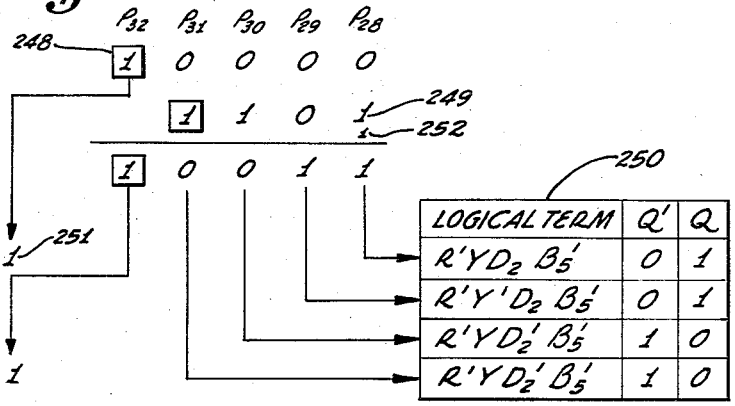
Figure 83 serves to illustrate the computation process when $dx$ is negative and Y is positive.

As a further example, refer to Figure 83 which illustrates the computation process when $dx$ is negative and Y is positive. Pulse position $P_{32}$ content 248 of the R number for this case has a pulse (one) therein. The Y number 249 as picked from wheel 36, equals plus five. But when $dx$ is negative ($B_5'$ true), a Y number is regarded as a complement and an initial carry, a true state of $D_2$ flip-flop, is introduced in the first stage summation as shown by means of example 252.

The truth table 250 accompanying Figure 83 provides indication of how $y=+5$ is effectively complemented and added to the R number so as to produce an effective difference. For example, at pulse time $P_{28}$, R is zero, Y is one, and a carry $D_2$ occurs. However, the term $R'YD_2B_5'$ does not occur in the logical equation for $Q'$. Consequently Q' equals zero and Q negation of Q' equals one. The other three values for Q can be substantiated in a similar manner.

Figure 84:
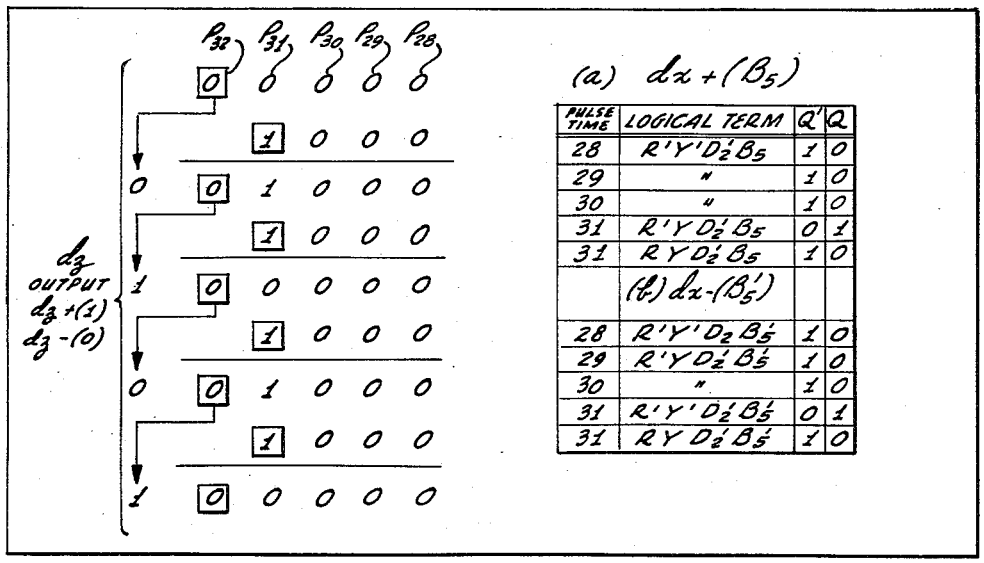
Figure 84 illustrates the $dz$ output obtained when a zero value of Y is added to a zero value of R.

Although no carry results from the pulse position $P_{31}$ addition, there is a sign reversal pulse $P_{32}$ in the R channel; consequently a $dz$ output pulse 251 is generated The concept of the "plus-one-minus-one" system in which the invention operates is exemplified in Figure 84 which shows the $dz$ output obtained when a zero value of Y is added to a zero value of R. Obviously, the $dz$ output should be zero, whether $dx$ is positive or negative. As noted in Figure 84, the first additive transfer of $y=0$ into $r=0$ results in no carry at the end of $P_{31}$ pulse time and hence, since $P_{32}$ pulse position of R is zero, the $dz$ output is a zero digit. However, the next addition results in a carry at the end of $P_{31}$ pulse time. This occurs because the sign digit of $Y=0$ is a "one" in the $P_{31}$ pulse position, and the previous addition had placed a "one" in the $P_{31}$ pulse position of the R number. This carry when added to the 0 digit in pulse position $P_{32}$ of the R number results in a $dz$ output digit "one." The third addition is the same as the first and the $dz$ output is again a zero digit. The fourth addition is the same as the second and results in a 1 digit $dz$ output. Thus consecutive $dz$ outputs are alternate zeroes and ones, but the sum of the $dz$ outputs, which represents the true output, is effectively zero as desired.

Figure 85 is a schematic diagram of the logical diode network, comprising the Q' proposition and the $d_2$ and $_0d_2$ input logic; this is the familiar "family tree" type of circuit and its accompanying equations are written below the diagram.

*Preparation of problems for the computer*

The basic method of solving ordinary differential equations by the use of integrating means such as those provided in the computer is to interconnect the outputs of one or a plurality of the integrators to some of the inputs in such a manner so as to create a feedback system, and then "drive" the entire integrator system by pulses which represent incremental changes in the independent variable of the equation.

When the system is actuated, a pulse stream corresponding to a dependent variable Y of the equation can be stored in one of the integrators.

A solution of the equation can be obtained by noting the values of Y corresponding to values of $x$ at fixed increments of the variable $x$.

The manner of interconnecting the integrators is determined by the differential equation to be solved, i. e. for each particular problem, the interconnection system is arranged in a certain way.

As an example of the process of coding a problem for the invention, consider the following equation with its initial conditions:

$$\frac{d^2y}{dx^2} = -\frac{dy}{dx} + y^2 + \sin y + A$$

$$x_0=0 \quad y_0=0 \quad \frac{dy}{dx_0}=\frac{1}{8} \quad \frac{d^2y}{dx^2_0}=-\frac{3}{8} \quad A=-\frac{1}{4}$$

Figure 86:
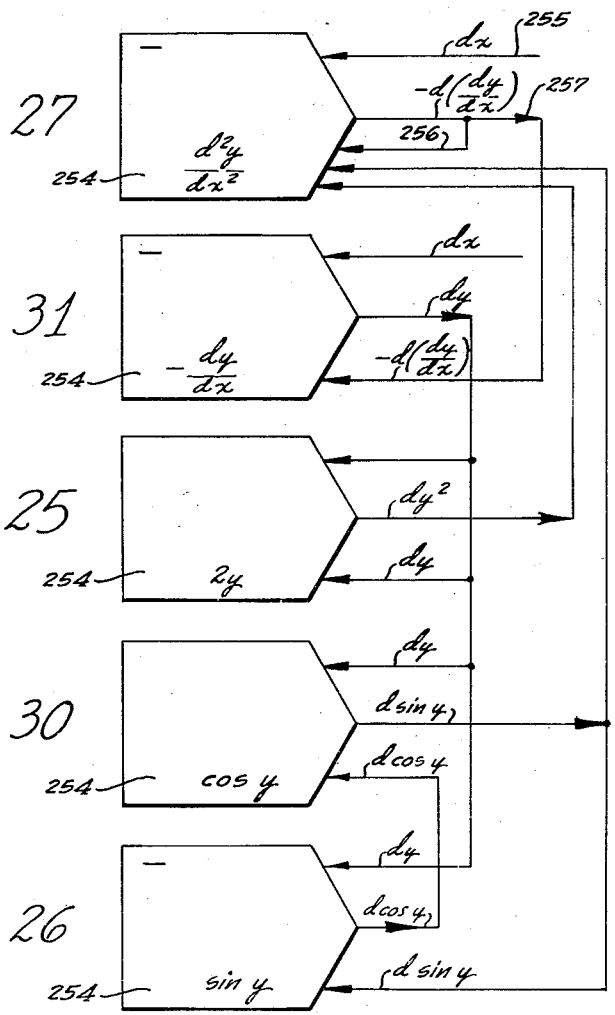
Figure 86 is an interconnection diagram for solving a certain differential equation on the invention.

The first step in preparing a problem for solution on the computer is to draw up an interconnection diagram. Figure 86 comprises an interconnection diagram for the problem undergoing consideration. In regard to Figure 86, each block 254 represents an integrator. The independent variable for each integrator is represented as being conveyed in by a line above the center of block 254 (line 255 into integrator 27, for example); the dependent variable is represented by a line or by several lines below the center of block 254 (line 256 into integrator 27) for example. The output from an integrator is represented by an outgoing line from center of block 254 (line 257 from integrator 27, for example). The value represented by the Y number is written inside the block and a minus in the upper left-hand corner represents a sign reversal (obtained by placing a pulse in pulse position $P_{32}$ of the R channel of the particular integrator).

Having prepared a correct interconnection diagram, the next step in problem preparation is to prepare a coding sheet as shown in Figure 88. The arbitrary integrator numbers octal 25 through 31 are selected.

It will suffice to explain only the coding of integrator number 27 since the procedure followed for the other integrators is identical. It can be noted from Figure 86 that the $dy$ address for integrator 27 consists of the outputs of integrators 27, 30 and 25. Referring to the coding sheet comprising Figure 88, note that the $dy$ address for integrator 27 is in integrator 26 block and that integrators numbers 27, 39 and 25 are found in channel pulse position $L_2 P_{21}$, $L_1 P_{20}$ and $L_1 P_{21}$, respectively. Consequently, a necessary requirement to pick up these integrators as a $dy$ input is to place pulses in the previously mentioned positions.

The independent variable for this integrator is time; this corresponds to an output from integrator 24. It is to be noted that time, denoted by "$t$" is located in the $dy$ block for integrator 27 (situated in the block for integrator 26) in the $L_1 P_{22}$ pulse position. The $dx$ block of integrator 27 is located in the upper left corner of the block for integrator 25. A one is placed in pulse position $L_1 P_{30}$ since time "$t$" is situated in the $L_1$ channel, in this case; if time "$t$" (the independent variable) had been in the $L_2$ channel a "zero" (no pulse) would have been placed in pulse position $L_1 P_{30}$ (see Figure 74). The number of the pulse position in which the independent variable ($t$ in this case) is located is placed in the other five positions of the $dx$ block. Consequently the binary number 10110 (decimal 22) is entered into the other five positions of the $dx$ block.

In order to determine the location of start pulses, SP, the problem must be correctly scaled. The scale of a variable can be defined as the ratio between the number within an integrator and the true number.

The number appearing in the Y register of the computer will be referred to in the ensuing discussion as $Y_m$. Since the binary point is always considered to lie on the left, $Y_m$ will always have an absolute value less than one. To use mathematical notation: $|Y_m|<1$. Furthermore the actual value in the problem which $Y_m$ represents is to be henceforth referred to as $Y_r$. $Y_r$ is in real units, and is, in general, not equal to $Y_m$.

The relation existing between $Y_m$ and $Y_r$ is expressed by the equation $$Y_m = 2^{S_y} Y_r$$

where the scale of the Y variable is said to be $S_y$.

A relation exists for the scale of increments in the independent variable $x$, i. e. $2^{S_{dx}}$ pulses are required to represent 1 unit change in the real value of $x$. Hence $$dx = \frac{1}{2^{S_{dx}}} \text{ units of } x = (2^{S_{dx}})^{-1} \text{ units of } x$$

or, in other words, $2^{S_{dx}}$ of $dx$ pulses change $x$ by 1 unit.

If A represents the area traversed under a curve during the time interval in which $x$ changes by one unit, the mean value of $Y_r$ can be defined as $\overline{Y}_r = A/1$ real unit of $x$, Numerically $\overline{Y}_r = A$ Thus:

$$\frac{2^{S_{dx}}}{\overline{Y}_r} = \left[\begin{array}{c}\text{Number of } dx \text{ increments required to} \\ \text{traverse unit area under the curve } Y_r\end{array}\right]$$

$\overline{Y}_m$ is now defined as the mean value of the scaled number appearing in an integrator of the invention.

Since $\overline{Y}_m = 2^{S_y} \overline{Y}_r$ then $$\frac{2^{S_{dx}}}{\overline{Y}_r} = \frac{2^{S_{dx}}}{\frac{\overline{Y}_m}{2^{S_y}}} = \frac{2^{S_{dx}-S_y}}{\overline{Y}_m}$$

Owing to the process by which the invention performs digital integration, as explained in the discussion accompanying Figures 2 and 3, the number of $dz$ increments can be expressed as $$\overline{Y}_m = \left[\frac{\text{Number of } dz \text{ increments}}{\text{Number of } dx \text{ increments}}\right]$$

Therefore the number of $dz$ increments corresponding to one unit of area traversed with regard to the integration is:

[Net number of $dz$ increments per real unit area] =

$$\overline{Y}_m \frac{2^{S_{dx}-S_y}}{\overline{Y}_m} = 2^{S_{dx}-S_y} = 2^{S_{dz}}$$

In other words, $2^{S_{dz}}$ of the $dz$ increments or $2^{S_{dx}-S_y}$ increment change Z by one real unit for the variable Z. Taking logarithms of both sides of the equality yields:

$$S_{dz} = S_y - S_{dx}$$

Thus an equation relating the scales within an integrator has been devised.

An equation useful is estimating $S_{dx}$ and $S_{dz}$ can be derived in the following manner:

Since $|Y_m|<1$ and $|Y_m|=2^{S_y}|Y_r|$ (because $2^{S_y}$ is positive), $$2^{S_y} < \frac{1}{|Y_r|}$$

Hence $$S_y < \log_2 \frac{1}{|Y_r|}$$

and $$S_{dx} - S_{dz} > \log_2 [|Y_r|] \text{ (because } S_y = S_{dz} - S_{dx})$$

In order to insure that this relationship exists, the *maximum* value of $|Y_r|$ should be considered. Therefore the foregoing relationship is better expressed as $$S_{dx} - S_{dz} > \log_2 [|Y_r|] \text{ max.}$$

Thus the maximum value of the Y number can be estimated so $S_y$ can be chosen to keep $|Y_m|$ from exceeding the capacity of the integrator.

An equation for determining the start pulse location (SP) can be derived as follows: Consider a Y register of a typical integrator consisting of 32 pulse time positions as shown:

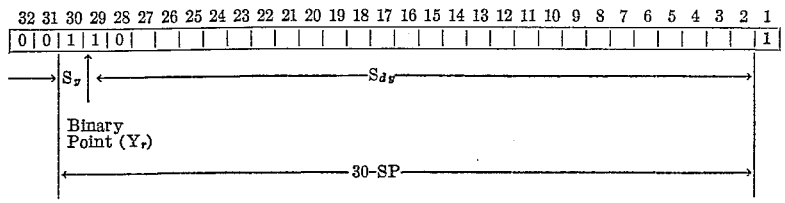

The example shown above is the information contained in the Y register of integrator 27 in this particular problem. The number of binary places between the binary point of $Y_r$ and start pulse SP is $S_{dy}$ since it takes $2^{S_{dy}}$ of $dy$ pulses to change $Y_r$ by 1 unit and $S_y$ (minus in this case) is merely the number of binary places $Y_r$ has moved to the right to fit into the Y register. A positive $S_y$ would indicate $Y_r$ was moved to the left. Therefore $$30 - SP = S_{dy} - S_y$$

or
$$SP = 30 - S_y - S_{dy}$$

In accordance with the arrangement of the number $Y_m$ within an integrator, the binary point lies between pulse position $P_{30}$ and $P_{31}$. Such a convention renders possible the reading of the binary number $Y_m$ in the octal number system by grouping the binary digits in groups of three starting with pulse position $P_{30}$ and reading to the right. However, the one exception to this rule is integrator 24 which is the integrator that is reserved for issuing stop and print signals; consequently in integrator 24 only, the binary point must be considered to lie between pulse positions $P_{27}$ and $P_{28}$.

It is convenient in setting up the scaling relationships for a problem to use a table similar to the one shown in Figure 87.

The first column, entitled "I" of the table comprising Figure 87 contains the integrator numbers. The second, third and fourth columns, headed $S_{dx}$, $S_{dy}$, and $S_{dz}$, respectively, contain scale factors of the inputs and output rates for each integrator. Since the outputs of integrators 27, 25 and 30 are added together as the $dy$ of integrator 27, these outputs must all be at the same scale factor which has been called $S_{27}$. The scale factor for $dx$ has been called $S_{dx}$, the scale factor for the output of integrator 31 called $S_{31}$, and the scale factor for the output of integrator 26 called $S_{26}$. These symbols have been entered into the table of Figure 87 at the appropriate places except for $S_{dy}$ of integrator 25 where $(S_{31}-1)$ has been entered in order to multiply the incoming rate, $dy$ by 2 to effect the rate $d(2_y)$.

The letter "M" will now be used to designate a value $M > \log_2 |Y_r|$ max. Thus in the fifth column entitled M, values are listed for the first estimates of $S_y$ for each integrator with each M chosen such that $2^M > |Y_r|$ max. Since it was previously shown that $S_{dx} - S_{dz} > \log_2 |Y_r|$ max, it follows that $S_{dx} - S_{dz} > -M$.

This relationship can now be written for each integrator.

27: $S_{dx} - S_{27} \geqslant -1$
31: $S_{dx} - S_{31} \geqslant -1$
25: $S_{31} - S_{27} \geqslant -1$
30: $S_{31} - S_{27} \geqslant -1$
26: $S_{31} - S_{26} \geqslant -1$ The next step is to choose a value for $S_{31}$. A decision as to what value to choose is usually a compromise between desired accuracy and length of computational time. As stated previously $$dy = \frac{1}{2^{S_{dy}}} \text{ units of } y$$

Thus as a study of this equation will reveal as $S_{dy}$ increases, the size of the $dy$ increment (see Figure 3) decreases. Consequently computational time and accuracy are both increased.

In this particular problem, an accuracy of approximately four decimal digits was desired. Therefore the value 15 was chosen for $S_{31}$ since $$\frac{1}{2^{15}} = \frac{1}{32,768}$$

which corresponds roughly to $$\frac{1}{10,000} \text{ or } .0001$$

This value allows reasonable margin for round off.

This selected value of 15 for $S_{31}$ can be used in the relationship $S_{dx} - S_{31} \geqslant -1$ and a value of $S_{dx} = 15$ found. The values thus obtained are listed in the second, third and fourth columns of the table comprising Figure 87.

An estimate of computational time can be made as follows:

$$\frac{1 \text{ min.}}{3600 \text{ rev.}} \cdot \frac{1408 \text{ pulse times}}{\text{cycle}} \cdot \frac{\text{rev.}}{1560 \text{ pulse times}} \cdot$$

$$\frac{\text{cycle}}{1 \text{ incr. of } dt} \cdot \frac{2^{S_{dt}} \text{ incr. of } dt}{1 \text{ unit ind. variable}} = \frac{1408}{1560} \approx .9$$

$$(.9) \frac{2^{15} \text{ min.}}{3600 \text{ unit ind. var.}} = \frac{.9 \ (32,768)}{3600} =$$

$$\frac{29491.2 \text{ minutes}}{3600 \text{ unit ind. var.}} = 8.19 \frac{\text{minutes}}{\text{unit ind. variable}} =$$

8 minutes 11 sec./unit ind. var.

This appears to be reasonable time for the desired accuracy.

Using the equations $S_y = S_{dz} - S_{dx}$ and $SP = 30 - S_y - S_{dy}$, the sixth and seventh columns of the table have been filled in. The eighth column, headed $Y_r$ contains the real values (decimal) of the initial conditions of the integrands. In the ninth column, the initial values of $Y_m$ calculated from the equation $Y_m = 2^{S_y} Y_r$ are listed. The octal equivalents of $_0Y_m$ values for the various integrators are listed in the tenth column; the eleventh column contains the octal values to be placed in the integrators with the positive numbers preceded by a one and the complemented numbers by a zero.

Stopping of computation is effected by integrator 24 which has no $dy$ input and receives its $dx$ from its own output. For this problem, the value of $Y_m$ to be filled into integrator 24 was selected to be $2^{-12}$ or $+.0001$ octally. During computation, this small number adds into the remainder accumulator 8 (Figure 2) of integrator 24 for each increment in the independent variable until the remainder accumulator overflows stopping computation automatically by triggering halt flip-flop (Figure 53). Therefore, with this particular coding, computation stops automatically each time there are $2^{12}$ $dx$ increments or each time $x$ advances by $$\frac{2^{12}}{2^{15}}$$

of a unit since $S_{dx} = 15$. In general, the $Y_m$ value filled into integrator 24 is made to be the reciprocal of the number of increments in the independent variable which are desired to occur between computational stopping points.

Having prepared a table of information such as the one comprising Figure 87, one can now proceed to fill in a coding sheet. Figure 88a and Figure 88b when joined as shown in Figure 88 illustrate a properly filled-in coding sheet for the problem undergoing discussion in accordance with the necessary information previously obtained as shown in Figures 86 and 87 and their accompanying descriptions.

*Operating the computer*

Having prepared a suitable problem for the computer, the task of filling the correct information into the computer remains. The control panel, a perspective sketch of which is presented in Figure 89, is used for operation of the computer. The various controls are conveniently mounted on a suitably engraved dural base 258. The A. C. voltmeter 259 is used for checking the A. C. line voltage to ascertain that it is within proper limits. The D. C. voltmeter 260, used in conjunction with four-position selector switch 261, allows one to check each of the four direct current voltages in the computer's power supply. These two instruments are merely for convenience since internal protecting relays automatically cut off the computer when these voltages are, for any reason, incorrect.

At the upper right of the control panel are the connections 262 for the oscilloscope. Adjoining five-position selector switch 263 allows one to view, upon the oscilloscope screen, the Y, R, $L_1$, $L_2$ and Z channels, respectively. The particular integrator whose channels the operator wishes to observe is selected on the double bank of push buttons 264 comprising the integrator selector switch (see Figure 45). The use of an oscilloscope in this manner provides direct observation of the memory contents and serves as a guide and a double check on the filling of the machine, as well as an observation of progressing computation.

Neon lamp 265 provides visual indication of when computation is in progress.

Single pole double-throw toggle switches 266 and 267 serve the functions preset and one cycle and restart and stop, respectively.

The seven operation switches 268 and the "E" or marker button 199 were explained previously in conjunction with Figure 48. At the right of operation switches 268 are four "clear" buttons 269 which clear out memory channels L, R, Y and Z, respectively. ("Sync" button 270 serves to effectively shorten integrator 24 by two pulse positions so that information can be properly synchronized when two digital differential analyzers are interconnected.) The "zero" and "one" buttons 212 and 213, respectively, comprise the binary typewriter by use of which information is given to the machine.

As an example of how the computer is operated, consider how information would be filled into the computer in accordance with the coding chart shown in Figure 88. The following precautions should be observed before information is filled into the invention.

Before starting the computer the operator should check to make sure the front, back and side panels 13 (Figure 4) are securely in place. The computer is cooled by a suction system and if these panels are loose, the resulting leak will impair ventilation and cause damage to the computer.

The first step in starting the computer is to turn on the power switch on the fuse panel. Before going further, the operator should check the air exhaust at the rear of the computer to make sure the ventilating fan is in operation. The vacuum tube heaters and the drum motor should also be in operation. After waiting at least one minute for tubes to reach proper temperature, plate power can be thrown on by depressing a B+ button. Plate voltages may then be checked on meter 260 on control panel by turning meter switch 261 to the various positions marked. Plate voltages should be as marked on the panel although very slight deviations from these voltages may be due to meter inaccuracy or deliberate adjustment made on the individual computer and need not be considered important.

If plate power does not come on when the plate power button is depressed, this indicates that sufficient warm-up period has not been allowed. A time delay relay within the computer makes it impossible to throw plate power on before tubes are warm.

As mentioned previously, visual read-out means is effected upon the screen of oscilloscope 33 (Figure 4). The oscilloscope is triggered by the output of the $I_i$ driver (Figure 46). The oscilloscope sweep is from left to right in order to present number patterns in normal order. The oscilloscope should be connected to the control panel with the signal input on terminal I, the trigger input on terminal T and the ground on terminal G.

After proper initial settings of the oscilloscope control dials have been made, all four clear buttons 269 should be depressed. Then oscilloscope intensity, sweep stability, and trigger amplitude can be adjusted to produce a straight, stable line on the oscilloscope screen. The vertical position should be adjusted so that this line lies just over the numerals inscribed on the oscilloscope screen. The horizontal position and the right hand sweep-speed multiplier dial should then be adjusted until this line adjust fills the calibrated section on the screen.

The operator can now commence to fill in the Y channel of integrator 24. Scope selector 263 is placed on position "Y," integrator buttons 2 in the left column and 4 in the right column of integrator selector switch 264 are depressed and also the fill Y button of operation switches 268 is depressed. Cycling switch 266 is set on "one cycle" and restart switch 267 is set on "stop." The marker button 199 is next depressed and the "zero" button 212 is tapped while holding marker button 199 down. Following this action, marker button 199 is released. Repeated tapping of "zero" button 212 will now effect the motion, along the trace on the oscilloscope screen, of two small spikes (one a positive and one of negative amplitude) between which is an approximate spacing of one pulse width. These two small spikes advance one pulse position every time "zero" button 212 is tapped. If the "one" button 213 is tapped, a square pulse will appear on the oscilloscope screen at whatever pulse width position indicated between the two spikes at the time "one" button 213 was tapped. This square indicates a "one" is inserted in the memory. By tapping the "zero" and "one" buttons 212 and 213, respectively, the proper pattern of ones and zeros may be inserted into the Y channel. Consequently in the case of the problem of Figure 87, in filling Y channel of integrator 29, the "zero" button 212 would be tapped until pulse position 16 is reached; the "one" button 213 would be tapped twice so as to fill "ones" or pulses into positions 16 and 15.

It is to be noted that there exist several methods of correcting errors made during the process of inserting information. For example, if the entire number is incorrect, marker button 199 is depressed and one of the binary typewriter keys (212 or 213) is tapped, returning the marker spikes or pulses to the start, or left-hand side, of the integrator. The process of writing over can now be commenced. Information can also be erased from the Y channel by means of the Y button of "clear" switches 269; however, the operator must remember that such action will clear all of the Y channels in all of the integrators and will, therefore, necessitate starting over again. If the error made in typing the number is noted at the instant it is made, one can back up the marker the required number of pulses and write over with the correct information; this action is accomplished by depressing the "shift left" button, included among operation switches 268 and marked by an arrow pointing to the left. When the "shift left" button is depressed, tapping either of the typewriter keys 212 or 213 will back up the marker pulse. One may then depress the fill Y button and correct the information. After the Y channel of integrator 24 has been filled, one might next go to the Y channel of integrator 25. This action necessitates depressing the 5 button in the right hand column of integrator selector switch 264 and then inserting a marker pulse which is accomplished, as before, by tapping a typewriter key (212 or 213) while marker button 199 is depressed. The Y channel of integrator 25 may now be filled in accordance with the coding chart of Figure 88 (i. e. tap "zero" button 212 until pulse position $P_{15}$ is reached, then tap "one" button 213).

A convenient procedure to follow is to fill the Y channels of all integrators used in the problem before proceeding to fill other channels. Thus, when all the Y channels are filled, one can go back and check the integrators previously filled merely by using integrator selector switch 264 to select the proper integrator number. In case an error was made in the right-hand portion of one of the integrators being checked, one can insert a marker pulse in this particular integrator and proceed to correct it. However, it is not necessary to type over the entire number; it is convenient to depress the "shift right" button, marked by an arrow pointing to the right, and included among operation switches 268; then tapping either "zero" button 212 or "one" button 213 will advance the marker spikes to the right without disturbing the information in the integrator. When the marker reaches the portion of the integrator containing incorrect information, the "fill Y" button can be depressed and the correct information written over the old information.

Filling of the R channels is effected in the same way as the Y channels were filled with the exception that scope selector 263 is, of course, set at "R" and the "fill R" button is used. Address lines $L_1$ and $L_2$ are filled in a similar manner.

When the entire problem has been placed in the machine to coincide with coding chart of Figure 88, it is time to commence computation; this is done by depressing "compute" button of operation switches 268. In this condition, tapping either of the typewriter keys (212 or 213) will cause the computer to compute a single cycle and stop. Various integrators can be observed by placing scope selector switch 261 or "Y," choosing the proper integrator number by means of integrator selector switch 264, and by repeatedly tapping typewriter keys 212 or 213 to observe computational progress.

If computation appears to be progressing satisfactorily, cycling switch 266 may be placed on "preset" position. If a typewriter key (212 or 213) is now tapped, the computer will go into continuous computation, stopping when it has issued its first print order. At this time a further check can be taken of the integrators, and if output tabulators are being used, the first printing of the tabulators can now be observed. If everything is still satisfactory, restart switch 267 can be placed on "restart" and typewriter key 212 or 213 tapped. The computer is now in continuous computation and each time it stops to issue a print order, it will automatically restart and go on.

During the progression of computation, one is free to examine any of the portions of any integrator by selecting the proper integrator on integrator selector switch 264 and by properly setting channel selector switch 263 to the desired channel. This procedure will not interfere with computation. However, none of the fill buttons 268 or clear buttons 269 should be touched while computation is in progress.

Should it be desired that the computer stop on the next print order, restart button 267 should be placed in "stop" position. Placing cycling switch 266 into "one cycle" position will cause the computer to stop without printing. It is to be noted that after stopping the computer, restart switch 267 should be placed in the "stop" position before any of the fill buttons 268 are depressed.

*Interconnecting equipment*

In the process of solving certain problems, it may be desired to interconnect two or more embodiments of the present invention; this result can be effected by utilization of output selector plugboard 30 and read-in, read-out panels 31, 31a and 32, previously shown in Figure 4.

Figure 90:
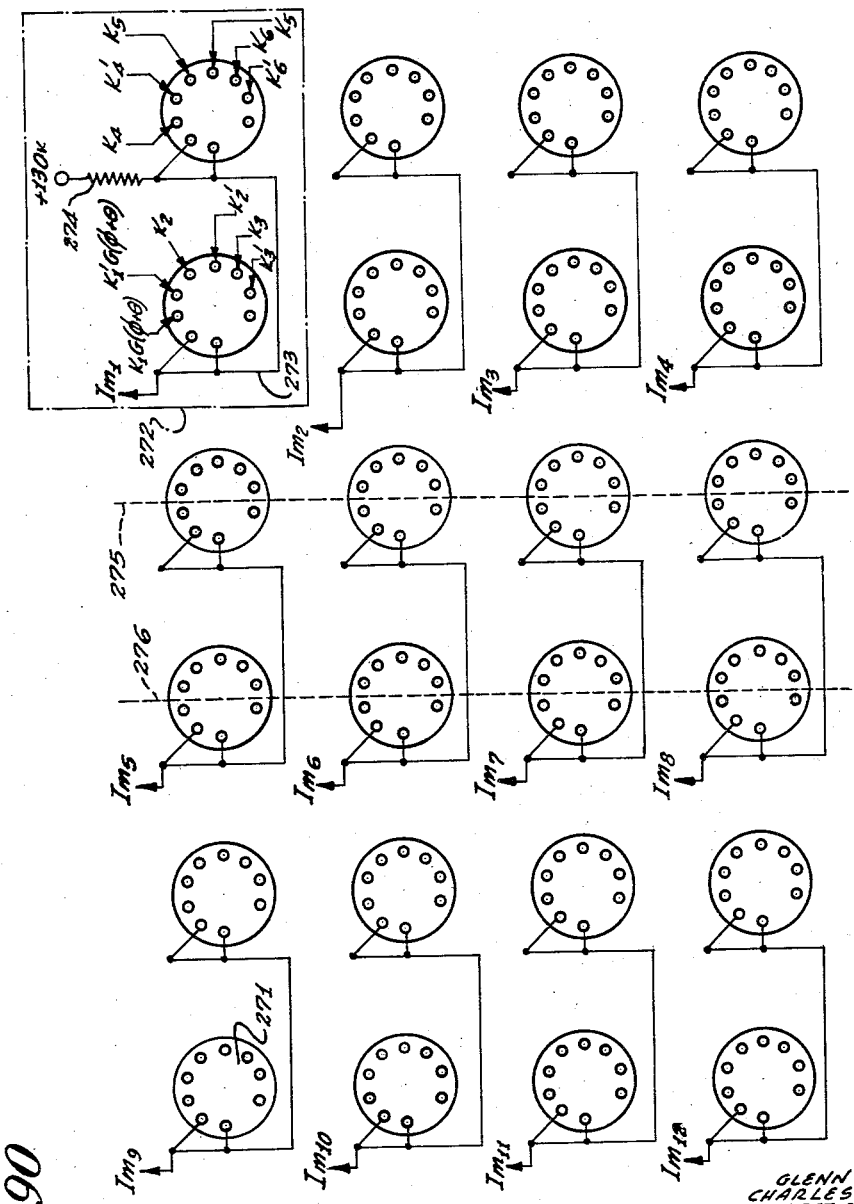
Figure 90 is a schematic diagram of the output selector plug-board.

Figure 90 is a schematic drawing of output selector plugboard 30. It is to be noted that the orientation of this diagram is from the *rear* of the plugboard (i. e., from the inside of computer looking toward the outside). The plugboard consists, essentially, of 24 typical 9 prong plug sockets, such as plug socket 271, into which are plugged typical plugs such as the one illustrated in Figure 91. The number appearing on the face of the plug is indicative of one digit of the octal-numbered integrator it represents.

Typical connections between two of plug sockets 271 are shown within the dotted bounds of box 272. Lead 273 connects two plugs, rendering available all propositions of the stages of the K counter 138 (Figure 20) whose configuration identifies a particular integrator. Resistor 274 serves as a "pull-up" resistor for the logical "and" combination formed by the two typical plug sockets 271 joined by lead 273; it is analogous to resistor 120 of Figure 19.

Figure 91:
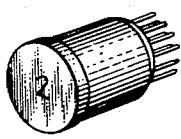
Figure 91 is a perspective sketch of a typical plug-in unit.

By wiring appropriate plug-in units, a typical one of which is illustrated in Figure 91, so as to be energized at the proper flip-flop configuration, a specific integrator's output is rendered available. For example, if one desired to obtain an output of integrator 75, he would plug in the plug marked ⑦ into any one of the 12 plug sockets located in the column containing stages $K_4$, $K_5$ and $K_6$ and $K_4'$, $K_5'$ and $K_6'$ as column 275. Furthermore, he would insert the plug marked ⑥ into the corresponding position in the adjacent column as 276, for example: Plug ⑦ would tap off $K_6$, $K_5$, and $K_4$; plug ⑥ would tap off $K_3$, $K_2$ and $K_1'G(\phi+\theta)$. Thus as the table of Figure 42 indicates, integrator 76 configuration $K_1'K_2K_3K_4K_5K_6$ is available as well as G and $(\phi+\theta)$ which are necessary computational propositions. It is to be noted that integrator 76 was selected, although it was desired to obtain the output of integrator 75; actually, the output of integrator 75 is available during integrator 76 time. Thus a method is provided for obtaining the output from any desired integrator of the computer. The connections designated $I_{m1}$ through $I_{m12}$ are to an output synchronization panel which will be described next.

*Output synchronization panel*

Figure 92:
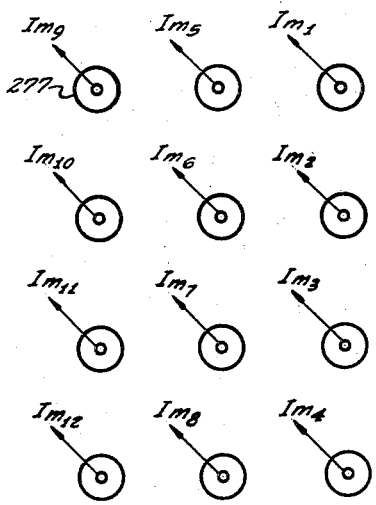
Figure 92 is a schematic diagram of the output synchronization panel.

Figure 92 comprises a schematic diagram of output synchronization panel 31a which consists essentially of 12 coaxial connectors as 277. It is to these plugs that the respective outputs $I_{m1}$ through $I_{m12}$ are conveyed from the output selector plugboard shown in Figure 90, to corresponding positions as indicated in Figure 92. One or more of these 12 outputs will be connected to an interconnector unit (to be described later) depending upon where the integrator plugs of Figure 91 were inserted.

*Miscellaneous output panel*

Figure 93:
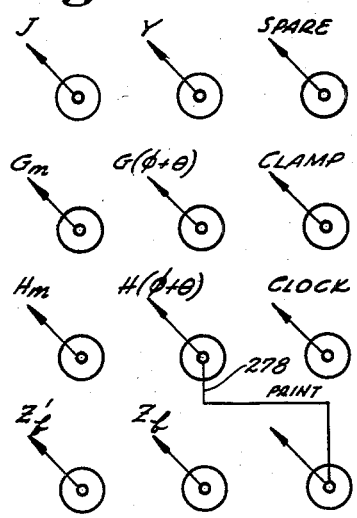
Figure 93 is a schematic diagram of a miscellaneous output panel.

Figure 93 is a schematic diagram of miscellaneous output panel 31. Here, as previously, there are 12 coaxial connectors such as typical coaxial connector 277 of Figure 92; the function of each of these 12 coaxial connectors will now be discussed: On J is available the output $J=I_{25}Z_fG(\phi+\theta)$; $G_m$ is a connection to the "G" flip-flop of the master unit; $H_m$ is a connection to the "H" flip-flop of the master unit. $Z_f'$ is the output from $Z_f'$ state of $Z_f$, Z channel output delay flip-flop, as explained previously in description of Figure 59. Y denotes the availability of the true state of Y channel flip-flop, previously shown in Figure 25. $G(\phi+\theta)$ and $H(\phi+\theta)$ provide these propositions as noted. It is to be noted that $H(\phi+\theta)$ proposition is connected via lead 278 to a "print" coaxial connector; the output lead from the print connection is conveyed to appropriate tabulators. $Z_f$ true state of the $Z_f$ flip-flop is also available. The last column consists of a spare connector, a clamp connection, a clock connection and the print connection previously mentioned.

*Input synchronization panel*

Figure 94:
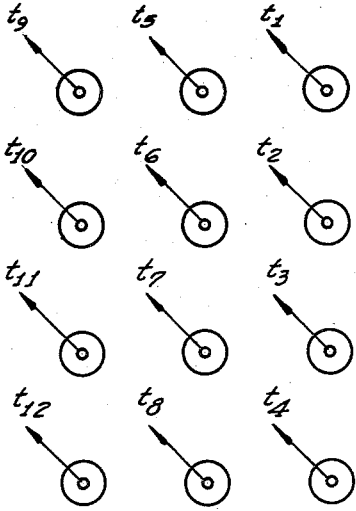
Figure 94 is a schematic diagram of the input synchronization panel.

The output from the interconnector unit is conveyed to corresponding co-axial connectors, labeled $t_1$ through $t_{12}$ and contained on the input synchronization panel 31, as shown schematically in Figure 94. (It is to be noted that this input synchronization panel receives from a separate embodiment of the invention the output from interconnector unit whose input is received from $Z_f'$, $Z_f$ and leads from output synchronization panel 31a on another embodiment of the invention.) Thus external outputs from one embodiment of the invention are made available on the Z line of another embodiment of the invention by virtue of a logical equation which states:

$$W = J_1t_1 + J_2t_2 + J_3t_3 + J_4t_4 + J_5t_5 + J_6t_6 + \\ J_7t_7 + J_8t_8 + J_9t_9 + J_{10}t_{10} + J_{11}t_{11} + J_{12}t_{12}$$

The explanation of this equation was given previously in the discussion of the Z channel.

*Synchronization button*

Synchronization button 270 (Figure 89) effects synchronization between two or more of the invention which are interconnected. The logic of the synchronization button 270 is summarized in a modified logical equation, defining a true state triggering input to flip-flop $F_2$ which comprises the second stage of pulse position counter 122. This modified logical equation is: $f_2 = F_1 F_2' C + I_{24} P_1 NC$.

Figure 95:
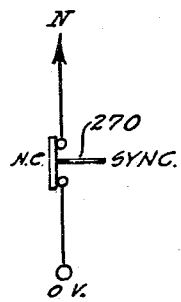
Figure 95 is a schematic diagram of the computer synchronization button.

The "N" in this equation means normally closed synchronization button 270 is depressed, thus effecting a true state of N (effectively energizing N with +30 v.). N is connected in an "and" diode gate i. e. $f_2 = I_{24} P_1 NC$ (not shown). As can be seen from the schematic diagram of Figure 95, depressing synchronization button 270 breaks the effective connection to 0 volts and renders N true. If N is true and it is pulse time $P_1$ of integrator 24, $F_2$ flip-flop is triggered "true." $P_1$ pulse time is true and the condition for this is $F_1' F_2' F_3' F_4' F_5'$ as reference back to the table of Figure 31 will reveal. Thus the configuration $F_1 F_2 F_3' F_4' F_5'$ is initiated and pulse position $P_3$ is established. Two pulse positions have been omitted in the count, and integrator 24 has been consequently shortened by two pulse position. Thus all the other integrators on drum wheel 36, are advanced by two pulse positions. Thus, by means of synchronization switch 270, one can continue to advance integrators on drum wheel 36 until synchronization is effected with the integrators of a reference wheel 36 on a separate embodiment of the invention. The synchronization condition can be observed as a stable waveform upon the oscilloscope screen.

*Interconnector*

Figure 96:
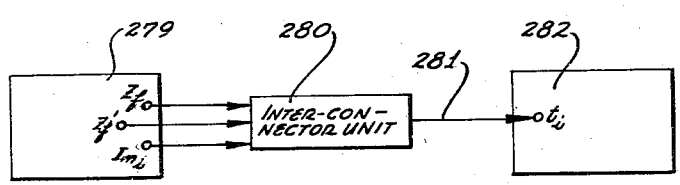
Figure 96 is a block diagram exemplifying use of an interconnector unit.

The actual link between two or more embodiments of the invention which are inter-connected is called an interconnector unit. Figure 96 is a simplified block diagram in which block 279 represents (one embodiment of the invention) which is joined via leads $Z_f$, $Z_f'$ and $I_{m1}$ to an interconnector unit 280; this unit has at least one lead 281 connected to an input synchronization connector $t_1$ on another embodiment of the invention, represented by block 282.

The interconnector unit 280 is essentially a one digit memory, namely, a flip-flop; it remembers whether the output of a typical integrator $I_{m1-1}$ in the invention (block 279) is a "one" or a "zero"; furthermore, it makes available this information to an input synchronization connection $t_1$ on another embodiment (of the invention) (block 282).

It is to be noted that the connections schematically illustrated in Figure 96 represent but one simple case in which two embodiments (of the invention) are interconnected. The actual number of integrators interconnected can be as many as 12. However, for each integrator interconnected, there is an associated one digit storage flip-flop comprising interconnector unit 280. Furthermore, connections from the $Z_f$ and $Z_f'$ propositions must be available as shown and for each integrator connected from output synchronization panel of one embodiment (of the invention), there will be a connection from the interconnector unit 280 to a $t_1$ connection on the input synchronization panel of another embodiment (of the invention). More than two embodiments (of the invention) can be interconnected by using more than one interconnector unit.

Thus, although specific details have not been given for this auxiliary equipment, it has been stated that an interconnector unit is a one digit memory flip-flop by means of which two or more embodiments (of the invention) can be interconnected.

Notwithstanding the fact that computers of the type of the invention can be constructed with more than 44 integrators, it is considered less economical to operate a single very large machine than a group of 44 integrator machines which can be coupled and uncoupled at will.

*Clear circuits*

In order to clear memory channels, the cathode returns of the false triodes of memory flip-flops $Y_m$, $R_m$, $L_{1m}$, $L_{2m}$, and $Z_m$ are disconnected by depressing clear pushbuttons 269 (Figure 89) which serve to render these triodes non-conducting.

Figure 97:
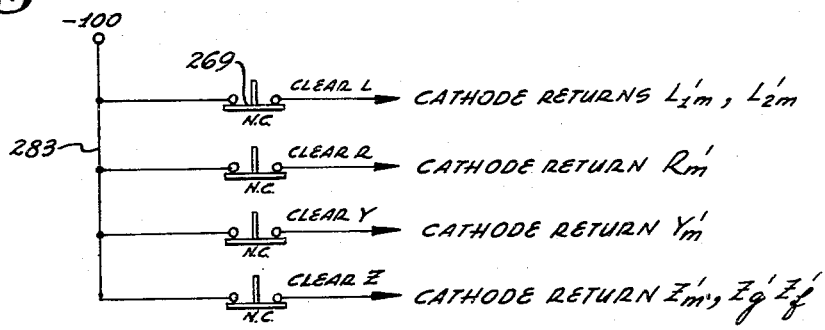
Figure 97 is a schematic diagram of four clear push-buttons.

Figure 97 is a schematic diagram of the four clear pushbuttons 269 which serve to clear out memory lines as labeled. Associated with clearing each of the four memory channels is a normally-closed pushbutton 269 which connects to −100 volts bus 283 and also to cathode returns of the associated flip-flops. Depression of one or more of normally closed pushbuttons 269 forces the one or more corresponding flip-flops to zero configuration regardless of the inputs to these flip-flops.

When zero configuration exists in a flip-flop, the plate of an electron tube to which the zero output line is connected is high; consequently this electron tube (a triode) is non-conductive. When this tube is conductive, however, the plate voltage is low and consequently the "one" plate output line is high. The effect of depressing a "clear" pushbutton 269 is to break the cathode connection to −100 volt bus 283, thus rendering non-conductive the electron tube (another triode) on the zero output side of the flip-flop; consequently the plate of this electron tube becomes high and the "zero" configuration is in effect. Thus these flip-flops pass only zeroes into the recirculation logical circuits so that "zeroes" must be recorded while clear pushbuttons 269 are depressed.

It is to be noted that the effect of depressing "clear Z" pushbutton 269 is not only to break the cathode returns of flip-flop $Z_m$, but also to clear the $Z_g$ and $Z_f$ flip-flops to zeroes so as to render these flip-flops consistent with Z channel information at the beginning of computation.

The function of the "clear" circuits can therefore be summarized as that of maintaining a constant zero configuration of a memory flip-flop and consequently an effectively constant magnetization pattern on the magnetic surface of drum wheel 36.

*Oscilloscope selector switch*

Figure 98:
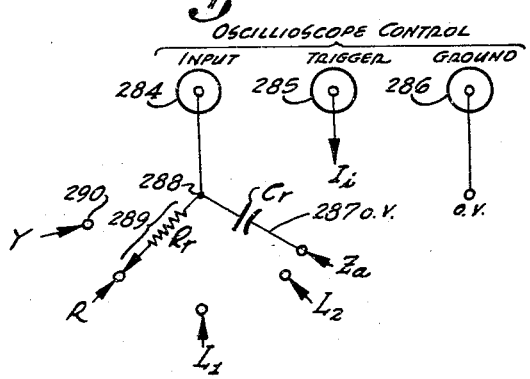
Figure 98 is a schematic diagram of the oscilloscope selector switch used when a visual indication is desired of a certain channel in an integrator.

The operation of oscilloscope selector switch 263 (Figure 89) is most readily explained by reference to the schematic diagram of Figure 98. Connectors 284, 285, and 286 are for leads from the input, trigger and ground connections, respectively, of oscilloscope 33 (Figure 4). The true output of Z channel delay flip-flop $Z_a$ is conveyed via lead 287 through a condenser $C_r$ which is connected at junction 288 to rotatable lead 289 which includes a suitable resistor $R_r$. It is to be noted that the circuit comprising lead 289 with resistor $R_r$ and lead 287 with condenser $C_r$ joined at junction 288 is a differentiating circuit. This circuit differentiates the output of the $Z_a$ flip-flop (Figure 28); it connects to the input 284 of oscilloscope 33. Lead 289 can be connected to any one of the terminals 290 to which propositions Y, R, $L_1$, $L_2$, and $Z_a$, respectively, are conveyed. The differentiated waveforms occurring within the selected channel can then be viewed upon the oscilloscope screen.

*Power supply and voltage selector switch*

Although various voltage levels have been noted throughout the specification, mention has not yet been made concerning source of these voltages. The voltages are supplied from a regulated power supply 15 (Figure 4). In addition to four major voltages of +30 volts, +130 volts, −290 volts and −100 volts, required bias voltages to playback or read amplifiers (as A in Figure 9) and to various flip-flops (as flip-flop $Y_m$ in Figure 16) are supplied by the power supply.

Figure 99:
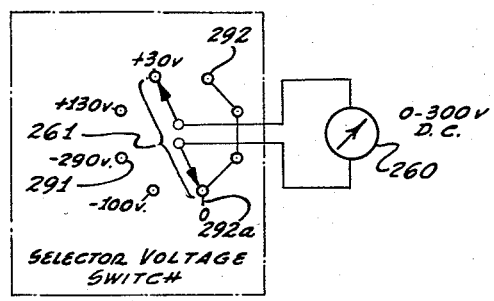
Figure 99 is a schematic diagram of a voltage selector switch.

For the purpose of checking the level of these voltages by means of D. C. voltmeter 260, a rotary 2 pole 4 position selector switch 261 is provided, the operation of which can be explained by referring to the schematic diagram comprising Figure 99. Rotary selector switch 261 can be moved to any of four upper contacts 291 while simultaneously contacting one of the four lower contacts 292. Lower contacts 292 are connected in series to 0 volt line 292a. Thus voltages can be checked from across 0 to +30 volts, 0 to +130 volts, −290 volts to 0, or −100 volts to 0.

Computing indicating light

Figure 100:
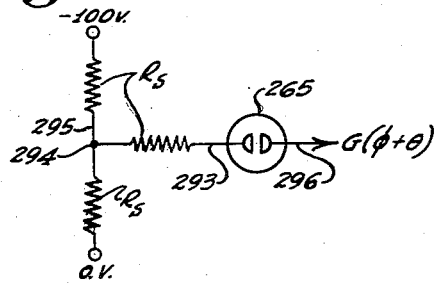
Figure 100 is a schematic diagram of the computing indicating light.

Neon lamp 265 (Figure 89) which serves to indicate whether or not computation is in progress can be explained by reference to the schematic diagram of Figure 100. Lead 293 from neon lamp 265 is connected at junction 294 to lead 295 which is energized from −100 volts to 0 volts. Lead 296 from the other connection to neon lamp 265 is conveyed to $G(\phi+\theta)$ proposition. Resistors $R_s$ serve to limit current. Thus neon lamp 265 is lit only when proposition $G(\phi+\theta)$ is true; this restriction is true only when computation is in progress; consequently visual indication is provided to let the operator know whether or not the computer is computing.

Oscilloscope read-out

Figure 101:
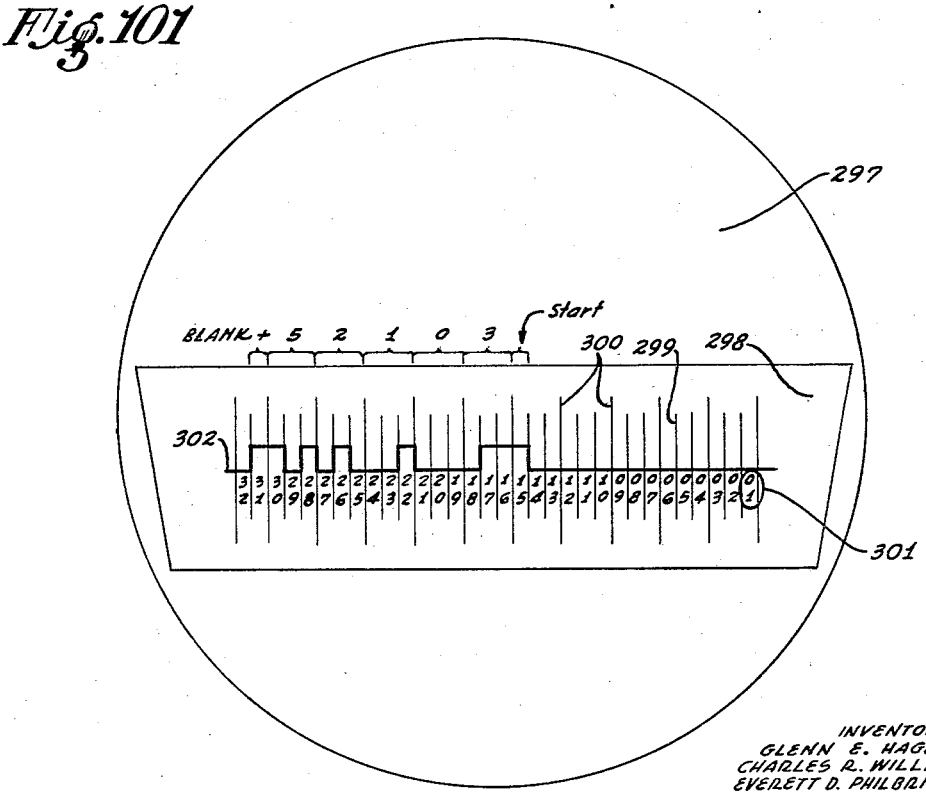
Figure 101 is a front view drawing of the face of the oscilloscope illustrating the manner in which numbers are read out from the computer.

Information is read-out from the invention by visual indication if the form of a pattern upon the screen of an oscilloscope 33 (Figure 4). A transparent read-out device is used to simplify read-out procedure. Figure 101 is a front view of oscilloscope screen 297 to the face of which is attached transparent read-out rule 298. Individual graduations 299 separate binary digit (pulse or no pulse) locations corresponding to a 32 digit register upon the magnetic surface 38 of wheel 36. Coarse graduation 300 separate the individual binary digits into groups of three so that rapid conversion may be made to the octal number system. The two decimal digits 301 identify the particular pulse position in which the observed binary configuration is situated.

A binary number appears on oscilloscope screen 297 as an irregular square wave. For example, in case of Y channel 51 (Figure 12), the extreme left position, pulse position $P_{32}$, is not used and is always filled in as a 0. The next position is reserved for the sign of the number; if the number is positive, there will be a one in pulse position $P_{31}$, and if it is negative, pulse position $P_{31}$ will contain 0. The binary point, which is to the binary system what a decimal point is to the decimal system, is always considered to lie between pulse positions $P_{31}$ and $P_{30}$, so that the number always appears to be less than one. The number itself, if it is positive, appears starting with pulse position $P_{30}$; however, if the number is negative, its complement appears starting with pulse position $P_{30}$. A final one is always annexed to the right-hand end of the number. This final one is called the start pulse. As previously mentioned, the start pulse is not part of the number, but it is used for the purpose of showing where the number terminates; it may be in any pulse position from $P_1$ to $P_{29}$.

The highest precision number that can be contained within a register will contain 29 significant digits, pulse positions $P_{30}$ through $P_2$, since $P_1$ would be reserved for the start pulse. A zero value in a register is represented by a one in pulse position $P_{31}$ followed by all zeroes out as far as the start pulse. The smallest negative number which can be represented and which will result if a single unit is subtracted from zero is represented by a zero in pulse position $P_{31}$ followed by all ones out through the start pulse. The largest negative number which can be expressed is minus one and will be represented by all zeroes, including a zero in pulse position $P_{31}$. The largest positive number which can be represented is a single increment short of plus one and will be represented by all ones, including a one in pulse position $P_{31}$.

As an example, line 302 shown in Figure 101 represents the positive octal number .52103, having a start pulse SP in pulse position $P_{15}$. From this foregoing description, it is apparent that the highly advantageous computer described herein is susceptible to modification in form, proportions, detail construction and arrangement of parts without departing from the principles involved or sacrificing any of the advantages thereof.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. A digital differential analyzer, including, means including memory means and a plurality of counting stages for providing a plurality of integrators, means for sequentially presenting the integrators for computation, means including a first channel in the memory means for providing signal indications digitally representing a dependent quantity for each of the integrators, means for providing signal indications digitally representing an independent qauntity for each integrator, means including a second channel in the memory means for providing for each integrator signal indications digitally representing an output quantity substantially equal to the differential combination of the dependent quantity and the independent quantity for each integrator, means including a third channel in the memory means for providing signal indications digitally representing weighted signal indications in the second channel for each integrator, means including a fourth channel in the memory means for providing for each integrator signal indications digitally coded to control the production of signal indications representing the digital variations in the independent and dependent quantities for each integrator every time that the integrator is presented for computation, means for digitally varying the signal indications for each integrator in the first channel in accordance with the coded signal indications provided in the fourth channel and the signal indications in the third channel every time that the integrator is presented for computation, and means for digitally varying the signal indications for each integrator in the second channel in accordance with the coded signal indications provided in the fourth channel and the signal indications in the first channel every time that the integrator is presented for computation.

2. A digital differential analyzer, including, means including memory means and a plurality of counting stages for providing a plurality of integrators, means for sequentially presenting the integrators for computation, means including a first channel in the memory means for providing signal indications digitally representing a dependent quantity for each of the integrators, means for providing signal indications digitally representing an independent quantity for each integrator, means including a second channel in the memory means for providing for each integrator signal indications digitally representing an output quantity substantially equal to the differential combination of the dependent quantity and the independent quantity for each integrator, means including a third channel in the memory means for providing signal indications digitally representing a weighted value of the signal indications in the second channel for each integrator, the third channel also providing for each integrator signal indications digitally representing variable quantities from sources external to the analyzer, means for shifting the signal indications in the third channel, means for recirculating in the third channel without shifting the signal indications representing the variable quantities from the external source, means including a fourth channel in the memory means for providing for each integrator signal indications digitally coded to control the production of signal indications representing digital variations in the independent and dependent quantities for each integrator every time that the integrator is presented for computation, means for digitally varying the signal indications in the first channel for each integrator in accordance with the coded signal indications provided in the fourth channel and the signal indications in the third channel every time that the integrator is presented for computation, and means for digitally varying the signal indications in the second channel for each integrator in accordance with the coded signal indications provided in the fourth channel and the signal indications in the first channel every time that the integrator is presented for computation.

3. A digital differential analyzer, including, means including memory means and a plurality of counting stages for providing a plurality of integrators, means for sequentially presenting the integrators for computation, means including a first channel in the memory means for providing signal indications digitallly representing a dependent quantity for each of the integrators, means for providing signal indications digitally representing an independent quantity for each integrator, means including a second channel in the memory means for providing for each integrator signal indications digitally representing an output quantity substantially equal to the differential combination of the dependent quantity and the independent quantity for each integrator, means including a third channel in the memory means for providing signal indications digitally representing weighted values of the signal indications in the second channel for each integrator, the third channel also providing for each integrator signal indications digitally representing variable quantities from sources external to the analyzer, means for shifting the signal indications in the third channel, means for recirculating in the third channel without shifting the signal indications representing the variable quantities from the external source, means for inserting new signal indications relating to the overflow of the signal indications in the second channel for an integrator at the end of each computation in the integrator, means for inserting new signal indications digitally representing the variable quantities from the external sources every time that a computation has been obtained for each of the integrators in the analyzer, means including a fourth channel in the memory means for providing for each integrator signal indications digitally coded to control the production of signal indications representing digital variations in the independent and dependent quantities for each integrator every time that the integrator is presented for computation, means for digitally varying the signal indications in the first channel for each integrator in accordance with the coded signal indications provided in the fourth channel and the signal indications in the third channel every time that the integrator is presented for computation, and means for digitally varying the signal indications in the second channel for each integrator in accordance with the coded signal indications provided in the fourth channel and the signal indications in the first channel every time that the integrator is presented for computation.

4. A digital differential analyzer, including, means including memory means and a plurality of counting stages for providing a plurality of integrators, means for sequentially presenting the integrators for computation, means including a first channel in the memory means for providing signal indications digitally representing a dependent quantity for each of the integrators, means for providing signal indications digitally representing variations in an independent quantity for each integrator, means including a second channel in the memory means for providing for each integrator signal indications digitally representing an output quantitiy substantially equal to the differential combination of the dependent quantity and the variations in the independent quantitiy for the integrator, means including a third channel in the memory means for providing signal indications digitally coded to control the production of signal indications representing variations in the independent and dependent quantities for each integrator, means for presenting corresponding signal indications in the first, second and third channels in sequence for computation, the coded signal indications representing the variations in the independent quantity of each integrator being provided in the third channel at least two integrators before the integrator that it controls, means for decoding the signal indications representing the variations in the independent quantity for each integrator at least one integrator before the integrator controlled by the code, means for retaining the decoded signal information for the variations in the independent quantity of each integrator until the integrator is presented for computation, the coded signal indications representing the variations in the dependent quantity of each integrator being provided in the third channel at least one integrator before the integrator that it controls, means for decoding the signal indications representing the variations in the dependent quantity for each integrator before the integrator is presented for computation, means for retaining the decoded signal information for the variations in the dependent quantity of each integrator until the integrator is presented for computation, means for combining the signal indications representing the dependent quantity for each integrator and the variations in the dependent quantity for the integrator every time that the integrator is presented for computation, and means for combining the signal indications in the first channel of the dependent quantity for each integrator and the signal indications in the second channel of the output quantity for the integrator every time that the integrator is presented for computation.

5. A digital differential analyzer, including, means including memory means and a plurality of counting stages for providing a plurality of integrators, means for sequentially presenting the integrators for computation, means for providing signal indications representing digital variations in an independent quantity for each of the integrators, means including a first channel in the memory means for providing signal indications digitally representing a dependent quantity for each of the integrators, means including a second channel in the memory means for providing for each integrator signal indications digitally representing an output quantity substantially equal to the differential combination of the dependent quantity and the variations in the independent quantity for the integrator, means including a third channel in the memory means for providing signal indications digitally representing an overflow of the signal indications in the second channel , means including a fourth channel in the memory means for providing signal indications digitally coded to control the production of signal indications representing variations in the independent and dependent quantities for each integrator, means for presenting corresponding signal indications in the first, second and third channels in sequence for computation, the coded signal indications representing the variations in the independent quantity of each integrator being provided in the fourth channel at least two integrators before the integrator that it controls, means for decoding the signal indications representing the variations in the independent quantity for each integrator at least one integrator before the integrator controlled by the coded indications, means operative in accordance with the decoded signal information for each integrator to select particular signal indications in the third channel for determining the sign of the variations in the independent quantity for the integrator, the coded signal indications representing the variations in the dependent quantity of each integrator being provided in the fourth channel at least one integrator before the integrator that it controls, means for decoding the signal indications representing the variations in the dependent quantity for each integrator before the integrator is presented for computation, means operative in accordance with the decoded signal information for the variations in the dependent quantity for each integrator to provide signal indications representing in digital form the resultant value of such variations every time that the integrator is presented for computation, means for combining the signal indications representing the dependent quantity for each integrator and the resultant signal indications representing the value of the variations in the dependent quantity for the integrator every time that the integrator is presented for computation, and means for combining the signal indications in the first channel of the dependent quantity for each integrator and the signal indications in the second channel of the output quantity for the integrator every time that the integrator is presented for computation.

6. A digital differential analyzer, including, a magnetic drum, means for rotating the drum, means for providing a plurality of channels on the drum, means including a plurality of counting stages for subdividing each channel into a plurality of integrators each having a particular number of pulse positions so as to present each integrator and each pulse position in the integrator in sequence for computation upon the rotation of the drum, means for providing in the pulse positions in a first one of the channels signal indications digitally representing a dependent quantity for each integrator, means for providing in a second one of the channel signal indications digitally representing an output quantity for each integrator, such output quantity representing the differential combinations of the dependent quantity and of an independent quantity for each integrator, means for providing for each integrator, in a third one of the channels at a position at least two integrators before the integrator, signal indications digitally representing in coded form variations in the independent quantity for the integrator, a first counter for decoding the signal information relating to variations in the independent quantity for each integrator, a first register for retaining the decoded signal information relating to the variations in the independent quantity for each integrator until the integrator is presented for computation, means for providing for each integrator, in the third channel at least one integrator before the integrator, signal indications digitally representing in coded form variations in the dependent quantity for the integrator, a second counter for decoding the signal information relating to variations in the dependent quantity for each integrator and for converting the information into digital form, a second register for retaining the decoded signal information relating to variations in the dependent quantity for each integrator until the integrator is presented for utilization, a first adder for combining the signal indications for each integrator in the first channel and the signal indications retained for the integrator in the second register every time that the integrator is presented for computation, and a second adder for combining the signal indications for each integrator in the first and second channels in accordance with the signal indications representing the variations in the independent quantity for the integrator every time that the integrator is presented for computation.

7. A digital differential analyzer, including, a magnetic drum, means for rotating the drum, means for providing a plurality of channels on the drum, means including a plurality of counting stages for subdividing each channel into a plurality of integrators each having a particular number of pulse positions so as to present each integrator and each pulse position in the integrator in sequence for computation upon the rotation of the drum, means for providing in the pulse positions in a first one of the channels signal indications digitally representing a dependent quantity for each integrator, means for providing in a second one of the channels signal indications digitally representing an output quantity for each integrator, such output quantity representing the differential combinations of the dependent quantity and of an independent quantity for each integrator, means for providing in a third one of the channels signal indications digitally representing any overflow for each integrator in the signal in the second channel for the integrator, means for providing for each integrator, in a fourth one of the channels at a position at least two integrators before the integrator, signal indications digitally representing in coded form variations in the independent quantity for the integrator, a first counter for decoding the signal information relating to the variations in the independent quantity for each integrator, a first coincidence circuit for operating on the signal indications in the third channel in conjunction with the counter to determine the polarity of each variation in the independent quantity for an integrator, means for providing for each integrator, in the fourth channel at least one integrator before the integrator, signal indications digitally representing in coded form variations in the dependent quantity for the integrator, a second coincidence circuit for decoding the signal information relating to variations in the dependent quantity for each integrator and for determining the polarity of each such variation, a second counter for determining the resultant value of the signal indications representing the variations in the dependent quantity for each integrator every time that the integrator is presented for computation, a first adder for combining the signal indications for each integrator in the first channel and the signal indications obtained for the integrator in the second counter every time that the integrator is presented for computation, and a second adder for combining the signal indications for each integrator in the first and second channels in accordance with the signal indications from the first coincidence circuit every time that the integrator is presented for computation.

8. A digital differential analyzer, including, means including memory means for providing a plurality of channels in the memory means, means for providing a plurality of digital positions in each channel, means including a plurality of counting stages for separating the plurality of digital positions into a plurality of integrators each having a plurality of digital positions, means for advancing the digital positions on a unitary basis and in a sequential pattern to present each integrator and each digital position in the integrator for the utilization and storage of information, means for providing in digital positions in a first one of the channels signal indications representing the digital coding of variations in an independent quantity for each integrator, means for providing in digital positions in the first channel signal indications representing the digital coding of variations in a dependent quantity for each integrator, means for providing in a second one of the channels signal indications digitally representing the dependent quantity for each integrator, means for differentially combining the signal indications representing the independent and dependent quantities for each integrator in accordance with the signal indications representing the digital code for the independent quantity for the integrator every time that the integrator is presented for computation to form signal indications digitally representing a differential combination, means for registering in a third one of the channels said signal indications digitally representing the differential combination, means for providing in a fourth one of the channels signal indications digitally representing weighted signal indications representing the differential combinations in the third channel, means for providing in the fourth channel signal indications digitally representing variable quantities from external sources, means for combining the signal indications from said fourth channel of particular integrators and the signal indications from particular external sources with the signal indications representing the dependent quantity for each integrator in accordance with the coded signal indications in the first channel every time that the integrator is presented for computation, means for shifting the signal indications in digital positions of said fourth channel to present to each integrator the signal indications from the different integrators and to provide for the insertion of new signal indications for each integrator into the fourth channel after the integrator has been presented for computation, and means for recirculating the signal indications from the external sources to present such indications to each integrator and for inserting into the fourth channel new signal indications from the external source after the indications previously inserted into the channel have been presented to each integrator for computation.

9. A digital differential analyzer, including, means including memory means and a plurality of counting stages for providing a plurality of integrators, means including the memory means for providing signal indications digitally coded to provide a particular interrelationship between the integrators in accordance with a mathematical problem to be solved, means including the memory means for providing for each integrator signal indications representing in finite increments an independent variable quantity, means for providing for each integrator signal indications representing in finite increments a dependent variable quantity, integrating computer unit means for differentially combining for each integrator the signal indications representing the independent and dependent quantities for the integrator to produce signal indications representing in finite increments an output quantity for the integrator, means for providing signal indications representing in finite increments variable quantities from external sources, and means for varying the signal indications representing the dependent quantity for each integrator on a finite incremental basis in accordance with the signal indications representing variations in the independent quantity for the integrator and in accordance with the output signal indications from certain integrators and the signal indications from certain external sources dependent upon the problem to be solved.

10. In a computer, means for synchronizing the operation of two interconnected digital differential analyzers each having a certain number of operating pulse positions in a circulating memory, and having clock pulse means supplying timed pulses for regulation of operations in its associated analyzer, which comprises general means in each said analyzer controlling all its respective operating pulse positions, a plural stage clock pulse position counter connected to each said clock pulse means to count its respective clock pulses, an integrator counter receiving the overflow from each said clock pulse position counter, the output of each said integrator counter connected to trigger its respective general controlling means for positioning said operating pulses in said memory of its associated analyzer, means for comparing the counts of said two integrator counters and separate manually operated input means connected to each said clock pulse position counter to shift the count of its connected counter until the condition of its respective integrator counter is changed to agree with the other integrator counter, as shown by said comparing means, whereby said interconnected analyzers are synchronized by electronically redistributing said operating pulse positions of either analyzer.

11. A digital differential analyzer, comprising: means including memory means for providing a plurality of integrators, means for sequentially presenting the integrators for computation, means including said memory means for registering signal indications digitally representing an independent quantity for each integrator, means including said memory means for registering signal indications digitally representing a dependent quantity for each integrator, an integrating computer unit for forming signal indications digitally representing the differential combination of the independent and dependent quantities for each integrator, means including said memory means for registering signal indications digitally representing empirical information from external sources and said signal indications digitally representing said differential combination, means for presenting to each integrator in a particular pattern the signal indications representing the differential combinations from the other integrators and the signal indications representing the empirical information from the external sources for the utilization of such information by the integrator, and means for providing signal indications representing digital variations in the independent and dependent quantities for each integrator in accordance with the signal indications representing the differential combinations from particular integrators and the signal indications representing the empirical information from particular external sources dependent upon the problem being solved.

12. A digital differential analyzer, comprising means including memory means for providing a plurality of integrators, means for sequentially presenting the integrators for computation, means including said memory means and electrical circuitry for registering signal indications digitally representing an independent quantity for each integrator, means including the memory means and electrical circuitry for registering signal indications digitally representing a dependent quantity for each integrator, an integrating computer unit combining said signal indications to form signal indications digitally representing the differential combination of the independent and dependent quantities for each integrator, means including the memory means and electrical circuitry for registering said signal indications digitally representing said differential combination for each integrator, means including electrical circuitry for registering in said memory means signal indications digitally representing empirical information from external sources, means including electrical circuitry for presenting to each integrator for utilization said signal indications representing said differential combination from the other integrators and the signal indications from the external sources, and means including electrical circuitry for providing signal indications representing digital variations in the independent and dependent quantities for each integrator in accordance with the signal indications from the other integrators and from the external sources and in accordance with the interrelationship between the different integrators and the external sources.

13. A digital differential analyzer, comprising: means including memory means for providing a plurality of integrators, means for sequentially presenting the integrators for computation, means including said memory means and electrical circuitry for registering signal indications digitally representing a dependent quantity for each integrator, means including said memory means and electrical circuitry for registering signal indications digitally coded to control the production of signal indications representing variations in an independent quantity for each integrator before the presentation of the integrator for computation, means including said memory means and electrical circuitry for registering signal indications digitally coded to control the production of signal indications representing variations in the dependent quantity for each integrator before the presentation of the integrator for computation, means including said memory means and electrical circuitry for registering signal indications digitally representing the differential combination of the independent and dependent quantities for each integrator, means including electrical circuitry for arithmetically combining the signal indications representing the dependent quantity and the variations in the dependent quantity for each integrator upon the presentation of the integrator for computation to provide new signal indications representing the dependent quantity for the integrator, and an integrating computer unit including electrical circuitry for differentially combining the signal indications representing the dependent quantity and the variations in the independent quantity for each integrator upon the presentation of the integrator for computation to produce signal indications representing increments in the differential combination for the integrator.

14. A digital differential analyzer, comprising: means including memory means for providing a plurality of integrators, means for sequentially presenting the integrators for computation, means including said memory means and electrical circuitry for registering signal indications digitally representing a dependent quantity for each integrator, means including said memory means and electrical circuitry for registering signal indications digitally representing the differential combination of the dependent quantity and an independent quantity for each integrator, means including said memory means and electrical circuitry for registering weighted-value signal indications digitally representing weighted values in the last mentioned signal indications, means including said memory means and electrical circuitry for registering signal indications digitally coded to control the production of signal indications representing variations in the independent quantity for each integrator before the presentation of the integrator for computation and in accordance with said weighted-value signal indications from other integrators dependent upon the problem being solved, means including said memory means and electrical circuitry for registering signal indications digitally coded to control the production of signal indications representing variations in the dependent quantity for each integrator before the presentation of the integrator for computation and in accordance with said weighted value indications from other integrators dependent upon the problem being solved, means including electrical circuitry for arithmetically combining the signal indications representing the dependent quantity and variations in the dependent quantity for each integrator upon the presentation of the integrator for computation to provide new signal indications representing the dependent quantity for the integrator, integrating computer unit means including electrical circuitry for differentially combining the signal indications representing the dependent quantity and variations in the independent quantity for each integrator upon the presentation of the integrator for computation to produce signal indications representing increments in the differential combination for the integrator, and means including electrical circuitry for arithmetically combining the signal indications representing the differential combination and the increments in the differential combination for each integrator upon each presentation of the integrator for computation to provide new signal indications representing the differential combination for the integrator.

15. A digital differential analyzer comprising: memory means for providing a plurality of integrator memory sections; a first memory channel in each of said integrator memory sections for registering signals digitally representative of a dependent quantity; integrating computer means connected to receive said signals from said first memory channel to form signals digitally representing the differential combination of said dependent quantity and an independent quantity upon receiving signals indicating a discrete variation in an independent quantity; a second memory channel in each of said integrator memory sections for registering the signals digitally representing said differential combination; at least a third memory channel in each of said integrator memory sections for registering signals representing a conditional discrete variation in said independent quantity; another memory channel associated with each of said integrator memory sections for registering signals digitally representing weighted values of the signals registered in said second memory channel; means for detecting the coincidence of signals in said third memory channel and said other memory channel to form said signals indicating a discrete variation in an independent quantity; and means for applying said signals indicating a discrete variation in an independent quantity of said integrating computer means.

16. A device according to claim 15 wherein said memory means comprises a data register having a plurality of channels; and counting means for dividing said data register into a plurality of integrator storage sections.

17. A device according to claim 16 wherein said data register comprises a magnetic drum register.

18. A device according to claim 15 including means for receiving external signals digitally representing a variable quantity; and means for varying the signals registered in said other memory channel under control of said external signals.

19. A device according to claim 15 wherein said integrating computer means includes adder means for adding signals from said second channel to signals from said signals digitally representing the differential combination.

20. A device according to claim 15 including means for varying the signals registered in said first memory channel.

21. A digital differential analyzer comprising: memory means for providing a plurality of integrator memory sections; a first memory channel in each of said integrator memory sections for registering signals digitally representative of a dependent quantity; integrating computer means connected to receive said signals from said first memory channel to form signals digitally representing the differential combination of said dependent quantity and an independent quantity upon receiving signals indicating a discrete variation in an independent quantity; a second memory channel in each of said integrator memory sections for registering the signals digitally representing said differential combination; at least a third memory channel in each of said integrator memory sections for registering signals representing conditional discrete variations in said independent quantity and said dependent quantity; another memory channel associated with all of said integrator memory sections for registering signals digitally representing weighted values of the signals registered in said second memory channel; means for detecting the coincidence of signals in said third memory channel and said other memory channel to form signals indicating discrete variations in said independent quantity and said dependent quantity; means for applying said signals indicating a variation in said independent quantity to said integrating computer means; and means for altering the signals registered in said first channel in accordance with said signals indicating a variation in said dependent quantity.

22. A device according to claim 21 including means for receiving external signals digitally representing a variable quantity; and means for varying the signals registered in said other memory channel under control of said external signals.

23. A device according to claim 21 wherein said at least a third channel comprises two separate memory channels each for registering signals identified with variations in a particular quantity.

References Cited in the file of this patent
UNITED STATES PATENTS

| | | |
|---|---|---|
| 2,318,591 | Couffignal | May 11, 1943 |
| 2,540,654 | Cohen et al. | Feb. 6, 1951 |
| 2,609,143 | Stibitz et al. | Sept. 2, 1952 |
| 2,611,813 | Sharpless et al. | Sept. 23, 1952 |
| 2,701,095 | Stibitz | Feb. 1, 1955 |

OTHER REFERENCES

The Design of Switching Circuits, Keister et al., D. Van Nostrand Co., 1951; pages 235–272, 523–546 only.

Investigation for Design of Digital Calculating Machinery, Harvard Computation Laboratory, November 1948; pages II–5 to II–9 only.

Mechanized Reasoning, Electronic Engineering, April 1951; pages 126–133.

Synthesis of Electronic Computing and Control Circuits; Staff of Harvard Computation Laboratory; Harvard University Press, 1951; pages 30–49, 68–117.